United States Patent [19]

Rupp et al.

[11] Patent Number: 4,882,683

[45] Date of Patent: Nov. 21, 1989

[54] CELLULAR ADDRESSING PERMUTATION BIT MAP RASTER GRAPHICS ARCHITECTURE

[75] Inventors: Charles R. Rupp, Bolton; William R. Stronge, Tewksbury, both of Mass.

[73] Assignee: Fairchild Semiconductor Corporation, Santa Clara, Calif.

[21] Appl. No.: 26,041

[22] Filed: Mar. 16, 1987

[51] Int. Cl.⁴ ........................ G09G 1/16; G06F 3/153

[52] U.S. Cl. .................................. 364/521; 340/723; 340/750; 340/799

[58] Field of Search ............................ 364/518-521; 340/701, 703, 723, 727, 729, 724, 750, 798-800

[56] References Cited

U.S. PATENT DOCUMENTS

| | | | |
|---|---|---|---|
| 3,988,728 | 10/1976 | Inoue et al. | 340/724 |
| 4,129,859 | 12/1978 | Iwamura et al. | 340/724 |
| 4,240,075 | 12/1980 | Bringol | 340/798 |
| 4,245,321 | 1/1981 | Gennettem | 364/521 |
| 4,246,578 | 1/1981 | Kawasaki et al. | 340/750 |
| 4,330,834 | 5/1982 | Murphy | 364/521 |
| 4,342,990 | 8/1982 | Traster | 340/724 |
| 4,375,079 | 2/1983 | Ricketts et al. | 364/518 |
| 4,445,115 | 4/1984 | Rudgard | 340/745 |
| 4,517,654 | 5/1985 | Carmean | 364/521 |
| 4,555,763 | 11/1985 | Dahme | 364/521 |
| 4,559,533 | 12/1985 | Bass et al. | 340/724 |
| 4,595,917 | 6/1986 | McCallister et al. | 340/703 |
| 4,636,783 | 1/1987 | Omachi | 340/723 X |
| 4,642,621 | 2/1987 | Nemoto et al. | 340/723 X |
| 4,648,049 | 3/1987 | Dines et al. | 340/703 X |
| 4,688,190 | 8/1987 | Bechtolsheim | 364/900 |
| 4,700,320 | 10/1987 | Kapur | 364/521 X |
| 4,716,544 | 12/1987 | Bartley | 364/900 |

OTHER PUBLICATIONS

Gupta, Sproull and Sutherland, "A VLSI Architecture for Updating Raster-Scan Displays", Aug. 1981, vol. 15, No. 3, pp. 333-340.

Foley, Van Dam, "Fundamentals of Interactive Computer Graphics", Jul. 1984, chapters 3, 10 and 12 et seq.

Newman, Sproull, "Principles of Interactive Computer Graphics", 1979, chapters 15, 19.

"A Configurable Pixel Cache for Fast Image Generation" by Andy Goris, Bob Fredrickson, & Harold L. Baeverstad, Jr., pp. 24-32.

"Architectures and Algorithms for Parallel Updates of Raster Scan Displays", Doctoral Dissertation by Satish Gupta, 1982.

*Primary Examiner*—David L. Clark
*Assistant Examiner*—H. R. Herndon
*Attorney, Agent, or Firm*—Lee Patch; Daniel H. Kane, Jr.

[57] ABSTRACT

A new permutation bit map architecture is described for flexible cellular addressing, image creation, and frame buffer control in raster graphics machines. A new frame buffer address generator and address circuitry accesses frame buffer memory locations with different word and cell configuration addressing modes to increase performance and efficiency. A new graphics image data generator creates, modifies, and updates graphics image data in the frame buffer memory locations accessed by the multiple addressing mode word and cell configurations of the address generator and address circuitry. The graphics image data generator provides vector drawing, polygon filling, "Bit Blt's" or bit block transfers, alignment and masking of graphics image data, and refresh display of a raster view surface. Vector drawing is achieved with greatly increased performance because of the multiple cellular addressing modes of the addressing circuitry. A new and unusual permuted bit map organization of graphics image data is established in the frame buffer memory locations by the new flexible addressing architecture. The frame buffer address circuitry incorporates linear permutation networks that permute the user X,Y,Z coordinate addresses. The data generator circuit also incorporates linear permutation networks for normalizing, aligning and merging data retrieved from the frame buffer memory in raster operations. Parallel processing of accessed data is achieved using a frame buffer comprised of multiple memory banks. The system is also implemented in three dimensions. A new three-dimensional permuted bit map organization accommodates a variable number of multiple planes in the third dimension or bit depth dimension for varying the number of bits defining each pixel.

65 Claims, 25 Drawing Sheets

$C_p(X,Y) = X+Y \pmod 4$ FOR $L=4$ $S_p(T, i) = (i + T) \bmod L = i'$ $Y_s = S_p(sm, R_p(Y))$ for $sm = 1$
$T = 3$
$L = 4$

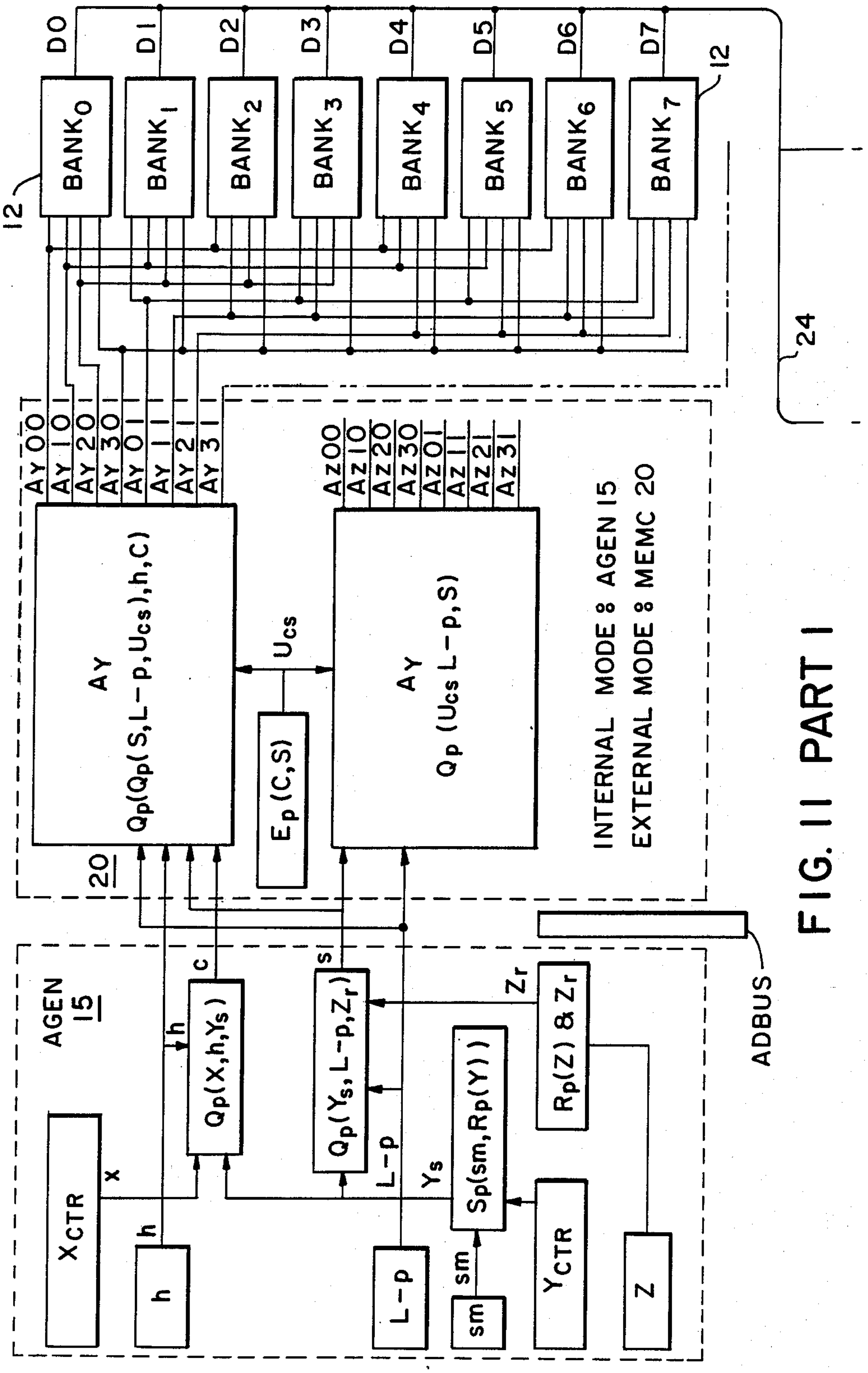
FIG. 11 PART I

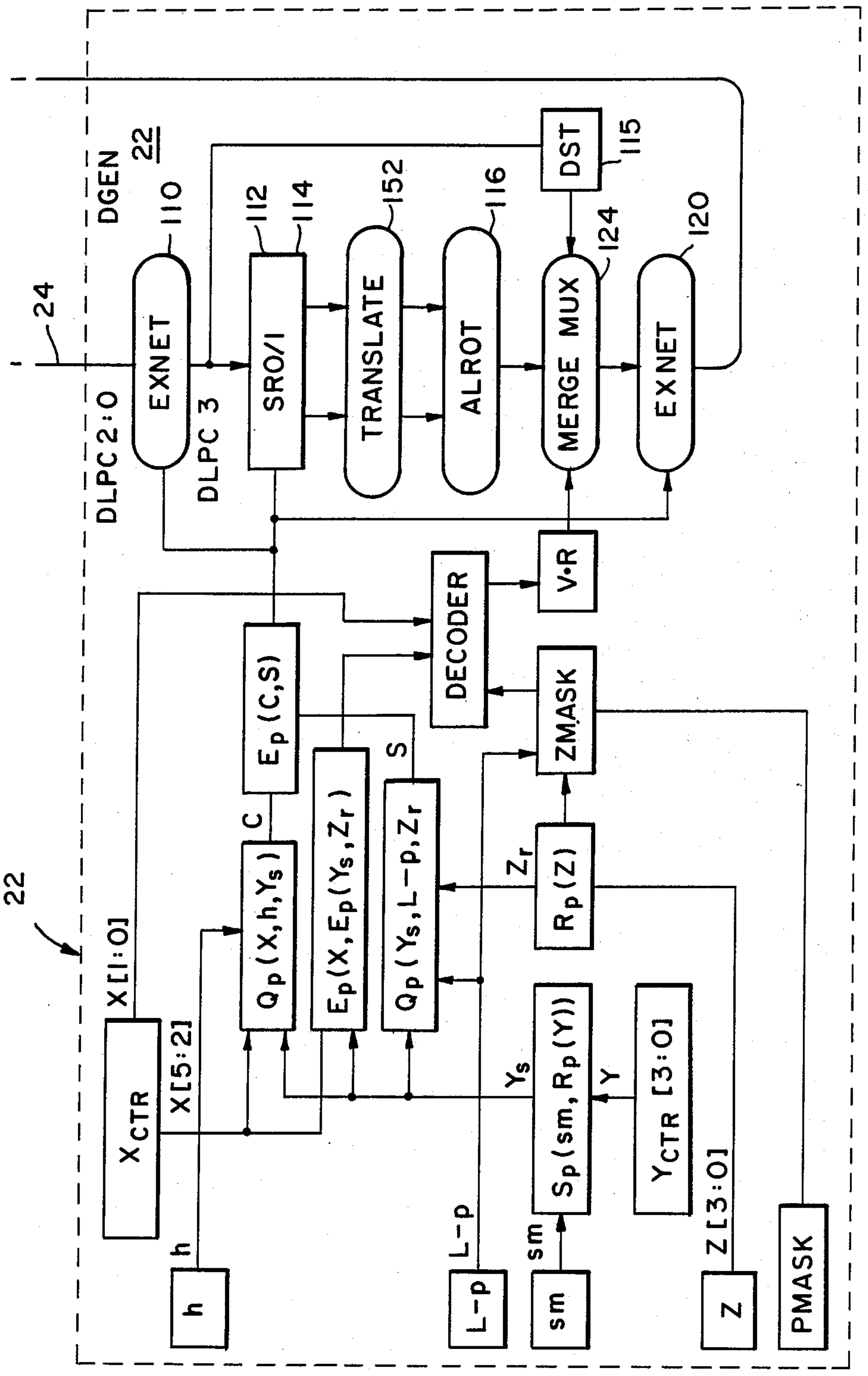
FIG. 11 PART 2

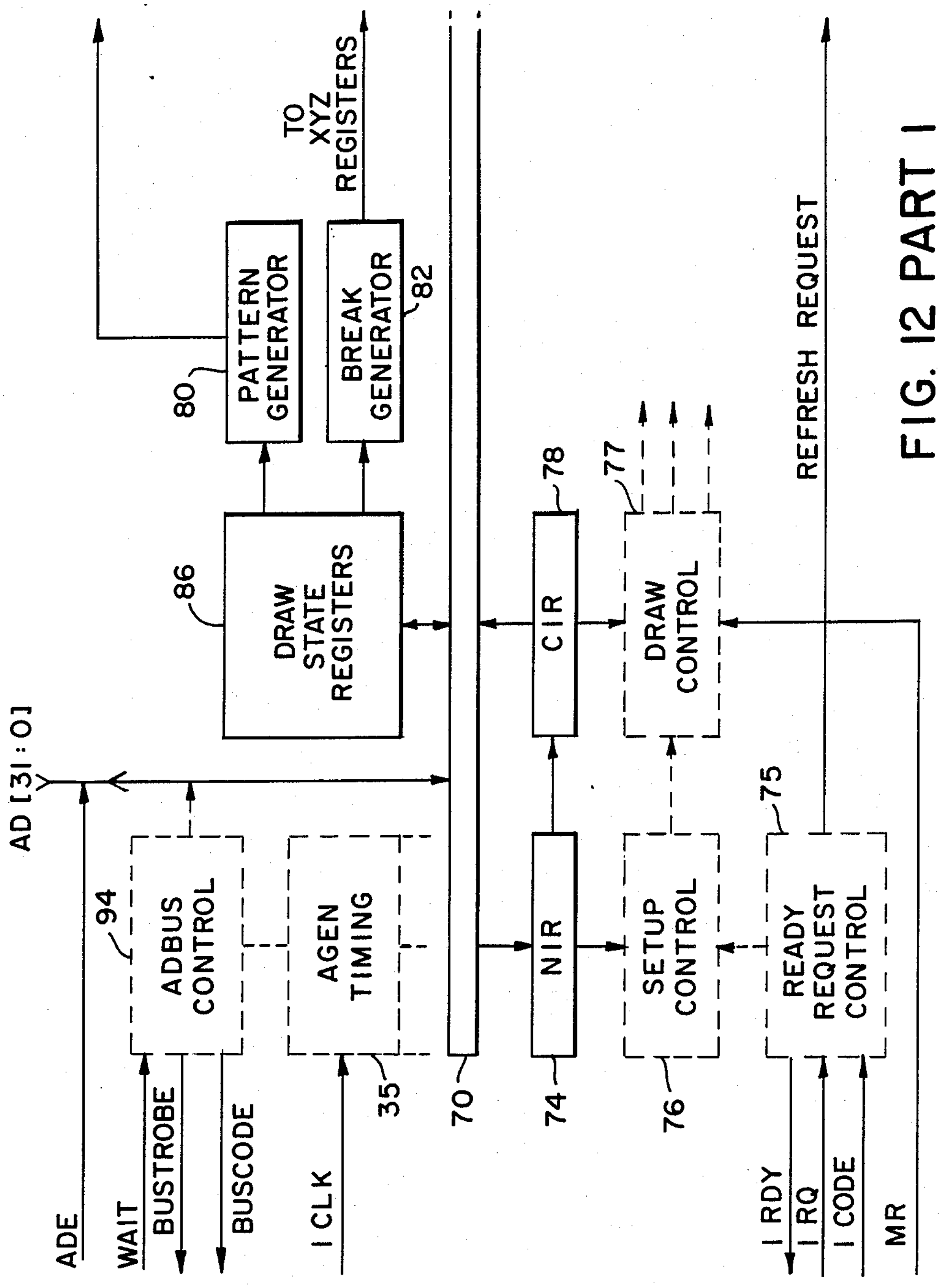
FIG. 12 PART I

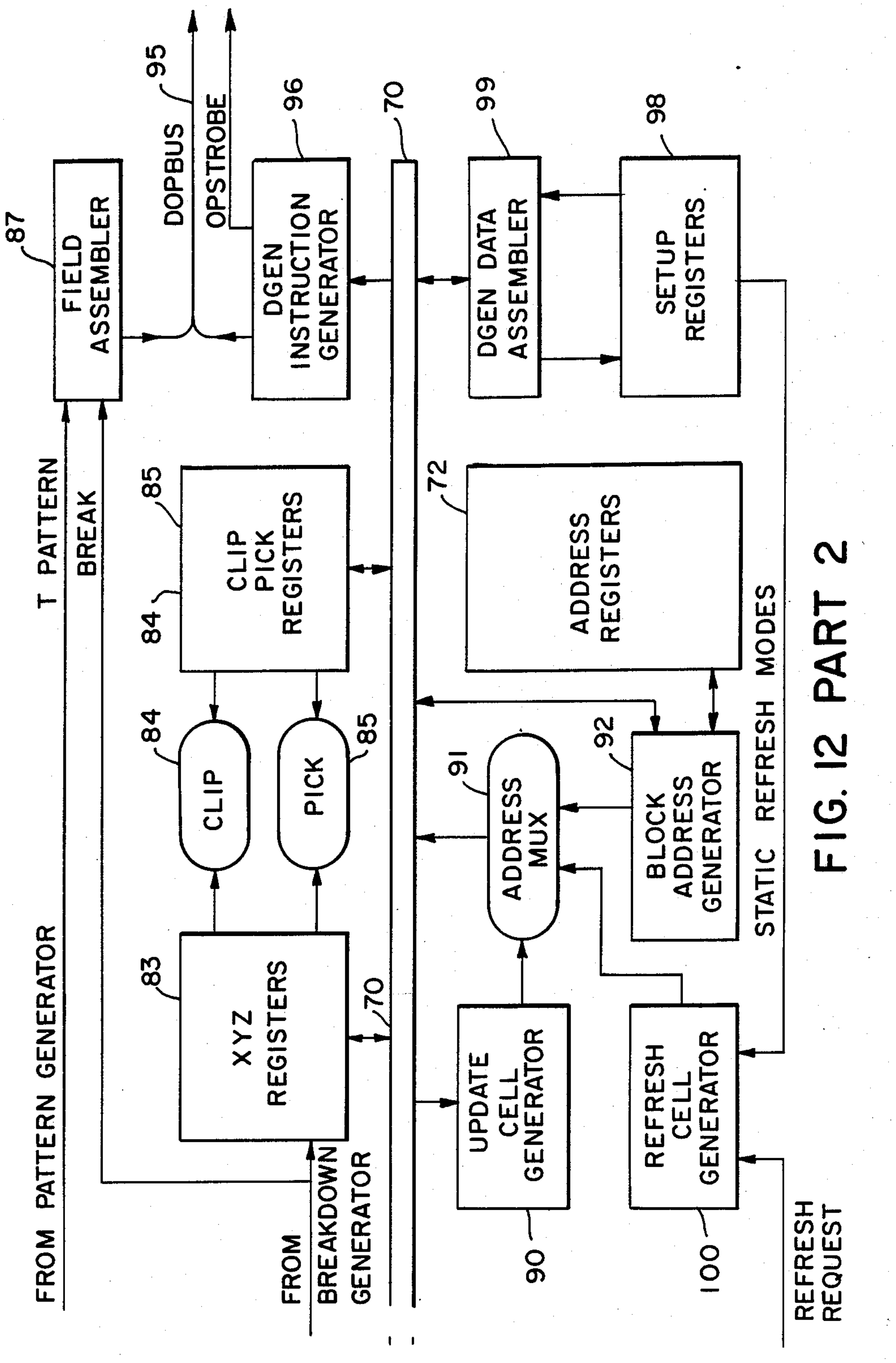
FIG. 12 PART 2

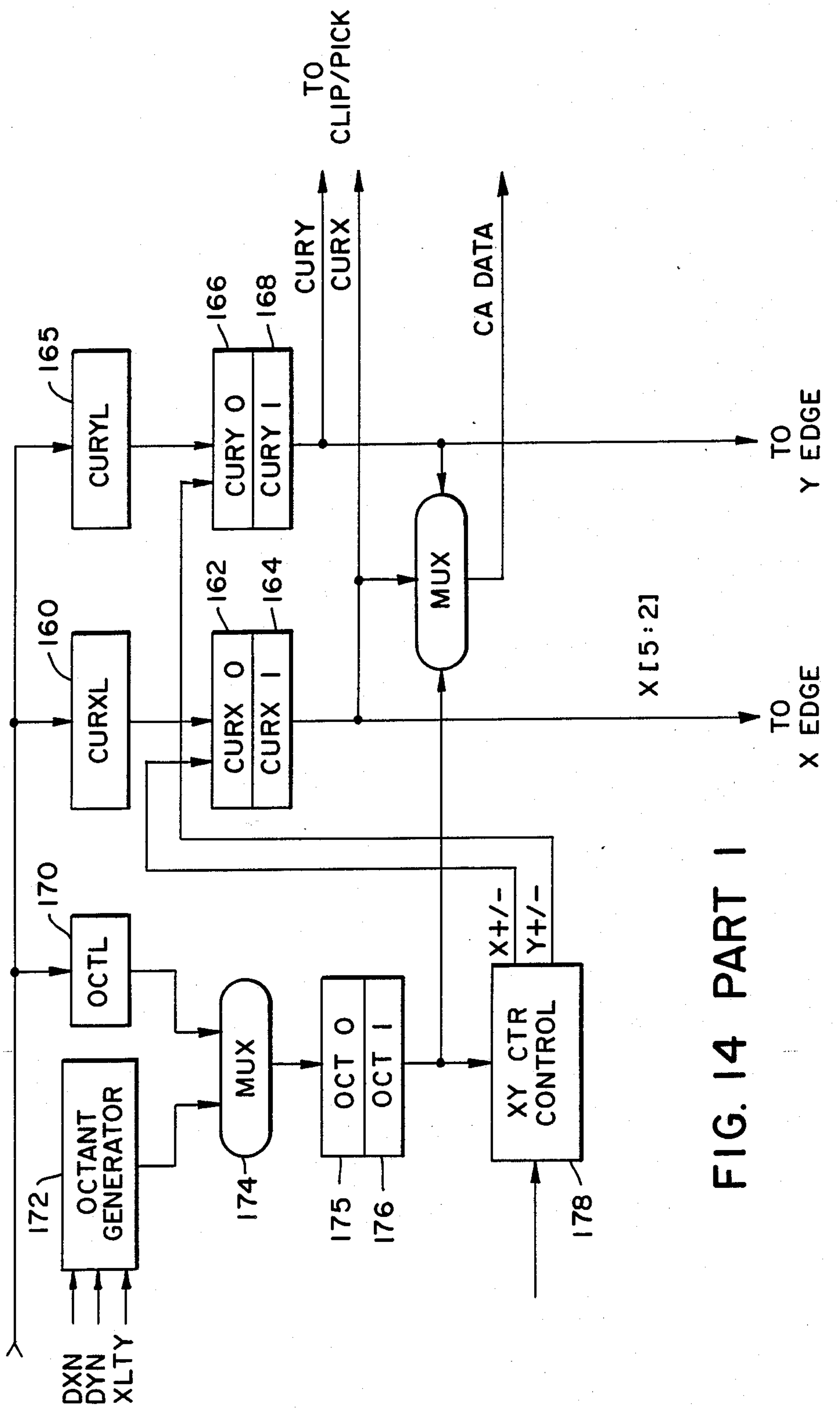
FIG. 14 PART I

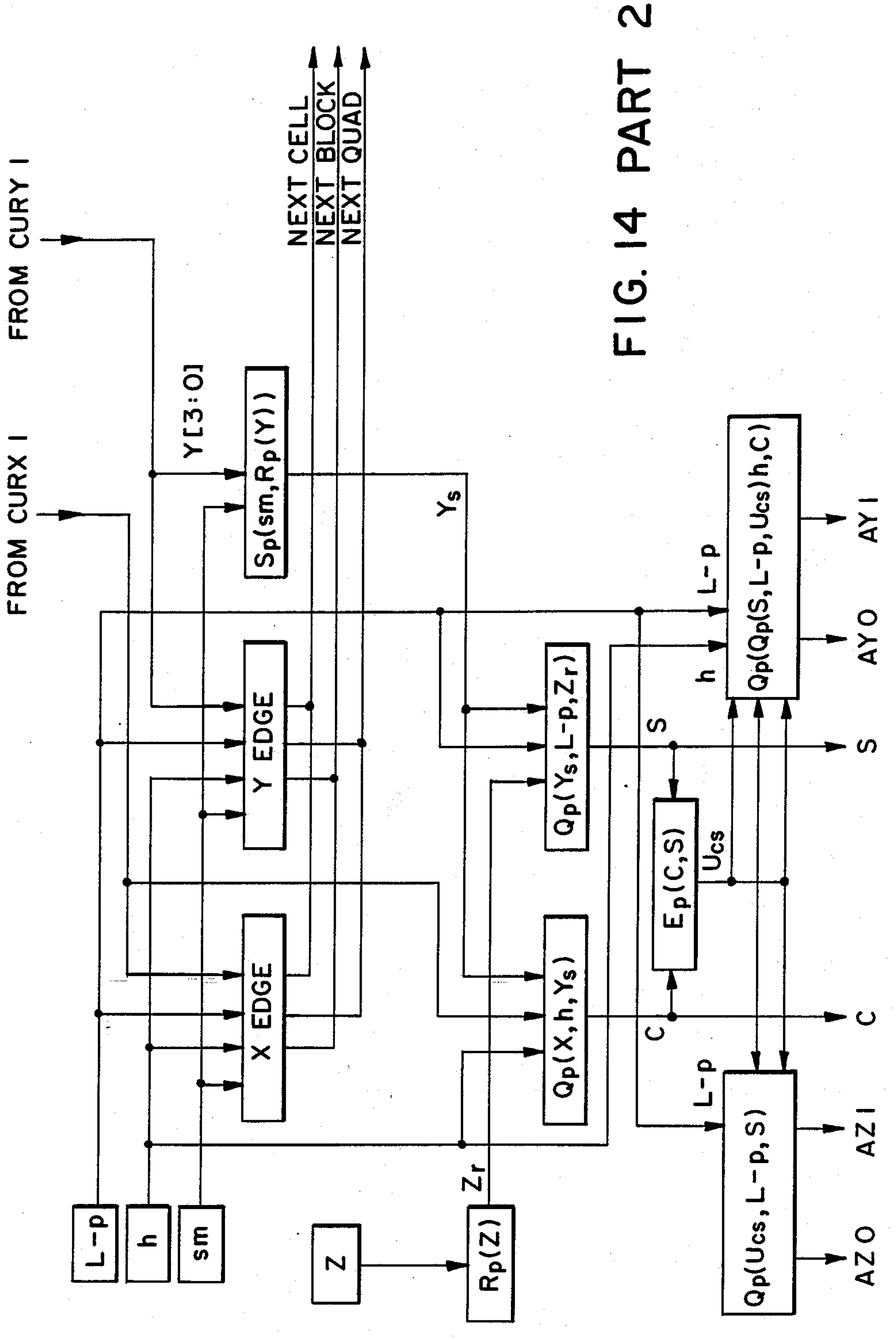
FIG. 14 PART 2

REFRESH CELL ADDRESS GENERATION

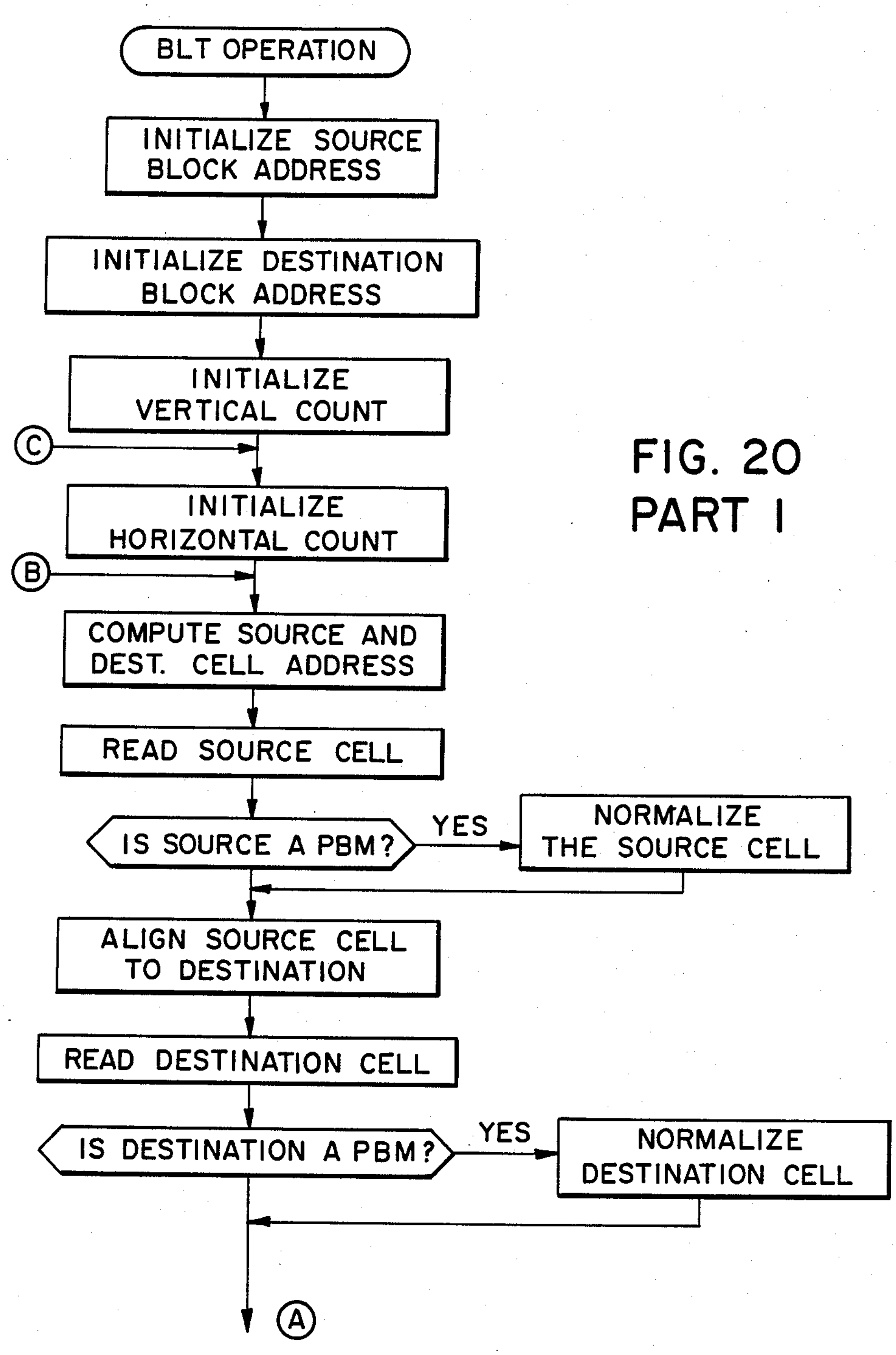
FIG. 20 PART I

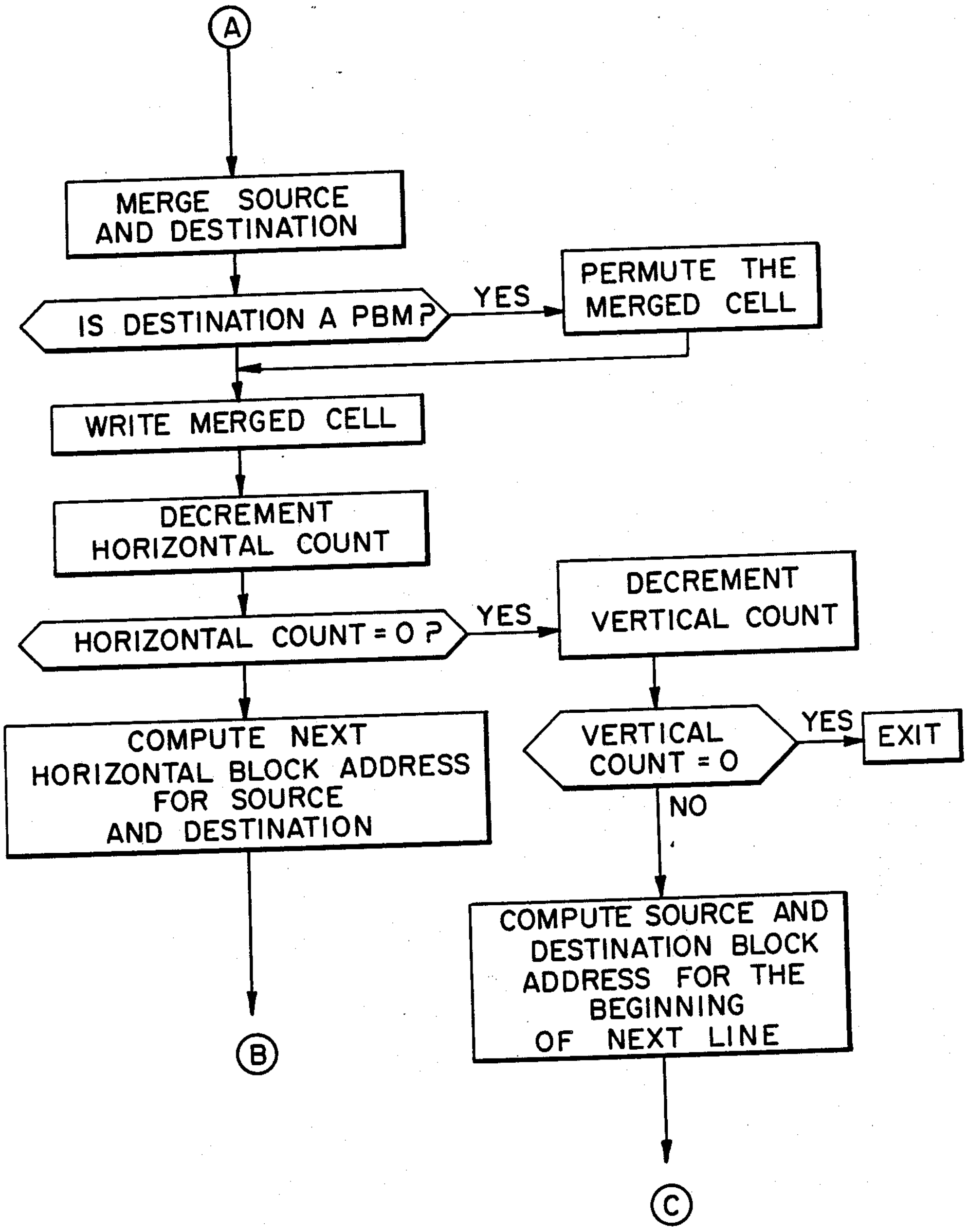
FIG. 20 PART 2

CELLULAR ADDRESSING PERMUTATION BIT MAP RASTER GRAPHICS ARCHITECTURE

TECHNICAL FIELD

This invention relates to a new computer graphics image creation system frame buffer memory controller, and flexible frame buffer addressing architecture for raster graphics machines. The invention provides a new frame buffer address generator and address circuitry for accessing frame buffer memory locations with different word and cell configuration addressing modes to increase performance and efficiency. The invention provides a new graphics image data generator for creating, modifying, and updating graphics image data in the frame buffer memory locations accessed by the multiple addressing mode word and cell configurations of the address generator. The graphics image data generator provides e.g. vector drawing, polygon fill, "Bit Blt's" or bit block transfers, and refresh display of a raster view surface. The invention also relates to new and unusual permuted bit map organization of graphics image data in the frame buffer memory locations. The frame buffer address circuitry incorporates linear permutation networks that permute the user X,Y or X,Y,Z coordinate addresses to replace standard bit maps with permuted bit maps that accommodate multiple word and cell addressing modes. Parallel processing of accessed data is achieved using a frame buffer comprised of multiple memory banks. The invention also includes new three-dimensional permuted bit map organization with variable number of multiple planes in the third or Z dimension for varying the number of bits defining each pixel.

BACKGROUND ART

In computer raster graphics machines, an image is typically displayed by raster scanning on a CRT display screen or other raster display view surface. Each minimum picture element at a display screen or view surface location is referred to as a pixel and each pixel is defined by one or more bits at one or more memory locations of the image data memory. In the simplest raster graphics display, the pixel at each display location is defined by one bit at a corresponding memory location of the image data memory.

The graphics image data memory is referred to as the image frame buffer, image refresh buffer or image bit map. The frame buffer is typically implemented by solid state random access memory (RAM) integrated circuit (IC) chips which may also constitute multiple memory banks. The frame buffer is referred to as a refresh buffer because the image frame on a CRT display screen is refreshed with the contents of the frame buffer, typically 30 or 60 raster cycles per second. The framebuffer is also referred to as a bit map because the contents or bits at the memory locations of the frame buffer are mapped onto the display screen or view surface by a raster scan generator. The contents of the frame buffer are organized in a linear stream by a video scan line generator to control CRT beam intensity.

Typically there is a fixed one to one correspondence between the memory address locations in the frame buffer and the pixel positions on the display screen or view surface identified as the user/viewer X,Y coordinate system. Where each pixel of the raster display view surface is defined by more than one bit for example 1, 2, 4, 8, or 16 bits, etc., the frame buffer memory locations are considered spatially organized into planes for example 1, 2, 4, 8, and 16 planes etc. corresponding to the multiple bits per pixel. The planes may be viewed as adding a third dimension to the bit map. The multiple bits per pixel bear a many-to-one correspondence with pixel positions of the user X,Y coordinate system view surface and are used to define color tone, gray scale, resolution, etc., and provide an image with greater definition.

The contents of the frame buffer are delivered to the video display section in a linear sequence by successive memory cycles. Successive memory cycles access the frame buffer in standard bit map word mode addressing or word configuration addressing of the multiple RAMs or memory banks constituting the frame buffer. Each memory cycle or memory access cycle accesses each of the memory banks consecutively and pulls out a sequence of bits from the successive RAMs or memory banks which may be visualized as a horizontal word or portion of a row of the standard bit map and a horizontal word or portion of a row of pixels on the user X,Y coordinate system view surface. Each scan line of the raster pattern is composed of a sequence of such words retrieved from the bit map forming complete rows or scan lines across the view surface. Typically, approximately half of the memory bandwidth or memory cycle time of the frame buffer is used for refresh memory access.

The other portion of the memory bandwidth or memory cycle time is available for updating the frame buffer or refresh buffer image memory. This is also referred to as writing, drawing or painting new images, image portions or image elements in the frame buffer. In the case of a CRT display, updating is typically accomplished by interleave during refresh. The new contents are displayed by refresh of the image on the display screen or view surface. A disadvantage of the conventional raster graphics word mode architecture and standard bit map is that the update of the frame buffer by "drawing" and "painting" is accomplished using the same word mode addressing and horizontal word configuration for accessing the multiple RAMs or memory banks. This is a disadvantage because the one-dimensional horizontal word mode or word configuration addressing, while it is adapted for efficiently accessing the contents of the frame buffer for refreshing the entire screen, cannot capitalize on the simple geometry of smaller two-dimensional areas of vectors to be drawn.

In vector drawing and painting only a defined portion of the frame buffer need be accessed for drawing, painting or modifying a small portion of the view surface area. The word mode addressing constrains the raster graphics machine to access numbers of memory locations far in excess of that required for a particular frame buffer update for example for drawing a vector. This is because the conventional word mode architecture and addressing looks only at long horizontal word sequences or row portions of the bit map in successive memory cycles. The vector or character to be drawn may conform more realistically to a small vertically oriented two-dimensional rectangle. Excessive time of multiple memory cycles is therefore required for updating the frame buffer in drawing and painting and the available frame buffer memory band width or available memory cycle time is inefficiently used.

The efficiency of performance of the raster graphics machine can be measured as a function of the number of bits defining pixels on the screen which are actually changed or updated each memory cycle. For example, if each memory cycle accesses 64 bits at 64 memory locations of the memory banks in the form of a 64 bit horizontal addressing word, then a 16 bit or 16 pixel vertical or diagonal vector is drawn or updated in the frame buffer inefficiently. In a single plane frame buffer perhaps only a single bit corresponding to a single pixel of the screen is updated each memory word access cycle. Therefore, up to 16 of the word memory access cycles may be required to complete the drawing of the vertical or diagonal vector updating only one bit each 64 bit word memory access cycle.

A cellular architecture for raster-scanned frame buffer displays is described by Satish Gupta and Robert F. Sproull of Carnegie-Mellon University and Ivan E. Sutherland in "A VLSI Architecture for Updating Raster-Scan Displays" *Computer Graphics,* Volume 15, Number 3, pp. 333–340, August 1981, also published in *Proceedings of SIGGRAPH* 81. pp. 71–78, Association of Computing Machinery, 1981. Gupta, Sproull, and Sutherland disclose an 8×8 bit cell organization of the frame buffer memory instead of the conventional horizontal word oriented memory organization for accessing the frame buffer by a single two-dimensional 8×8 bit cell configuration addressing mode.

According to this cell addressing concept, the frame buffer addressing and control circuits and bit map are designed to permit accessing successive memory address locations of the memory banks in a cell configuration corresponding to a square cell of pixels on the view surface or display screen. The cell configuration rectangle is composed of a similar number of bits or pixels as a horizontal word mode addressing word, for example 64 bits. However the cell addressing configuration viewed on the display screen or viewing surface is two-dimensional. As a result the frame buffer may be updated and a vertical or diagonal vector or two-dimensional character can be drawn in a reduced number of memory access cycles for updating or drawing the required bits and pixels. Vector drawing performance, which conventionally may be limited to one bit or pixel changed or updated per memory cycle, is upgraded to multiple bits or pixels changed or updated per memory access cycle.

The 8×8 cell addressing mode permits greater performance in number of pixels updated each memory access cycle when updating the frame buffer for drawing two-dimensional vectors, characters and bit block transfers. A disadvantage of the Gupta, Sproull, and Sutherland system however is that refresh of the display is less efficient than is the case with horizontal word mode addressing because the rectangular addressing mode cell must be used for refresh or display of the contents of the frame buffer across the view surface. Only one line of the 8×8 bit cell from each memory access cycle is used for assembling a particular refresh scan line. The Gupta et al. system architecture can achieve only one addressing mode and is constrained by the selected cell configuration and a bit map organization that permits only one addressing mode.

Another cell organized raster display architecture with a single 8×8 pixel cell is described by Jordan and Barrett in "A Cell Organized Raster Display for Line Drawings", *CACM,* Volume 17(2):70, February, 1974 and "A Scan Conversion Algorithm with Reduced Storage Requirements", *CACM,* 16 (11):676, November, 1973. Further background on computer graphics raster display frame buffer architecture is provided by Foley & Van Dam, *Fundamentals of Interactive Computer Graphics,* Addison-Wesley Company, Reading, Mass., 1982, Chapters 3, 10 and 12 et. seq. and Newman and Sproull, *Principles of Interactive Computer Graphics,* Second Edition, McGraw-Hill Book Company, New York, N.Y., 1979, Chapters 15–19. According to Foley and Van Dam the Tektronix 4025 and 4027 (Trademark) displays utilize cell encoding in which memory is allocated by storing cells of 8×14 pixels. In these prior references the architecture is limited to one addressing mode with a generally simple or straightforward standard or conventional bit map organization that can accommodate only one addressing mode cell configuration during frame buffer memory access cycles.

In the Texas Instrument TI 34010 Graphics System Processor or GSP, a different number of planes, for example 1, 2, 4, 8 or 16 planes, can be selected. This raster graphics system is therefore capable of defining pixels by different selected number of multiple bits. A different horizontal addressing word is associated with each different selection of number of planes. There are, therefore, different addressing words. A different but standard type bit map is associated with each selection of a different number of planes. However, once the number of planes and corresponding standard bit map is selected only one addressing word or mode is available.

Further discussion of the prior art and state of the art in raster addressing modes is found in applicant's Information Disclosure Statement along with discussion of distinguishing and contrasting features of the present invention. Applicant's Information Disclosure Statement and references cited are incorporated herein by reference.

OBJECTS OF THE INVENTION

It is therefore an object of the present invention to provide new and flexible raster graphics architectures and frame buffer bit maps which accommodate multiple different cell and word addressing modes or multiple cell and word configurations for accessing the raster display frame buffer memory locations.

Another object of the invention is to provide frame buffer addressing and control circuits which permit selection from a range of cell or word configuration addressing modes to match a particular image drawing requirement for optimizing performance. The invention capitalizes on the simple geometry of vectors and characters to be drawn or updated when addressing the frame buffer. That is, the new architecture of the present invention is intended to permit selection of the appropriate mode from a plurality of alternative cellular addressing modes to optimize and maximize the number of pertinent bits of the frame buffer bit map and corresponding pixels drawn or updated each memory cycle. By this arrangement the number of memory access cycles is minimized reducing the time required for graphics drawing operations. Optimum use is made of the available memory bandwidth and memory cycle time not required for display screen refresh.

A further object of the invention is to provide multicellular addressing modes including both alternative two-dimensional cells and horizontal words. A feature and advantage of this flexible architecture is that vector drawing performance is dramatically improved with the two-dimensional cellular addressing while preserving the high efficiency of horizontal word access to the frame buffer for refresh of the raster display.

Yet another object of the invention is to provide flexible organization of the frame buffer memory address locations into single and multiple planes adding a flexible third dimension to the bit map while preserving multicellular and word addressing modes for each selection of number of planes. According to this feature the frame buffer architecture effectively accommodates multiple three-dimensional addressing mode cell and word configurations for selectively varying image pixel display definition in color scale, gray scale, resolution, etc.

A related object of the invention is to provide an image creation system and image data generator for raster graphics machines capable of operating in the new flexible addressing raster graphics frame buffer architecture and bit map. The data generator is capable of raster operations on graphics image data accessed according to any of the multiple addressing modes.

DISCLOSURE OF THE INVENTION

In order to accomplish these results and accommodate multiple cell and word addressing modes a highly unusual bit map organization is provided by the present invention. To this end the memory locations and corresponding memory addresses of the frame buffer memory banks are not organized in the conventional row and column arrangement of a standard bit map or SBM corresponding to a simple arithmetic or identity bit map relationship with the user/viewer X,Y coordinate system. Rather the addresses or memory locations of the frame buffer are permuted in an unusual order. The image data frame buffer bit map constitutes a linear permutation or transformation from the simple row and column user X,Y coordinate address arrangement on the display screen or view surface. To visualize the consequences of this permuted order, each memory bank instead of controlling an orderly sequence of columns of pixels on the view surface controls a complex distribution of pixels across the screen comprising a complex linear permutation of the original conventional columns and rows of pixels in the user/viewer X,Y coordinate system.

According to the invention the addressing and control circuits for the frame buffer incorporate logical linear permutation networks or operators for achieving and implementing the unusual organization. The bit map itself is organized as a complex logical linear permutation of the user X,Y coordinate system organization of image pixel address positions on the display surface. The linear permutation operators incorporated into the frame buffer addressing and control circuits store the image data bits in the frame buffer in a permuted or "warped" order constituting a novel permutation bit map or PBM which accommodates the addressing access in alternative multiple cell configuration and word modes. An image data generator circuit is also provided which incorporates logical linear permutation networks and linear permutation operators in order to normalize image data retrieved from the frame buffer in the multiple access modes for performing Boolean operations on image data retrieved from the frame buffer. The unusual permuted or warped order is recreated in processed image data for return to the frame buffer permutation bit map.

An address generating circuit or AGEN with associated address circuitry receives command signals from a host computer, CPU, microprocessor, or programmed graphics processor etc. The AGEN also receives image data address coordinate information in the original user X,Y coordinate system or space corresponding to a standard coordinate space. The AGEN and associated address circuits transform the image data addresses to the permuted or "warped" address space establishing the permuted bit map or novel PBM coordinate space of the frame buffer. The AGEN in turn delivers command words or operation codes to the frame buffer image data generating circuit or DGEN which processes graphics image data retrieved from the permuted bit map for updating the frame buffer memory and for refresh of the raster display.

In implementing the new raster graphics architecture, logical linear permutation networks (LPN's) incorporating self-symmetric reversible logic functions or gates permute the addressing sequence from the user X,Y coordinate space to a permuted frame buffer or PBM memory bank and bank address space, BA. The LPN's are incorporated in both the address circuits and the data generator or image creation circuits. These LPN circuits implement logical or Boolean linear permutation operators or primitives such as exchange and cyclic or rotation LPN operators. So called wire linear permutation network operators or primitives or wire LPN's such as reversal, butterfly, and shuffle LPN operators are also combined with the logical LPN's.

The invention incorporates into the flexible addressing architecture a third dimension in the form of a flexible number of bit planes of organization of the frame buffer along a third Z coordinate. The number of planes selected along the Z coordinate coincides with the number of bits defining each pixel and effectively adds a flexible third dimension or bit depth Z to the bit map and user coordinate system. The three-dimensional user X,Y,Z coordinate system or SBM space is therefore permuted or warped according to the invention to accommodate multiple three-dimensional addressing mode cells and words in a novel three-dimensional PBM space or permutation bit map.

The addresses received at the address generator and associated circuitry in the X,Y,Z user coordinate space are transformed in a preferred example to the physical memory bank and bank address PBM coordinate space in two permutation steps. First the addresses in the user X,Y,Z coordinate space are transformed to an abstract permuted C,U,S address space or bit map composed of three-dimensional block section addresses S representing subdivisions of the three-dimensional address bit map in multiple planes and corresponding subdivisions of a raster view surface encompassing the bit depth dimension. The block sections are in turn subdivided into three-dimensional cells with cell addresses C, each cell comprising memory locations from each of the successive memory banks of the frame buffer accessed in one memory access cycle. The cells are in turn subdivided into units U of image data which in the preferred implementation are units of four bits referred to as quad pixels, one unit derived from each memory bank of the frame buffer memory in a memory access cycle.

This transformation from the user X,Y,Z coordinate space to abstract C,U,S organization coordinate space is accomplished using a novel multiplexing or switch LPN which is actually a logical LPN constructed to operate on more than one index and capable of mixing or multiplexing two or more dimensions of the SBM, PBM, and intermediate address spaces. The intermediate C,U,S bit map address space is in turn translated by further address circuitry incorporating the logical LPN's into concrete memory bank designations B, and memory bank address coordinates $A_y$ and $A_z$. The $A_y$ coordinate address portion controls vertical access for a single plane mode and the $A_z$ coordinate address portion controls plane selection for address modes with vertical height of one unit, as hereafter more fully developed. The physical memory bank address coordinate space designated $B,A_y,A_z$ having the unusual permuted order and constituting a three-dimensional permuted frame buffer memory or permutation bit map permits memory accessing in any of the desired addressing cell configuration modes.

By way of example, in a single plane bit map with the cell or word size selected and arranged to be 64 bits, the addressing mode cell and word configurations range from the horizontal 64×1 refresh word for use in accessing the frame buffer during screen refresh cycles and selected raster operations, to horizontally and vertically oriented cell rectangles, for example 32×2 bit, 16×4 bit, and 4×16 bit cells for updating the frame buffer while drawing vertically and horizontally oriented two-dimensional vectors and characters. A square cell 8×8 bit addressing mode is also provided. Furthermore, the cell configurations within blocks may be rearranged and implemented in three dimensions over 2, 4, 8, and 16 planes of depth organization according to the number of bits required to define each pixel, one plane for each bit of the multi-bit pixel.

In implementing the image data generating circuit or DGEN, logical linear permutation networks implementing logical or Boolean linear permutation operator primitives such as exchange or cyclic permutation networks are again required. Wire LPN's such as reversal, butterfly, and shuffle linear permutation networks are also combined with the logical LPN's. For raster operations including raster ops or Bit Blt's, source data retrieved from the frame buffer memory of the Bit Blt or bit block transfer is merged with destination data retrieved from the frame buffer for rewriting in the frame buffer memory after appropriate masking. According to one example embodiment, data retrieved from the frame buffer is normalized, that is, permuted or transformed back to the user X,Y,Z coordinate system or standard coordinate space for performing such raster operations. A pre-permutation operation is therefore implemented by a pre-permutation network including logical LPN's so that the source data and destination data are represented in the same coordinate space. Alternatively, data may be matched for logical operations in either the normalized X,Y,Z coordinate space or in the permuted C,U,S or $B,A_y,A_z$ coordinate spaces. Alignment and masking steps are incorporated as required.

Finally, after merger of matched and aligned source and destination data in a logical function or Boolean logic circuit, a post-permutation or "postnet" operation is performed to return any normalized data to the unusual permuted or PBM address space organization of the frame buffer memory location addresses for rewriting in memory. Overall, DGEN transformations from the physical memory bank address coordinate space $B,A_y,A_z$ to the user X,Y,Z coordinate space are represented by logical LPN functional pre-permutation or prenet transformations $X,Y,Z=f(B,A_y,A_z)$, while the post-permutation or postnet logical LPN operations are the reverse, $B,A_y,A_z=f(X,Y,Z)$.

In the preferred three-dimensional system architecture the intermediate transformation through an intermediate coordinate system between the initial user X,Y,Z coordinate system and the permuted physical memory bank coordinate system $B,A_y,A_z$ represents the organization of the image data bits or pixels or the memory location addresses into blocks, cells, and units. This mode of organization constitutes an important novel and distinguishing feature of the raster graphics system invention. Because there are always at least two different cell or word addressing modes, the alternative cells or words give rise to a new level of organization or subdivision of the bit map and view surface referred to as the "block". The block width is the same as the largest horizontal dimension of the available cell or word addressing modes. The block height is the same as the largest vertical dimension of the available cell or word address modes. The cell size in bits is defined by the product of the horizontal dimension $H_i$ in bits times the vertical dimension $V_i$ in bits of each cell and word in the two-dimensional implementation and is the same for all available addressing mode cells or cell configurations and words. The cell size in bits in two dimensions is therefore equal to $H_i \times V_i$, is the same for each word and cell configuration or shape, and is selected on the basis of the overall performance desired, a larger cell size in number of bits giving better performance. Furthermore, the same number of cells for each addressing mode fills out each block without overlap and the block size in two dimensions is $H_{max} \times V_{max}$ where $H_{max}$ is the largest horizontal dimension, for example 64 bits for the $64 \times 1$ bit display word, and $V_{max}$ is the largest vertical dimension, for example 16 bits for the $4 \times 16$ bit vertically oriented cell. In the multi-plane three-dimensional architecture, the number of planes P is added as a factor in the cell size $H_i \times V_i \times P_i$ and block size $H_{max} \times V_{max} \times P$. The blocks in each case define boundaries within which all the addressing modes are accommodated in a set of an equal number of cells and within which a set of the same number of cells from each addressing mode form a boundary subset.

In the present invention the frame buffer memory comprises a plurality of separately addressable memory banks for parallel processing. The address circuit addresses each memory bank B of the frame buffer memory in a memory access cycle. Each memory access cycle accesses or generates a single cell and each memory bank contributes a unit of image data, for example a quadbit or quadpixel to each cell. Cell size is therefore related to the number of available memory banks. Block size is related to the number of different addressing mode cell or word configurations and the cell size. The unit of image data retrieved from each memory bank, for example quads of bits, is related in size to the bit width of the memory bank components, for example four bit wide memory banks. The frame buffer address circuit is operatively arranged to receive graphics image data addresses organized in a user X,Y,Z coordinate system of horizontal rows X and vertical columns Y corresponding to the pixel positions on the raster display or view surface. The user X,Y,Z coordinate system includes a bit depth dimension Z corresponding to the planes of the frame buffer memory. The address circuit linear permutation networks (LPN's) transform and permute the graphics image data addresses in the user X,Y,Z coordinate system to addresses in a $B,A_y,A_z$ coordinate system. The $B,A_y,A_z$ coordinate system is a linear permutation of the user X,Y,Z coordinate system, a linear permutation bit map, permuted bit map or PBM addressable by the frame buffer address circuit in at least two different addressing mode cell or word configurations. At least one of the addressing mode cell or word configurations corresponds to a two-dimensional cell in the user X,Y coordinate system, a two-dimensional cell in the user X,Z coordinate system, or a three-dimensional cell in the user X,Y,Z coordinate system. A feature of the invention is that the permuted bit map or PBM can operate in multiple word addressing modes in multiple planes in the X,Z coordinate system when Y the vertical dimension is set at zero. The present invention provides a multiple word addressing permuted bit map in the X,Z coordinate system by changing the number of planes in the same bit map and changing the horizontal dimension of the horizontal addressing and display word. This feature of the invention provides permuted bit maps for multiple word and multiple cell addressing modes with reference to either the X,Y coordinate system, X,Z coordinate system, or X,Y,Z coordinate system of the user.

In the preferred examples, the linear permutation networks comprise at least one Boolean or logical linear permutation network (LPN) incorporating self-symmetric reversible Boolean logic functions or gates. A feature and advantage of this arrangement is that there is a reversible one-to-one relationship between input and output so that graphics image data cannot be lost. The designated memory bank B in the $B,A_y,A_z$ coordinate system is a function of X,Y,and Z in the X,Y,Z coordinate system having a functional relationship of the form:

$$B=f_1(X,f_2(Y,Z))$$

where $f_1$ and $f_2$ are functions comprising logical linear permutation networks, for example an exchange linear permutation network, $E_p$. For optimum flexibility, $f_2$ comprises an exchange LPN, $E_p$, and a reversal LPN, $R_p$. Specifically, in the preferred embodiment B is the following function of X,Y and Z:

$$B=E_p(X,E_p(Y_s,Z_r))$$

where $$Z_r=R_p(Z)$$

and $$Y_s=S_p(sm,R_p(Y))$$

where $S_p$ is the shuffle wire LPN, $R_p$ is the reversal wire LPN, and wherein sm is related to the selected permutation bit map or PBM referred to as the static addressing mode set or static mode hereafter described and defined.

The memory bank cell address locations $A_y$ in the $B,A_y,A_z$ coordinate system may generally be a function of Y in the X,Y,Z coordinate system having a functional relationship of the form:

$$A_y=f_3(Y)$$

where $f_3$ comprises a wire linear permutation network, for example a reversal LPN, $R_p$. Specifically, in the preferred embodiment $A_y$ a function of Y in the form:

$$A_y=Y_s.$$

The frame buffer bit plane addresses $A_z$ may be a function of Z in the X,Y,Z coordinate system having a functional relationship of the form:

$$A_z=Z_r.$$

These functional relationships of logical linear permutations from X,Y,Z to $B,A_y,A_z$ or from the image pixel space to the PBM are implemented in the frame buffer address circuits AGEN and in the "postnet" or post-permutation circuit of the DGEN. Conversely, the reverse functional relationships permuting and normalizing from the PBM $B,A_y,A_z$ coordinate space to an X,Y,Z coordinate space are implemented in the "prenet" or pre-permutation circuit of the DGEN as follows:

$$X=E_p(B,E_p(A_y,A_z))$$

$$Y_s=A_y$$

$$Z_r=A_z$$

The linear permutation transformation from the user X,Y,Z coordinate system bit map to the frame buffer memory address $B,A_y,A_z$ coordinate system permuted bit map may be accomplished as explained above in two steps of linear transformations. A first linear permutation network function transforms and permutes the graphics image data addresses in the user X,Y,Z coordinate system to addresses in an abstract C,U,S coordinate system of three-dimensional multi-plane block sections S, cell subdivisions C of the block sections corresponding to the addressing mode cells, and graphics image data units U, each cell comprising an equal number of data units. The C,U,S coordinate system forms a first linear permutation bit map or first permuted bit map. The first linear permutation network functional relationship is of the form:

$$C,U,S=f(X,Y,Z)$$

where f includes the switch linear permutation network $Q_p$. Specifically, the cell address C, unit address U, and third dimension block section address S are given by the following functions of the switch or multiplexing LPN $Q_p$:

$$C=Q_p(X,h,Y_s)$$

$$U=Q_p(Q_p(Z_r,L-p,Y_s),h,X)$$

$$S=Q_p(Y_s,L-p,Z_r)$$

where h and p are address mode selection parameters in which h is the logarithm to the base 2 of the horizontal dimension H of the selected word or cell addressing mode in units of 4 bits, quadbits, or quads, p is the logarithm to the base 2 of the selected number of planes, v is the logarithm to the base 2 of the vertical dimension V of the selected word or cell addressing mode in units of bits, and $L=h+v+p$ for the selected addressing mode. L is the logarithm to the base 2 or $\text{Log}_2$ of the number of logical memory banks and also the number of units U in a cell C.

A second linear permutation network transforms and permutes the graphics image data addresses in the abstract C,U,S coordinate system to memory bank addresses in the $B,A_y,A_z$ coordinate system of designated memory banks B, memory bank address locations $A_y$, and the third dimension memory bank bit plane addresses $A_z$ of the frame buffer memory. The functional relationship of the second transformation and linear permutation is of the form:

$$B,A_y,A_z=g(C,U,S)$$

where g also includes the logical LPN's for the final transformation to B and the switch linear permutation network $Q_p$ for the final transformation to $A_y$ and $A_z$ Each of the first and second linear permutation network transformations of the two-step process further include wire LPN's. Specifically, the memory bank designation B and bank cell address locations $A_y$ and $A_z$ are given by the following linear permutation operations, where B is essentially the same functional permutation of C,U,S as it is of X,Y,Z:

$$B=E_p(U,E_p(C,S))$$

and $A_y$ and $A_z$ are functions of the switch or multiplex LPN, $Q_p$:

$$A_y=Q_p(Q_p(S,L-p,U)h,C)$$

$$A_z=Q_p(U,L-p,S)$$

The data generator circuit is operatively coupled to the frame buffer address circuit and frame buffer memory for updating the frame buffer with vector drawing, polygon filling, and raster operations and for refresh and display of the raster display or view surface with the graphics image data contents of the frame buffer memory. Because of the permuted bit map established in the frame buffer memory bank address locations by the address generator and address circuits of the invention, the data generator circuit is provided with a first prenet or pre-permute linear permutation network. The pre-permute LPN provides selected transformation and linear permutation of graphics image data accessed from the frame buffer memory in the permuted $B,A_y$, $A_z$ coordinate system or PBM space to the user X,Y,Z coordinate system or standard space thereby normalizing graphics image data accessed from the frame buffer for raster operations. Whereas the AGEN and address circuits operate on addresses or indices only, the DGEN LPN circuits operate directly on the data. A second postnet or post-permute linear permutation network is also provided in the data generator circuit. The post-permute LPN provides transformation and linear permutation of processed graphics image data remaining in the normalized user X,Y coordinate system or standard space to the permuted $B,A_y,A_z$ coordinate system or PBM space of the frame buffer memory bank address locations for return to the frame buffer memory permutation bit map.

The pre-permute or prenet and post-permute or postnet LPN's are essentially the same logical linear permutation networks used in the address generator and associated address circuitry. The logical LPN's are self-symmetric and reversible incorporating reversible Boolean logic gates such as XOR and XNOR gates. These gates are assembled to form, for example the exchange linear permutation networks $E_p$ and reversal exchange networks $E_pR_p$ as hereafter described for use in the address generator and associated address circuitry and data generator circuitry. The self-symmetric properties and reversible operative characteristics of the logical LPN's permit reversible transformation and permutation back and forth between the normalized user X,Y,Z coordinate space and standard bit map and the unusual permuted $B,A_y,A_z$ coordinate space and permuted bit map. Essentially the same logical linear permutation networks are incorporated in both the AGEN and associated address circuitry and the DGEN. While the address circuit LPN's operate on the indices or addresses only, the DGEN LPN's operate selectively directly on the data for performing raster operations, Bit Blt's, and polygon fills on graphics image data retrieved from the PBM space of the permuted bit map.

The invention thus contemplates a new method for graphics image data generation for updating frame buffer memory bank address locations A in the memory banks B of a frame buffer memory in a raster graphics machine and in particular for raster operations. Referring to a general two-dimensional implementation, the steps of the method are as follows: organizing the frame buffer memory bank address locations into a permuted or warped bit map by receiving graphics image data addresses in the user X,Y coordinate system and transforming and permuting the addresses from the user X,Y coordinate system through linear permutation networks to a permuted B,A coordinate system or PBM space of designated memory banks B and memory bank address locations A; retrieving graphics image data from the frame buffer memory bank address locations in the permuted B,A coordinate system or PBM space for processing in raster operations: pre-permuting and normalizing the order of retrieved graphics image data from the permuted B,A coordinate system to the normalized user X,Y coordinate system or standard space through pre-permute linear permutation network means for matching source data with destination data during raster operations; post-permuting graphics image data remaining in the normalized user X,Y coordinate system after processing in raster operations to the permuted B,A coordinate system or PBM space through post-permute linear permutation network means: and returning the graphics image data in the permuted B,A coordinate system to the frame buffer memory bank address locations thereby completing raster operations in the permuted bit map or PBM space.

The invention also contemplates new methods for vector drawing in the PBM space of the permutation bit map and for refresh of a raster display using display words retrieved from the frame buffer permutation bit map. Operations of the AGEN and associated address circuits with the DGEN including its data path section, vector and mask section, and video section are fully integrated for operation between SBM and PBM coordinate spaces or systems. The invention also contemplates extending the new methods to a user X,Y,Z coordinate system of a multiplane bit map and logically permuting the X,Y,Z standard bit map in three dimensions to a three-dimensional permutation bit map or PBM addressable and accessible by a variety of three-dimensional word and cell configuration addressing modes. Data path manipulations are carried out on graphics image data retrieved from the multiplane PBM's accessed by addressing mode variable not only in horizontal and vertical bit dimensions but also in bit plane depth dimension, i.e. variable in number of planes.

A variety of alternative methods and hardware embodiments are contemplated by the invention for implementing the new flexible addressing frame buffer architecture, image data creation and generation system, and frame buffer addressing and control circuits. The features and advantages of these embodiments of the invention are set forth in the following specification and accompanying drawings and tables.

BRIEF DESCRIPTION OF THE DRAWINGS

FIG. 6 is a circuit diagram for implementing the multiplexing switch hybrid LPN operator $Q_p$ while

FIGS. 9A, 9B, and 9C present circuit diagrams for implementing the shuffle wire LPN operator $S_p$, while

FIG. 11 (parts 1 and 2) is a general block diagram and flow chart of the address and data path components showing the mapping flow of address data and graphics image data between the address generator or AGEN, address logic circuits, frame buffer memory banks, and data generator or DGEN.

FIG. 12 (parts 1 and 2) is a general block diagram of the address generator or AGEN for processing graphics image data received in the user X,Y, Z coordinate system.

FIG. 14 (parts 1 and 2) is a block diagram of the cell address generation section of the address generator or AGEN.

FIG. 20 (parts 1 and 2) is a data flow chart showing flow of data between standard and PBM coordinate spaces in the DGEN during Bit Blt's or bit block transfers and polygon fill graphics operations.

BRIEF DESCRIPTION AND IDENTIFICATION OF THE TABLES

Figure 1:
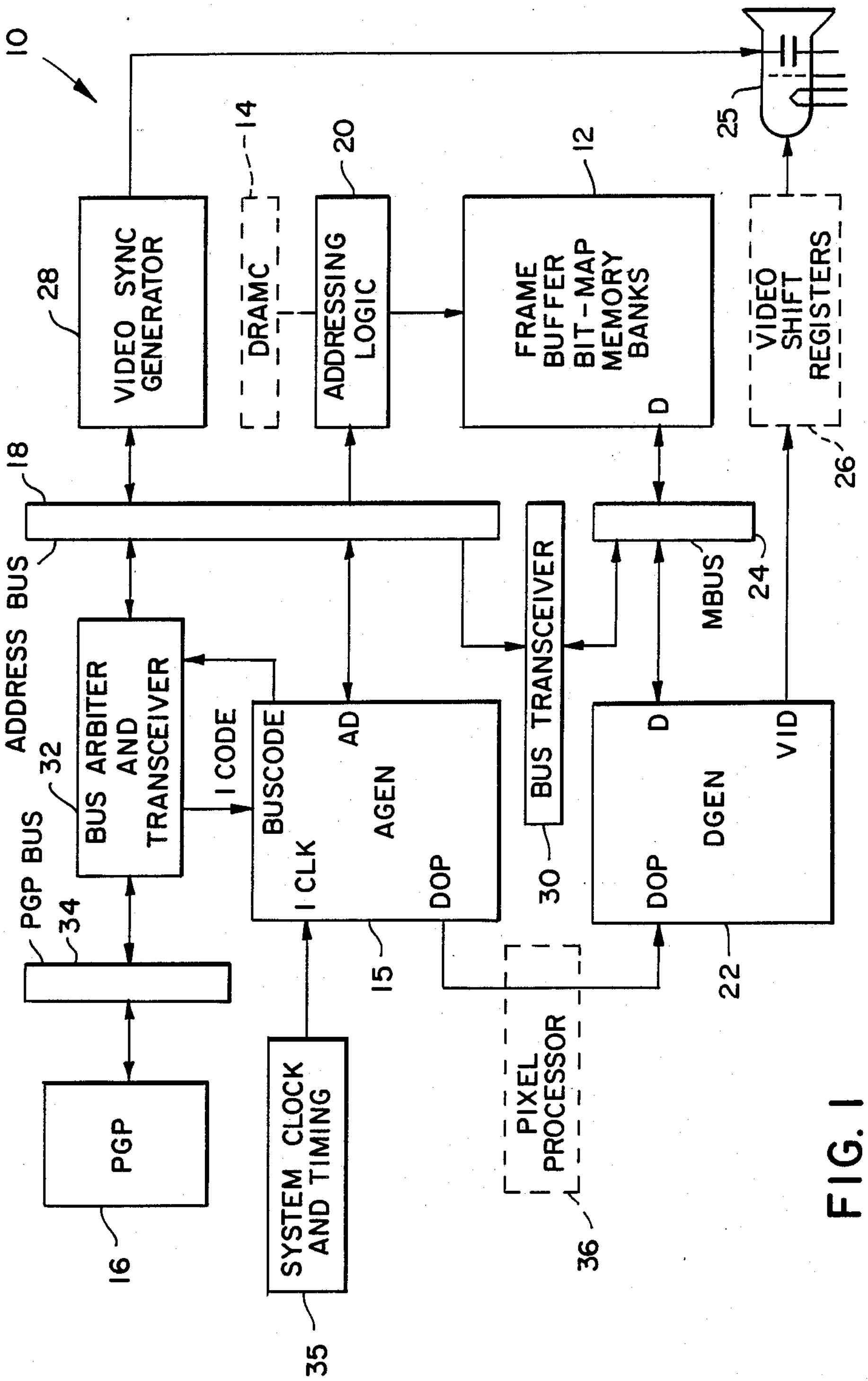
FIG. 1 is a general block diagram of a raster graphics machine incorporating the image creation system and frame buffer controller of the present invention including the data generator or DGEN, the address generator or AGEN, and further frame buffer memory addressing circuitry.

Table 1 is a table of one block of a cyclic permutation bit map showing the permutation and assignment of memory banks in the permuted B,A coordinate system relative to the view surface pixel positions in the user X,Y coordinate system using a cyclic linear permutation network or rotator to achieve one example architecture which accommodates multiple addressing mode word or cell configurations.

Tables 2, 3, and 4 are tables defining the cyclic logical linear permutation network $C_p$, the multiplexing switch hybrid linear permutation network $Q_p$, and the exchange logical linear permutation network $E_p$ respectively used in executing linear permutation operations for establishing for example the cyclic permutation bit maps and cyclic PBM embodiments of the present invention.

Tables 5 through 8 are tables of blocks of the reversal exchange or exchange and reversal permutation bit map according to the invention showing the respective cell configuration addressing modes as respective partitions of the exchange and reversal permutation bit map block.

Table 9 is a table defining the reversal wire LPN, $R_p$ used in combination with, for example the exchange logical LPN $E_p$ for establishing the reversal exchange or exchange and reversal permutation bit map of the present invention.

Table 10 is a summary of the multicellular addressing modes of the respective static modes for the optimum double exchange shuffle and reversal permutation bit map implemented by combinatorial linear permutation operations on address bits or index bits by at least two exchange logical LPN's $E_p$ and two wire LPN's, the shuffle LPN $S_p$ and the reversal LPN $R_p$.

Tables 11 through 25 are tables of blocks of three-dimensional double exchange shuffle and reversal permutation bit maps according to the invention partitioned to show selected ones of the multiple three-dimensional cell configuration addressing modes for selected static modes. Tables 11 through 15 are each single partitioned blocks showing different selected cell configuration addressing modes AM in one plane for static mode sm=0. Tables 16 through 19 are each partitioned blocks showing selected different three-dimensional cell configuration addressing modes AM in two planes for static mode sm=1. Tables 20 through 24 are each multiple partitioned blocks showing selected different three-dimensional cell configuration addressing modes AM in four planes for the static mode sm=2. Table 25 is a multiple partitioned blocks showing a selected three-dimensional cell configuration addressing mode AM in eight planes for the static mode sm=3.

Table 26 is a table of the fundamental equations defining the frame buffer architecture, addressing circuits, data generator circuits, and linear permutation networks for transformation between the user X,Y,Z coordinate system, abstract cell, unit and block section C,U,S, coordinate system, and the memory bank address B,$A_y$,$A_z$ coordinate system; and Table 26A is a table of the fundamental equations using alternative symbolism.

Table 27 is a table defining the shuffle wire LPN, $S_p$, used in combination with the exchange logical LPN, $E_p$, and the reversal wire LPN, $R_p$, for establishing the best mode three-dimensional double exchange shuffle and reversal permutation bit map of the present invention.

Table 28 is a table of the frame buffer memory bank address equations and address connections in the three-dimensional universal implementation of the invention.

Table 29 is a table of the valid dynamic cellular addressing modes AM for each different multiple plane static addressing mode sm.

Table 30 is a table of the functional permutation and correlation between the C,U,S address or index bits and the X,Y,Z index bits for the different dynamic addressing modes AM in static mode sm=0.

Table 31 is a table of the corresponding external address line equations of the frame buffer memory bank address locations for different addressing mode cell configurations in static mode sm=0.

Table 32 is a table of the functional permutation and correlation between C,U,S address or index bits and X,Y,Z index bits for the different addressing modes AM in static mode sm=1.

Table 33 is a table of the corresponding external address line equations of memory bank address locations for the different addressing mode cell configurations in static mode sm=1.

Table 34 is a table of the functional permutation and correlation between the C,U,S address or index bits and X,Y,Z index bits for the different addressing modes AM in static mode sm=2.

Table 35 is a table of the corresponding external address line equations of memory bank address locations for different addressing mode cell configurations in static mode sm=2.

Table 36 is a table of the functional permutation and correlation between C,U,S address bits or index bits and X,Y,Z index bits for the different dynamic addressing modes AM in static mode sm=3.

Table 37 is a table of the corresponding external address line equations of the memory bank address locations for the different addressing mode cell configurations in static mode sm=3.

Table 38 is a table of the functional permutation and correlation between C,U,S address or index bits and X,Y,Z index bits for the different dynamic addressing modes AM in static mode sm=4.

Table 39 is a table of the corresponding external address line equations of memory bank address locations for the different addressing mode cell configurations for static mode sm=4.

Figure 13:
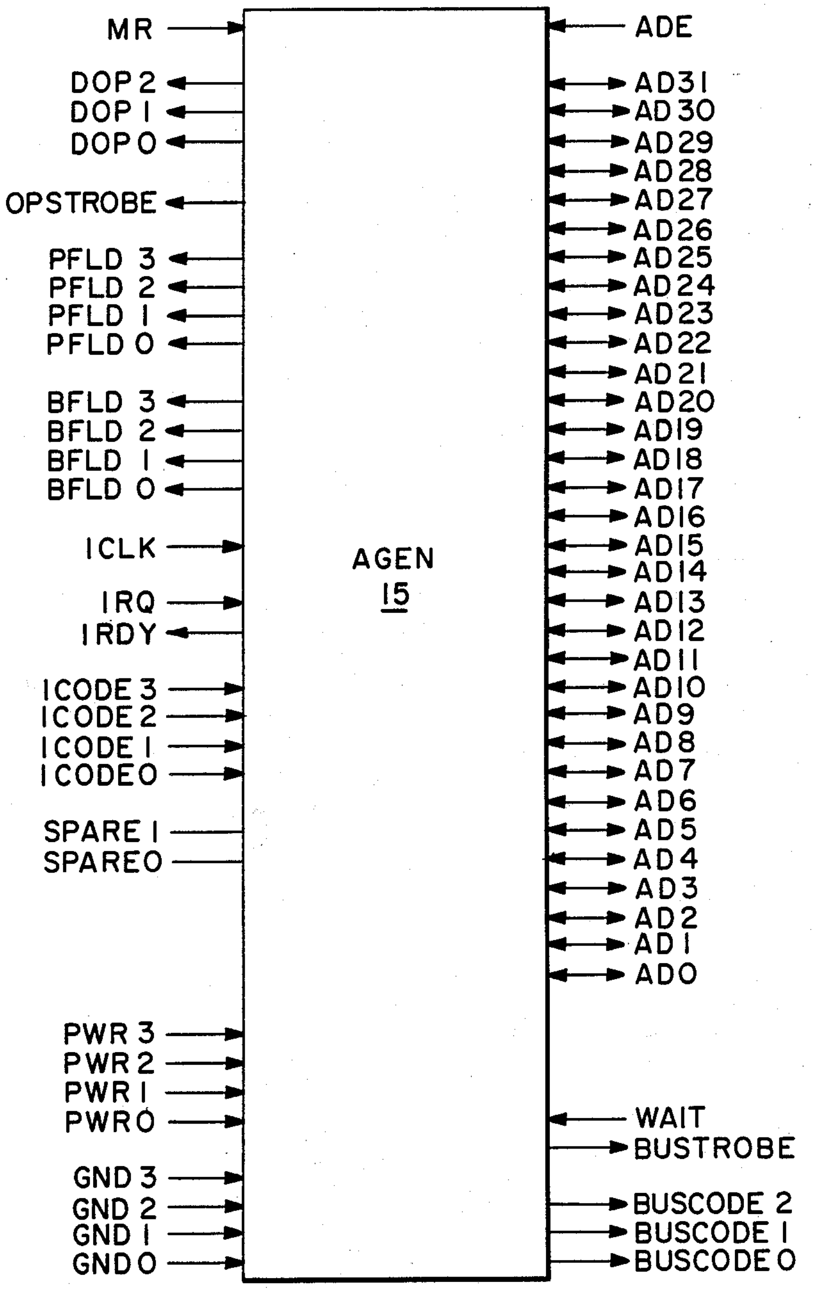
FIG. 13 is a pin description block diagram for the address generator chip showing the AGEN pinouts.

Table 40 is a table list of the AGEN pinout signal descriptions corresponding to the pinout abbreviations in FIG. 13.

Figure 17:
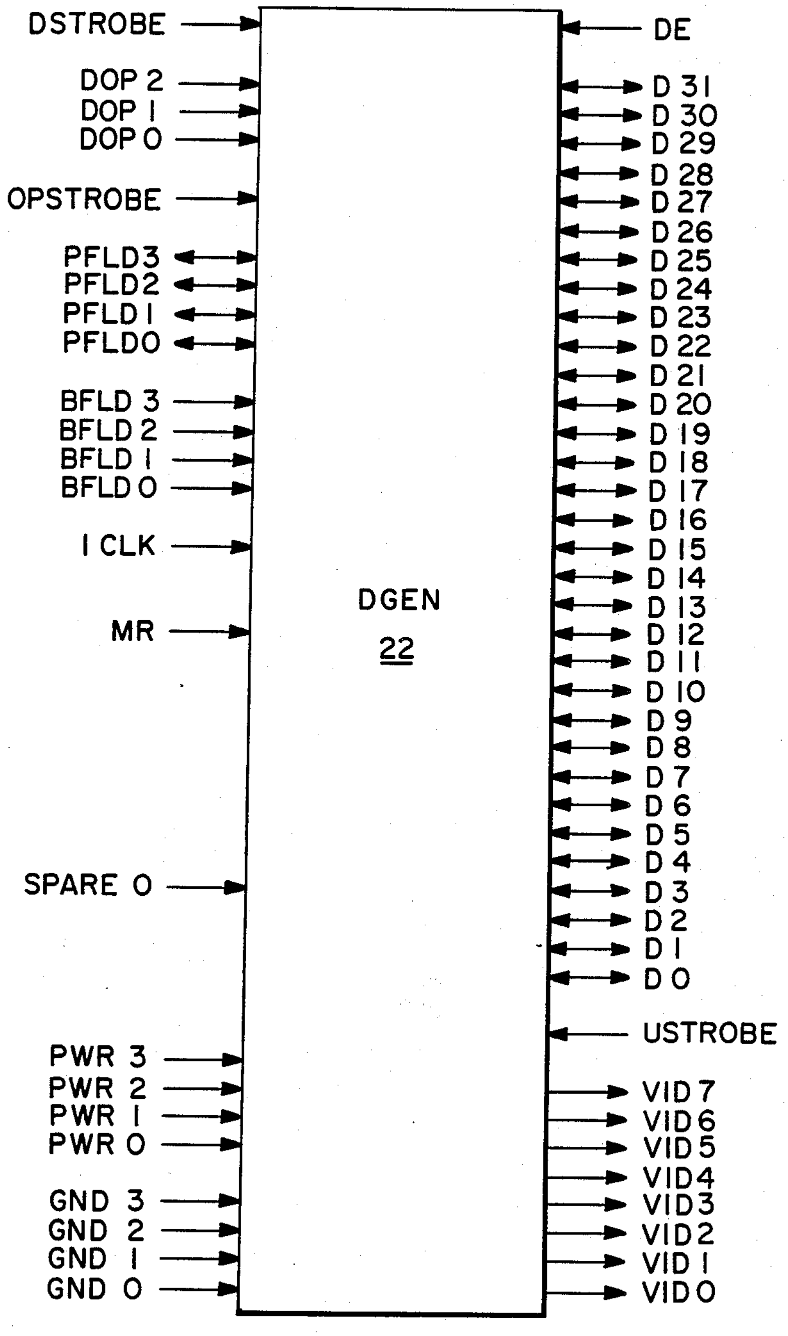
FIG. 17 is a pin description block diagram of the data generator chip showing the DGEN pinouts.

Table 41 is a table list of the DGEN pinout signal descriptions corresponding to the pinout abbreviations of FIG. 17.

Figure 24:
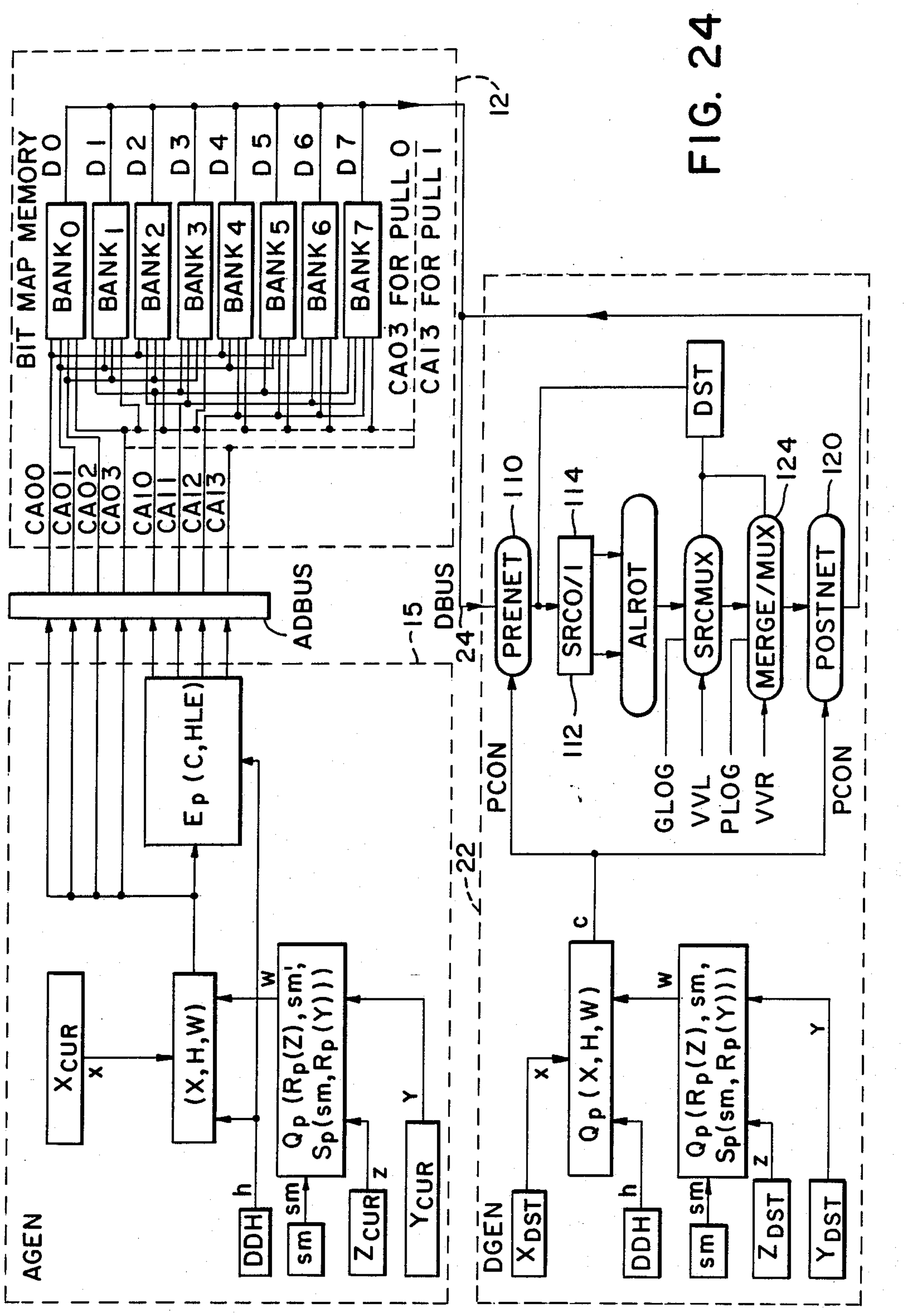
FIG. 24 is an alternative general block diagram and flow chart of the address and data path components showing the mapping flow of address data and graphics image data between the AGEN and address logic circuits, frame buffer memory banks, and DGEN and data path components.

Table 42 is a table of cell address equations in Boolean format for formulating the cell address lines, circuits and connections corresponding to the cell address lines CA of FIG. 24.

DESCRIPTION OF PREFERRED EXAMPLE EMBODIMENTS AND BEST MODE OF THE INVENTION

A general system block diagram of a raster graphics system 10 implementing the graphics architecture of the present invention is illustrated in FIG. 1. The frame buffer memory 12 is provided by an array of physical memory banks or components, for example at least eight physical memory banks, with a bit width of, for example, 4 bits, to support the novel permutation bit map.

In the detailed example hereafter described, the frame buffer memory is provided by eight physical memory banks "time sliced" twice each memory access cycle. The two "pulls" from each physical memory bank each memory cycle thereby provide sixteen effective or logical memory banks. The sixteen effective memory banks constitute sixteen permutation "objects" for the novel logical linear permutation operators or networks incorporated in the addressing and data path circuits.

By way of example, each memory bank is composed of four integrated circuit RAM chips providing memory banks four bits wide with four input/output lines having the same address. During a memory access cycle graphics image data units U of four bits, referred to as quads, quadbits, or quadpixels, are pulled from the memory banks. Time slicing pulls two quads from each of the eight physical memory banks, or one quad from each of the sixteen effective or logical memory banks each memory access cycle. The memory addressing word or cell is therefore composed of 16 quads or 64 bits. The data path system components are designed to accommodate the 64-bit words for example by multiplexed 32-bit data paths. Thus each 64 bit word is composed from two interleaved 32 bit words or "pulls".

If the frame buffer is composed of dynamic RAM's or DRAM's, a dynamic RAM controller or DRAMC 14 may be required for DRAM cell refresh. Alternatively, the address generator trace may perform this function.

The address generator or AGEN 15 executes graphics instructions received on the ICODE line from the programmable graphics processor or PGP 16 which may alternatively be a host or system CPU, and acknowledges instruction requests on the BUSCODE lines. The AGEN 15 generates appropriate addresses for the frame buffer in response to instruction requests on the address lines or AD lines and on the address bus or ADBUS 18 which is for example a 32 bit bidirectional bus for addressing the frame buffer 12 through additional addressing logic circuits 20. The addressing logic circuits 20 include an address buffer latch and logic gates to drive four unique bank address lines to the sixteen logical memory banks (eight physical memory banks time sliced twice). The AGEN 15 and associated addressing logic 20 together establish and implement the permutation bit map as hereafter described. The AGEN 15 also delivers instruction sequences in the form of data operation codes or DOP codes on the DOP line to the data generator or DGEN 22.

The data generator 22 is the data path component comparable to a bit block transfer chip or Bit Blt chip for receiving instruction sequences from the AGEN 15 and executing graphics operations on graphics image data accessed from the frame buffer corresponding to the address sequences generated by the address generator. The graphics operations executed by the DGEN 22 in combination with AGEN 15 include vector drawing or vector addressing from relative or absolute positions, raster ops or bit block transfers known as Bit Blt's, polygon fill, character drawing, stripe sequencing, etc., and refresh of the raster display. 64-bit graphics image data words or cells are transferred to and from the frame buffer 12 in multiplexed--32-bit words on the data lines or D lines and data bus 24 for example a 32 bit bidirectional bus also referred to as the DBUS or MBUS 24 under addressing control of the AGEN 15.

The graphics image data resides in the memory banks of the frame buffer in the permuted order established by the address generator. This permutation bit map accommodates multiple word and cell addressing modes. The DGEN 22 is constructed and arranged to execute graphics data operations and carry out data path manipulations on graphics image data received in the unusual permuted order of the permutation bit map established by AGEN. The DGEN is provided with logical linear permutation operators for normalizing data and for returning data to the unusual permuted order after completion of data path manipulations for return to the frame buffer permutation bit map. While the logical linear permutation operator circuits or networks of the AGEN operate on the indices or addresses of the graphics image data, the corresponding logical LPN circuits of the DGEN operate directly on the data objects. The DGEN networks and circuits are capable of transforming the graphics image data organization between the user X,Y or X,Y,Z coordinate system corresponding to a standard bit map or SBM space and the memory bank and bank address coordinate space corresponding to the permutation bit map coordinate system or PBM space according to the requirements of the particular graphics data operation or data path manipulation. The data path manipulations including masking, alignment, and logical operations required for example for vector drawing, Bit Blt's, and polygon fills are appropriately arranged according to the SBM or PBM coordinate space of the data words.

The DGEN 22 also prepares display words for refresh of the CRT display 25 on the video output lines or VID lines. The DGEN 22 includes a FIFO interface for assembly of display words and carries out the first level of video shifting. Video shift registers 26 are included when required for higher band widths, for example band widths higher than 40 MHz. The first level of video shifting performed in the data generator 22 accommodates and adjusts for the permuted order of display addressing mode words received from the frame buffer permutation bit map for assembling normalized sequences to control the video scan lines. This shifted video data may be used directly with a color lookup table (LUT) and digital-to-analog converter (DAC) for refresh of the CRT display 25. The video sync generator 28 controls the display timing and the request for refresh cycles from the AGEN 15.

The AGEN 15 and DGEN 22 and respective ADBUS 18 and MBUS 24 are split by a bus transceiver 30. The bus transceiver 30 allows concurrent addressing of frame buffer memory banks with simultaneous data transfers between DGEN and the frame buffer memory banks. Bus transceiver 30 also allows concurrent loading of the next instruction data during execution of the current instruction. This split arrangement for concurrency of addressing and data transfers is referred to as "Harvard" architecture. A second bus transceiver 32 provides concurrent isolation of the AGEN 15 and the PGP bus 34. The bus transceivers 30 and 32 therefore result in a three-stage hierarchical data pipeline having constant information bandwidth but increasing bit bandwidth with the programmable graphics processor 16 constituting the first stage. PGP 16 breaks down geometric objects from the data base of a system CPU into high level geometric primitives along with the necessary transforms for converting or generating position information in the user X,Y or X,Y,Z coordinate system. The AGEN 15 and DGEN 22 constitute the second stage converting the position data to a bit stream of pixels for frame buffer storage while the refresh display constitutes the third stage. It is in the second stage of converting the position data to a bit stream of pixel data that AGEN and DGEN permute the order to establish novel two and three-dimensional PBM's in the frame buffer.

Other components of the general system include a system clock which delivers, for example, 40 MHz clock signals on the ICLK lines to drive the AGEN 15 and DGEN 22 instruction execution sequences and provide other system timing requirements. A pixel processor 36 may be added to implement occlusion algorithms and color shading.

Figure 2:
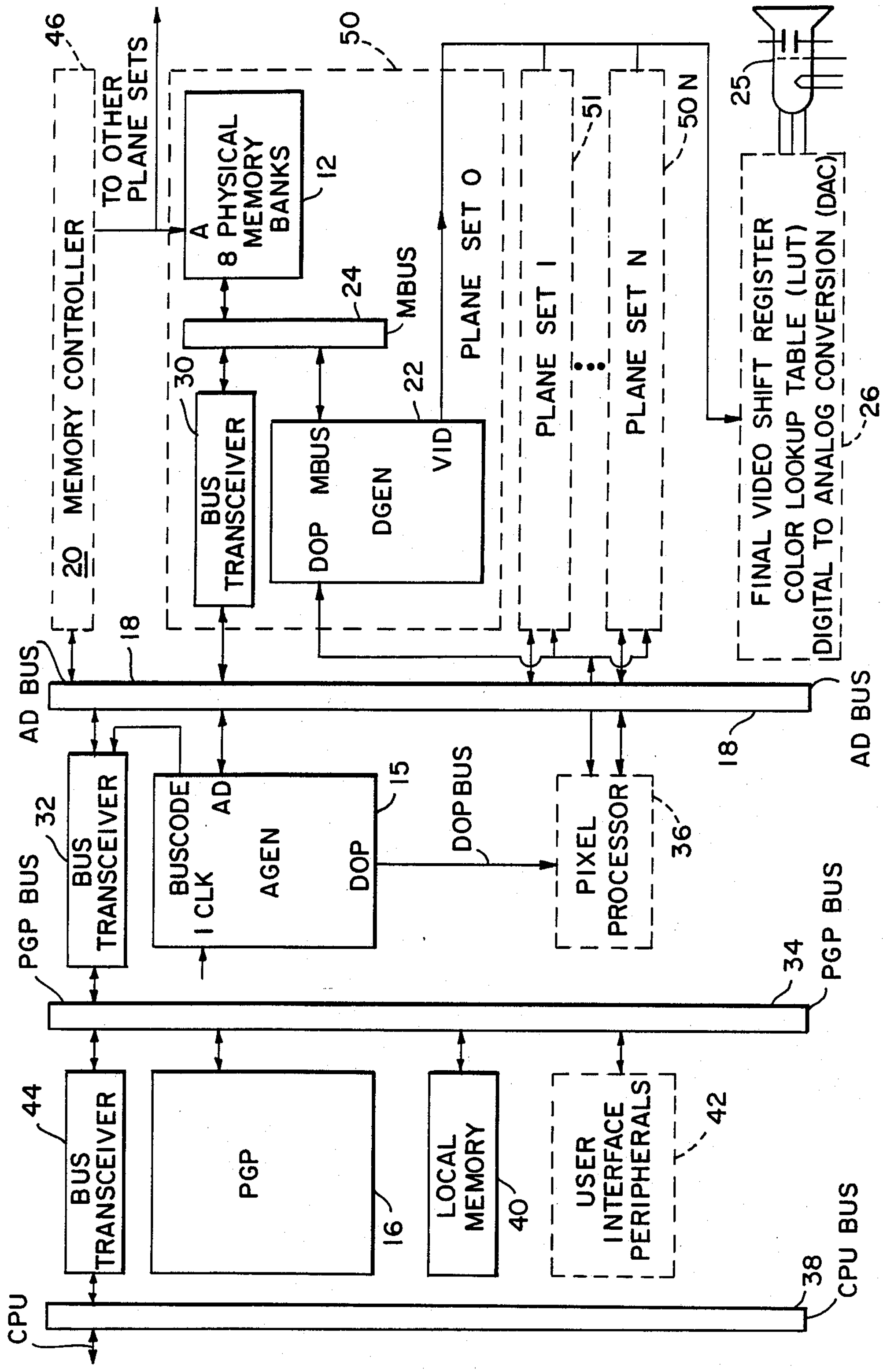
FIG. 2 is another general block diagram configuration of the raster graphics machine with the frame buffer memory organized in multiple planes.

A further block diagram of the raster graphics system showing a multiplane embodiment of the present invention is illustrated in FIG. 2. Components similar to those of the block diagram of FIG. 1 are designated by the same reference numeral. This more complete block diagram shows more clearly the hierarchical pipeline organization contemplated by the present invention. In this example the host or system CPU on CPU bus 38 incorporates a database of an instantiation hierarchy of abstract symbols which are broken down into high level geometric objects by database traversal. The high level geometrical objects are broken down into the high level geometric primitives by the programmable graphics processor PGP 16 as heretofore described, enhanced by local memory 40 and optional user interface peripherals 42. The PGP 16 is isolated from the CPU bus 38 by bus transceiver 44. The further stages of the hierarchical data pipeline are as described above.

In the system example of FIG. 2 the frame buffer memory banks 12 are partitioned or organized into N planes 50, 51 . . . 50N. In the block diagram of FIG. 2 it is contemplated for example that the set of memory banks 12 and data generator or DGEN 22 be duplicated for each plane of the frame buffer memory. The planes of the frame buffer memory represent the number of bits defining each pixel and constitute a third depth dimension or Z coordinate of the user/viewer coordinate system. Alternatively, the same set of memory banks comprising the frame buffer memory may be partitioned and organized into N multiple planes, each plane cutting across all of the eight physical memory banks or sixteen logical memory banks. In this instance and the detailed example hereafter described, a single data generator or DGEN component 22 may execute the data path manipulations for all planes. The memory controller 46 provides necessary dynamic memory refresh and may also incorporate supplemental addressing logic gates or circuits 20 associated with the operation of the address generator or AGEN 15. The address generator may be supplemented with a pixel processor 36. The AGEN 15 and DGEN 22 are capable of driving a 320 MHz monitor 25 for resolutions up to for example 2,048×2,048 pixels.

At the system block diagram level of FIGS. 1 and 2 the raster graphics system of the present invention resembles presently available raster graphics machines and work station graphics architectures. The subtle differences of the present invention lie within the address generator or AGEN 15 and associated address logic circuitry and within the data generator or data path component DGEN 22. While the AGEN 15 at the system block diagram level appears to be a conventional address generator, it incorporates either internally in the AGEN or both internally in the AGEN and externally in associated address logic circuitry 20 logical linear permutation networks, operators, or circuits hereafter described which permute the graphics image data addresses to establish in the multibank frame buffer memory novel permutation bit maps which may be accessed and which accommodate a variety of different word and cell configuration address modes. Similarly, while the DGEN appears in a capacity similar to a conventional data path chip or Bit Blt chip, it also incorporates the logical linear permutation networks, operators, or circuits in order to process and manipulate graphics image data retrieved from the frame buffer permutation bit map in the unusual permuted order. The DGEN according to the present invention provides a variety of strategies for handling data received in the unusual permuted order and carrying out the necessary graphics operations of for example vector drawing, polygon filling, 64-bit horizontal word block transfers, and image refresh and display.

Figure 3:
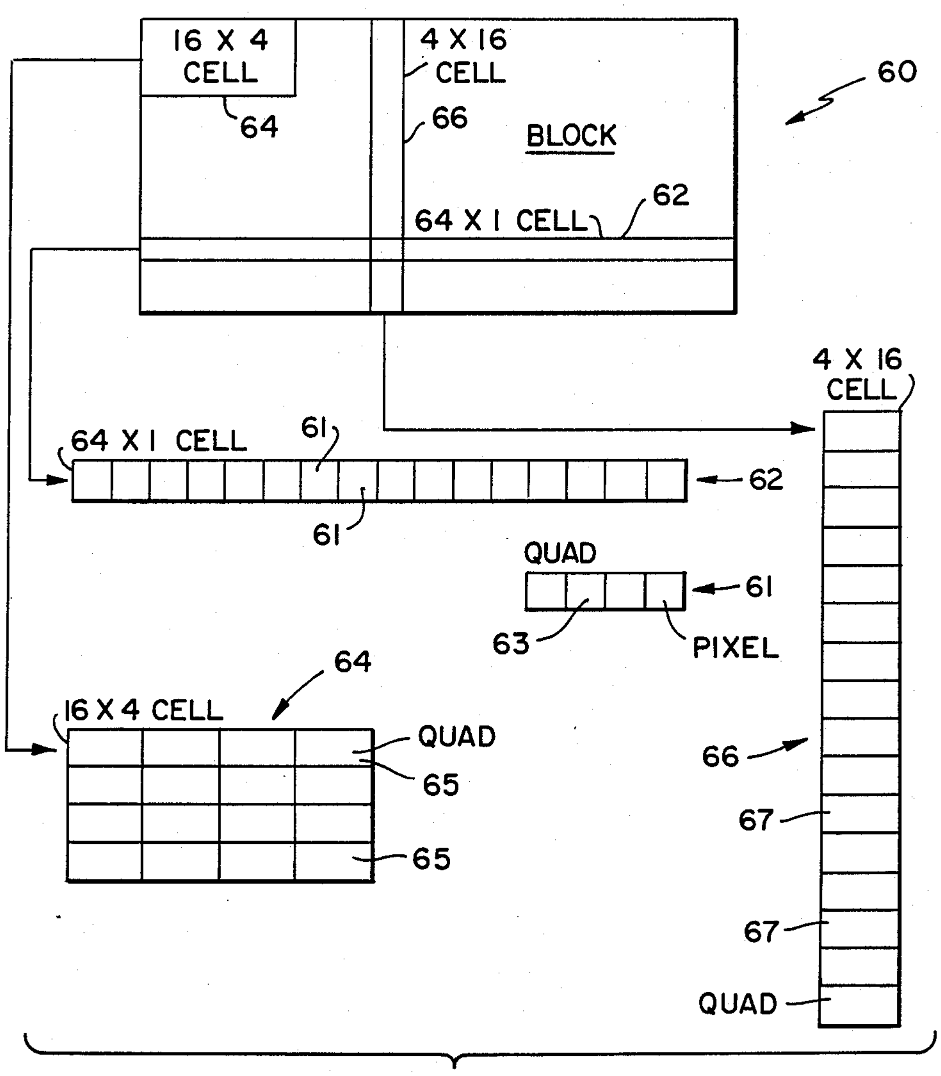
FIG. 3 is a diagram of block and cell organization of the frame buffer memory bank address locations according to one example of the present invention corresponding to a block subdivision of the view surface with multiple addressing mode cells or cell configurations for accessing the frame buffer memory bank address locations.

The multicellular addressing capability inherent in the permutation bit maps or PBM's of the present invention contrast with the conventional standard bit maps or SBM's closely associated with the user/viewer X,Y or X,Y,Z coordinate system. The conventional SBM's are capable of being addressed or accessed in only one addressing mode whether by one-dimensional word or two-dimensional cell. The multicellular addressing capability of the present invention is illustrated in the diagrams of FIGS. 3 and 4 showing a block or subdivision of the raster display view surface also corresponding to the novel block organization of the permutation bit map of the frame buffer. The block organization concept is fundamental to the present invention, the consequence of the coexistence or concurrency of multiple cell addressing modes. The block or block section is the smallest rectangular subdivision of the raster display view surface in which all of the different addressing mode cells and words form equal boundary subsets. An equal number of cells or words from each of the different addressing modes fill out the block without overlap.

Referring to FIG. 3 there is shown a novel block 60 according to the present invention which may be understood as representing a rectangular subdivision or portion of a raster display view surface, for example a CRT screen, in the user/viewer two-dimensional X,Y coordinate system space. As hereafter more fully described with reference for example to Table 1 and subsequent tables the block 60 also represents an abstract subdivision organization of the memory banks and memory bank address locations of the frame buffer permutation bit map in PBM space. An important feature of the present invention and system embodiment is that the block 60 concept is transferable and carries over between the user X,Y coordinate system and the permuted B,A coordinate system, that is between the standard coordinate space and the permuted PBM coordinate space. This transferable block organization principal arises solely because of the concurrency of multiple addressing mode cells and words and is entirely novel originating with the present invention.

In the system example described above the addressing word and cell size is 64 bits, composed of 16 quads, quadbits or quadpixels, 1 contributed by each of the 16 effective or logical memory banks each memory access cycle. In the example of FIG. 3 the block 60 may be interrogated or accessed by either of 3 addressing mode cells. The 64×1 bit cell 62 is basically the horizontal word addressing mode used in accessing the frame buffer memory for refresh of the CRT screen. The 64×1 bit horizontal words 62 is also used according to the present invention for example for Bit Blt's and polygon filling. The 16×4 bit cell 64 represents a two-dimensional cell larger in the horizontal dimension and therefore useful according to the invention for accessing the frame buffer memory to update the frame buffer for example for drawing horizontally oriented vectors. The 4×16 bit cell 66 is another two-dimensional cell addressing mode but larger in the vertical dimension and therefore useful according to the invention for accessing the frame buffer and updating the frame buffer by drawing vertically oriented vectors. It is apparent that the dimensions of block 60 are set by the maximum dimensions of the respective addressing mode cells 62, 64 and 66. The horizontal dimension of block 60 is equal to the maximum of the horizontal dimensions of the addressing cells, namely the 64 bit horizontal width of the one-dimensional 64×1 bit display word 62. The vertical dimension of block 60 is the maximum vertical dimension of the addressing cells namely the 16 bits of vertical height of the 4×16 bit vertically oriented cell 66. The overall dimension of block 60 is therefore 64×16 bits. A display surface or view surface having a resolution of for example 1024×1024 pixels would be composed of approximately 1000 or exactly 1024 blocks, 16 blocks across in the horizontal X direction and 64 blocks down in the vertical Y direction. A display surface or view surface having a resolution of 2048×2048 pixels would be composed of 32 blocks across in the X coordinate direction and 128 blocks down in the vertical Y direction for approximately 4000 or exactly 4096 blocks.

Referring further to FIG. 3, each of the horizontal word mode cells 62 is composed of 16 horizontally oriented quadpixels 61 arranged in a single row. Each quadpixel or quad 61 is in turn composed of 4 bits 63 arranged in a horizontal row. In the case of a single plane frame buffer each pixel is defined by a single one of the bits 63. The horizontally oriented two-dimensional addressing mode cell 64 is also composed of 16 quads 65 in this instance arranged in 4 columns and 4 rows of quads 65. Each quad is arranged as a horizontal row of 4 bits. The vertically oriented two-dimensional addressing mode cell 66 is composed of 16 quadpixels 67 arranged in a single vertical column. Each quad is also composed of 4 bits in a horizontal row. The basic unit U of the block geometry in the preferred examples is the horizontally oriented quad, although the basic unit of data could also be a bit or other multiple bit configuration. Each of the three illustrated addressing mode cells is composed of 16 of the units U or quads and therefore 64 bits and the geometry of the cells is in part determined by the 64 bit cell size and the data units U of quads arranged as horizontal units of 4 bits. The dimensions or boundaries of the block 60 are then determined.

Figure 4A:
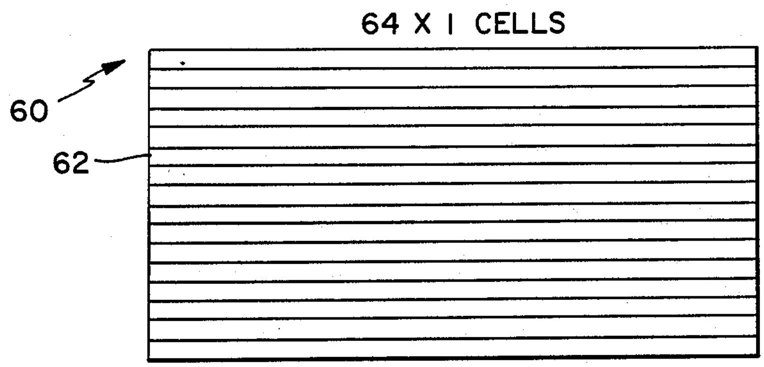
FIGS. 4A, 4B and 4C are diagrams of the block of the frame buffer memory bank address location showing access to the block according to three different addressing mode cells or cell configuration.
Figure 4B:
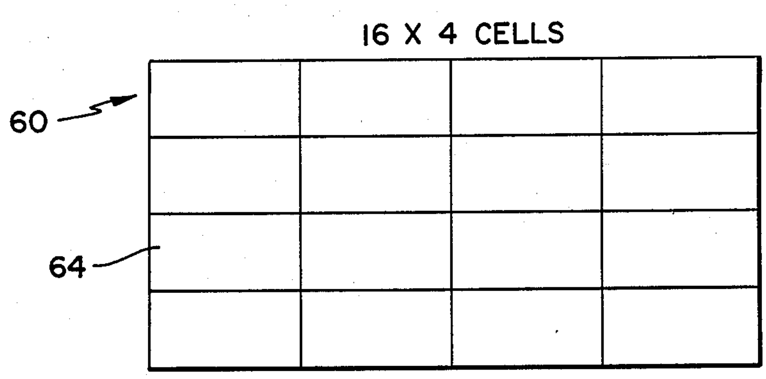
Figure 4C:
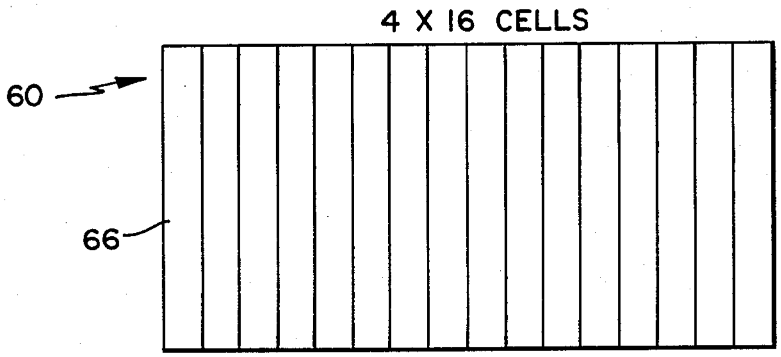
Figure 16:
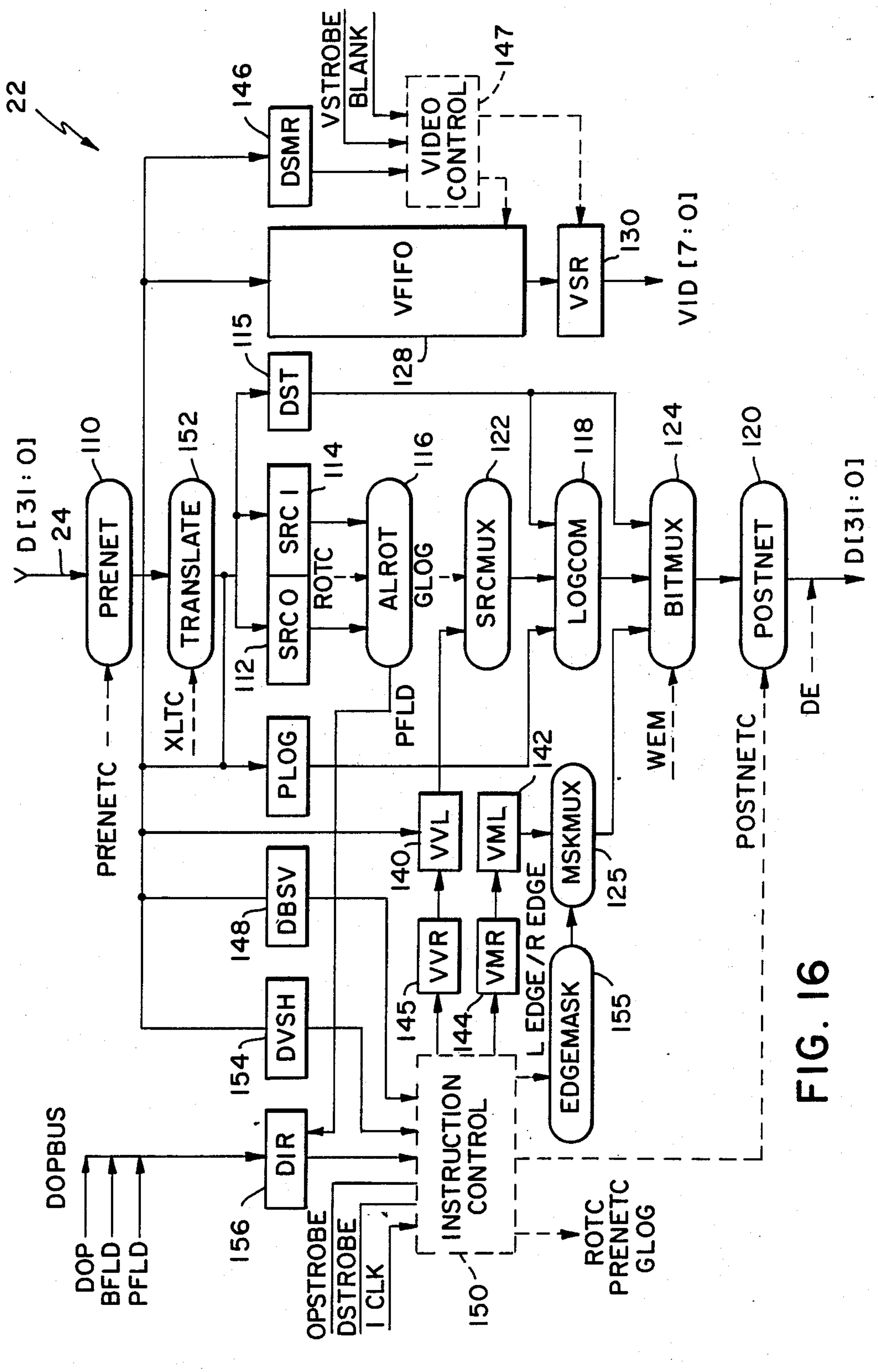
FIG. 16 is a block diagram and flow chart of the data generator or DGEN.

As shown in FIGS. 4A, 4B and 4C the block is the smallest subdivision of the X,Y coordinate system view surface in which all of the different addressing mode cells coincide at the boundaries with the same number of cells. In FIG. 4A, 16 of the one dimensional horizontal word mode cells 62 fill out and access all of the bits or pixels of the block 60 without overlap. The 16 horizontal words or cells 62 in effect form a single column filling the block. In FIG. 4B, 16 of the horizontally oriented two-dimensional addressing mode cells 64 access all of the bits or pixels filling out block 60 with four columns and four rows of the cells without overlap. In FIG. 4C 16 of the vertically oriented two-dimensional addressing mode cells 66 access all of the bits or pixels of block 60 without overlap. The 16 cells 66 in effect form a single row filling out the block. In each instance the block size of 64×16 bits or 1024 bits is the same and there is no redundancy or overlap in the cell coverage of the block. In other words, each set of addressing mode cells forms a boundary subset of the block.

The carryover of the block level of organization from the user/viewer X,Y coordinate system or standard space to the permutation bit map, permuted PBM space, or B,A coordinate system of the frame buffer of the present invention is illustrated in the example of Table 1 which represents a block corresponding to the blocks of FIGS. 3 and 4. The 16 effective or logical memory banks identified by 16 hexadecimal digits 0 through F are the permutation objects presented in permuted order with reference to the pixel X and Y coordinates of the corresponding block portion or subdivision of the user raster display view surface. In the convention of Table 1 and the subsequent tables and specification the X coordinate is the horizontal coordinate increasing from left to right. The Y coordinate is the vertical coordinate increasing from top to bottom. In Table 1 the X coordinates are presented in the fundamental data units U of quads from 0 to 16 quads expressed in hexadecimal digits 0–F so that the bit dimension of the X coordinate axis is actually 64 bits, but 16 quads or data units U. This is because the quads are always horizontally oriented comprising units of 4 bits in a horizontal row. The Y coordinate is expressed in units of bits with the Y coordinate dimension extending from 0 to 16 expressed in hexadecimal digits 0–F because the basic data units U or quads have a vertical dimension of one bit only. Thus, the block size represented by Table 1 remains 64×16 corresponding to the block of FIGS. 3 and 4 with a distortion or compression of the actual horizontal width because the X coordinate positions are in quad units.

Within the body of Table 1 are presented the assignments of the 16 logical memory banks B to pixel positions on the view surface identified by the first hexadecimal digit in each pair of digits in the permuted order of a cyclic permutation bit map representing one example embodiment of the invention. Each of the 16 memory banks contributes 1 quad or unit to each addressing mode word or cell and a total of 16 quads or units to the block. Each memory bank is therefore provided with 16 bank addresses A which correlate with cell addresses C for each block. While the bank address assignment A for a particular pixel or pixel position remains invariable, the correlated cell address C of the pixel changes according to the selected addressing mode cell configuration as hereafter further described. Once the block address and addressing cell mode have been specified, only the memory bank B and memory bank address A or cell address C needs to be specified for each pixel or quadpixel position on the view surface. The bank address A or cell address C is the second hexadecimal digit in each pair of digits and one possible example of an arbitrary assignment of bank cell addresses is shown in the body of Table 1. Each memory bank B is interrogated or accessed each memory access cycle at an address A and the 16 memory bank and bank cell addresses B,A produce one addressing mode cell.

In a standard bit map the succession or order of memory bank assignments across each row would be the same orderly sequence of columns from 0 to F with the standard bit map bearing a simple functional arithmetic relationship to the X,Y coordinate system amounting to a substantial identity. As is apparent in Table 1, the memory bank assignments of the present invention appear in a permuted order. The memory banks control or determine the graphics image data value at pixel locations across the block subdivision of the view surface in an arrangement amounting to a complex linear permutation of the X,Y coordinate system. For example memory bank 9 delivers 16 quadpixels to the block for controlling the graphics image pixel values in a complex array across the block which cannot easily be characterized by initial study. As hereafter presented this functional relationship is a complex logical linear permutation that enables the three different addressing mode cells to access the entire block without redundancy or overlap.

As shown in Table 1 three example addressing mode cells are outlined corresponding approximately to the three cells appearing on the block of FIG. 3. The dimensions of Table 1 are however distorted from the actual dimensions of a block of the view surface as appearing in FIG. 3 because of the quads appearing in Table 1 identified by hexadecimal digits which actually have a horizontal breadth or dimension of 4 bits. Table 1, if presented in true scale corresponding to the view surface, would be four times wider in its horizontal dimension therefore coinciding with the block of FIG. 3. Examining for example the deployment of the horizontal refresh cell 62 on the memory bank Table 1, in each of the 16 horizontal word cells that would fill Table 1, each of the 16 memory banks is represented contributing 1 quadpixel and there is no redundancy or overlap. Similarly deploying the vertically oriented 4×16 bit cell at 16 locations across Table 1 would result in 16 vertically oriented two-dimensional cells in each of which the 16 memory banks are represented contributing a quadpixel without overlap or redundancy. Finally deploying the horizontally oriented two-dimensional addressing mode cell 64 across the memory bank assignments of Table 1 would produce 16 cells in each of which all of the 16 memory banks are represented contributing 1 quadpixel without redundancy or overlap.

It is apparent that the permutation bit map of Table 1 has so arranged the assignment of memory banks and bank cell address locations to pixel positions on the screen so that three different addressing mode cell configurations may be accommodated. It is in this respect that the present invention greatly increases performance over standard bit map machines. In the system of the present invention up to 16 pixels of for example a vertically oriented vector may be drawn each interleaved memory cycle accessing a 16 quad or 64 bit cell. The cell can be selected to optimize the number of pixels updated according to whether the vector is horizontally or vertically oriented. For arbitrary angle vectors the multicellular addressing mode architecture of FIGS. 3 and 4 and Table 1 still delivers an average performance of at least 6 pixels updated per memory access cycle in contrast to the one pixel updated per memory access cycle characteristic of standard bit map machines. The present invention thus increases vector drawing speeds by a factor of 5 to 10 times that of conventional standard bit map systems.

The cyclic linear permutation network PBM represented in Table 1, while a vast improvement over standard bit maps, is nevertheless a suboptimal embodiment of the present invention. It is presented to illustrate minimum requirements of the present invention for achieving multicellular addressing modes. In particular, the frame buffer must be composed of multiple memory banks with separate unique addresses, the memory banks constituting "permutation objects" of linear permutation networks incorporating at least one logical LPN. The number M of logical memory banks is a power of 2, and in the following example M=16. The logical linear permutation network or operator which implements the cyclic PBM of Table 1 is the rotation or cyclic linear permutation network or operator $C_p$. The functional definition of the LPN operator $C_p$ is presented in Table 2.

The cyclic linear permutation operator $C_p$ is referred to as a logical LPN or linear permutation operator because it operates on at least two operands, address variables, or index variables in two dimensions and because it is based upon and incorporates self-symmetric or reversible logic or Boolean gates such as XOR and XNOR gates. According to this requirement the inputs and outputs of the logical linear permutation networks are reversible and data cannot be lost. The addressing and data path circuits included in the AGEN and associated address logic and the DGEN can implement the raster graphics system for readily switching back and forth between the standard X,Y coordinate space and the permuted B,A coordinate system or PBM space without loss of data. The cyclic operator $C_p$ operates on two index variables and modifies the index bits by a modulus addition or subtraction. The inverse of the $C_p$ operator is given by another $C_p$ LPO in which one of the operands is a negative of either of the index variables.

Figure 5:
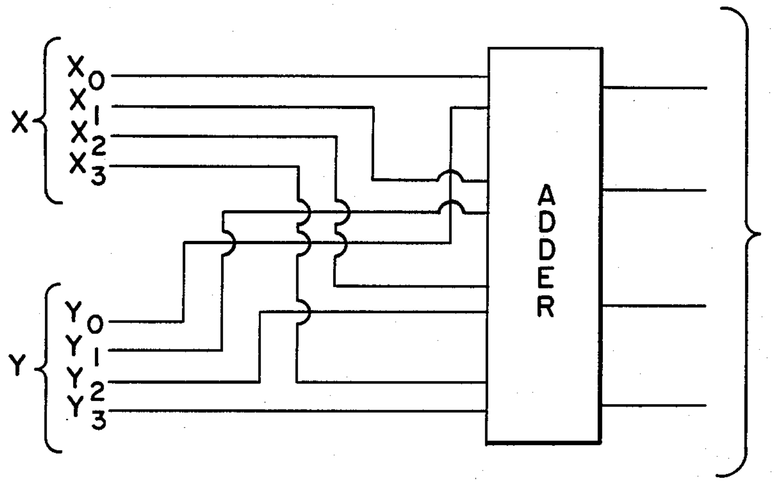
FIG. 5 is a circuit diagram for implementing the cyclic logical LPN operator $C_p$ for operation on address or index bits in address space.

The cyclic LPN is implemented in addressing logic circuitry in index or address space by arrangement of reversible or self-symmetric logical XOR or XNOR gates arranged as an adder as shown in FIG. 5. The cyclic linear permutation of the operands is therefore the sum of the operands with reference to a modulus equal to the number of address indices or objects being permuted. In terms of logic circuitry, the cyclic LPN $C_p$ translates to an adder or "rotator" implemented as such in the address circuits of AGEN or its associated address logic. In the data space and data paths of DGEN as hereafter described, the cyclic LPN $C_p$ is implemented by a barrell shifter or data rotator.

The particular functional relationship and linear permutation between the X,Y coordinate system and the PBM organization of the 16 memory banks B shown in Table 1 is defined by the following normal form equation.

$$B=C_p(X',Y')$$

The normal form X', Y' coordinates are related to the X,Y coordinates by the following equations:

$$X'=Q_p(X,1,0)$$

$$Y'=Q_p(Y,1(X,Y))$$

where $Q_p$ is the multiplexing or switch hybrid LPN defined in Table 3 and $E_p$ is the exchange logical linear permutation operator defined in Table 4. The exchange linear permutation network or operator $E_p$ is a logical linear permutation operator operating on at least two operands or dimensions and incorporating or implementing self-symmetric reversible logical gates such as XOR and XNOR logic gates.

Figure 6A:
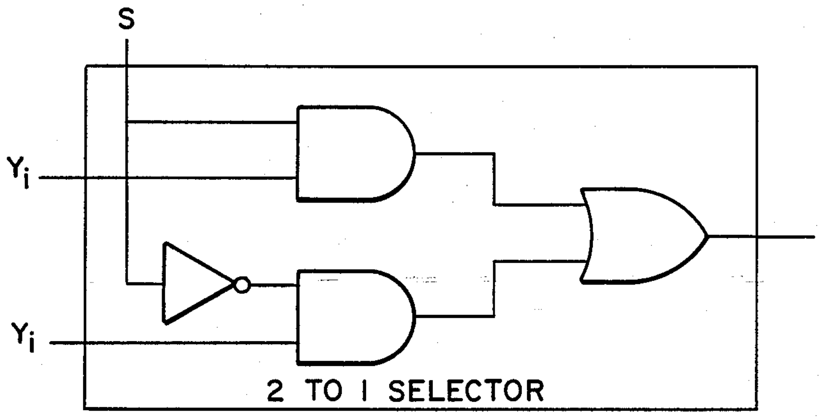
FIG. 6A is a detail of the 2-to-1 selector switch.
Figure 6:
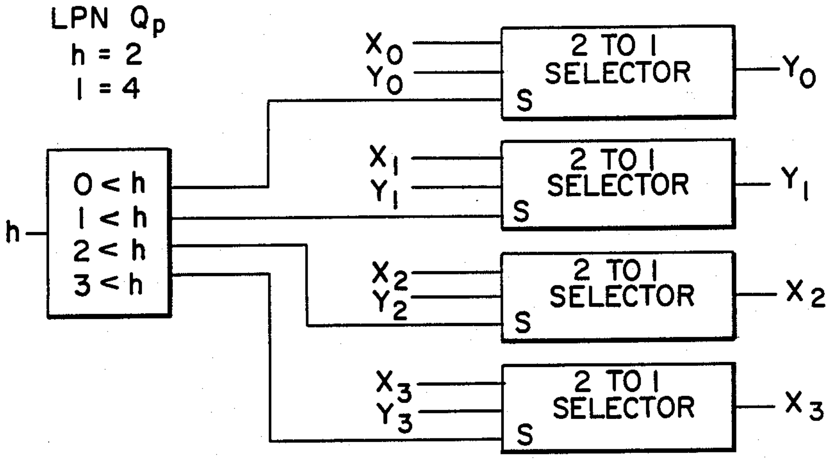
Figure 7:
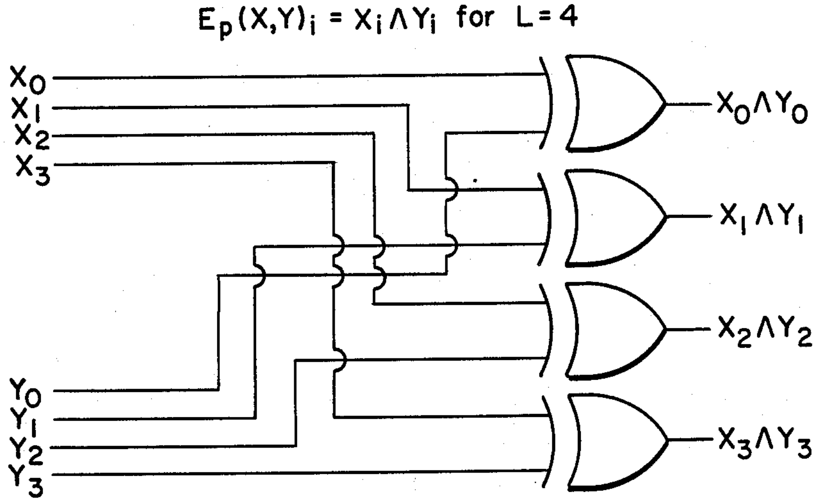
FIG. 7 is a circuit diagram for implementing the exchange logical LPN operator $E_p$ for operation on address or index bits in address space.

The multiplexing or switch LPN $Q_p$ is referred to as a hybrid LPN because it does not incorporate or implement such logic gates and therefore may be implemented with "wire" only operating on the index of an operand. However, the $Q_p$ LPN is a pairwise logical LPN. The $Q_p$ LPN is a unique LPN construction because it operates on indices from two or more dimensions multiplexing multiple dimensions and when implemented in pairs effectively functions as a logical LPN. Thus the pairwise logical switch operator $Q_p$ is an LPN that operates on two or more indices and when operating in pairs can perform logical operations as hereafter more fully presented. The switch LPN $Q_p$ is effectively a two-dimensional permutation logical operator which takes bits out of two different dimensions and multiplexes indexed or address bits. A circuit for implementing the switch LPN $Q_p$ in the address or index space is shown in FIG. 6 for the example of TABLE 3, while FIG. 6A shows the detail of the 2-to-1 selector switch of FIG. 6. A circuit for implementing the exchange LPN E is shown in FIG. 7.

For extending the permutation bit map of Table 1 from two dimensions to three dimensions incorporating for example a multiplane permutation bit map, the logical LPN transformation equation defining the assignment of the 16 memory banks B to pixel or bit positions of the user X,Y,Z coordinate system, two applications of the cyclic LPN or cyclic operator $C_p$ are required. That is to implement the permutation bit maps of the present invention a transformation LPN function is required which incorporates at least one logical LPN function such as the cyclic linear permutation operator $C_p$ for the two-dimensional permutation bit map and at least one logical LPN for each dimension after the first for higher dimension bit maps. For permutation of the three-dimensional X,Y,Z coordinate system to a three-dimensional PBM at least two logical LPN's are required.

In order to achieve multicellular addressing with two-dimensional cell configurations, the permutation objects, namely the 16 logical memory banks B must be a logical linear permutation function of at least two dimensions, for example both dimensions of the X,Y coordinate system namely X and Y. In the case of a multiplane three-dimensional coordinate system the memory bank designations may also be a function of at least both the X and Z coordinates. The logical LPN therefore operates on the pertinent indices or addresses of both coordinate dimensions. In the present examples these address bits also referred to as indices or index bits are four in number along each coordinate. In the Y coordinate direction of a block the address bits, indexes, or indices permuted by the logical LPN function are designated $Y_3$, $Y_2$, $Y_1$ and $Y_0$ or generally $Y_i$ where $i=3, \ldots, 0$. In the X coordinate direction of the block the address bits permuted by the logical LPN function are $X_5$, $X_4$, $X_3$, and $X_2$ or generally $X_i$ where $i=5, \ldots, 2$. This pertinence of four index or address bits of X and Y is based on the following addressing scheme.

With reference to the addressing bit orders and directions, the following conventions are observed. Following the standard practice the right-most bit in an addressing word or data word expresse horizontally is the least significant bit (LSB) and is labeled with the index number or subscript $i=0$. The left-most bit of a word expressed horizontally is the most significant bit (MSB) and is labeled $N-1$ for an N bit word. Accompanying the LSB and MSB conventions is the convention that X values in the X,Y coordinate system increase from left to right while Y values increase from the top to the bottom of the X,Y coordinate system refresh image. According to one example implementation, the 64 bit cells or words in the DGEN are formed as an interleaved sequence of two 32 bit words to and from the frame buffer memory. According to the convention of identifying the order of data structures having multiple parts with increasing memory address order, the first 32 bit word to be transmitted or received has the lower memory address number. Similarly the 32 bit words of the AGEN composed of two 16 bit operands are arranged so that the 16 bit word with the lower register are placed in the least significant bits of the 32 bit word. In the case of the three-dimensional bit map with a Z coordinate for multiple planes, a convention is followed that the first plane or top plane is identified by index bit zero with higher numbered plane progressing downward in pixel depth. For refresh of the display each scan line composed of successive horizontal display words of successive blocks begin on a block address boundary.

Binary power of two X,Y addressing may be used to relate the X,Y position of a pixel on the raster display view surface to address values or positions of the memory banks and memory bank cell addresses which contain the pertinent pixel. While linear addressing may also be used, preferable for windowing systems, the following binary addressing scheme is described. The X,Y address is a concatenation of the index bits for Y and X. The X address of a pixel location of the view surface in the X,Y coordinate system is given by the address or index bits $$X_{N-1}, \ldots, X_6, X_5, \ldots, X_2, X_1, X_0$$

where $X_{N-1}, \ldots, X_6$ represents the block address in X, where $X_5, \ldots, X_2$ represents the address in X of a quadunit within a cell, and where $X_1$, $X_0$ identify the four bits within the quad data unit. For a view surface and bit map with resolution of for example $1024\times1024$ pixels the view surface is subdivided and filled out by 1024 blocks of the dimensions $64\times16$ bits as described above. For a resolution of $2048\times2048$ pixels, the raster view surface and bit map are subdivided into 4096 blocks. A minimum of 10 to 12 address bits are therefore required to identify a particular block specified in part by the block address bits $X_{N-1}, \ldots, X_6$. This X coordinate portion of the block address carries over directly between the X,Y coordinate system and the B,A coordinate system or PBM without permutation according to standard or conventional addressing transformation to memory.

The string of four address or index bits $X, \ldots, X_2$ identifies a quad in the horizontal X direction of the block which may be identified with a cell address corresponding to a coordinate position in the X,Y coordinate space. This is because in the horizontal X coordinate direction each coordinate position represents a quad of four bits or pixels. Each row of the block along the horizontal X direction is composed of 16 quads (64 bits), which quads can be identified by four index bits $X_5, \ldots, X_2$. Each horizontal X coordinate position quad is controlled by or contributed by a different one of the 16 memory banks B as shown in Table 1. The memory banks B are also organized into blocks having the same block address for particular blocks. Once the block address is specified it is the same for all memory banks and all 16 memory banks contribute to the block. The specified block of a particular memory bank is divided into 16 cell addresses for the 16 cells of the block to which the memory bank contributes and constitutes one quad. As previously explained, each memory bank contributes one data unit or quad to each of the 16 cells of a block. The quad for a particular cell is therefore identified by the cell address A within the memory bank B. This cell address A and the memory designation B of the PBM coordinate system is related to the X,Y coordinate positions through the logical linear permutation transformation.

In the case of the X coordinate direction it is only the cell addresses of the quads for the cell address or index bits $X_5, \ldots, X_2$ that are permuted representing four index bits. In the definitions of the different logical and wire LPN's of Tables 2, 3, 4, etc. the number of index bits L is therefore four and the modulus where applicable for example in defining the cyclic LPN $C_p$ is also 4. The block address bits $X_{N-1}, \ldots, X_6$ are not permuted but carry over by conventional addressing to the memory banks. In other words the block is the set of bits in memory for which every memory bank has the same address. Every memory bank has the same block address in a particular block. The block organization of the present invention arises because there are portions of the address that do not change. Similarly the address bits $X_1$, $X_0$ which identify a bit or pixel position within the quad are not permuted by the LPN's. Rather it is only the four index bits of the cell address portion which change according to the selected addressing mode and therefore it is only the cell address bits that are permuted. It is the cell portion of the address that changes.

The Y address of a pixel location of a view surface in the X,Y coordinate system is given by the following address index bits:

$$Y_{M-1}, \ldots, Y_4, Y_3, \ldots, Y_0$$

where $Y_{M-1}, \ldots, Y_4$ represents the Y coordinate portion of the block address and $Y, \ldots, Y_0$ represents not only the quad within a cell but also a particular bit or pixel location because in the vertical or Y direction the dimension of a quad unit is only one bit. The vertical dimension of a block is 16 bits or 16 pixel positions which can be specified by the 4 index bits $Y_3, \ldots, Y_0$. Again, the Y portion of the block address $Y_{M-1}, \ldots, Y_4$ carries over directly between the X,Y coordinate system or SBM space and the B,A coordinate system or PBM space without permutation according to standard or conventional transform addressing. The complete block address is given by the concatenation of X and Y coordinate block address portions:

$$Y_{M-1}, \ldots, Y_5, Y_4, X_{N-1}, \ldots, X_7, X_6$$

As stated above, the block address is not permuted and carries over to the memory bank address space in a conventional arithmetic relationship.

By way of example, the handling of the block address during refresh of the display is as follows. At the start of each frame determined by the clock ID on the display data bus, the block address counters or registers are loaded with the display start block address stored in the block address register 92 of the AGEN 15 illustrated in FIG. 12. This register is loaded with the first block address to be displayed. The block portion of the address is incremented across a horizontal scan line each time the clock ID from the display bus indicates the start of a display memory access cycle. A scan line is composed of aligned rows from 16 successive blocks across the screen. As each new scan line starts, the clock ID causes the Y portion of the address to be incremented one row. If the Y portion has reached its maximum count, namely the 16the row 0–F of the block, the block address is also incremented in the vertical Y direction. If the Y portion is not at its maximum count remaining within the same block, the block address is reloaded for the next scan line. In this way the display addresses repeat the same series of block addresses 16 times across 16 consecutive lines with each of the 16 lines using a different Y.

Display accesses use only the the 64×1 bit display word access so only the Y portion of the display address is needed to generate the 16 quad addresses which are all the same. Update addresses from the address registers of AGEN 15 use any of the selected two dimensional cell addressing modes. The update addresses may use both the X and Y portions of the address in addition to the specification of the selected cell configuration addressing mode.

The string of four address or index bits $Y_3, \ldots, Y_0$ identifies a bit or pixel position in the vertical Y direction of the block which may be identified with a cell address in the X,Y coordinate space. Each column of the block in the vertical direction is composed of 16 bits or pixel positions from 16 quads which can be specified by the index bits $Y_3, \ldots Y_0$. Each vertical Y coordinate position is controlled by or contributed by a different one of the 16 memory banks B designated by the hexadecimal digits 0–F as shown in Table 1.

As noted above, the memory banks B are also organized into blocks, each with the same block address for a particular specified block. Once the block address is specified each memory bank contributes 16 data units or quads to each block from 16 memory bank addresses A. Each of the memory bank addresses A contributes 1 unit of graphics image data or 1 quad to each cell of the lock for each different cell addressing mode that is specified. The memory bank addresses A are correlated with differing cell addresses C for the different addressing mode cell configurations. Each of the 16 memory banks B therefore has 16 bank addresses A within each block which can also be identified with 16 changing cell addresses C. The bank addresses A within a block are thus correlated with cell addresses C for any particular specified addressing mode cell configuration. These 16 cell addresses C represent the 16 data units or quads contributed to each block, one unit per cell. This cell address is established once the block and the addressing mode are specified. This is because the block portion of the permutation bit map according to the invention is organized to contribute one and only one data unit or quad to each cell. At this level, once the addressing mode is specified the bank addresses A within a block can be identified with the cell addresses C because each one of the 16 quads or graphic data units is associated with one of the 16 cells of the block for each of the different addressing modes. In the tables hereafter set forth for each of the different addressing modes, it is the memory banks B and cell addresses C for each of the specified addressing modes that are set forth as functions of the user X,Y or X,Y,Z coordinate pixel positions.

The bank addresses A and memory bank designations B of the PBM space or coordinate system are therefore related to the X,Y coordinate space through the linear permutation of index bits in both X and Y namely $X_i$ where $i=5, \ldots, 2$ and $Y_i$ where $i=3, \ldots, 0$. In the definitions of the various logical and wire LPN's of Tables 2, 3, 4, etc. the number of index bits L permuted remains 4 throughout for the selected example embodiments. Also the modulus where applicable is also 4. As stated above, the block address bits are not permuted.

Similarly as developed in subsequent address equations, the address bits or index bits for specifying the 16 memory banks B of a block are the four index bits $B_3, \ldots, B_0$. The address bits or index bits for specifying the 16 cell addresses A of a block are the four index bits $A_3, \ldots, A_0$. The address equations are therefore vector equations summarizing multiple equations. In the preferred example embodiments the number of permuted index bits per dimension or coordinate subject to linear permutation transforms remains 4 throughout, namely $X_i$, $Y_i$, $B_i$, $A_i$ where the number of index bits L is four and i can assume one of the 4 values. The number of index or address bits L for each index variable e.g. $X_i$, $Y_i$, $B_i$, $A_i$, etc. is related to the number of logical memory banks M as the logarithm to the base 2. That is, $L=\log_2(M)$. In extending the present invention to the third dimension Z with 16 possible planes of organization of the frame buffer this also remains true of the index bits $X_i$, $Y_i$,$Z_i$ of the SBM coordinate system as well as the index bits $B_i$, $A_{yi}$, $A_{zi}$ of the PBM coordinate system.

A major achievement of the present invention is in the novel construction of a whole class of permutation bit maps with the following unique characteristics. Within each block the memory banks and bank cell addresses are so arranged in correlation with the pixel positions of the view surface and user X,Y coordinate system that multiple different cell addressing modes may be selected and yet each memory bank contributes one and only one data unit (in these example embodiments the quad) to each cell for whatever selected configuration. The different cell and word addressing modes or configurations therefore fill out or access each block covering all of the bits or pixel positions without redundancy and without overlap, forming boundary subsets of the block. Each memory access cycle for whatever selected addressing mode accesses each memory bank and accesses one cell or word to which each memory bank contributes one and only one data unit, in the present examples represented by a quad.

This achievement of the present invention requires a linear permutation transformation between the standard X,Y coordinate system and the PBM or B,A coordinate system incorporating at least one logical LPN in the case of a two-dimensional bit map and at least one logical LPN for each dimension after the first for higher dimensional bit maps. Thus for a three-dimensional PBM at least two logical LPN's are required in the functional transformation. Furthermore there is no limitation according to the present invention on the number of dimensions of the bit map. For example a four-dimensional PBM may be constructed based upon linear permutation of for example a user X,Y,Z,T coordinate system incorporating at least three logical LPN's where the fourth dimension is time. Such a four-dimensional LPN is useful, for example, in double or multiple buffer graphics. It should be noted that in linear permutation computations, the values of the data are not changed, only their ordering. Thus the variables may be viewed as coordinates of where the data is located and the mapping function f may be viewed as a computation which changes the number of a data item to a different number and therefore is a transformation from one coordinate system to another. The application of permutation theory to frame buffer addressing is a unique use of this mathematics in which the data ordering is carried out in more than one dimension. The mathematical literature treats only single dimension problems, while the present invention is concerned with novel multidimensional frame buffer addressing with linear permutation operators. According to the invention, there is always a one to one mapping of data from one set to another in such a way that the data may be transformed bank to its original order by an inverse transformation. Mapping functions which have this one to one and invertable property are called linear permutation operators or LPOs for short. LPOs are mathematical functions which satisfy the rules of an algebra and may be manipulated by formulas to prove desirable properties and achieve the end results.

The physical implementation of LPOs in any combination is called a "Linear Permutation Network" or LPN for short. In general an LPN implemented in index space requires considerably less circuitry than the equivalent LPN implemented in data space. For this reason, all LPNs in the address circuitry or the address generator are implemented in index space. As used herein the terms LPO and LPN are sometimes used interchangeably though it is the LPNs that are the physical circuitry implementations of the LPOs.

A more versatile permutation bit map embodiment of the present invention is summarized in Tables 5, 6, 7, 8, and 8A, each showing a 64×16 bit size block (16×16 quad size block) of the permutation bit map. The Tables give the memory bank and bank cell addresses B,A or B,C as a function of X,Y or X,W where $W=R_p(Y)$. A close inspection of the assignment of memory banks designated by the first hexadecimal digit 0–F of each pair of hexadecimal digits in the body of the tables to pixel or quadpixel positions of the X,Y coordinate system reveals a difference in the permutation order resulting from exchange and reversal linear permutation networks in contrast to the cyclic LPN which generated Table 1. Tables 5 through 8A are also shown with the horizontal X coordinate increasing from left to right and the vertical Y coordinate increasing from top to bottom.

A feature and advantage of the exchange and reversal PBM of Tables 5 through 8A is that additional addressing modes AM are accommodated. Each addressing mode AM is designated by two numbers hv where h is the exponent to the base 2 of the number of quads in the horizontal direction and v is the exponent to the base 2 of the number of bits in the vertical direction composing each cell of the addressing mode. As shown in Table 5 the block may be addressed or accessed by the 64×1 bit horizontal word addressing mode AM40 for refresh of the display and for bit block transfers and polygon fills. Table 6 shows the partitions of the block into vertically oriented 4×16 bit cells of addressing mode AM04 useful for updating the frame buffer for drawing vertically oriented vectors with high performance. A high number of pixels may be updated, as many as 16 pixels, each memory access cycle. Table 7 shows the partition of the block into 16 horizontally oriented 16×4 bit cells in AM22 useful for updating the frame buffer for drawing horizontally oriented vectors with high performance. With respect to Table 5, 6 and 7 the exchange and reversal PBM equals the capability of the cyclic PBM of Table 1. In addition however as illustrated in Tables 8 and 8A the block may be partitioned into and addressed and accessed by square configuration 8×8 bit cells and horizontal 32×2 bit cells for appropriate applications. In each instance the 16 memory banks still each contribute one and only one data unit or quad in each cell and the 8×8 bit cells of Table 8 and the 32×2 bit cells of Table 8A fill out or cover the block without redundancy or overlap forming further boundary subsets for addressing modes AM13 and AM31.

Reviewing Tables 5 through 8A it is apparent that the assignment of memory bank addresses B to pixel positions on the view surface represented by the X,Y coordinate system blocks of the tables is fixed and invariant. In these examples the memory bank designations B are shown as the first hexadecimal digit while the bank addresses A or actually the corresponding addresses C for the specified addressing mode AM are the second hexadecimal digit. Thus the bank designations B do not change in the same static mode. The cell assignments or cell addresses C however do change with the different cell addressing modes. Tables 5 through 8A show the unvarying bank assignments B and the logical linear permutation of the banks as permutation objects in the transformation by logical linear permutation from the X,Y coordinate system to the logical memory bank coordinate system. The memory bank cell addresses which correspond at this level with cell address C also become "permutation objects" but the permutation is not unvarying and changes according to the selected addressing mode cell configuration. All 16 memory banks are represented in each cell for whatever configuration addressing mode but the memory bank cell addresses of the bank address locations A within the memory banks vary as hereafter described in further detail with reference to the example embodiments of the permutation bit map invention.

Figure 8:
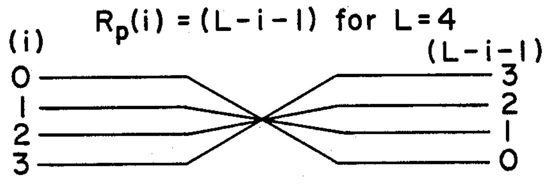
FIG. 8 is a circuit diagram for implementing the reversal wire LPN operator $R_p$ for operation on address or index bits in address space.
Figure 9A:
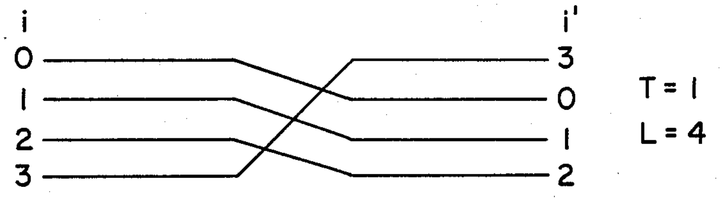
Figure 9B:
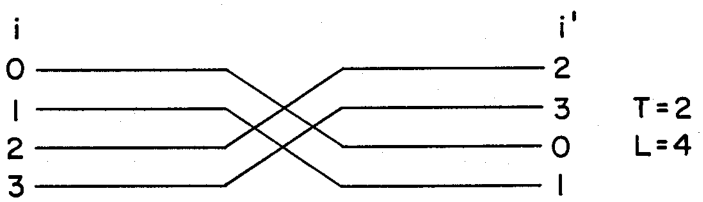
Figure 9C:
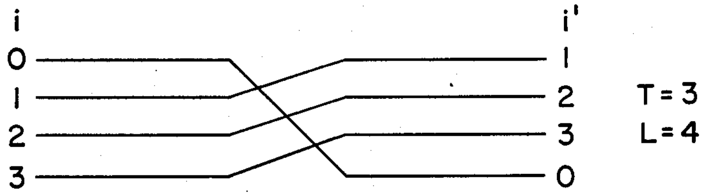
Figure 9D:
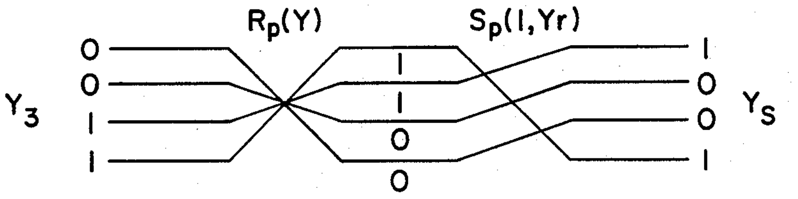
FIG. 9D is a circuit diagram for a combinational implementation of $R_p$ and $S_p$.

In order to achieve the permutation bit map of Tables 5 through 8A, the 16 memory banks are coordinated or assigned to the X,Y coordinate pixel positions according to the logical linear permutation functional transformation expressed in the following equation:

$$B=E_p(X,R_p(Y))$$

$$\text{or } B=E_p(X,W)$$

$$\text{where } W=R_p(Y)\text{, and conversely,}$$

$$X=E_p(B,A)$$

where $E_p$ is the exchange logical linear permutation network defined in Table 4 and $R_p$is the reverse or reversal wire linear permutation network defined in Table 9. A circuit for implementing the wire LPN $R_p$ is shown in FIG. 8.

With respect to the LPO and LPN notations and table definitions, the location of a specific data item in a set of data is defined by an index variable (also called a data coordinate) and expressed by capital letter variable names such as X, Y, and Z; B, $A_y$, and $A_z$; C, U, and S etc. All data sets contain a power of 2 number M of data objects so that each index variable requires $L=\log_2(M)$ bits. The individual bits in an index variable are Boolean values which are represented by either a subscript notation such as $X_i$ or by appending the actual bit number to the variable such as $X_0$, $X_1$ and so forth. The bits in an index variable are order sensitive and bit-0 will always be used to denote the least significant bit. For example, in a system having 16 memory banks, the "bank number" index variable B has 4 bits defined as follows:

$$B=B[3:0]=[B3,B2,B1,B0]$$

All the LPOs on an index variable involve simple operations on the bits of the index in such a way as to preserve the invertibility property. All expressions in an LPN must involve variables with the same number of index bits. Thus, general formulas may be derived which describe a system of any size for implementation in a specific system which specifies the desired value of L. The LPO definitions are given in terms of the i-th bit of an index variable.

Formulas involving the index bit numbers are performed using module arithmetic based on the modulus L. Thus if j and k are index variable bit numbers, then:

$$i=j+k=(j+k) \bmod L$$

and $$i=j-k=(L+j-k) \bmod L$$

For example, if L=4, j=3 and k=2 then:

$j+k=5 \bmod 4=1$ and $k-j=(4+2-3) \bmod 4=3$

The reversal operator $R_p$ results in the reversal of the index variable bits of a single index variable. $R_p$ simply reverses the order of the bits in an index variable. A second reversal $R_p$ will restore the original order so that $R_p$ is its own inverse. The exchange ($E_p$) LPO is a logical LPO which involves two index variables and the XOR Boolean primitive. Note that XOR and XNOR are the only Boolean functions of two variables which are invertable. The exchange LPN or LPO is the exclusive "or" Boolean function of the two variables. The inverse of $E_p$ is the exchange or substitution of any two variables all as set forth in TABLE 4. In general, $E_p$ commutes over any wiring LPO whereas the logical CLPO does not commute over any wiring LPO. Furthermore, $C_p$ does not commute over $E_p$.

More generally the reversal exchange permutation bit map is defined by the following general form of the fundamental equation:

$B=f_L(X,f_W(Y))$ where $f_L$ is a function of a logical LPN while $f_w$ is a function of a wire LPN or linear permutation operator. In the multiplane implementation of the reversal exchange permutation bit map the fundamental equation may also be applied in the two dimensions of X and Z for permutation of the addressing in different numbers of planes as follows:

$B=f_L(X,f_W(Y))$

The changing memory bank cll and unit addresses C and U which change according to the selected addressing mode AM are given by the following LPN permutations:

$C=Q_p(X,h,W)$ $U=Q_p(W,h,X)$ and conversely, $X=Q_p(C,h,U)$ $W=Q_p(U,h,C)$ where $W=R_p(Y)$ and h is the exponent or logarithm to the base 2 of the number of quads in the horizontal dimension of the selected addressing mode cell. The multiplexing or switch LPN $Q_p$ expresses the changing bank cell addresses necessary to achieve the multiple cell addressing modes. The address mapping of the memory bank address locations A is given by:

$A=Q_p(E_p(B,C),h,C)$

According to the best mode of the invention a three-dimensional permutation bit map is constructed with linear permutation of the user X,Y,Z coordinate system addresses in three dimensions using a novel combination of both logical and wire linear permutation networks including at least two applications of logical linear permutation operators. In this preferred three-dimensional PBM embodiment nearly 50 different cell configuration addressing modes are available for accessing the blocks. These cell configurations of the best mode PBM are summarized in Table 10. As heretofore described the preferred implementation is described with reference to a frame buffer composed of 8 physical memory banks each with a unique set of addressing lines. The physical memory banks are time sliced twice each memory access cycle providing 16 effective logical memory banks for permutation in the three-dimensional permutation bit map.

Because of the third dimension, the dimension of the block or block section includes not only the horizontal dimension of 16 quads or 64 bits and the vertical dimension of 16 bits in the case of a single plane P=1, but also the depth dimension of number of planes P of up to 16 planes. The block dimension is therefore $H_{max}\times V_{max}\times P$ bits where P the number of planes may have the value of 1, 2, 4, 8 or 16 bits. The block size does not exceed 1024 bits. Each block is composed of and may be partitioned into three-dimensional cells. The horizontal cell width is designated H with a maximum cell width Hmax, the vertical cell height is designated V with a maximum cell height $V_{max}$, and the pixel depth is similarly designated P.

The many addressing modes of the preferred permutation bit map hereafter described are summarized in Table 10. Referring to Table 10 most of the addressing modes pertain to the optimum permutation bit map or PBM of the present invention although the system also accommodates a number of standard bit map or SBM addressing modes. The second column designates or names the respective addressing modes by a four digit number denoted hvps. The origin of this designation is as follows. Of the columns on the right three of the columns designated H, V and P specify the respective horizontal, vertical and plane depth dimension of each of the addressing cell configurations in bits. The capital letter designations are thus reserved for specifying dimensions in bits. Of the left-hand columns the lower case columns designated h, v, and p represent logarithms to the base two of the horizontal, vertical and plane depth dimension specified by the respective upper case letters H, V, and P with the following qualification. The v and p designations are in fact the exponents to the base 2 of the respective V and P dimensions in single bits. The h designation referring to the horizontal dimension is however the exponent to the base two of the number of quads defining the cell in the horizontal dimension. Thus, for example on the first line identifying the 64×1 bit horizontal word cell configuration the horizontal dimension is 64 bits or 16 quads and h is the exponent 4 to the base 2 which gives 16 quads which also equals 64 bits.

The fourth designation of the addressing mode using hvps notation is the s referring to the static addressing mode or static mode. Not all of the PBM addressing modes are available at the same time under the mathematical constraints of the three-dimensional permutation bit map architecture. Only those addressing modes are concurrently available which satisfy a contiguity requirement hereafter defined. The optimum multicellular addressing PBM architecture according to the present invention allows the user to select one of five static modes s or sm, designated by the numbers $s=0, \ldots, 4$ each static mode affording a rich set and selection of alternative cell configuration addressing modes with greatly improved performance characteristics appropriate to particular applications. As shown in Table 10 these addressing modes which are available concurrently to the user are designated by the same digits equal to 0, 1, 2, 3 or 4. The logarithm to the base 2 parameters h,v,p corresponding to the H,V, and P parameters are combined with the static mode character s to form the four character address mode or AM designation for example AM3100, the second addressing mode of Table 10. The AM3100 is a horizontally oriented 32×2 bit cell. For each of the identified cell addressing modes the most appropriate uses for the cell configuration are listed in the right-hand column of Table 10. In this column under the heading "USE", the B refers to use in bit block transfers while the V refers to use in vector drawing. In some instances both are appropriate uses.

In referring to Table 10 it is noted that the product of the bit dimensions H×V×P of the three-dimensional modes are achieved by varying any two of the three parameters but the product of the parameters always equals exactly the 64 bit cell size of the preferred example embodiment. It is also noted that the sum of the corresponding exponents or logarithms h,v,p always equals 4 and this sum is designated L:

$$L=h+v+p,$$

$$\text{where } L=\log_2(M)$$

a parameter useful in the defining equations of the logical and wire linear permutation networks. In the present examples, M=16 and L=4. The number 4 coincides with the number of address bits or index bit permuted in a linear permutation operation for any particular coordinate dimension, the number of least significant address bits or index bits of interest for each dimension or degree of freedom. It is the four least significant bits in each of the dimensions that is permuted to achieve the three-dimensional permutation bit map. In the case of the X coordinate dimension this however coincides with the address bits $X_5, \ldots, X_2$ because the data units are in quads and the lowest bits $X_1$, $X_0$ identify a bit or pixel position within the quad.

Optimum or best mode permutation bit maps in three dimensions corresponding to representative selected addressing modes of the static modes of Table 10 are illustrated in Tables 11 through 25. These permutation bit maps are referred to as double exchange shuffle and reversal bit maps implemented by a combinatorial linear transformation function incorporating two exchange logical linear permutation networks or operators and shuffle and reversal wire linear permutation networks or operators as hereafter more fully defined. A single block of the three-dimensional double exchange shuffle reversal PBM is shown in each of the Tables 11 through 15. Each table presents the coordinates of the user X,Y,Z coordinate system represented in two dimensions with the X coordinate in the horizontal direction increasing from left to right and the Y and Z coordinates in the vertical direction increasing from top to bottom. The assignment of memory banks in the body of the table corresponding to pixel or quadpixel locations of the view surface for the block subdivision are represented by three hexadecimal digits. The first digit is the logical memory bank designation B which may be compared with the first digit in Tables 1 and 5 through 8A. The second hexadecimal digit represents the bank cell address C for the specified addressing mode AM within the memory bank while the third hexadecimal digit represents the three-dimensional block section or cell address $A_z$ or S. For Tables 11 through 15 this third address designation is zero because these tables represent addressing modes in a single plane permutation bit map. The partitions show selected ones of the different addressing mode cell configurations AM available in static mode sm=0. All the addressing word modes where v=0 and V=1 for example are not shown although they are listed in TABLE 10. Upon close inspection the subtle differences of the double exchange shuffle reversal permutation bit map from the exchange reversal permutation bit map and cyclic permutation bit map are apparent. It is the characteristic and subtle permuted organization of the double exchange shuffle reversal permutation bit map which enables the rich selection of available cell configuration addressing modes in multiple planes as summarized in Table 10. Tables 16–25 represent multiple partitioned blocks showing representative selected ones of the different three-dimensional cell configuration addressing modes AM in multiple planes for higher static modes sm 0. All of the available three-dimensional AM's are listed in TABLE 10.

Equations for defining the linear permutation transformations to establish the PBM's of Tables 10–25 are summarized in Table 26 including the set up equations. Equations for word mode addressing AMhWp are a special case where W=v=0. An alternative symbolism or notation for expressing the same fundamental equations from TABLE 26 is used in the equivalent equations set forth in TABLE 26A. All of the applicable linear permutation operators or LPN's have already been defined except for the shuffle wire LPN $S_p$ which is defined and summarized in Table 27. Circuits for implementing the shuffle LPN $S_p$ are shown in FIGS. 9A–9D.

The shuffle LPO $S_p$ is a wire LPN or LPO that rotates the bits of an index variable. The phase of the rotation is given by a phase shift parameter or shuffle phase parameter. The inverse of a shuffle is a shuffle with negative shuffle phase shift parameter or a negative of the original shuffle phase shift parameter. A positive shuffle phase shift gives a left to right rotation while a negative shuffle phase shift gives a right to left rotation. Note that $R_p$ and $S_p$ are non-distributive. $S_p$ is used to implement the selected static addressing mode or selected static mode (sm) permutation bit map.

The general fundamental equation for the linear permutation transformations between the standard and PBM spaces for the best mode three-dimensional linear permutation bit map is of the normal form:

$$B=f_{L1}(X'f_{L2}(Y'Z'))$$

$$A_y=Y'$$

$$A_z=Z'$$

where $f_{L1}$ and $f_{L2}$ are logical LPN functions and X′, Y′, and Z′ may involve further wire or logical LPN functions of the original user pixel coordinates X, Y, and Z. In the preferred example $f_{L1}$ and $f_{L2}$ are or incorporate the exchange LPN operator $E_p$ and Y′ and Z′ incorporate shuffle $S_p$ and reversal $R_p$ operator LPN functions of Y and Z. In particular, the preferred fundamental equations are of the form:

$$B=E_p(X,E_p(Y_s,Z_r))$$

$$A_y=Y_sY_s=S_p(sm,R_p(Y))$$

$$A_z=Z_rZ_r=R_p(Z)$$

$$B=E_p(U,E_p(C,S))$$

$$A_y=C$$

$$A_z=S$$

The reverse transformation from the permutation bit map coordinate space $B,A_y,A_z$ to the user X,Y,Z standard coordinate system also in the functional form of the fundamental equations as follows:

$$X=E_p(B,E_p,A_z))$$

$$Y_s=A_yY_s=S_p(sm,R_p(Y))$$

$$Z_r=A_zZ_r=R_p(Z)$$

Figure 10:
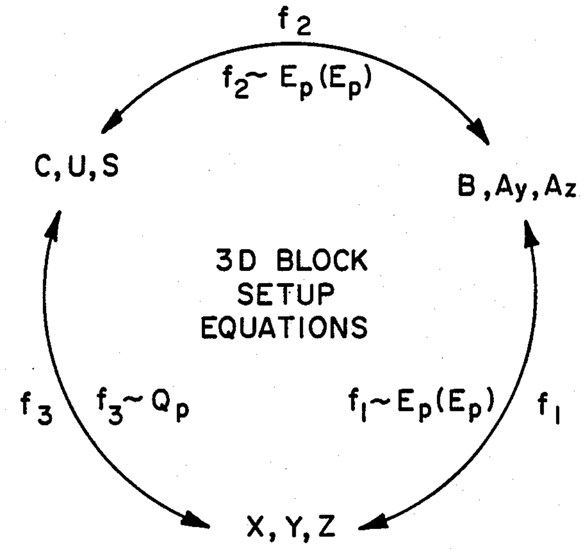
FIGS. 10 and 10A are a diagrams illustrating the fundamental theorem of linear permutation network theory and the mutual derivability and transformation in three dimensions between the X,Y,Z: C,U,S: and $B,A_y,A_z$ coordinate spaces and in two dimensions between the X,Y: C,U: and B,A coordinate spaces.
Figure 10A:
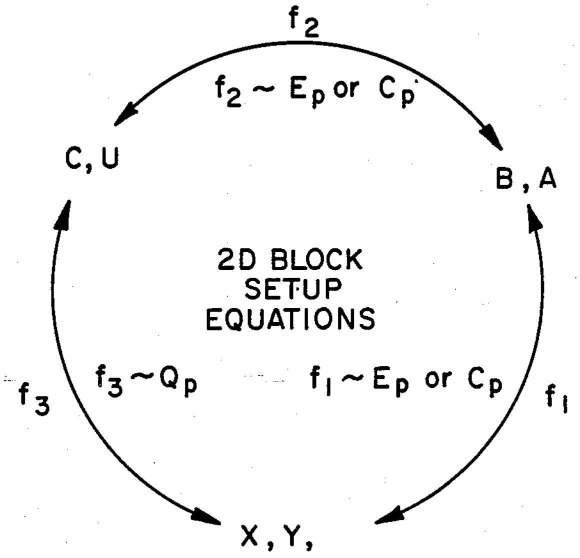

The intermediate transformations, for example between the X,Y,Z and C,U,S coordinate system require the multiplexing switch hybrid LPN $Q_p$ as set forth in the equations of Table 26 and 26A. The fundamental circular relationship between the three coordinate system spaces X,Y,Z: C,U,S; and $B,A_y,A_z$ is shown in FIG. 10. This diagram illustrates the fundamental theorem of linear permutation network theory that if two of the three mutually derivable functional transformations are given, then the third is also given.

To establish the best mode linear transformations in two dimensions the fundamental equation for the linear permutation transformations between the SBM and PBM spaces may take the following general form:

$$B=F_L(X,f_W)(Y))$$

where $F_L$ is a logical linear permutation network or operator function while $f_W$ is a wire linear permutation network or operator function. The memory bank cell and unit address equations may take the form:

$$C=Q_p(X,h,W),\ U=Q_p(W,h,Y),\ W=R_p(Y)$$

with address mapping $$A=Q_p(E_p(B,C),h,C))$$

It should be no that the closest prior art relating to raster graphics architecture and frame buffer bit maps, such as for example the Texas Instrument TI 34010 Graphics System Processor or the Carnegie Mellon University (CMU) cellular architecture discussed above, if characterized in terms of linear permutation network theory do not go beyond and cannot be characterized as going beyond a transformation of the following general format:

$$B=f_W(X,f_W)(Y))$$

where the $f_W$'s are no more than wire linear permutation networks or operators. In fact no prior art workers in the field and no prior art devices of which applicant is aware have adverted to the very productive but unobvious applicability of linear permutation network theory to raster graphics architecture nor incorporated nor embodied LPN concepts in raster graphics software or hardware. More importantly, it is a further novel and unobvious contribution and discovery of the present invention to incorporate at least one logical linear permutation network or operator constructed from reversible i.e. self symmetric Boolean logic gates such as XOR and XNOR gates.

For a two-dimensional bit map a single logical LPN is sufficient to establish a novel PBM according to the invention with a rich selection of multiple alternative cell and word configuration addressing modes. Moreover the two-dimensional permutation may take place in either the X,Y coordinate plane or the X,Z coordinate plane to provide a novel two-dimensional permutation bit map in either plane. For example the fundamental permutation transformation equation in two dimensions may also be applied in the X,Y plane as follows:

$$B=f_L(X,f_W)(Z))$$

As described above in transition to a three-dimensional bit map or even higher dimensional bit map, a plurality of logical linear permutation network operators or functions are required in the fundamental transformation equation, one for each dimension after the first. In this way a multidimensional permutation bit map may be established with a rich and varied selection of three-dimensional or higher dimensional cell and word configuration addressing modes. In each instance, for however many dimensions of the multidimensional permutation bit map according to the invention, the fundamental mapping equation for the memory banks B is independent of the addressing modes. That is the transformations or assignments of the memory banks B and memory bank address locations A to pixel positions of the view surface remains invariant for any particular selected permutation bit map while it is the cell addresses C which vary according to the selected addressing mode. Because of this characteristic feature of the invention the multiplexing or switch LPN $Q_p$ does not appear in the fundamental mapping equations for B. The multiplexing operator $Q_p$ expresses the multiple addressing cell and word modes for any particular permutation bit map of the invention and therefore appears particularly in the cell address, data unit address, and cell related parameter and coordinate equations of Tables 26 and 26A. The importance of the permutor or operator $Q_p$ is in expressing the different dynamic cell and word configuration addressing modes applicable and permitted with a selected permutation bit map. The particular permutation bit map is selected in the described example embodiment by selecting the static mode, sm or s number shown in Table 10.

The valid dynamic multiple cellular addressing modes AM for each of the different selected static modes sm or permutation bit maps of the preferred example embodiment are also summarized in Table 29. Each static mode sm may be viewed as a different permutation bit map or PBM with different fixed assignment or permutation of memory banks relative to the coordinate positions for pixel positions of the user view surface. For each different PBM or sm the valid available addressing modes AM are indicated by the affirmative letter Y in Table 29. The constraint which determines whether or not an addressing mode is available of a particular PBM or sm is referred to herein as the contiguity requirement. According to the contiguity requirement only contiguous modes are available. The contiguity or contiguous modes refers to addressing equations in which the address bits or index bits, namely the least significant bits of X and Y and Z must be adjacent or contiguous bits. For example, Table 30 is a table of the addressing permutation and correlation between the C,U,S address or index bits and the X,Y,Z index bits for the different dynamic addressing modes AM available in static mode sm=0. It is apparent upon inspection of this Table that the contiguity requirement is met by indicated addressing modes AM because the least significant bits or X,Y or Z are always adjacent or contiguous bits with reference to the numerical order of the index i.

The satisfaction of the contiguity requirement by most of the addressing modes available for the PBM or static mode sm or SM=1, the PBM or static mode sm or SM=2, the PBM or static mode sm or SM=3 and the PBM or static mode sm or SM=4 is further shown in Tables 33, 36, 39 and 42 respectively. Each of these tables also shows the transformation of address bits between the user X,Y,Z coordinate system and the intermediate block cell and unit coordinate system C,U,S. It should be noted that in each of these tables the index bit number (written in the specification as a subscript) follows the coordinate dimension letter X,Y or Z and in these tables corresponds to this subscript. In the Tables 33,36 39 and 42 the index bit digits for Y and Z in which i=3, . . . , 0 and for X in which i=5, . . . , 2 are written next to the dimension coordinate letter for convenience only. In the LPN definition tables 2,3,4,9 and 27, these index bits are written as actual subscripts.

The final physical memory bank address connections A, in two dimensions, and $A_y$,$A_z$ in three dimensions are derived and formulated from the fundamental permutation bit map equations of the present invention in four basic steps. In the first step the static modes for the system and the possible static mode transforms or static transforms are established. Each static mode is a specific mapping of pixels from the standard X,Y coordinate system to physical memory bank locations. A range of static modes are available in the preferred embodiment each in effect constituting a different physical permutation bit map with a different range of dynamic addressing modes or addressing mode cell configurations. A defined set of dynamic addressing mode cell configurations will operate on the permutation bit map defined by a particular static mode. The static transforms may involve any combination of wiring and switch LPOs or LPNs but do not include other logical LPNs. The result of this first step or static transforms is a set of modified functions of X,Y and Z for example X,$Y_s$,$Z_r$ where $Y_s$ is a shuffle linear permutation function of Y and $Z_r$ is a reversal linear permutation function of Z. In the alternative notation of TABLE 26A the initial modified variables are, for example X,$W_y$ and $W_z$.

In the second step of defining and formulating the address line connections and equations, the memory bank designations or assignments B and the memory bank address assignments A in two dimensions and $A_y$ and $A_z$ in three dimensions are established as a function of the modified static transform variables X, $Y_s$ and $Y_z$ or X, $W_y$, $W_z$. These are the fundamental equations for B, $A_y$, and $A_z$ at the beginning of TABLES 26 and 26A. These bank assignment transformations or logical bank assignments establish the range of possible addressing mode cell configurations. The bank assignment LPNs are any combination of logical LPOs or LPNs. Specifically the bank assignment transform function involves cyclic $C_p$ and exchange $E_p$ linear permutations in any combination which includes all the index space variables. The switch LPO $Q_p$ with at least one constant index may be included to construct specific permutation bit maps such as the cyclic permutation bit map of TABLE 1 . If the number of dimensions of the index space is N+1 then the bank assignment transform function must include exactly N occurrences of a logical LPO according to the invention. These bank assignment transformations must be invertible as shown in the fundamental equations of TABLES 26 and 26A.

The third step in formulating the address line connections is the dynamic cell address transformation deriving the address cell and unit coordinates in two dimensional index space or C,U,S in three dimensional index space from the modified static transform variables X,$Y_s$,$Z_r$ or X,$W_y$,$W_z$. This cell address transform defines the possible dynamic cell address modes for the given sets of static transformation equations from steps 1 and 2. Each address mode is selected by selection parameters related to the dimensions of the selected addressing mode cell as heretofore described with reference to TABLE 10. Only those addressing modes which satisfy the contiguity requirement discussed above may be useful. The cell address transformation of this third step involves only the logical switch operator $Q_p$ using the address mode selection variables for the switch index threshold parameters designated h in TABLE 3 and variously including h,L−p, and p' in TABLES 26 and 26A. The cell mode transform must be invertible and the inverse transform must be expressible only in terms of the U,C or U,C,S index variables. Similarly in the inverse transform only $Q_p$ LPOs or LPNs may be used as set forth in TABLES 26 and 26A. The cell address variables U,C, and S in TABLE 26 are expressed in the alternative notation U,$C_y$,$C_z$ in TABLE 26A.

The final step in defining the memory bank address line connections physically defining the architecture of the system is to derive the physical address mapping of the bank address assignments $A_y$ and $A_z$ (also designated AY and AZ in the address equations) in terms of the memory bank assignments or designations B and the cell addresses C in two dimensions or C,S in three dimensions. In the alternative notation of TABLE 26A the memory bank address line assignments $A_y$ and $A_z$ (AY and AZ) are formulated in terms of the variables B,$C_y$ and $C_z$. The fundamental theorem diagrammatically illustrated in FIG. 10 permits this final index or address line transformation. This is also possible in the preferred embodiment of the present invention because the $E_p$ and $Q_p$ operators commute. Once the memory bank address assignments $A_y$ and $A_z$ are formulated in terms of the memory bank assignments B and cell addresses C,S or $C_y$,$C_z$, equivalent Boolean equations may be derived for implementation of the memory bank cell address lines and line connections. This is accomplished by replacing the LPO operators in the final equations for $A_i$ namely $A_y$ and $A_z$ with their Boolean logical equivalent. These address lines for $A_y$ and $A_z$ are shown in FIG. 11. The fundamental equations for $A_y$ and $A_z$ in combinational mathematics are summarized in TABLE 26 and 26A. The corresponding equivalent Boolean equations AY and AZ for determining the actual cell address line circuits and connections are given in TABLES 28, 31, 33, 35, 37, and 39. The index bits ij following AY and AZ are the variable bit number i [3:0] and the "pull" number j either 0 or 1.

While the example embodiments have been described with reference to frame buffer memory address and data spaces of 2 and 3 dimensions, the present invention is applicable to n dimensional spaces defined by n coordinates, index variables or address variables. In each instance the fundamental equations may be generalized for linear permutation transformations between an n dimensional or n coordinate standard user/viewer space , an n dimensional abstract data unit and cell address space, and finally an n dimensional memory bank and bank address coordinate space.

The memory bank address connections for the corresponding addressing circuits to achieve the best mode example are set forth in Table 28 along with the addressing equations set forth in condensed Boolean equation format. These address line equations are spelled out in further detail for the different static modes in Tables 31, 33, 35, 37, and 39. The external address equations compute and generate the address lines. They convert the fundamental equations and setup equations of Tables 26 and 26A expressed in the combinational mathematics of linear permutation operators to logic circuitry expressed by the Boolean logic equations. The symbolism conventions of the addressing equations and external address equations are as follows.

The capital letters H and P are actually the log values expressed in the specification as lower case h and lower case p. However, they are written in Tables 31, 33, 35, 37, and 39 in capital letters because it is the convention to write the Boolean address equations in all capitals. The expressions HLT and PLT refer to "h less than" and "p less than". It should be noted that the subscripts as they appear in the specification as subscripts are shown in the Tables on the same line as the referent. Thus AY refers to $A_y$. In the external address equations the plus sign "+" refers to the logical "OR" operation, a blank space refers to the logical "AND" operation, the complement symbol "'" refers to the logical complement or "NOT" operation and the ^ symbol refers to the exclusive or "XOR" operation. These external address equations convert the fundamental equations of Tables 26 and 26A into logic circuits.

A generalized block diagram and flow diagram of a raster graphics system according to the invention showing the AGEN 15 and associated address circuits 20, frame buffer memory banks 12, and the DGEN 22 are illustrated in FIG. 11. This block diagram shows the basic configuration of a frame buffer address and data controller for raster graphics machines with the elements of novelty incorporated by the present invention. As shown in FIG. 11, the AGEN 15 includes the basic linear permutation networks in block diagram form for converting graphics data address information in the user X,Y,Z coordinate system to the intermediate cell, data unit, and block section coordinate system C,U,S. To this end the network blocks incorporate respective wire linear permutation networks $S_p$ and $R_p$ and the important cell address permutation hybrid LPN $Q_p$ in the functional relationships that are summarized in Table 26.

In the example of FIG. 11 the full linear permutation transformation from the user X,Y,Z coordinate system to the memory bank and bank address coordinate system B,$A_y$,$A_z$ is not completed within the AGEN 15. This embodiment of the invention is referred to as the exterior addressing mode for AGEN 15. The addressing permutation transformations are completed in associated address circuitry 20, which for example incorporates the external address circuitry of Tables 31, 33, 35, 37 and 39. The associated address circuit 20 includes the linear permutation networks for completing the transformation from the intermediate C,U,S coordinate system to the physical memory bank and memory bank address coordinate space B,$A_y$,$A_z$. Completion of the linear permutation transformation is accomplished by the logical, wire, and hybrid LPN's $E_p$,$S_p$,$R_p$, and $Q_p$ as set forth in the equations of Table 26 implemented in the functional blocks of the associated address circuitry 20 as shown in FIG. 11. The resulting memory bank addresses are summarized by the addressing equations and the memory bank address line address connections summarized in Table 28, 31, 33, 35, 37 and 39.

Data retrieved from the memory bank address locations is then processed for specified graphics operations in the DGEN 22. Detailed description of the components and elements of DGEN 22 as shown in both FIG. 11, Part 2 and FIG. 16 is provided hereafter with reference to the description of DGEN 22 at FIG. 16. For the present purposes, the block diagram of FIG. 11 shows the novel elements required to be implemented in the graphics data generating component because of the unusual permuted order of the data retrieved from memory banks 12. According to the graphics operation to be performed, for example, bit block transfers, polygon filling, vector drawing, etc., data must be reordered from the PBM space of the B,$A_y$,$A_z$ coordinate system to the SBM standard coordinate system in certain instances. To accomplish this, pre- and post-linear permutation networks are provided for example in association with the EXNET elements 110 and 120 of FIG. 11 hereafter referred to as the PRENET and POSTNET of FIG. 16 for performing linear permutations. Alternatively, vector graphics data to be written in memory must be transformed from the user X,Y,Z coordinate system to the intermediate PBM coordinate space C,U,S for matching and masking with destination data, etc. Masks must be matched with source or destination data also during Bit Blt and polygon fill operations. Linear permutation networks for matching and masking data to be merged or masked all as hereafter described in further detail are set forth in the LPN functional block elements of the DGEN 22 in FIG. 11. All of these parameters for performing the operations on graphics data in DGEN 22 are summarized and defined in Table 26. Additional linear permutation operators may be incorporated for example in the TRANSLATE component or element of DGEN 22 in FIG. 11 according to the selected permutation bit map in the frame buffer and therefore the PBM organization of data retrieved from the frame buffer.

The basic features of the AGEN component 15 are described with reference to FIGS. 12 and 13. The AGEN component 15 is a dedicated address and rasterization sequence controller which supplies addresses to a memory control 22 or memory circuit and generates the sequences of operations which allow the DGEN component 22 to modify the contents of the bit-map of the frame buffer memory. The AGEN supports varying architecture styles of high performance graphics systems. The AGEN includes all the standard basic primitive generation features and provides a number of unique capabilities relating to PBM's not found in any conventional addressing device. The significant capabilities of the AGEN may include the following.

The AGEN 15 provides automatic generation of addresses for controlling permutation bit-maps in the user selectable cell address mode. Up to 1 Giga-byte of memory per DGEN may be directly addressed in single plane mode or up to 64 Mega-bytes of memory per DGEN may be addressed for applications using DGEN in the 16 plane mode. The AGEN 15 provides a full set of pipeline drawing state registers allowing the setup of the next instruction to be completed before the completion of the current instruction.

Complete control of the bit level rasterization may be provided for vector begin point, end point and break point bias. There is full bit level clipping, and clip edge interrupt. Full bit level picking is also provided with programmable pick identification code, and interrupt independent of the clip process. The memory block address generation as heretofore described supports direct mapped, binary mapped and linear bit-map styles of addressing. The major AGEN graphics generation instructions may be aborted and then resumed after register restoration. Full address generation is provided for the screen refresh function in response to refresh request inputs. The AGEN 15 supports single to multiple plane addressing as well as the sequencing of pixel level data transfers for user supplied pixel processing. Thus, the AGEN incorporates those features known in the computer graphics art and in addition the PBM addressing capabilities of the present invention.

As illustrated in FIG. 13 of the drawings, AGEN is a 68 pin component using 60 pins for the functional system interface and 8 pins for power and ground connection. The general purpose and characteristics of these pins are summarized in TABLE 45 and set forth in further detail as follows:

AD[31:0]

ADDRESS/DATA

Bus This is the primary 32-bit bidirectional bus interface of the AGEN to the rest of the system. Data received and transmitted on this bus include: (1) instruction words and operands form the programmable graphics processor, (2) addresses of data for input to the DGEN components, (3) addresses of data for writing into memory from the DGEN components and (4) control words for the system components. Input data is enabled for reading by AGEN over these lines by the ADE signal. AGEN sinks a maximum of one 74LS load from the bus signal drivers for input.

ADE

ADDRESS/DATA ENABLE

This active low signal forces the AD bus into an open condition allowing the reception of data into the AGEN registers while also allowing bus transfers in which AGEN is not involved. This signal is generated by the external bus control logic. AGEN sinks a maximum of four 74LS loads from this signal.

MR

MASTER RESET

This active low signal causes complete initialization of the AGEN control circuits, including the initialization of the refresh state counters. After the low to high transition of this signal, AGEN generates a READY bus-code indicating a satisfactory operational state and readiness to execute instructions. AGEN sinks a maximum of four (4) 74LS from this signals.

ICLK

INSTRUCTION CLOCK

This is the primary source of timing for all AGEN internal operations. The maximum rate is 40 MHZ with minimum dynamic state rate of 1 MHZ. Typical graphics systems will normally drive this signal at its maximum specified rate. The signal is able to sink the equivalent of ten 74LS loads at the maximum rate and has a duty cycle of no less than 40% and no more than 60%. AGEN assume that this clock is free running (never stops). All active low AGEN output strobe signals occur within 20% of the high to low transition of this clock.

BUSCODE[2:0]

BUS OPERATION CODE

This is a multi-purpose code which indicates the instruction execution state in response to a status request which is an a synchronous interrupt request to the programmable graphics processor or the definition of the type of bus cycle to be executed for AGEN data input and output. These lines are valid when the BUSTROBE signal are low and are capable of driving a minimum of two 74LS loads at a 10 MHZ maximum rate.

BUSTROBE

BUS OPERATION STROBE

An active low output signal indicates that the BUSCODE is valid. The high to low transition may be used by external circuits to load the BUSCODE into external registers for finite-state machine control. This signal is capable of driving a minimum of two 74LS loads at a 30% duty cycle maximum rate of ICLK divided by four.

WAIT

BUS CYCLE WAIT DELAY

This active high input signal causes the AGEN to delay any AD bus transaction for the number of clock cycles for which it remains high. The leading edge must be received by AGEN two and one-half ICLK cycles prior to any AGEN operation which would otherwise utilize the AD bus. This signal is used primarily to insert "wait states" for memories whose read or write cycle time is greater than two ICLK cycles and to allow external use of the AD bus for direct PGP access to the bit-map memories. This signal must be high for at least two ICLK cycles. The AGEN sinks a maximum of one 74LS load from this signal.

IRDY

INSTRUCTION READY

This is an active high level signal indicating that the AGEN is available to accept a instruction request (IRQ) instruction code (ICODE) input. This signal is guaranteed by the AGEN to be low for no longer than four ICLK periods allowing external polling of the AGEN instruction status. This signal by itself does not indicate that AGEN is available to receive a new AD bus instruction or operand. The AGEN pulls this signal low within two clock cycles of the receipt of an IRQ and also drops the signal for an AGEN initiated bus cycle. The signal remains high for a status or interrupt request bus-code output allowing external circuitry to distinguish the meaning of a bus-code. This signal is capable of driving two 74LS loads at 50% duty cycle at a rate of ICLK divided by four. That is, AGEN drops this signal at most once every four ICLK periods.

ICODE[3:0]

INSTRUCTION REQUEST CODE

This four bit code indicates to the AGEN the type of operation which is being requested by the external hardware including soft reset, status request, refresh data request and graphics instruction execution. These signals are valid when the IRQ signal is low. The AGEN sinks a maximum of one 74LS load from these lines. The drive circuits are required to change the values of these lines no more often than four ICLK cycles.

IRQ

INSTRUCTION REQUEST

Active low input signal indicates to AGEN that the instruction request code (ICODE) is valid. The ICODE is processed beginning at the high to low transition of this signal. This signal is synchronous with the ICLK train and the high to low transition within 20% after the high to low transition of ICLK. The signal is required to remain low for at least two clock cycles and must not be issued more frequently than every four ICLK cycles. For operand input, it is normal for IRQ to be received every four ICLK cycles. IRQ may be generated while IRDY is low but will not be honored until IRDY becomes high. AGEN sinks a maximum of one 74LS load from this signal.

DOP[2:0]

DGEN OPERATION CODE

These code signals are issued by the AGEN to indicate the primary type of instruction to be executed by the DGEN(s). May also be decoded by external circuitry along with the bus-code when applicable to gain detailed information regarding the type of bus operation being conducted. For example, the memory controller determines whether a read, write, refresh read or read-modify write sequence is to be executed based on the DOP code and Blt's in the BFLD. A low value of OPSTROBE indicates to the external logic BFLD. that DOP is valid. DOP values do not change more frequently than every four ICLK cycles and AGEN sinks a maximum of two 74LS loads on these lines. These signals are normally connected directly to the equivalent pins of the DGEN (after appropriate buffering as necessary depending on the number of DGEN components). The DOP, BFLD and PFLD signals taken together form the NGEN input instruction and are collectively called the DOPBUS signals.

OPSTROBE

DGEN OPERATION STROBE

An active low output signal indicates to the DGEN (and external circuits) that the DOPBUS signals are valid. The high to low transition may be used to load external registers. OPSTROBE remains low for a minimum of two ICLK cycles and is issued normally at rate of once every four ICLK cycles.

BFLD[3:0]

DOPBUS BREAK FIELD

This four bit quantity is used by the DGEN to determine the sequence of XY counting when assembling the vector data to be drawn. For other DGEN instruction, Blt's in the BFLD are used to extend the DOP code to allow more than eight instructions to be interpreted by DGEN. The BFLD bits are also used by DGEN to indicate the beginning or end of a block transfer line operation.

PFLD[3:0]

DOPBUS PIXEL FIELD

This four bit quantity is used by the DGEN to determine the line style pixel values when assembling the vector data to be drawn. For other DGEN operations, the PFLD indicates the permutation control index or the DGEN global logical operation code (GLOG). External circuitry is allowed to modify GLOG on a per DGEN basis to facilitate multiple auxiliary plane control.

FIG. 12 illustrates the major register groups, their functional operations and relationships for the AGEN 15. The AGEN functional operations may be logically divided into five main categories: (1) instruction and operand input and setup, (2) AD bus control and bus-code generation, (3) address generation, (4) graphic primitive rasterization (conversion of a geometric primitive such as line or polygon fill to a sequence of pixels to be written), and (5) preparation and transmission of the DGEN instruction words. AGEN may be viewed as consisting of a number of independent computing and register blocks connected by an internal bus 70 and incorporating the addressing features of the skilled art in computer raster graphics. These multiple components operate together concurrently to implement the basic drawing algorithms. The general operations performed by AGEN and the definition of these functional blocks are as follows.

Refresh addressing causes the readout of the display bit-map memory data to DGEN for conversion to a serial stream which is then used to control the beam intensities for the display device. The range of addresses used for display refresh taken together are called the refresh bit-map which is defined in the address registers 72.

Vector rasterization is the conversion of a line segment defined by two end-point positions to a set of pixels which approximate the connected straight line in such a manner as to visually represent a straight line. The bit-map resolution and "square pixel" arrangement dictate that the constructed image is only an approximation, but the approximation improves as the bit-map size increases requiring more pixels to be drawn and thus requiring faster rasterization which is accomplished by the higher performance of the present architecture. The AGEN may provide a pattern mechanism which allows the drawing of line styles and automatically suppresses the drawing of vector pixels which are outside of the current display window by pixel a clipping process as hereafter described.

Block transfers allow rectangular regions of a bit-map to be moved and modified on a block basis. The use of the word "block" in this case is different from the use of the same word in the address organization. Block transfers involve generally at least the definition of a source bit-map (where the pixel data is coming from) and a destination bit-map (where the data is going to) and the locations of the corners of the rectangle in each bit-map. The most common uses of block transfers are for character drawing and window management. For "window dragging" as may be required by window management software, the source and destination bit-maps may be the same. Vector rasterization only involves the destination bit-map. Further, the source and/or destination bit-maps may be the same as the refresh bit-map in which case the result of the rasterization operation will become immediately visible on the display screen (but only if the operation were not "clipped" as described below).

Polygon fills are the rasterization of a bit-map area defined by a general polygon perimeter. This allows the drawing a filled circle for example. Because of the rasterization principle of approximation, a circle may be represented adequately on its circumference by a sequence of straight line vectors of sufficiently short length. Conceptually, polygon fill is a combination of vector rasterization for the perimeter and block transfer for the interior. The AGEN allows a polygon fill to use a source bit-map so that the interior may be rendered with arbitrary two-dimensional pattern or with a gradation of intensity for color shading.

For a drawing position operation, AGEN uses the "current position" to determine the precise X and Y location in a bit-map which is to be modified during the rasterization sequences. Instructions are provided in AGEN to set the initial value of the current position for an instruction. For example, the two end-points of a line are defined by first executing a set position instruction and then executing a vector instruction which defines the second point. The AGEN always maintains the current position in such a manner as to have the proper memory address. That is, the AGEN 15 automatically converts X,Y and Z (pixel depth) bit-map coordinates to the permutation bit-map memory addresses. All of these features available to those skilled in computer raster graphics may be incorporated into the AGEN and the DGEN.

The general process of executing an instruction consists of loading the Next Instruction Register NIR 74 with a 32-bit instruction word from the AD bus 18 after negotiating an instruction request/instruction ready IRQ/IRDY sequence with a "load next instruction" ICODE input at the READY REQUEST CONTROL 75. Depending upon the current AGEN activity, the SETUP CONTROL logic 76 may proceed to load the pipeline registers through the DRAW CONTROL 77 with input operands in preparation for the instruction execution. Any instruction operand which needs to be loaded into a register which is not pipelined and is currently in use is not executed until the register is free to be loaded. Other operations of the setup control phase are dependent upon the instruction type and involve the distribution of data with no computations executed beyond simple comparisons. Once all the operands and registers for an instruction have been processed, the instruction is transferred to the Current Instruction Register CIR 78 for execution. At this point, the setup controller is available to receive a new instruction. Instructions which only load registers do not have an execution phase.

Instruction execution may involve a computation setup phase such as is needed for computing the width, height and direction of a block transfer operation. If needed, these computations are performed by the same generators used in the actual pixel manipulation phase.

The rasterization process may be viewed as consisting of operations at the pixel level (components above the internal bus 70 in FIG. 12) and operations at the block and cell level (block below the bus 70 in FIG. 12). These operations always proceed concurrently with information from the pixel sequencing side being used to generate the proper cell and block address traces.

Operations at the pixel sequence level include line style pattern generation by PATTERN GENERATOR 80, line break generation by BREAK GENERATOR 82, assembly by the Field Assembler 87, and the appropriate counting action of the X and Y counters X,Y,Z REGISTERS 83 to reflect the current drawing position. For vector drawing, the current position is compared to the clipping and picking boundaries as defined by the CLIP and PICK REGISTERS 84 and 85 on a per pixel position basis. Any crossing of a clip or pick boundary may result in the generation of an interrupt if that interrupt is enabled.

If picking is enabled, no actual drawing is performed, that is, the AGEN (15) does not issue DGEN instruction or memory reads and writes. Otherwise the operation of the AGEN is exactly the same as for the case of pick disabled (drawing enabled). The pick process is used primarily to retrace all the drawing steps in the drawing of an image to determine the step at which a graphic primitive intersects the current user visual cursor. This allows sophisticated interactive graphics editing. Since no DGEN or memory operations are performed, the image is normally traversed much faster with pick enabled as compared to the time necessary to actually draw the image.

The clipping process is used primarily to allow the graphics primitives to traverse a coordinate space larger than the available memory and also facilitates the implementation of effective windowing systems. Neither the clip or pick process effect vector performance although they represent a small amount of overhead for block transfer and polygon fill instructions.

The actual sequence of pixel traversal is controlled by the values in the DRAW STATE REGISTERS 86 which contain all the details for the process and make these details available for user modification. Each time that a cell boundary is crossed in the pixel traversal process, the values for the cell address and block address are modified by the UPDATE CELL GENERATOR 90 and the BLOCK ADDRESS GENERATOR 92. Cell address generation depends completely on the current X,Y,Z values while block address generation depends upon information indicating which side of a memory block has been traversed and the current address values and bit-map definition values contained in the ADDRESS REGISTERS 72.

At each point in the rasterization process that a new cell has become defined, the memory address needed to read and write memory for that cell is assembled from the current cell address and block address through address multiplexer or ADDRESS MUX 91 and transmitted to the memory controller over the AD bus 18 along with the appropriate bus-code from the bus control logic 94. Concurrently, the pattern and break sequence data are assembled along with the appropriate operation code and transmitted to DGEN over the DOPBUS 95 by the DGEN INSTRUCTION GENERATOR 96. During the computational setup phase of all instructions, appropriate 32-bit setup and control words are assembled by the DGEN DATA ASSEMBLER 99 from the drawing state information and contents of the SETUP REGISTERS 98 for transmission over the ADBUS 18 to DGEN 22 along with a DGEN load register instruction from the DGEN instruction generator 96.

For vector drawing, several DGEN instructions may be generated to transmit the vector data to be assembled by the DGEN 22 for each cell. For the block transfer operations, each memory cell cycle is associated with one DGEN instruction execution. The pixel sequence blocks are not used in the process of the sequential address generation for bit-map display refresh. Rather, the block address generator and a separate REFRESH CELL GENERATOR 100 supply all the information needed to output refresh cycle addresses. This allows the pixel sequencing to proceed concurrently allowing overlap of screen refresh with rasterization.

Further details of the AGEN update cell generator 90 are illustrated in FIG. 14. For cell address generation input address data in the X,Y coordinate system of the current absolute horizontal drawing position for vectors and characters is received in the CURXL latch or register 160 with register CURX 0 162 for vectors and register CURX 1 164 for characters and respectively for the left and right side of bit transfer blocks and polygon fills. The least significant six bits are used directly to construct the cell address for source and destination address access. The current absolute vertical drawing position for vectors, characters, and the left and right side of bit transfer blocks and polygon fills is input to the latch or register CURYL 165 and registers 166 and 168 respectively CURY 0 and CURY 1. The contents of these registers are compared with the CLIP and PICK register states. The horizontal and drawing position address data is also input to the octant latch or register OCTL 170 for multiplexing with the output of octant generator 172 through MUX 174 to octant registers 175 and 176 respectively OCT 0 and OCT 1. Output from X,Y control 178 is provided to the current drawing position registers. The current X and Y position registers provide data input to the XEDGE and YEDGE registers 180 and 182.

According to the novel elements of the present invention, the final cell address data in the C,S and $A_y,A_z$ memory bank coordinate system are permuted by linear permutation networks implementing the LPN operators as set forth in the functional blocks of FIG. 14. The LPN operations selected from the basic defining equations of Table 26 establish the updated cell addresses according to the selected addressing mode.

Figure 15:
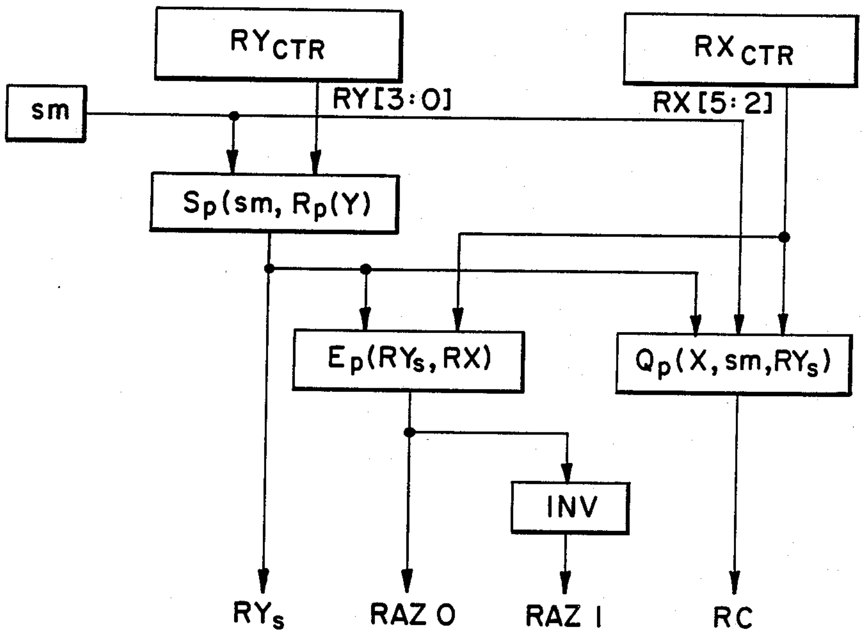
FIG. 15 is a block diagram and flow chart of the refresh word cell address generation section of the AGEN.

The further details of the AGEN refresh cell generator 100 are shown in the block diagram of FIG. 15. For refresh cell address generation using the refresh word mode, the refresh X and Y coordinate address data RY and RX are permuted according to the selected LPN's of FIG. 15, also derived from the basic linear permutation equations of Table 26. The outputs of refresh cell generator 100 are the refresh cell addresses in the C,S and the $A_y,A_z$ coordinate systems.

The DGEN or Data Generator component 22 shown in FIG. 11, Part 2 and FIGS. 16 and 17 is the data path manipulation component of the system architecture. The DGEN 22 implements the spatial data permutations needed to allow the multiple cell address modes for variable plane bit-maps and high speed vector generation.

The purpose of the DGEN is to (1) handle the extremely high bandwidths of data that are common to high-end graphics systems, (2) generate area images (polygon fill, windows and characters), (3) generator vector (line) type images at "stroke graphics" performance and (4) perform the first level of video bandwidth generation for image refresh. On a comparative basis, DGEN can be considered to be a "Bit-Blt chip" incorporating features known to those skilled in the field or art and which takes advantage of the new permutation bit map architecture of the present invention to perform the data manipulation aspects of image generation at a speed of 5 to 10 times the rate of previously developed components.

As shown in FIG. 17, the DGEN 22 is an integrated circuit packaged in a 68 pin LCC with functional pinouts summarized in TABLE 46. The following paragraphs describe the function and use of the DGEN interface signals in further detail.

VID[7:0]

The VID[7:0] outputs represent consecutive 8-bit video words in screen refresh order. These signals are used directly to construct a system having 1, 2, 4, 8, or 16 image planes per DGEN component and operating at up to a 40 MHZ monitor bandwidth. For higher bandwidth systems, the VID[7:0] outputs are connected to external shift registers to achieve the maximum specified bandwidth of 320 megapixels for a single plane per DGEN system. The VID output may be TTL compatible or ECL compatible. In either case, the VID lines are capable of driving only one standard load. Data values on the VID lines change on each occurrence of the video strobe (VSTROBE) signal.

D[31:0]

The D[31:0] bidirectional lines are the principle interface to the refresh memories. These lines are usually connected to the system bus 24 through bus transceivers to allow maximum bandwidth between the DGEN and the frame buffer memory banks 12. The DBUS or MBUS 24 is designed to operate at up to 20 million cycles per second providing the availability of up to 640 megapixels of data to be shared between screen refresh and image generation functions. The DGEN data formats are constructed to allow the use of 1-bit wide and 4-bit wide memory parts. The DGEN directly supports memories with page-mode and static column access modes, with or without write enable mask input. DGEN can also be used with static memories (SRAMs) with cycle times as low as 50 nsec. DGEN has been optimized for standard DRAMs in such a way that 60% of the performance of a 50 nsec SRAM memory system can be achieved at 10% to 30% of the cost of a SRAM based system. The D lines are capable of supporting 2 LS-TTL loads at the full 20 MHZ rate.

DOP[2:0], BFLD[3:0], PFLD[3:0]

The DOP[2:0], PFLD[3:0], and FFLD[3:0] signals taken together form the 11-bit DGEN input instruction word and are referred to as the DOPBUS. These instruction words are used to control the type of operation performed by the DGEN on each memory cycle. For vector operations, the PFLD[3:0] lines represent 4 bits of a vector to be drawn and are given to the DGEN at a rate of up to 10 MHZ allowing the generation of vectors at speeds up to 40 megapixels. This allows multiple board systems without the difficulties of distributing the vector data at the 40 megapixel rate. The ICLK line is used to strip each bit from the 4-bit P field and pack these bits into the internal drawing registers. The P-field of each DGEN in a multiple plane system may be connected to the system bus using a transceiver in such a manner that single pixels with full Z-depth can be read and written in a single memory cycle. The OPSTROBE signal is used to enable DGEN operations and synchronize the internal timing chains. This means that all timing states for drawing and memory interface are resynchronized on each new memory and operation cycle.

The combination of 40 MHZ ICLK, VSTROBE and VID-bus with 20 MHZ, MBUS or DBUS and 10 MHZ OPCODE bus provides a very high performance multiple board system.

The basic functional block diagram of FIG. 16 and the block diagram of FIG.11, Part 2 illustrates the major functional components of the DGEN 22. The DGEN provides an effective 64 bit path based upon a multiplexed 32-bit data path. This provides better economy of implementation without performance degradation. The DGEN 22 may be viewed as comprising three main sections: (1) the principle data path in the center of FIG. 16, (2) the video section on the right side of FIG. 16, and (3) the vector generation section on the left side of FIG. 16.

The basic sequence for modifying memory contents consists of taking data from the DBUS 24 through the pre-operation permutation normalization circuit PRENET 110 to restore the standard bit map SBM user organization where appropriate and then storing that data in the source and destination data latches SRCO 112, SRCl 114, and DST 115. This data is then reordered by the alignment rotator or ALROT 116 and logically merged in the PLOG and LOGCOM circuit 118 to form the new result word which is post-operation permuted in POSTNET 120 to return normalized data to the unusual PBM organization and then written back into the memory. The corresponding components of FIG. 16 and FIG. 11, Part 2 are identified by the same reference numerals.

The PRENET 110 and POSTNET 120 circuits, also referred to as the EXNET circuits 110 and 120 in FIG. 11, Part 2, are the main distinguishing aspects of the DGEN as compared to existing Bit-Blt chips and indirectly form the basis for the architecture of the present invention. The need for these pre- and post- operation rotations or permutations are a consequence of the manner in which data is stored in memory to allow the access to the two-dimensional pixel cells by multiple cellular addressing modes which are the basis for the high performance vector drawing. The alignment rotation or ALROT 116 is used to adjust the position of the bits in Bit-Blt source words to the destination word boundaries prior to merging the source words with the destination words as known to those skilled in raster graphics. The LOGCOM circuit 118 and associated PLOG circuit provide the programmable means for defining in what manner the source words from source multiplexes or SRCMUX 122 (including vector bits) are combined with the existing memory destination words from DST register 115. The 16 logical operations provided include the ability to EXOR the source words with the destination for rubber banding operations and "or"-ring the source with the destination to simulate image transparency. The BITMUX 124 in the principle data path allows the selection of bits in the destination memory words to be left without modification as defined by the output from mask multiplexer MASKMUX 125. For example, in a Bit-Blt operation, the bits to the left and right of the destination image window must be left without modification.

Figure 18:
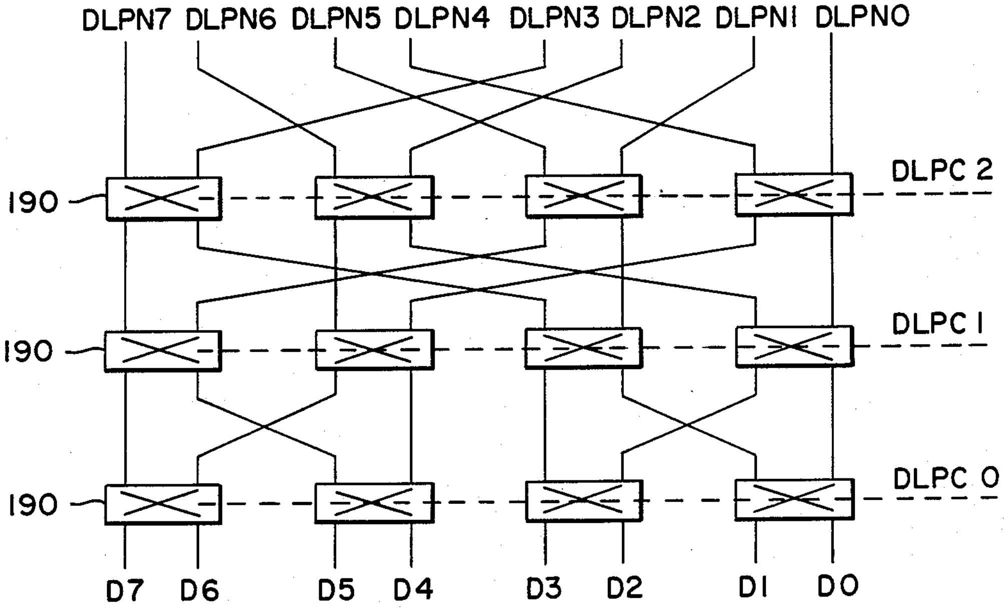
FIG. 18 is a generalized block diagram of a logical linear permutation network incorporating exchange logical linear permutation operators $E_p$ for operating on data in the DGEN in data space and for implementing the fundamental equation of the best mode PBM.
Figure 19:
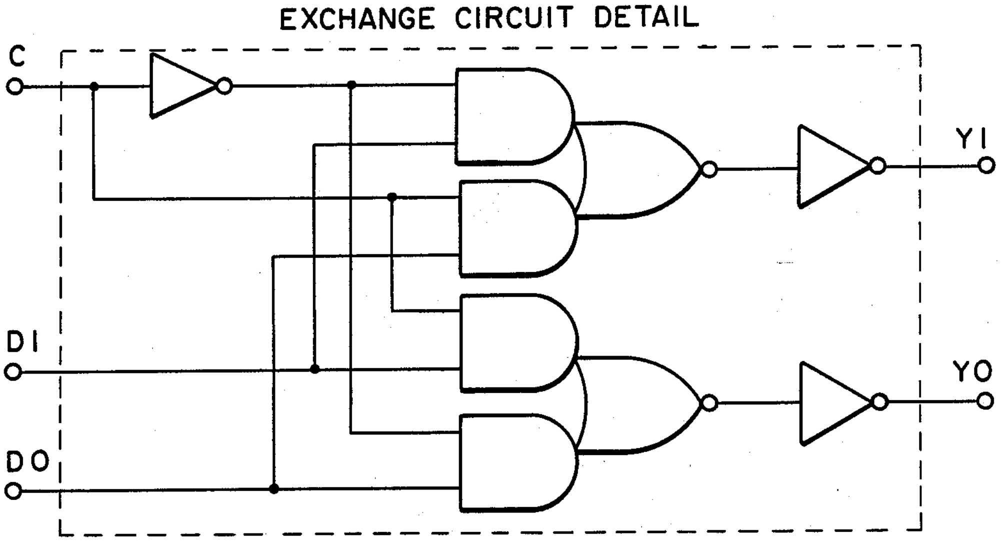
FIG. 19 is a detailed logic circuit of a linear permutation exchange element of FIG. 18 for operating on data bits in the data space.

By way of example the exchange linear permutation $E_p$ is implemented in the DGEN 22 of FIG. 16 using the PRENET and POSTNET circuits which incorporate the exchange LPNs for example of FIGS. 18 and 19. For the DGEN data input 24 to PRENET 110 the input word is the bank number designation or assignment B and the output of the PRENET circuit is the quads or quadpixels in normalized graphics data unit U coordinates. The cell address parameters $E_p(C,S)$ are then the PRENETC control for the PRENET permutation network. The output of PRENET circuit 110 goes to the DGEN registers through a possible further wire permutation network transformation in TRANSLATE 152 according to the operating static mode or permutation bit map. Thus, conveniently the control for the PRENET permutation network 110 may simply be the cell address function $E_p(C,S)$ for operation of the DGEN 22 with permutation bit maps. For operation of DGEN 22 with a standard bit map the PRENETC control is zero. The quadpixel unit coordinates U are therefore derived as functions of the memory bank designations B and cell addresses C from the fundamental equation:

$$U=E_p(B,E_p(C,S))$$

$$PRENETC=E_p(C,S)$$

The POSTNET output permutation circuit 120 is the inversion of the PRENET circuit 110. The POSTNET LPN circuits implement the exchange inversion of the fundamental theorem namely:

$$B=E_p(U,E_p(C,S))$$

$$POSTNETC=E_p(C,S)$$

Thus the input to POSTNET permutation circuit 120 from the output of multiplexer 124 is in the quadpixel normalized unit dimension coordinates U and the output is in the permuted memory bank assignment coordinates B for return to the frame buffer memory permutation bit map. The POSTNETC control may similarly be the cell address function $E_p(C,S)$ for the permutation bit map from which the memory bank coordinates B are derived as a function of C and U. While the POSTNETC control signal may be $E_p(C,S)$ for operation of the DGEN 22 with frame buffer permutation bit maps, the control signal is zero for standard bit maps. The network arrangments for deriving these signals corresponding to linear permutation functions is shown in FIG. 11, Part 2.

By way of example the shuffle linear permutation network $S_p$ may, for example, be incorporated in the TRANSLATE component to accommodate changes in the static mode or permutation bit map. The shuffle LPN operator $S_p$ introduces a static transform changing the address or index bit positions. A characteristic of the shuffle operator $S_p$ is that is changes the assignment of pixel positions in the user/viewer X,Y or X,Y,Z coordinate system to memory bank address locations in the B,A or B,$A_y$,$A_z$ coordinate system. This change in the permutation bit map is referred to herein as a static transform and changes the static mode sm.

The shuffle LPN $S_p$ is useful only for changing the static mode or permutation bit map and cannot be used in the fundamental equation for a particular permutation bit map once the PBM is established. On the other hand the logical linear permutation network operators $E_p$ and $C_p$ alone or in combination with each other or with the wire LPN $R_p$ are useful in defining a particular assignment of pixel positions, performing the permutation without changing the address or index bits. The assignment of pixel positions to physical memory bank address locations remains the same despite operations by the operators $E_p$, $C_p$, and $R_p$ Another wire LPN useful in changing the index or address bits and therefore the association of pixel positions in the user/viewer X,Y coordinate system with memory bank address locations is the butterfly LPN $B_p$. Thus, according to the invention the bufferfly operator $B_p$ may be used instead of the shuffle operator $S_p$ for changing the permutation bit map to different static modes sm. Briefly, the butterfly linear permutation operation (LPO) $B_p$ involves the exchange of a specified arbitrary index bit number k with the least significant bit (LSB) of that address or index. For example:

If $B_p(k{:}a_i) = B_p(2{:}A_3,A_2,A_1,A_0)$ where k=2 and i=3, . . . , 0

L=4 (the modulus or number of index bits)

i=index bit number=L−1, . . . , 0

Then $B\ (2{:}A_3,A_2,A_1,A_0) = A_3,A_0,A_1,A_2$

In this example where the specified or selected exchange index bit k=2 than the address or index bit $A_2$ is exchanged with the least significant bit of the address namely $A_0$. The butterfly LPO is self-inverting as follows:

$B_p(k,)B_p(k,A) = A$

The shuffle LPO $S_p$ and the butterfly LPO Bp therefore provide examples of linear permutation networks which actually exchange or change the index bit positions useful for changing the definition or organization of the permutation bit map and therefore the static mode sm. Such LPOs may be incorporated in the address circuit for changing the PBM and in the TRANSLATE component of the DGEN 22 for normalizing data retrieved from the altered or newly defined PBM. The TRANSLATE component may also include other wire LPNs necessary to normalize data retrieved from the frame buffer memory such as for example the reversal LPN $R_p$.

The video generation section of the Bit-Blt chip is provided for two reasons: (1) buffer data from the image memory using the DGEN's high speed bus interface and (2) hide the strangeness of the bit-ordering of the PBM refresh data in the image memory. FIFO buffering 128 of the video data is standard to simplify system timing and allow more effective utilization of memory bandwidth. The inclusion of the video FIFO or VFIFO 128 in the DGEN makes standard DRAM's look like video RAM's or VRAM's. The inclusion of video FIFOs is a standard feature of commercially available video shift registers. The inclusion of the 40 MHZ video shift registers 130 in the DGEN permits inexpensive standard ECL shifters to be used to generate the final system bandwidth. Alternately, DGEN can be connected directly to some commercially available LUT/DAC (color look-up table/digital to analog converter) components which have onboard video shift registers. Providing 512 bits of FIFO storage means that only three RAS cycles to memory are needed for the refresh of each scan line in a system of 1280 by 1024 resolution. Using static column components, this represents only a negligible performance decrease in such a system relative to VRAM's and at significantly reduced cost.

The vector generation section on the left side of the DGEN 22 consists of high speed circuits which load the vector source value latch or register VVL 140 and vector mask latch or register VML 142 based on the pixel value (PFLD) and break sequence (BFLD) signal inputs. This section includes 6-bit X value and 4-bit Y value counters which define the position in the registers where the consecutive value bits are written. The X and Y counters are incremented and decremented for each bit as a function of the current drawing direction and the values of the break signals. This circuit is constructed to implement the data manipulation portion of the inner loop of any of the variations of Bresenham's vector drawing algorithm as is well known in the raster graphics field. The DGEN can also be used with non-Bresenham line generators such as the slope-DDA (digital differential analyzer) algorithm which has attractive properties in anti-aliasing as compared to Bresenham's algorithm. This interface also provides the basis for external high speed shading circuits.

In summary, the DGEN provides the lowest level detailed bit manipulations needed in any high performance graphics system without any specific constraints on the style of use. Typically, these operations are sequenced in such a manner as to have the effective results of polygon filling, window dragging and character drawing.

As illustrated in the DGEN block diagram of FIG. 16, other registers are as follows.

The MBUS or Data Bus 24, designated D[31:0] is a 32-bit bidirectional bus interface to memory and the AGEN bus transceivers. Register operations which involve the MBUS and require a 64-bit word are referred to as MBUS 64 whereas transfers involving only 32-bits are referred to as MBUS 32. MBUS 64 operations use two consecutive MBUS 32 operations.

SRC0 and SRC1 112 and 114 are 64-bit registers which hold the source bit-map data values during block transfer operations. Taken together, these registers form the 128-bit word input to the alignment rotator, the source bit-map data is made to align with the proper bit position in the destination bit-map for read and write operations.

LOGCOM 118 is a 64-bit map plane logical operation control register which allows the merging of source and destination data to be controlled on a per plane basis. This is used for plane masking (disable modification of certain planes, transparency control, setting foreground and background colors (referred to by the GKS and CGI standards as primary and auxiliary color).

The GLOG or global logical operation control register controls the merging of SRC and VVL registers for stripe and three operand operations.

VFIFO 128 is an eight word by 64-bit FIFO register set. It buffers data to be output on the VIDEO output lines through the internal video shift registers VSR 130.

DST 115 is a 64-bit destination bit map data register. It holds the current value of the destination bit-map cell for merging with the new values from the aligned source registers or the vector value registers.

VML 142 is a 64-bit vector mask latch that indicates the bits in a cell which are to be modified during vector draw operations.

VVL 140 is a 64-bit vector value latch that stores the foreground background selector value for pixels written by the vector draw and stripe draw operations.

VMR 144 is a=64-bit vector mask assembly register. Vector mask bits are first stored in this register prior to being loaded into the VML register 142. This allows the overlap of loading VMR 144 by vector instructions while writing the last word assembled into memory from the VML register 142.

VVR 145 is a 64-bit vector value assembly register. Vector pixels are first assembled into the VVR before transferring to the VVL for memory modification.

DSMR 146 is a 32-bit DGEN static mode register. It stores mode control information for video control 147. DSMR 146 is normally changed infrequently, and contains the following general information: the number of planes used per DGEN component during the refresh process; the number of 64-bit word transfers which are performed to load the VFIFO registers on each refresh load instruction execution; whether the refresh bit-map is of type standard bit-map (SBM) or permutation bit-map (PBM); and the permutation static mode to be used in the PBM normalization for any bit-map which is a PBM.

DBSV 148 is a 32-bit block transfer, vertical transfer control register. It contains the information needed by the DGEN to control data transfer and translation for an entire block transfer operation through instruction control 150. ROTC is a 6-bit rotation index. It defines the amount by which the source register value is rotated prior to merging with the destination bit-map data. XLTC controls the translation of source data from the memory by TRANSLATE component 152. The TRANSLATE component is provided for further LPN's which may be necessary for particular PBM organization. It is used primarily to convert SBM's to PBM's and PBM's to SBM's, but may also be used to translate bit-map data which does not conform to standard conventions to standard form. DIR 156 controls the direction of the block transfer operation in terms of left to right versus right to left and top to bottom versus bottom to top. This information is used to control the order in which the source registers are loaded and to control whether the source and destination scan line number registers are to incremented or decremented. This field is shared with the OCT field of the vector setup control register.

DVSH 154 is a 32-bit vector and block transfer horizontal control register. It contains the information needed by DGEN to control edge masking for block transfer operations by EDGEMASK 155, both left edge or LEDGE and right edge or REDGE, permutation control of the destination bit-map, and vector drawing position information. The WEM signal enables the write enable mask output. It allows only a portion of destination words to be modified in memory components supporting this capability. Write enable allows faster operation since the destination word does not have to be read. It only applies if "write only" logical merge values have been selected.

Linear permutation network or LPN circuits for implementing the prenet 110 and postnet 120 of the DGEN 22 for exchange permutation bit maps are illustrated in FIGS 18 and 19. FIG. 18 illustrates a combination of exchange LPNs for graphics image data operations with an exchange permutation bit map or PBM of the type described. Referring to FIG. 18, each rectangular element 190 comprises a logical exchange linear permutation network $E_p$ with two data inputs and outputs as illustrated in FIG. 19. The respective exchange LPNs 190 are in turn coupled exchange LPN overall permuting the eight data inputs D[, . . . , 7] to the permuted data outputs DLPN[0, . . . , 7].

For cyclic permutation bit maps, prenet 110 and postnet 120 may be implemented by the cyclic LPN, $C_p$. The cyclic operator $C_p$ is implemented in index space by an adder bit in the DGEN in data space by a data rotator or barrel shifter. $C_p$ may also be used to define systems in which the data alignment rotator or ALROT 116 in the DGEN 22 is also used to perform the permutation normalization. Although this reduces the gate complexity of the DGEN, the number of unique address lines required is proportional to the number of address banks which means that the bank address lines must be computed external to the AGEN. In contrast, for the components based upon the exchange LPO $E_p$ the number of unique address lines required is proportional to the $\log_2$ of the number of memory banks M so that the address lines are computed internal to the AGEN and transmitted as part of the overall memory address word. This substantially reduces the complexity of the external circuitry.

The DGEN component 22 of FIG. 16 also incorporates the circuit element TRANSLATE 152 for incorporating additional LPNs as may be required for a particular permutation bit map or PBM, for example additional wire LPNs such as the reversal LPN $R_p$ and/or the shuffle LPN $S_p$. Alternatively the prenet 110 and postnet 120 may incorporate directly additional logical or wire LPNs for example to implement the double exchange shuffle and reversal PBM for example summarized in Tables 11 through 25.

A fundamental concept of linear permutation theory is that LPO transformation on the order of data may be viewed (and implemented) in two fundamentally different but precisely equivalent ways namely in (1) data space and (2) index or address space. In the data space, the data is physically moved from one place to another. In the index space (or coordinate space) the data remains physically in the same space, but is accessed (read or written) in a different order. An equation using LPOs may be implemented using either. In the case of the architecture of the present invention all the AGEN and address circuit operations permute the pixel data in the memory blocks using index space operations the AGEN never physically touches the data. In contrast, most of the DGEN operations execute the same equations in data space by physically moving bits from one place to another. The invariant for all these operations is the location of pixels in memory which must be the same for all address modes accessing the same permutation bit maps. The AGEN cell addresses to memory are used to define data order transformations by allowing each memory bank to contribute pixel data from different locations. This allows the implementation of the address modes. In the transformation equations, the data from memory is generally permuted in such a way as not to be directly usable for display refresh or block transfer operations. The DGEN PRENET circuit implements the same equations in data space to allow the normalization of data to screen order for refresh and block transfer operations. The DGEN to the PBM order needed for proper physical placement of the data in the memory banks.

Summaries of various data processing steps for selected graphics operations in the DGEN 22 are illustrated in FIGS. 20 through 23. While the general data flow for particular operations such as bit block transfers and polygon fills, vector drawing, and display refresh are well known in the raster graphics field, the flow charts of FIGS. 20 through 23 show the novel requirements and steps according to the invention for normalizing data received in the permuted PBM coordinate space for logical processing, masking, merging or other selected operations and for permutation and return of process data from the normalized or standardized SBM coordinate space to the permuted PBM coordinate space for storage in the unusual order of the frame buffer bit map. In particular, normalization of data where required is generally accomplished by the prenet or prepermutation network 110 of the DGEN 22 while the permuting of process data for return to the frame buffer permutation bit map as accomplished by the postnet or postpermutation network 120.

An example bit block transfer or bit-blt operation according to the invention is set forth in FIG. 20. While such a bit block transfer operation is a standard feature of raster graphics machines the novel steps according to the present invention appear in the middle of the flow chart. According to the invention a determination is made of the coordinate space of the source word or source cell and the destination word or destination cell. If the source cell and destination cell originate from the PBM space they are respectively normalized for compatible merging of the source and destination cells. The source and destination cells or words are aligned by conventional rotation or barrel shifting prior to merging. The merged cell is then permuted to match the PBM coordinate space of the destination cell in memory prior to writing the merged cell in the frame buffer permutation bit map.

Figure 21:
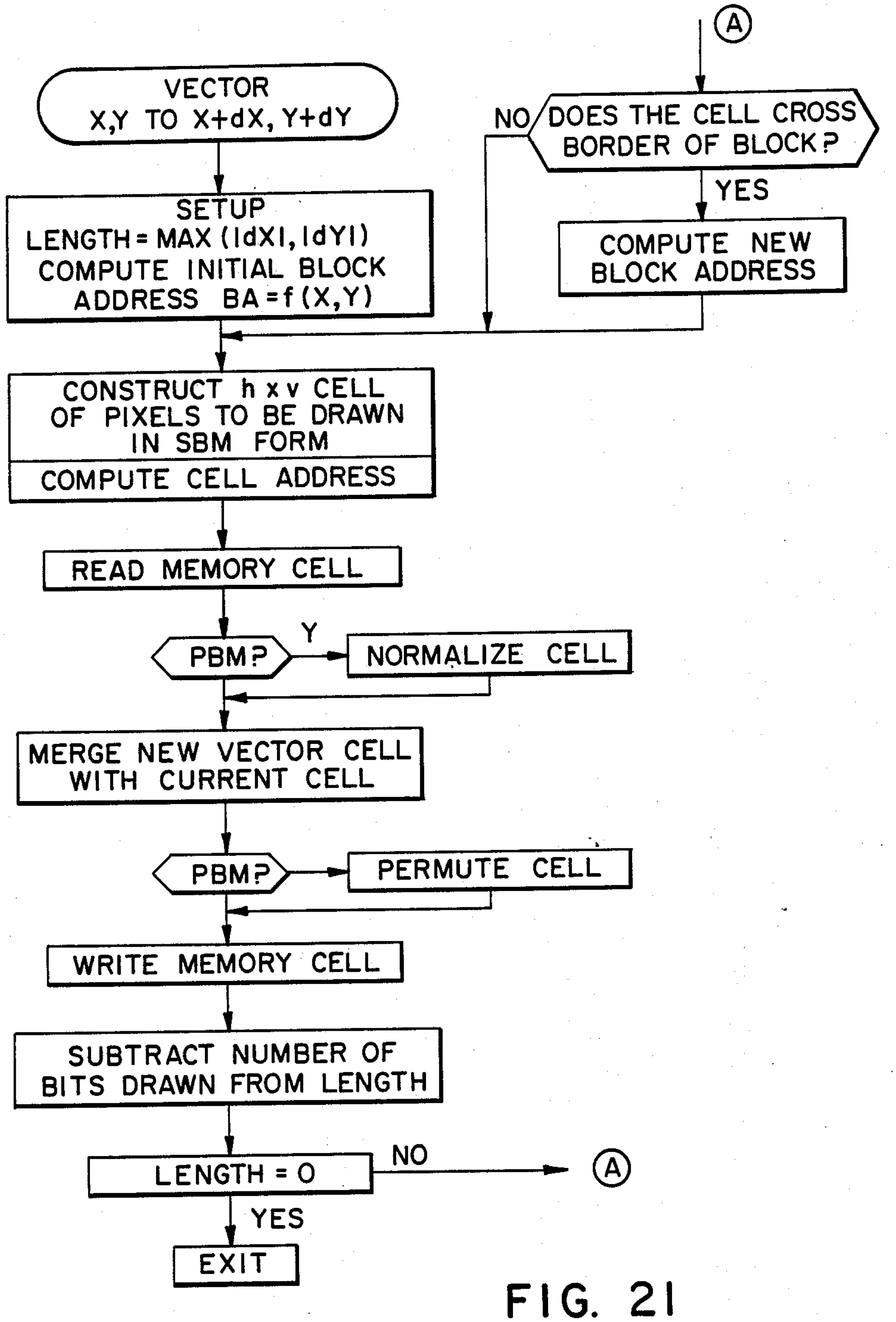
FIG. 21 is a data flow chart showing flow of graphics image data between standard and PBM coordinate spaces in the DGEN during vector drawing operations.
Figure 22:
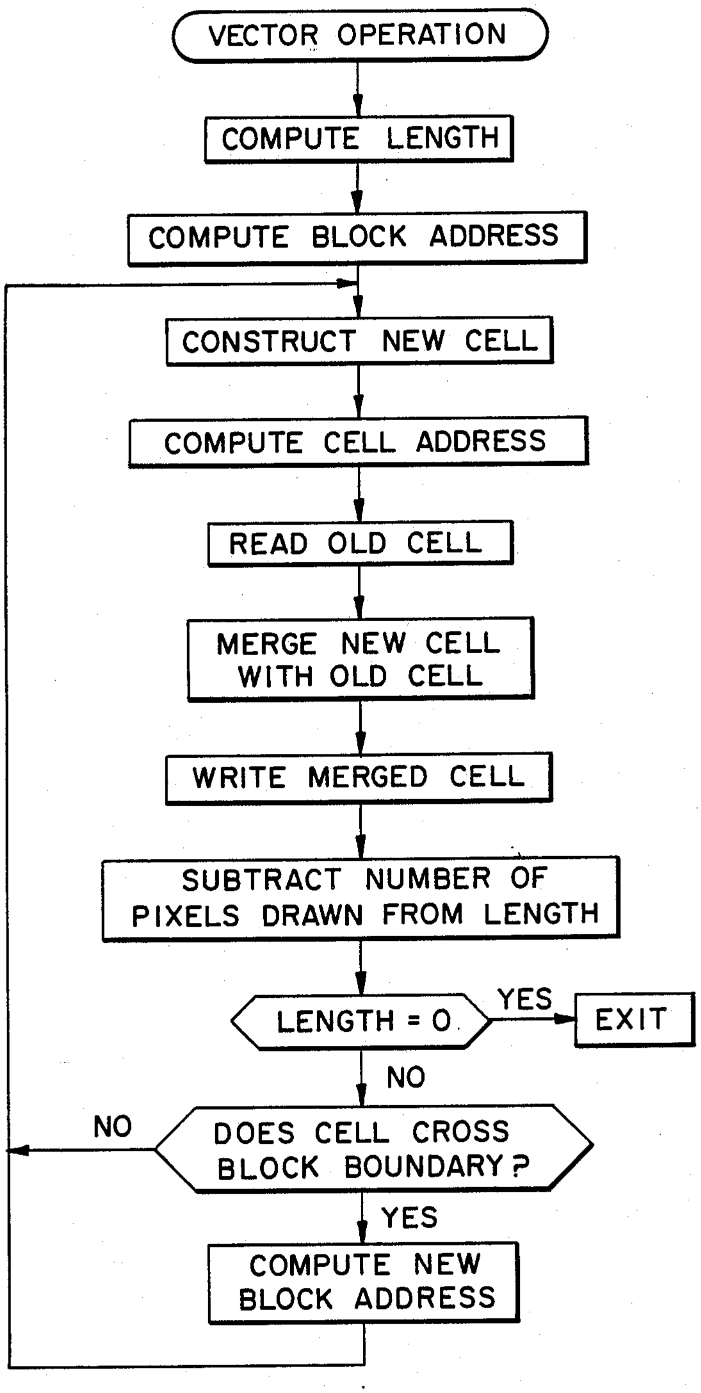
FIG. 22 is a data flow chart showing flow of data during vector operations all in standard space or all in PBM space in an alternative implementation of the DGEN.

A typical vector draw operation is illustrated in the flow chart of FIG. 21. While the steps of vector drawing are well known in raster graphics machines, the novel steps according to the present invention appear in the middle of the flow chart. The new vector to be drawn is constructed in the standard user coordinate space. The memory cell or destination cell from the frame buffer permutation bit map is normalized for merging with the new vector cell in the standard coordinate space. The merged cell is then permuted for writing into the PBM coordinate space of the frame buffer permutation bit map. A further flow chart of ve:tor drawing operations by the DGEN 22 is illustrated in FIG. 22 in which all operations are carried out in either the standardized user coordinate space or in the permuted PBM coordinate space.

Figure 23:
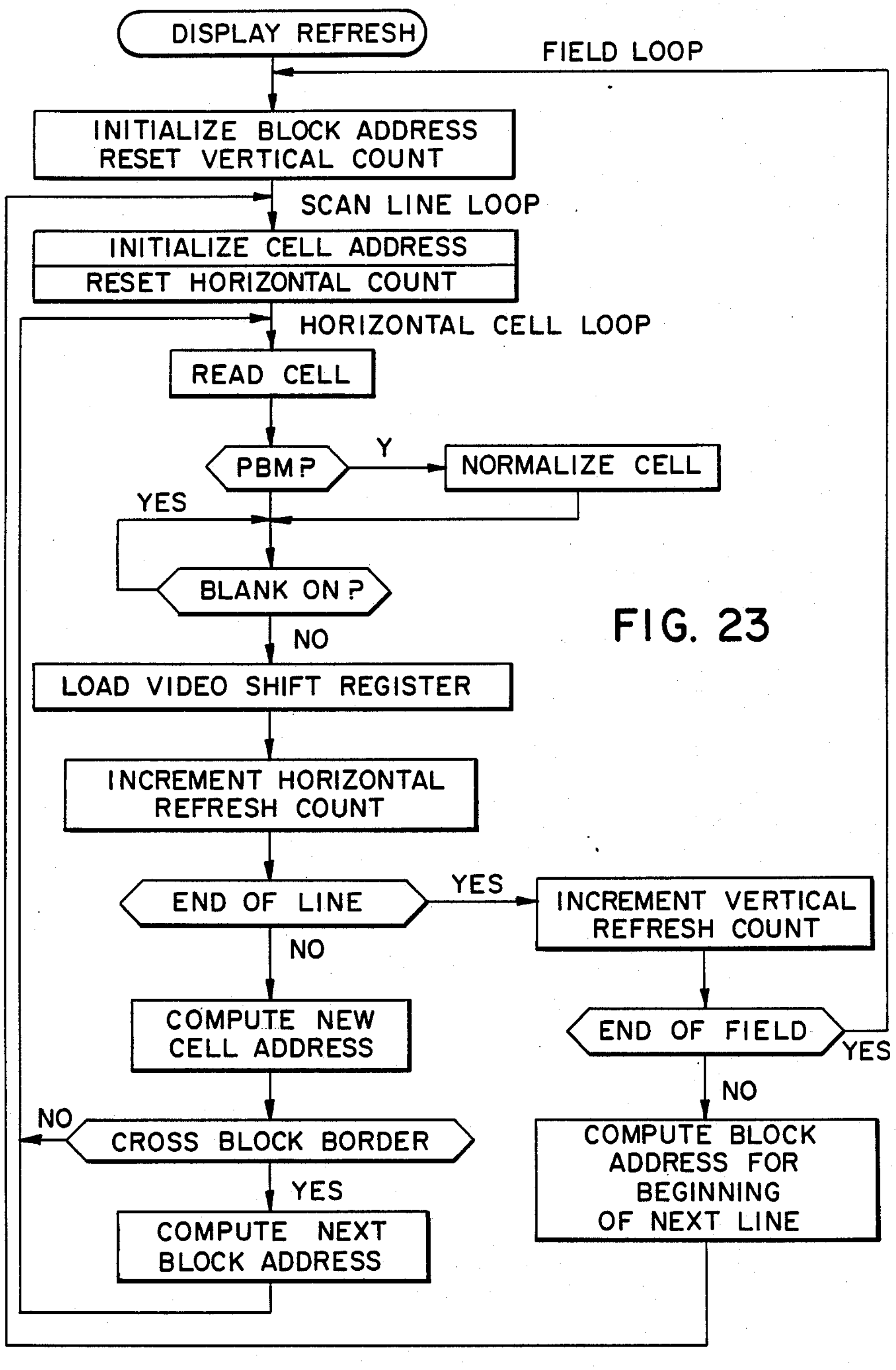
FIG. 23 is a data flow chart showing flow of graphics image data between standard and PBM coordinate spaces during refresh of the raster display.

The refresh data flow in the DGEN 22 is illustrated in FIG. 23. While the serial processing of refresh data words for display on a raster display such as a CRT are well known in raster graphics machines, the novel steps according to the present invention appear in the middle of the flow chart. If the refresh data words are retrieved and received in the permuted PBM coordinate space, the refresh cells or words are normalized by appropriate linear permutation networks as heretofore described to order the serial refresh data words in the standardized user coordinate space for loading into the video shift registers. The examples of FIGS. 20 through 23 represent read-modify-write operations. In addition write enable (WE) operations may also be incorporated in the DGEN 22 for writing directly into the permuted PBM coordinate space of the frame buffer permutation bit map.

In arranging the data flow sequences and steps for the data generator a number of alternatives are available. One objective in selecting among the alternative steps for processing data and performing graphics operations on data retrieved from the permuted bit map is to minimize circuitry. Another objective is to increase the speed of operations. These objectives may be achieved according to the invention by maximizing the number of operations that are performed on the addresses of the data, that is the address indices in the address or index space, and minimizing the number of operations performed on the data bits in data space. According to preferred embodiments of the invention for example most of the operations are performed in index space.

A feature and advantage of this arrangement is that the index space is a log space or logarithm space with an exponential reduction in the number of permutation objects required to be permuted relative to the data space. While the data space is the coordinate system representation of the data bits, the address space or index space is a binary encoding coordinate system representation of the log indices. Graphics operations in the data space coordinate system represent an exponential increase in the number of permutation objects permuted by the LPN circuits over the operations in the index space. Therefore it is advantageous according to the invention to perform most of the operations or as many of the operations as possible in the address or index space using the address circuitry. Those LPN operations that cannot be displaced to the address circuitry are teen performed in the data generator circuitry on data in the data space.

The linear permutation operators or LPN's according to the present invention may operate in either the index space or the data space. In either case the principle of operation and definition of the LPN as heretofor described remains the same. However, because of the difference in the number of permutation objects, as between the index space or address space and the data space, the LPN circuitry is of lesser or greater complexity. For example, FIGS. 6A and 19 are equivalent in the functions performed but the simpler circuit FIG. 6A operates in the index or address space and the more complex circuit FIG. 19 operates in the data space. In terms of the number of permutation objects, the index space and data space bear to each other this logarithmic or exponential relationship. By way of example, the cyclic operator $C_p$ is implemented in index space by an adder and in data space by a data rotator or barrel shifter.

Another characteristic of the present invention which differs from conventional raster graphics machines is the provision of and requirement for two separate mappings for performing graphics operations. Throughout the operations of the multicellular addressing permutation bit map raster graphics architecture of the present invention, one of these mappings represents an invariance property, namely the pixel position/bank address mapping between the user coordinate system and frame buffer memory bank addresses X,Y and B,A in two dimensions and X,Y,Z and B,$A_y$,$A_z$ in three dimensions. This mapping always remains constant and valid independent of the address mode selected among the multicellular addressing modes. The pixels on the user view surface always remain in the same position on the display with the same memory bank address location or assignment.

This invariant pixel position/bank address mapping is the logical linear permutation network mapping achieved by the logical LPN operators in the fundamental equations. The invariance property of this mapping is that each of the pixels or pixel positions on a display or view surface retain the same frame buffer memory bank address location or assignment for any selection of refresh addressing words. And this invariant mapping relationship is one of a logical linear permutation transformation. The pixel positions in the X,Y or X,Y,Z or higher dimension coordinate space bear a logical linear permutation functional relationship to the actual memory bank addresses B,A or B,$A_y$,$A_z$ or higher dimension bank address space.

The conventional raster graphics machine is also characterized by a mapping between the pixel positions in the user X,Y or X,Y,Z coordinate system and memory bank address locations but this is the only mapping relationship or mapping performed by the system and it is a standard bit map or standard mapping relationship limited to a single addressing mode rather than a permutation bit map or logical linear permutation mapping relationship with multicellular addressing modes.

Not only does the present invention differ from conventional raster graphics machines in introducing this permutation bit mapping, but also in introducing an entirely new requirement of a second mapping between the pixel positions in the user X,Y or X,Y,Z coordinate system and a cell, unit, and block section organizational space C,U or C,U,S. The pixel position/cell address mapping represents the variance property, switching property, or selection property of the mapping relationships according to the present invention for selecting among a plurality of multicellular addressing modes. According to this second mapping relationship of the present invention, different addressing modes with different cells or cell configurations may be selected and defined with the pixels identified by different cell addresses in the different selected cells. That is, the different graphics data units or quads comprising the cells and constituting the contents of the cells are accessed in to the frame buffer memory with changing cell addresses according to the address mode cell configuration selected.

The pixel position/cell address mapping X,Y to C,U in two dimensions and X,Y,Z to C,U,S in three dimensions constitutes this second mapping introduced by the present invention for performing graphics operations with multicellular addressing. This mapping relationship is a multiplexing or switching linear permutation transformation using the pairwise logical linear permutation operator $Q_p$. It is the characteristic of this pairwise LPN operator that it introduces the variable or variance property achieved by the mapping relationships of the present invention, also referred to as the switching or selection property. As a result, multiple addressing modes reading on the permutation bit map are available.

Thus, the present invention differs from conventional raster graphics machines in the following respects. First, the present invention introduces and requires at least three mapping spaces X,Y,Z: B,$A_y$,$A_z$; and C,U,S in contrast to prior art and conventional raster graphics machines which operate between only two mapping spaces. Second, the present invention introduces and requires at least two mapping relationships between at least three novel mapping spaces. One of these mapping relationships represents the invariance property of the system of the present invention, while the other mapping relationship represents the variance or selection property of the system of the present invention. This is in contrast to conventional raster graphics systems which operate with only one invariant mapping relationship. Third, these novel mapping relationships according to the present invention constitute linear permutation transformations which introduce permuted or permutation bit maps. According to one of the mapping relationships the invariant pixel position/bank address mapping is achieved by logical linear permutation networks performing logical linear permutation operations with reversible self-symmetric Boolean logic gates. On the other hand, the second variance or selection pixel position/cell address mapping is accomplished using the pairwise logical multiplexing or switching linear permutation networks $Q_p$ resulting in changing cell addresses for the units of graphics image data according to the selected addressing mode cell configuration.

It is these co-acting features of the multiple bit mapping concept of the present invention which enables and achieves multicellular addressing. In particular, there must be multiple mapping spaces, at least three, with multiple mapping relationships, at least two, between the mapping spaces. One of the mapping relationships represents and implements the invariance property of the pixel position/bank address mapping relationship. At least one other mapping relationship represents the variable or selection property of the pixel position/cell address mapping relationship for the different and multicellular addressing modes. Finally, the mapping spaces and associated bit maps must include permuted, warped, or permutation bit maps in order to be read upon by multiple cell configurations in successive memory cycles and these permutation bit maps are achieved by mapping relationships or transforms in the nature of linear permutations implemented by logical (invariant) (e.g. $E_p$ and $C_p$) and pairwise logical (switching) (e.g. $Q_p$) linear permutation networks and operators.

A further example of the multicellular addressing permutation bit map frame buffer architecture of the present invention is described with reference to FIG. 24 and Table 42. This example pertains to a frame buffer raster graphics machine according to the invention with three pixel dimensions X,Y,Z and two blocks dimensions in memory bank address space B,A and cell and unit address space C,U. This system similarly is based upon 16 memory banks B so that L, the logorithm to the base 2 of the number of memory banks, representing the number of index bits of each of the variables X,Y,Z,-B,A,C,U is four. The fundamental equations defining this system are as follows:

$$B=E_p(X,W)$$

$$A=W$$

$$W=Q_p(R_p(Z),sm',S_p(sm,R_p(Y))$$

$$U=Q_p(W,h,X)=E_p(B,C)$$

$$C=Q_p(X,h,W)=E_p(B,U)$$

$$X=Q_p(C,h,U)=E_p(B,A)$$

$$W=Q_p(U,h,C)=E_p(B,X)$$

$$B=E_p(U,C)$$

$$A=Q_p(B,C),h,C)$$

The static mo or number is indicated by sm while sm' is equal to L−sm. The final address mapping equation for the bank address assignments A in terms of the memory bank designations or assignments B and cell addresses C is given in the final equation.

This address mathematical notation is converted to Boolean logic equation notation in Table 42. This table gives the address circuit lines and connections for the address lines CA between the AGEN 15 and frame buffer permutation bit map memory 12 FIG. 24. In FIG. 24 and accompanying text the bank address assignments A are denoted by the letters CA referring to the designation as cell address lines. The address line designations CA are derived from the fundamental equations for A from Table 42. In this example the basic graphics image data unit U is the quadpixel or quad of four horizontal bits, the block size is 64×16 bits and the index size is L=4. Thus each of the variables is expressed by four index the address equations for A in the linear permutation mathematics notation and CA in the Boolean equation notation is diagrammatically presented in the address data mapping flow elements of AGEN 15 in FIG. 24. Of the various registers, XCUR is the origin of the current X variable value, DDH is the source of the h parameter (represented by H in FIG. 24 and Table 42), SM is the source of the static mode parameter number sm (indicated by SM in the Table 42 and FIG. 24), ZCUR is the source of the current variable Z bit value, and YCUR is the source of the current variable Y index bit.

The operation of the data generator circuit component DGEN 22 is similar to that heretofore described except that the DGEN 22 of FIG. 24 operates on data flows from a block organization of two dimensions B,A or C,U.

By way of example the exchange linear permutation $E_p$ is implemented in the DGEN 22 of FIG. 24 using the PRENET 110 and POSTNET 120 circuits which incorporate the exchange LPNs for example of FIGS. 18 and 19. For the DGEN data input 24 to PRENET 110 the input word is the permuted bank number designation or assignment B and the output of the PRENET circuit is the quads or quadpixels in normalized graphics data unit dimension U coordinates. The cell address parameter or index C may then be the permutation control CON for the PRENET permutation network. The output of PRENET circuit 110 goes to the DGEN registers 112, 114 through a possible further wire permutation network transformation according to the operating static mode and permutation bit map definition functions. Thus, conveniently the PCON control for the PRENET permutation network 110 may simply be the cell address C for operation of the DGEN 22 with frame buffer memory permutation bit maps. For operation of DGEN 22 with a frame buffer memory standard bit map the PCON control is zero. The quadpixel unit coordinates U are therefore derived as functions of the memory bank designations B and cell addresses C from the fundamental equation:

$$U=E_p(B,C)\ PCON=C$$

The POSTNET output permutation circuit 120 is the inversion of the PRENET circuit 110. The POSTNET LPN circuits implement the exchange inversion of the fundamental theorem namely:

$$B=E_p(U,C)\ PCON=C$$

Thus the input to POSTNET permutation circuit 120 from the output of multiplexer 124 is in the quadpixel normalized unit dimension coordinates U the output is in the permuted memory bank assignment coordinates B for return to the frame buffer memory permutation bit map. The POSTNET control index PCON may similarly be the cell address C for the permutation from which the memory bank coordinates B are derived as a function of C and U. While the PCON permutation control signal may be the cell address C for operation of the DGEN 22 with frame buffer permutation bit maps, the control signal is zero for standard bit maps.

For vector operations, the permutation control index PCON[3:0] is derived using the state information in the DGEN registers. For all other operations (including refresh) the PCON parameter is derived from the state information in AGEN and transmitted to DGEN as part of the DOPBUS instruction. The scheme for deriving PCON is the same in both cases from the fundamental theorem equation:

$$U = E_p(B,C) \text{ and } B = E_p(U,C)$$

The equations for deriving PCON for a PBM are as follows:

$$\begin{aligned} \text{PCON} &= C \\ &= CAO \\ &= Q_P(X,H,YZ) \end{aligned}$$

For an SMB, PCON=0.

The DGEN registers which are used to form the permutation control index signal PCON in the case of vector operations are as follows:

XDST[5:2] supplies the X index
YDST[3:0] supplies the Y index
ZDST supplies the Z bit for DSM=1 or sm=1 operations
DDH[2:0] supplies the h parameter
DGEN operates on successive 32-bit words called "pulls" to implement the full 64-bit cell. PRENET and POSTNET thus operate on successive 32-bit pulls and sequence rules handle the ordering of the pulls to be consistent with the permutation translation. These rules are as follows:

1. The memory control always reads or writes the pulls in numerically increasing order independent of the permutation control value PCON.

2. DGEN loads the lower or upper 32-bits of a register in the order defined by PCON as follows:

a If PCON is 0 then the first pull is saved (or read from) the lower 32 bits and the second pull operates on the upper 32 bits of a register.

b. If PCON is 1 then the first pull is saved (or read from) the upper 32 bits and the second pull operates on the lower 32 bits of a register. These rules are based upon the XOR property of the PCON bits. PCON may be implemented as a counter bit. All DGEN operations have been defined in such a way that successive DSTROBE signals may toggle PCON and PCON will always indicate whether the pull is for the upper 32-bits (PCON=1) or the lower 32-bits (PCON=0) for the entire sequence of the operation. For SBMs, PCON is initially set to zero and PCON then is allowed to count as usual.

In the example of FIG. 24 and Table 42 the designations for the address lines for A, designated CA, to the eight physical memory banks (16 logical memory banks) are followed by two index bits ji, e.g. CAji. The first index bit number j is the "pull" number 0 or 1, while second bit number i is the variable bit number i[3:0] specifying which of the four component bits of the variable. This is not to be confused with the address line designations Ay and $A_z$ or $A_Y$ and $A_Z$ of FIG. 11 and Tables 28, 31, 33, 35, 37 and 33 where the variables AY and AZ are followed by two index bits ij, e.g. AYij and AZij where the first index bit number i is the variable bit number i[3:0]and the second bit number j is the "pull" number 0 or 1.

While the invention has been described with reference to particular example embodiments it is intended to cover all variations, modifications and equivalents within the scope of the following claims.

TABLE 1

BLOCK FROM A CYCLIC PERMUTATION BIT MAP WITH PARTITIONS SHOWING THREE DIFFERENT CELL CONFIGURATION ADDRESSING MODES

| Y/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 00 | 10 | 20 | 30 | 40 | 50 | 60 | 70 | 80 | 90 | A0 | B0 | C0 | D0 | E0 | F0 |
| 1 | 41 | 51 | 61 | 71 | 81 | 91 | A1 | B1 | C1 | D1 | E1 | F1 | 01 | 11 | 21 | 31 |
| 2 | 82 | 92 | A2 | B2 | C2 | D2 | E2 | F2 | 02 | 12 | 22 | 32 | 42 | 52 | 62 | 72 |
| 3 | C3 | D3 | E3 | F3 | 03 | 13 | 23 | 33 | 43 | 53 | 63 | 73 | 83 | 93 | A3 | B3 |
| 4 | 14 | 24 | 34 | 44 | 54 | 64 | 74 | 84 | 94 | A4 | B4 | C4 | D4 | E4 | F4 | 04 |
| 5 | 55 | 65 | 75 | 85 | 95 | A5 | B5 | C5 | D5 | E5 | F5 | 05 | 15 | 25 | 35 | 45 |
| 6 | 96 | A6 | B6 | C6 | D6 | E6 | F6 | 06 | 16 | 26 | 36 | 46 | 56 | 66 | 76 | 86 |
| 7 | D7 | E7 | F7 | 07 | 17 | 27 | 37 | 47 | 57 | 67 | 77 | 87 | 97 | A7 | B7 | C7 |
| 8 | 28 | 38 | 48 | 58 | 68 | 78 | 88 | 98 | A8 | B8 | C8 | D8 | E8 | F8 | 08 | 18 |
| 9 | 69 | 79 | 89 | 99 | A9 | B9 | C9 | D9 | E9 | F9 | 09 | 19 | 29 | 39 | 49 | 59 |
| A | AA | BA | CA | DA | EA | FA | 0A | 1A | 2A | 3A | 4A | 5A | 6A | 7A | 8A | 9A |
| B | EB | FB | 0B | 1B | 2B | 3B | 4B | 5B | 6B | 7B | 8B | 9B | AB | BB | CB | DB |
| C | 3C | 4C | 5C | 6C | 7C | 8C | 9C | AC | BC | CC | DC | EC | FC | 0C | 1C | 2C |
| D | 7D | 8D | 9D | AD | BD | CD | DD | ED | FD | 0D | 1D | 2D | 3D | 4D | 5D | 6D |
| E | BE | CE | DE | EE | FE | 0E | 1E | 2E | 3E | 4E | 5E | 6E | 7E | 8E | 9E | AE |
| F | FF | 0F | 1F | 2F | 3F | 4F | 5F | 6F | 7F | 8F | 9F | AF | BF | CF | DF | EF |

TABLE 2

Definition of the Rotation or Cyclic LPN, $C_p$, A Logical Linear Permutation Operator Definition:

$C_p(X,Y) = (X + Y) \bmod L$
X,Y are Operands or index variables
i = index bit number = L − 1, . . . , 1, 0
L is the number of index bits of the index variables + is the addition operator Example:

If: $X_i = X_3,X_2,X_1,X_0$
$Y_i = Y_3,Y_2,Y_1,Y_0$
L = number of index bits of the variable = 4
i = 3, . . . , 0

Then: $C_p(X_i,Y_i) = \{(X_i + Y_i) \bmod 4\}_i$

Inverse:

$C_p(-X,C_p(X,Y)) = Y$

Since: $-X + (X + Y) = Y$

TABLE 3

Definition of the Multiplexing Switch LPN, $Q_p$, A Hybrid Linear Permutation Operator Definition:

$Q_p(X,h,Y)_i = Y_i$ for $i < h$
$= X_i$ for $i \geqq h$
i = index bit number
X,Y are operands or index variables
h = switch threshold parameter Examples:

(1) $X_i = X_3,X_2,X_1,X_0$
$Y_i = Y_3,Y_2,Y_1,Y_0$
i = index bit number
L = number of index bits of the index variables = 4
h = 2
$Q_p(X,2,Y) = (X_3,X_2,Y_1,Y_0)$ (2) For $A = Q_p(B,h,C)$:

| | $Q_p(B,h,C)$ | | | |
|---|---|---|---|---|
| h | 3 | 2 | 1 | 0 |
| 0 | B3 | B2 | B1 | B0 |
| 1 | B3 | B2 | B1 | C0 |
| 2 | B3 | B2 | C1 | C0 |
| 3 | B3 | C2 | C1 | C0 |
| 4 | C3 | C2 | C1 | C0 |

Pair Operation Definition and Pair Operation Reversal Proof:

If
$X = Q_p(A,h,B)$
$Y = Q_p(B,h,A)$
Then
$A = Q_p(X,h,Y)$
$B = Q_p(Y,h,X)$

TABLE 3-continued

Definition of the Multiplexing Switch LPN, $Q_p$, A Hybrid Linear Permutation Operator Other Useful Properties:

$Q_p(X,h,Q_p(Y,h,Z)) = Q_p(X,h,Z)$
$Q_p(Q_p(X,h,Y),h,Z) = Q_p(X,h,Z)$
$Q_p(C,h,C) = C$
$E_p(Q_p(X,h,Y),Z) = Q_p(E_p(X,Z),h,E_p(Y,Z))$

TABLE 4

Definition of the Exchange LPN, $E_p$, A Logical Linear Permutation Operator

Definition:

$E_p(X,Y)_i = X_i \wedge Y_i$
$\wedge$ = XOR i.e. $a \wedge a = 0$
$a \wedge \bar{a} = 1$
X,Y are operands or index variables
i = index bit number = L − 1, . . . , 0
L = number of index bits of the index variables Reversal Proof:

$E_p(X,E_p(X,Y)) = Y$

Inverses:

If $X = E_p(Y,Z)$
Then $Y = E_p(X,Z)$
And $Z = E_p(Y,X)$

Other Useful Properties:

$E_p(\theta,X) = X$
$E_p(X,X) = \theta$
$R_p(E_p(X,Y)) = E_p(R_p(X),R_p(Y))$
$\theta$ = index variable with all index bit values zero

TABLE 5

PARTITION TABLE BC = f(XW) FOR AM40

| Y/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 00 | 10 | 20 | 30 | 40 | 50 | 60 | 70 | 80 | 90 | A0 | B0 | C0 | D0 | E0 | F0 |
| 1 | 88 | 98 | A8 | B8 | C8 | D8 | E8 | F8 | 08 | 18 | 28 | 38 | 48 | 58 | 68 | 78 |
| 2 | 44 | 54 | 64 | 74 | 04 | 14 | 24 | 34 | C4 | D4 | E4 | F4 | 84 | 94 | A4 | B4 |
| 3 | CC | DC | EC | FC | 8C | 9C | AC | BC | 4C | 5C | 6C | 7C | 0C | 1C | 2C | 3C |
| 4 | 22 | 32 | 02 | 12 | 62 | 72 | 42 | 52 | A2 | B2 | 82 | 92 | E2 | F2 | C2 | D2 |
| 5 | AA | BA | 8A | 9A | EA | FA | CA | DA | 2A | 3A | 0A | 1A | 6A | 7A | 4A | 5A |
| 6 | 66 | 76 | 46 | 56 | 26 | 36 | 06 | 16 | E6 | F6 | C6 | D6 | A6 | B6 | 86 | 96 |
| 7 | EE | FE | CE | DE | AE | BE | 8E | 9E | 6E | 7E | 4E | 5E | 2E | 3E | 0E | 1E |
| 8 | 11 | 01 | 31 | 21 | 51 | 41 | 71 | 61 | 91 | 81 | B1 | A1 | D1 | C1 | F1 | E1 |
| 9 | 99 | 89 | B9 | A9 | D9 | C9 | F9 | E9 | 19 | 09 | 39 | 29 | 59 | 49 | 79 | 69 |
| A | 55 | 45 | 75 | 65 | 15 | 05 | 35 | 25 | D5 | C5 | F5 | E5 | 95 | 85 | B5 | A5 |
| B | DD | CD | FD | ED | 9D | 8D | BD | AD | 5D | 4D | 7D | 6D | 1D | 0D | 3D | 2D |
| C | 33 | 23 | 13 | 03 | 73 | 63 | 53 | 43 | B3 | A3 | 93 | 83 | F3 | E3 | D3 | C3 |
| D | BB | AB | 9B | 8B | FB | EB | DB | CB | 3B | 2B | 1B | 0B | 7B | 6B | 5B | 4B |
| E | 77 | 67 | 57 | 47 | 37 | 27 | 17 | 07 | F7 | E7 | D7 | C7 | B7 | A7 | 97 | 87 |
| F | FF | EF | DF | CF | BF | AF | 9F | 8F | 7F | 6F | 5F | 4F | 3F | 2F | IF | 0F |

TABLE 6

PARTITION TABLE BC = f(XW) FOR AM04

| Y/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 00 | 11 | 22 | 33 | 44 | 55 | 66 | 77 | 88 | 99 | AA | BB | CC | DD | EE | FF |
| 1 | 80 | 91 | A2 | B3 | C4 | D5 | E6 | F7 | 08 | 19 | 2A | 3B | 4C | 5D | 6E | 7F |
| 2 | 40 | 51 | 62 | 73 | 04 | 15 | 26 | 37 | C8 | D9 | EA | FB | 8C | 9D | AE | BF |
| 3 | C0 | D1 | E2 | F3 | 84 | 95 | A6 | B7 | 48 | 59 | 6A | 7B | 0C | 1D | 2E | 3F |
| 4 | 20 | 31 | 02 | 13 | 64 | 75 | 46 | 57 | A8 | B9 | 8A | 9B | EC | FD | CE | DF |
| 5 | A0 | B1 | 82 | 93 | E4 | F5 | C6 | D7 | 28 | 39 | 0A | 1B | 6C | 7D | 4E | 5F |
| 6 | 60 | 71 | 42 | 53 | 24 | 35 | 06 | 17 | E8 | F9 | CA | DB | AC | BD | 8E | 9F |
| 7 | E0 | F1 | C2 | D3 | A4 | B5 | 86 | 97 | 68 | 79 | 4A | 5B | 2C | 3D | 0E | IF |
| 8 | 10 | 01 | 32 | 23 | 54 | 45 | 76 | 67 | 98 | 89 | BA | AB | DC | CD | FE | EF |
| 9 | 90 | 81 | B2 | A3 | D4 | C5 | F6 | E7 | 18 | 09 | 3A | 2B | 5C | 4D | 7E | 6F |
| A | 50 | 41 | 72 | 63 | 14 | 05 | 36 | 27 | D8 | C9 | FA | EB | 9C | 8D | BE | AF |
| B | D0 | C1 | F2 | E3 | 94 | 85 | B6 | A7 | 58 | 49 | 7A | 6B | 1C | 0D | 3E | 2F |
| C | 30 | 21 | 12 | 03 | 74 | 65 | 56 | 47 | B8 | A9 | 9A | 8B | FC | ED | DE | CF |
| D | B0 | A1 | 92 | 83 | F4 | E5 | D6 | C7 | 38 | 29 | 1A | 0B | 7C | 6D | 5E | 4F |
| E | 70 | 61 | 52 | 43 | 34 | 25 | 16 | 07 | F8 | E9 | DA | CB | BC | AD | 9E | 8F |
| F | F0 | E1 | D2 | C3 | B4 | A5 | 96 | 87 | 78 | 69 | 5A | 4B | 3C | 2D | 1E | 0F |

TABLE 7

| PARTITION TABLE BC = f(XW) FOR AM22 | | | | | | | | | | | | | | | | |
|---|---|---|---|---|---|---|---|---|---|---|---|---|---|---|---|---|
| Y/X | 0 | 1 | 2 | 3 | 4 | 5 | 6 | 7 | 8 | 9 | A | B | C | D | E | F |
| 0 | 00 | 10 | 20 | 30 | 44 | 54 | 64 | 74 | 88 | 98 | A8 | B8 | CC | DC | EC | FC |
| 1 | 80 | 90 | A0 | B0 | C4 | D4 | E4 | F4 | 08 | 18 | 28 | 38 | 4C | 5C | 6C | 7C |
| 2 | 40 | 50 | 60 | 70 | 04 | 14 | 24 | 34 | C8 | D8 | E8 | F8 | 8C | 9C | AC | BC |
| 3 | C0 | D0 | E0 | F0 | 84 | 94 | A4 | B4 | 48 | 58 | 68 | 78 | 0C | 1C | 2C | 3C |
| 4 | 22 | 32 | 02 | 12 | 66 | 76 | 46 | 56 | AA | BA | 8A | 9A | EE | FE | CE | DE |
| 5 | A2 | B2 | 82 | 92 | E6 | F6 | C6 | D6 | 2A | 3A | 0A | 1A | 6E | 7E | 4E | 5E |
| 6 | 62 | 72 | 42 | 52 | 26 | 36 | 06 | 16 | EA | FA | CA | DA | AE | BE | 8E | 9E |
| 7 | E2 | F2 | C2 | D2 | A6 | B6 | 86 | 96 | 6A | 7A | 4A | 5A | 2E | 3E | 0E | 1E |
| 8 | 11 | 01 | 31 | 21 | 55 | 45 | 75 | 65 | 99 | 89 | B9 | A9 | DD | CD | FD | ED |
| 9 | 91 | 81 | B1 | A1 | D5 | C5 | F5 | E5 | 19 | 09 | 39 | 29 | 5D | 4D | 7D | 6D |
| A | 51 | 41 | 71 | 61 | 15 | 05 | 35 | 25 | D9 | C9 | F9 | E9 | 9D | 8D | BD | AD |
| B | D1 | C1 | F1 | E1 | 95 | 85 | B5 | A5 | 59 | 49 | 79 | 69 | 1D | 0D | 3D | 2D |
| C | 33 | 23 | 13 | 03 | 77 | 67 | 57 | 47 | BB | AB | 9B | 8B | FF | EF | DF | CF |
| D | B3 | A3 | 93 | 83 | F7 | E7 | D7 | C7 | 3B | 2B | 1B | 0B | 7F | 6F | 5F | 4F |
| E | 73 | 63 | 53 | 43 | 37 | 27 | 17 | 07 | FB | EB | DB | CB | BF | AF | 9F | 8F |
| F | F3 | E3 | D3 | C3 | B7 | A7 | 97 | 87 | 7B | 6B | 5B | 4B | 3F | 2F | 1F | 0F |

TABLE 8

| PARTITION TABLE BC = f(XW) FOR AM13 | | | | | | | | | | | | | | | | |
|---|---|---|---|---|---|---|---|---|---|---|---|---|---|---|---|---|
| Y/X | 0 | 1 | 2 | 3 | 4 | 5 | 6 | 7 | 8 | 9 | A | B | C | D | E | F |
| 0 | 00 | 10 | 22 | 32 | 44 | 54 | 66 | 76 | 88 | 98 | AA | BA | CC | DC | EE | FE |
| 1 | 80 | 90 | A2 | B2 | C4 | D4 | E6 | F6 | 08 | 18 | 2A | 3A | 4C | 5C | 6E | 7E |
| 2 | 40 | 50 | 62 | 72 | 04 | 14 | 26 | 36 | C8 | D8 | EA | FA | 8C | 9C | AE | BE |
| 3 | C0 | D0 | E2 | F2 | 84 | 94 | A6 | B6 | 48 | 58 | 6A | 7A | 0C | 1C | 2E | 3E |
| 4 | 20 | 30 | 02 | 12 | 64 | 74 | 46 | 56 | A8 | B8 | 8A | 9A | EC | FC | CE | DE |
| 5 | A0 | B0 | 82 | 92 | E4 | F4 | C6 | D6 | 28 | 38 | 0A | 1A | 6C | 7C | 4E | 5E |
| 6 | 60 | 70 | 42 | 52 | 24 | 34 | 06 | 16 | E8 | F8 | CA | DA | AC | BC | 8E | 9E |
| 7 | E0 | F0 | C2 | D2 | A4 | B4 | 86 | 96 | 68 | 78 | 4A | 5A | 2C | 3C | 0E | 1E |
| 8 | 11 | 01 | 33 | 23 | 55 | 45 | 77 | 67 | 99 | 89 | BB | AB | DD | CD | FF | EF |
| 9 | 91 | 81 | B3 | A3 | D5 | C5 | F7 | E7 | 19 | 09 | 3B | 2B | 5D | 4D | 7F | 6F |
| A | 51 | 41 | 73 | 63 | 15 | 05 | 37 | 27 | D9 | C9 | FB | EB | 9D | 8D | BF | AF |
| B | D1 | C1 | F3 | E3 | 95 | 85 | B7 | A7 | 59 | 49 | 7B | 6B | 1D | 0D | 3F | 2F |
| C | 31 | 21 | 13 | 03 | 75 | 65 | 57 | 47 | B9 | A9 | 9B | 8B | FD | ED | DF | CF |
| D | B1 | A1 | 93 | 83 | F5 | E5 | D7 | C7 | 39 | 29 | 1B | 0B | 7D | 6D | 5F | 4F |
| E | 71 | 61 | 53 | 43 | 35 | 25 | 17 | 07 | F9 | E9 | DB | CB | BD | AD | 9F | 8F |
| F | F1 | E1 | D3 | C3 | B5 | A5 | 97 | 87 | 79 | 69 | 5B | 4B | 3D | 2D | 1F | 0F |

TABLE 8A

| PARTITION TABLE BC = f(XW) FOR AM31 | | | | | | | | | | | | | | | | |
|---|---|---|---|---|---|---|---|---|---|---|---|---|---|---|---|---|
| Y/X | 0 | 1 | 2 | 3 | 4 | 5 | 6 | 7 | 8 | 9 | A | B | C | D | E | F |
| 0 | 00 | 10 | 20 | 30 | 40 | 50 | 60 | 70 | 88 | 98 | A8 | B8 | C8 | D8 | E8 | F8 |
| 1 | 80 | 90 | A0 | B0 | C0 | D0 | E0 | F0 | 08 | 18 | 28 | 38 | 48 | 58 | 68 | 78 |
| 2 | 44 | 54 | 64 | 74 | 04 | 14 | 24 | 34 | CC | DC | EC | FC | 8C | 9C | AC | BC |
| 3 | C4 | D4 | E4 | F4 | 84 | 94 | A4 | B4 | 4C | 5C | 6C | 7C | 0C | 1C | 2C | 3C |
| 4 | 22 | 32 | 02 | 12 | 62 | 72 | 42 | 52 | AA | BA | 8A | 9A | EA | FA | CA | DA |
| 5 | A2 | B2 | 82 | 92 | E2 | F2 | C2 | D2 | 2A | 3A | 0A | 1A | 6A | 7A | 4A | 5A |
| 6 | 66 | 76 | 46 | 56 | 26 | 36 | 06 | 16 | EE | FE | CE | DE | AE | BE | 8E | 9E |
| 7 | E6 | F6 | C6 | D6 | A6 | B6 | 86 | 96 | 6E | 7E | 4E | 5E | 2E | 3E | 0E | 1E |
| 8 | 11 | 01 | 31 | 21 | 51 | 41 | 71 | 61 | 99 | 89 | B9 | A9 | D9 | C9 | F9 | E9 |
| 9 | 91 | 81 | B1 | A1 | D1 | C1 | F1 | E1 | 19 | 09 | 39 | 29 | 59 | 49 | 79 | 69 |
| A | 55 | 45 | 75 | 65 | 15 | 05 | 35 | 25 | DD | CD | FD | ED | 9D | 8D | BD | AD |
| B | D5 | C5 | F5 | E5 | 95 | 85 | B5 | A5 | 5D | 4D | 7D | 6D | 1D | 0D | 3D | 2D |
| C | 33 | 23 | 13 | 03 | 73 | 63 | 53 | 43 | BB | AB | 9B | 8B | FB | EB | DB | CB |
| D | B3 | A3 | 93 | 83 | F3 | E3 | D3 | C3 | 3B | 2B | 1B | 0B | 7B | 6B | 5B | 4B |
| E | 77 | 67 | 57 | 47 | 37 | 27 | 17 | 07 | FF | EF | DF | CF | BF | AF | 9F | 8F |
| F | F7 | E7 | D7 | C7 | B7 | A7 | 97 | 87 | 7F | 6F | 5F | 4F | 3F | 2F | 1F | 0F |

TABLE 9

| Definition of Reversal LPN, $R_p$, A Wire Linear Permutation Operator | |
|---|---|
| Definition: | $R_p(X_i) = X_{(L-i-l)} = X_{i'}$ |
| Where | i' = L-i-l |
| | i = index bit number |
| | L = number of index bits i |
| | L = modulus |
| | X = operand or index variable |
| Example: | |
| If | L = 4 and i = 0 |
| Then | |

TABLE 9-continued

| Definition of Reversal LPN, $R_p$, A Wire Linear Permutation Operator | |
|---|---|
| | i' = 3 and $R_p(X_0) = X_3$ |
| If | L = 4 and i = 1 |
| Then | i' = 2 and $R_p(X_1) = X_2$ |
| | Generally, for L = 4: |

| i | i' |
|---|---|
| 3 | 0 |
| 2 | 1 |
| 1 | 2 |
| 0 | 3 |

TABLE 9-continued

Definition of Reversal LPN, $R_p$, A Wire Linear Permutation Operator

| $X_i$ | $X_{i'}$ |
|---|---|
| $X_3$ | $X_0$ |
| $X_2$ | $X_1$ |
| $X_1$ | $X_2$ |
| $X_0$ | $X_3$ |

Reversal Proof:

$$R_p(R_p(X_i)) = X_i$$

TABLE 10

CELL ADDRESSING MODES (hvps NOTATION)

| Type | hvps | h | v | p | s | H | V | P | Use |
|---|---|---|---|---|---|---|---|---|---|
| PBM | 4000 | 4 | 0 | 0 | 0 | 64 | 1 | 1 | B |
| PBM | 3100 | 3 | 1 | 0 | 0 | 32 | 2 | 1 | — |
| PBM | 2200 | 2 | 2 | 0 | 0 | 16 | 4 | 1 | V |
| PBM | 1300 | 1 | 3 | 0 | 0 | 8 | 8 | 1 | — |
| PBM | 0400 | 0 | 4 | 0 | 0 | 4 | 16 | 1 | V |
| PBM | 4000 | 4 | 0 | 0 | 0 | 64 | 1 | 1 | VB |
| PBM | 3010 | 3 | 0 | 1 | 0 | 32 | 1 | 2 | VB |
| PBM | 2020 | 2 | 0 | 2 | 0 | 16 | 1 | 4 | VB |
| PBM | 1030 | 1 | 0 | 3 | 0 | 8 | 1 | 8 | VB |
| PBM | 0040 | 0 | 0 | 4 | 0 | 4 | 1 | 16 | VB |
| PBM | 4001 | 4 | 0 | 0 | 1 | 64 | 1 | 1 | — |
| PBM | 0401 | 0 | 4 | 0 | 1 | 4 | 16 | 1 | — |
| PBM | 3011 | 3 | 0 | 1 | 1 | 32 | 1 | 2 | B |
| PBM | 2111 | 2 | 1 | 1 | 1 | 16 | 2 | 2 | — |
| PBM | 1211 | 1 | 2 | 1 | 1 | 8 | 4 | 2 | V |
| PBM | 0311 | 0 | 3 | 1 | 1 | 4 | 8 | 2 | V |
| PBM | 2021 | 2 | 0 | 2 | 1 | 16 | 1 | 4 | B |

TABLE 10-continued

CELL ADDRESSING MODES (hvps NOTATION)

| Type | hvps | h | v | p | s | H | V | P | Use |
|---|---|---|---|---|---|---|---|---|---|
| PBM | 1031 | 1 | 0 | 3 | 1 | 8 | 1 | 8 | B |
| PBM | 0041 | 0 | 0 | 4 | 1 | 4 | 1 | 16 | B |
| PBM | 4002 | 4 | 0 | 0 | 2 | 64 | 1 | 1 | — |
| PBM | 0402 | 0 | 4 | 0 | 2 | 4 | 16 | 1 | V |
| PBM | 3012 | 3 | 0 | 1 | 2 | 32 | 1 | 2 | B |
| PBM | 2022 | 2 | 0 | 2 | 2 | 16 | 1 | 4 | VB |
| PBM | 1122 | 1 | 1 | 2 | 2 | 8 | 2 | 4 | — |
| PBM | 0222 | 0 | 2 | 2 | 2 | 4 | 4 | 4 | V |
| PBM | 1032 | 1 | 0 | 3 | 2 | 8 | 1 | 8 | B |
| PBM | 0042 | 0 | 0 | 4 | 2 | 4 | 1 | 16 | VB |
| PBM | 4003 | 4 | 0 | 0 | 3 | 64 | 1 | 1 | B |
| PBM | 0403 | 0 | 4 | 0 | 3 | 4 | 16 | 1 | VB |
| PBM | 3013 | 3 | 0 | 1 | 3 | 32 | 1 | 2 | VB |
| PBM | 2023 | 2 | 0 | 2 | 3 | 16 | 1 | 4 | VB |
| PBM | 1033 | 1 | 0 | 3 | 3 | 8 | 1 | 8 | B |
| PBM | 0133 | 0 | 1 | 3 | 3 | 4 | 2 | 8 | V |
| PBM | 0043 | 0 | 0 | 4 | 3 | 4 | 1 | 16 | VB |
| PBM | 4004 | 4 | 0 | 0 | 4 | 64 | 1 | 1 | B |
| PBM | 3104 | 3 | 1 | 0 | 4 | 32 | 2 | 1 | — |
| PBM | 2204 | 2 | 2 | 0 | 4 | 16 | 4 | 1 | V |
| PBM | 1304 | 1 | 3 | 0 | 4 | 8 | 8 | 1 | — |
| PBM | 0404 | 0 | 4 | 0 | 4 | 4 | 16 | 1 | V |
| PBM | 3014 | 3 | 0 | 1 | 4 | 32 | 1 | 2 | VB |
| PBM | 2024 | 2 | 0 | 2 | 4 | 16 | 1 | 4 | VB |
| PBM | 1034 | 1 | 0 | 3 | 4 | 8 | 1 | 8 | VB |
| PBM | 0044 | 0 | 0 | 4 | 4 | 4 | 1 | 16 | VB |
| SBM | 400s | 4 | 0 | 0 | — | 64 | 1 | 1 | VB |
| SBM | 301s | 3 | 0 | 1 | — | 32 | 1 | 2 | VB |
| SBM | 202s | 2 | 0 | 2 | — | 16 | 1 | 4 | VB |
| SBM | 103s | 1 | 0 | 3 | — | 8 | 1 | 8 | VB |
| SBM | 004s | 0 | 0 | 4 | — | 4 | 1 | 16 | VB |

TABLE 11

PARTITION TABLE BCS = f(XYZ) FOR sm = 0 AM4000

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 0 | 000 | 100 | 200 | 300 | 400 | 500 | 600 | 700 | 800 | 900 | A00 | B00 | C00 | D00 | E00 | F00 |
| 0 1 | 880 | 980 | A80 | B80 | C80 | D80 | E80 | F80 | 080 | 180 | 280 | 380 | 480 | 580 | 680 | 780 |
| 0 2 | 440 | 540 | 640 | 740 | 040 | 140 | 240 | 340 | C40 | D40 | E40 | F40 | 840 | 940 | A40 | B40 |
| 0 3 | CC0 | DC0 | EC0 | FC0 | 8C0 | 9C0 | AC0 | BC0 | 4C0 | 5C0 | 6C0 | 7C0 | 0C0 | 1C0 | 2C0 | 3C0 |
| 0 4 | 220 | 320 | 020 | 120 | 620 | 720 | 420 | 520 | A20 | B20 | 820 | 920 | E20 | F20 | C20 | D20 |
| 0 5 | AA0 | BA0 | 8A0 | 9A0 | EA0 | FA0 | CA0 | DA0 | 2A0 | 3A0 | 0A0 | 1A0 | 6A0 | 7A0 | 4A0 | 5A0 |
| 0 6 | 660 | 760 | 460 | 560 | 260 | 360 | 060 | 160 | E60 | F60 | C60 | D60 | A60 | B60 | 860 | 960 |
| 0 7 | EE0 | FE0 | CE0 | DE0 | AE0 | BE0 | 8E0 | 9E0 | 6E0 | 7E0 | 4E0 | 5E0 | 2E0 | 3E0 | 0E0 | 1E0 |
| 0 8 | 110 | 010 | 310 | 210 | 510 | 410 | 710 | 610 | 910 | 810 | B10 | A10 | D10 | C10 | F10 | E10 |
| 0 9 | 990 | 890 | B90 | A90 | D90 | C90 | F90 | E90 | 190 | 090 | 390 | 290 | 590 | 490 | 790 | 690 |
| 0 A | 550 | 450 | 750 | 650 | 150 | 050 | 350 | 250 | D50 | C50 | F50 | E50 | 950 | 850 | B50 | A50 |
| 0 B | DD0 | CD0 | FD0 | ED0 | 9D0 | 8D0 | BD0 | AD0 | 5D0 | 4D0 | 7D0 | 6D0 | 1D0 | 0D0 | 3D0 | 2D0 |
| 0 C | 330 | 230 | 130 | 030 | 730 | 630 | 530 | 430 | B30 | A30 | 930 | 830 | F30 | E30 | D30 | C30 |
| 0 D | BB0 | AB0 | 9B0 | 8B0 | FB0 | EB0 | DB0 | CB0 | 3B0 | 2B0 | 1B0 | 0B0 | 7B0 | 6B0 | 5B0 | 4B0 |
| 0 E | 770 | 670 | 570 | 470 | 370 | 270 | 170 | 070 | F70 | E70 | D70 | C70 | B70 | A70 | 970 | 870 |
| 0 F | FF0 | EF0 | DF0 | CF0 | BF0 | AF0 | 9F0 | 8F0 | 7F0 | 6F0 | 5F0 | 4F0 | 3F0 | 2F0 | 1F0 | 0F0 |

TABLE 12

PARTITION TABLE BCS = f(XYZ) FOR sm = 0 AM3100

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 0 | 000 | 100 | 200 | 300 | 400 | 500 | 600 | 700 | 880 | 980 | A80 | B80 | C80 | D80 | E80 | F80 |
| 0 1 | 800 | 900 | A00 | B00 | C00 | D00 | E00 | F00 | 080 | 180 | 280 | 380 | 480 | 580 | 680 | 780 |
| 0 2 | 440 | 540 | 640 | 740 | 040 | 140 | 240 | 340 | CC0 | DC0 | EC0 | FC0 | 8C0 | 9C0 | AC0 | BC0 |
| 0 3 | C40 | D40 | E40 | F40 | 840 | 940 | A40 | B40 | 4C0 | 5C0 | 6C0 | 7C0 | 0C0 | 1C0 | 2C0 | 3C0 |
| 0 4 | 220 | 320 | 020 | 120 | 620 | 720 | 420 | 520 | AA0 | BA0 | 8A0 | 9A0 | EA0 | FA0 | CA0 | DA0 |
| 0 5 | A20 | B20 | 820 | 920 | E20 | F20 | C20 | D20 | 2A0 | 3A0 | 0A0 | 1A0 | 6A0 | 7A0 | 4A0 | 5A0 |
| 0 6 | 660 | 760 | 460 | 560 | 260 | 360 | 060 | 160 | EE0 | FE0 | CE0 | DE0 | AE0 | BE0 | 8E0 | 9E0 |
| 0 7 | E60 | F60 | C60 | D60 | A60 | B60 | 860 | 960 | 6E0 | 7E0 | 4E0 | 5E0 | 2E0 | 3E0 | 0E0 | 1E0 |
| 0 8 | 110 | 010 | 310 | 210 | 510 | 410 | 710 | 610 | 990 | 890 | B90 | A90 | D90 | C90 | F90 | E90 |
| 0 9 | 910 | 810 | B10 | A10 | D10 | C10 | F10 | E10 | 190 | 090 | 390 | 290 | 590 | 490 | 790 | 690 |
| 0 A | 550 | 450 | 750 | 650 | 150 | 050 | 350 | 250 | DD0 | CD0 | FD0 | ED0 | 9D0 | 8D0 | BD0 | AD0 |
| 0 B | D50 | C50 | F50 | E50 | 950 | 850 | B50 | A50 | 5D0 | 4D0 | 7D0 | 6D0 | 1D0 | 0D0 | 3D0 | 2D0 |
| 0 C | 330 | 230 | 130 | 030 | 730 | 630 | 530 | 430 | BB0 | AB0 | 9B0 | 8B0 | FB0 | EB0 | DB0 | CB0 |
| 0 D | B30 | A30 | 930 | 830 | F30 | E30 | D30 | C30 | 3B0 | 2B0 | 1B0 | 0B0 | 7B0 | 6B0 | 5B0 | 4B0 |
| 0 E | 770 | 670 | 570 | 470 | 370 | 270 | 170 | 070 | FF0 | EF0 | DF0 | CF0 | BF0 | AF0 | 9F0 | 8F0 |
| 0 F | F70 | E70 | D70 | C70 | B70 | A70 | 970 | 870 | 7F0 | 6F0 | 5F0 | 4F0 | 3F0 | 2F0 | 1F0 | 0F0 |

TABLE 13

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | PARTITION TABLE BCS = f(XYZ) FOR sm = 0 AM2200 | | | | | | | | | | | | | |
| 0 0 | 000 | 100 | 200 | 300 | 440 | 540 | 640 | 740 | 880 | 980 | A80 | B80 | CC0 | DC0 | EC0 | FC0 |
| 0 1 | 800 | 900 | A00 | B00 | C40 | D40 | E40 | F40 | 080 | 180 | 280 | 380 | 4C0 | 5C0 | 6C0 | 7C0 |
| 0 2 | 400 | 500 | 600 | 700 | 040 | 140 | 240 | 340 | C80 | D80 | E80 | F80 | 8C0 | 9C0 | AC0 | BC0 |
| 0 3 | C00 | D00 | E00 | F00 | 840 | 940 | A40 | B40 | 480 | 580 | 680 | 780 | 0C0 | 1C0 | 2C0 | 3C0 |
| 0 4 | 220 | 320 | 020 | 120 | 660 | 760 | 460 | 560 | AA0 | BA0 | 8A0 | 9A0 | EE0 | FE0 | CE0 | DE0 |
| 0 5 | A20 | B20 | 820 | 920 | E60 | F60 | C60 | D60 | 2A0 | 3A0 | 0A0 | 1A0 | 6E0 | 7E0 | 4E0 | 5E0 |
| 0 6 | 620 | 720 | 420 | 520 | 260 | 360 | 060 | 160 | EA0 | FA0 | CA0 | DA0 | AE0 | BE0 | 8E0 | 9E0 |
| 0 7 | E20 | F20 | C20 | D20 | A60 | B60 | 860 | 960 | 6A0 | 7A0 | 4A0 | 5A0 | 2E0 | 3E0 | 0E0 | 1E0 |
| 0 8 | 110 | 010 | 310 | 210 | 550 | 450 | 750 | 650 | 990 | 890 | B90 | A90 | DD0 | CD0 | FD0 | ED0 |
| 0 9 | 910 | 810 | B10 | A10 | D50 | C50 | F50 | E50 | 190 | 090 | 390 | 290 | 5D0 | 4D0 | 7D0 | 6D0 |
| 0 A | 510 | 410 | 710 | 610 | 150 | 050 | 350 | 250 | D90 | C90 | F90 | E90 | 9D0 | 8D0 | BD0 | AD0 |
| 0 B | D10 | C10 | F10 | E10 | 950 | 850 | B50 | A50 | 590 | 490 | 790 | 690 | 1D0 | 0D0 | 3D0 | 2D0 |
| 0 C | 330 | 230 | 130 | 030 | 770 | 670 | 570 | 470 | BB0 | AB0 | 9B0 | 8B0 | FF0 | EF0 | DF0 | CF0 |
| 0 D | B30 | A30 | 930 | 830 | F70 | E70 | D70 | C70 | 3B0 | 2B0 | 1B0 | 0B0 | 7F0 | 6F0 | 5F0 | 4F0 |
| 0 E | 730 | 630 | 530 | 430 | 370 | 270 | 170 | 070 | FB0 | EB0 | DB0 | CB0 | BF0 | AF0 | 9F0 | 8F0 |
| 0 F | F30 | E30 | D30 | C30 | B70 | A70 | 970 | 870 | 7B0 | 6B0 | 5B0 | 4B0 | 3F0 | 2F0 | 1F0 | 0F0 |

TABLE 14

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | PARTITION TABLE BCS = f(XYZ) FOR sm = 0 AM1300 | | | | | | | | | | | | | |
| 0 0 | 000 | 100 | 220 | 320 | 440 | 540 | 660 | 760 | 880 | 980 | AA0 | BA0 | CC0 | DC0 | EE0 | FE0 |
| 0 1 | 800 | 900 | A20 | B20 | C40 | D40 | E60 | F60 | 080 | 180 | 2A0 | 3A0 | 4C0 | 5C0 | 6E0 | 7E0 |
| 0 2 | 400 | 500 | 620 | 720 | 040 | 140 | 260 | 360 | C80 | D80 | EA0 | FA0 | 8C0 | 9C0 | AE0 | BE0 |
| 0 3 | C00 | D00 | E20 | F20 | 840 | 940 | A60 | B60 | 480 | 580 | 6A0 | 7A0 | 0C0 | 1C0 | 2E0 | 3E0 |
| 0 4 | 200 | 300 | 020 | 120 | 640 | 740 | 460 | 560 | A80 | B80 | 8A0 | 9A0 | EC0 | FC0 | CE0 | DE0 |
| 0 5 | A00 | B00 | 820 | 920 | E40 | F40 | C60 | D60 | 280 | 380 | 0A0 | 1A0 | 6C0 | 7C0 | 4E0 | 5E0 |
| 0 6 | 600 | 700 | 420 | 520 | 240 | 340 | 060 | 160 | E80 | F80 | CA0 | DA0 | AC0 | BC0 | 8E0 | 9E0 |
| 0 7 | E00 | F00 | C20 | D20 | A40 | B40 | 860 | 960 | 680 | 780 | 4A0 | 5A0 | 2C0 | 3C0 | 0E0 | 1E0 |
| 0 8 | 110 | 010 | 330 | 230 | 550 | 450 | 770 | 670 | 990 | 890 | BB0 | AB0 | DD0 | CD0 | FF0 | EF0 |
| 0 9 | 910 | 810 | B30 | A30 | D50 | C50 | F70 | E70 | 190 | 090 | 3B0 | 2B0 | 5D0 | 4D0 | 7F0 | 6F0 |
| 0 A | 510 | 410 | 730 | 630 | 150 | 050 | 370 | 270 | D90 | C90 | FB0 | EB0 | 9D0 | 8D0 | BF0 | AF0 |
| 0 B | D10 | C10 | F30 | E30 | 950 | 850 | B70 | A70 | 590 | 490 | 7B0 | 6B0 | 1D0 | 0D0 | 3F0 | 2F0 |
| 0 C | 310 | 210 | 130 | 030 | 750 | 650 | 570 | 470 | B90 | A90 | 9B0 | 8B0 | FD0 | ED0 | DF0 | CF0 |
| 0 D | B10 | A10 | 930 | 830 | F50 | E50 | D70 | C70 | 390 | 290 | 1B0 | 0B0 | 7D0 | 6D0 | 5F0 | 4F0 |
| 0 E | 710 | 610 | 530 | 430 | 350 | 250 | 170 | 070 | F90 | E90 | DB0 | CB0 | BD0 | AD0 | 9F0 | 8F0 |
| 0 F | F10 | E10 | D30 | C30 | B50 | A50 | 970 | 870 | 790 | 690 | 5B0 | 4B0 | 3D0 | 2D0 | 1F0 | 0F0 |

TABLE 15

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | PARTITION TABLE BCS = f(XYZ) FOR sm = 0 AM0400 | | | | | | | | | | | | | |
| 0 0 | 000 | 110 | 220 | 330 | 440 | 550 | 660 | 770 | 880 | 990 | AA0 | BB0 | CC0 | DD0 | EE0 | FF0 |
| 0 1 | 800 | 910 | A20 | B30 | C40 | D50 | E60 | F70 | 080 | 190 | 2A0 | 3B0 | 4C0 | 5D0 | 6E0 | 7F0 |
| 0 2 | 400 | 510 | 620 | 730 | 040 | 150 | 260 | 370 | C80 | D90 | EA0 | FB0 | 8C0 | 9D0 | AE0 | BF0 |
| 0 3 | C00 | D10 | E20 | F30 | 840 | 950 | A60 | B70 | 480 | 590 | 6A0 | 7B0 | 0C0 | 1D0 | 2E0 | 3F0 |
| 0 4 | 200 | 310 | 020 | 130 | 640 | 750 | 460 | 570 | A80 | B90 | 8A0 | 9B0 | EC0 | FD0 | CE0 | DF0 |
| 0 5 | A00 | B10 | 820 | 930 | E40 | F50 | C60 | D70 | 280 | 390 | 0A0 | 1B0 | 6C0 | 7D0 | 4E0 | 5F0 |
| 0 6 | 600 | 710 | 420 | 530 | 240 | 350 | 060 | 170 | E80 | F90 | CA0 | DB0 | AC0 | BD0 | 8E0 | 9F0 |
| 0 7 | E00 | F10 | C20 | D30 | A40 | B50 | 860 | 970 | 680 | 790 | 4A0 | 5B0 | 2C0 | 3D0 | 0E0 | 1F0 |
| 0 8 | 100 | 010 | 320 | 230 | 540 | 450 | 760 | 670 | 980 | 890 | BA0 | AB0 | DC0 | CD0 | FE0 | EF0 |
| 0 9 | 900 | 810 | B20 | A30 | D40 | C50 | F60 | E70 | 180 | 090 | 3A0 | 2B0 | 5C0 | 4D0 | 7E0 | 6F0 |
| 0 A | 500 | 410 | 720 | 630 | 140 | 050 | 360 | 270 | D80 | C90 | FA0 | EB0 | 9C0 | 8D0 | BE0 | AF0 |
| 0 B | D00 | C10 | F20 | E30 | 940 | 850 | B60 | A70 | 580 | 490 | 7A0 | 6B0 | 1C0 | 0D0 | 3E0 | 2F0 |
| 0 C | 300 | 210 | 120 | 030 | 740 | 650 | 560 | 470 | B80 | A90 | 9A0 | 8B0 | FC0 | ED0 | DE0 | CF0 |
| 0 D | B00 | A10 | 920 | 830 | F40 | E50 | D60 | C70 | 380 | 290 | 1A0 | 0B0 | 7C0 | 6D0 | 5E0 | 4F0 |
| 0 E | 700 | 610 | 520 | 430 | 340 | 250 | 160 | 070 | F80 | E90 | DA0 | CB0 | BC0 | AD0 | 9E0 | 8F0 |
| 0 F | F00 | E10 | D20 | C30 | B40 | A50 | 960 | 870 | 780 | 690 | 5A0 | 4B0 | 3C0 | 2D0 | 1E0 | 0F0 |

TABLE 16

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | PARTITION TABLE BCS = f(XYZ) FOR sm = 0 AM3011 | | | | | | | | | | | | | |
| 0 0 | 000 | 100 | 200 | 300 | 400 | 500 | 600 | 700 | 880 | 980 | A80 | B80 | C80 | D80 | E80 | F80 |
| 1 0 | 800 | 900 | A00 | B00 | C00 | D00 | E00 | F00 | 080 | 180 | 280 | 380 | 480 | 580 | 680 | 780 |
| 0 1 | 440 | 540 | 640 | 740 | 040 | 140 | 240 | 340 | CC0 | DC0 | EC0 | FC0 | 8C0 | 9C0 | AC0 | BC0 |
| 1 1 | C40 | D40 | E40 | F40 | 840 | 940 | A40 | B40 | 4C0 | 5C0 | 6C0 | 7C0 | 0C0 | 1C0 | 2C0 | 3C0 |
| 0 2 | 220 | 320 | 020 | 120 | 620 | 720 | 420 | 520 | AA0 | BA0 | 8A0 | 9A0 | EA0 | FA0 | CA0 | DA0 |
| 1 2 | A20 | B20 | 820 | 920 | E20 | F20 | C20 | D20 | 2A0 | 3A0 | 0A0 | 1A0 | 6A0 | 7A0 | 4A0 | 5A0 |
| 0 3 | 660 | 760 | 460 | 560 | 260 | 360 | 060 | 160 | EE0 | FE0 | CE0 | DE0 | AE0 | BE0 | 8E0 | 9E0 |
| 1 3 | E60 | F60 | C60 | D60 | A60 | B60 | 860 | 960 | 6E0 | 7E0 | 4E0 | 5E0 | 2E0 | 3E0 | 0E0 | 1E0 |
| 0 4 | 110 | 010 | 310 | 210 | 510 | 410 | 710 | 610 | 990 | 890 | B90 | A90 | D90 | C90 | F90 | E90 |
| 1 4 | 910 | 810 | B10 | A10 | D10 | C10 | F10 | E10 | 190 | 090 | 390 | 290 | 590 | 490 | 790 | 690 |
| 0 5 | 550 | 450 | 750 | 650 | 150 | 050 | 350 | 250 | DD0 | CD0 | FD0 | ED0 | 9D0 | 8D0 | BD0 | AD0 |

TABLE 16-continued

| | PARTITION TABLE BCS = f(XYZ) FOR sm = 0 AM3011 | | | | | | | | | | | | | | | |
|---|---|---|---|---|---|---|---|---|---|---|---|---|---|---|---|---|
| ZY/X | 0 | 1 | 2 | 3 | 4 | 5 | 6 | 7 | 8 | 9 | A | B | C | D | E | F |
| 1 5 | D50 | C50 | F50 | E50 | 950 | 850 | B50 | A50 | 5D0 | 4D0 | 7D0 | 6D0 | 1D0 | 0D0 | 3D0 | 2D0 |
| 0 6 | 330 | 230 | 130 | 030 | 730 | 630 | 530 | 430 | BB0 | AB0 | 9B0 | 8B0 | FB0 | EB0 | DB0 | CB0 |
| 1 6 | B30 | A30 | 930 | 830 | F30 | E30 | D30 | C30 | 3B0 | 2B0 | 1B0 | 0B0 | 7B0 | 6B0 | 5B0 | 4B0 |
| 0 7 | 770 | 670 | 570 | 470 | 370 | 270 | 170 | 070 | FF0 | EF0 | DF0 | CF0 | BF0 | AF0 | 9F0 | 8F0 |
| 1 7 | F70 | E70 | D70 | C70 | B70 | A70 | 970 | 870 | 7F0 | 6F0 | 5F0 | 4F0 | 3F0 | 2F0 | 1F0 | 0F0 |
| 0 8 | 808 | 908 | A08 | B08 | C08 | D08 | E08 | F08 | 088 | 188 | 288 | 388 | 488 | 588 | 688 | 788 |
| 1 8 | 008 | 108 | 208 | 308 | 408 | 508 | 608 | 708 | 888 | 988 | A88 | B88 | C88 | D88 | E88 | F88 |
| 0 9 | C48 | D48 | E48 | F48 | 848 | 948 | A48 | B48 | 4C8 | 5C8 | 6C8 | 7C8 | 0C8 | 1C8 | 2C8 | 3C8 |
| 1 9 | 448 | 548 | 648 | 748 | 048 | 148 | 248 | 348 | CC8 | DC8 | EC8 | FC8 | 8C8 | 9C8 | AC8 | BC8 |
| 0 A | A28 | B28 | 828 | 928 | E28 | F28 | C28 | D28 | 2A8 | 3A8 | 0A8 | 1A8 | 6A8 | 7A8 | 4A8 | 5A8 |
| 1 A | 228 | 328 | 028 | 128 | 628 | 728 | 428 | 528 | AA8 | BA8 | 8A8 | 9A8 | EA8 | FA8 | CA8 | DA8 |
| 0 B | E68 | F68 | C68 | D68 | A68 | B68 | 868 | 968 | 6E8 | 7E8 | 4E8 | 5E8 | 2E8 | 3E8 | 0E8 | 1E8 |
| 1 B | 668 | 768 | 468 | 568 | 268 | 368 | 068 | 168 | EE8 | FE8 | CE8 | DE8 | AE8 | BE8 | 8E8 | 9E8 |
| 0 C | 918 | 818 | B18 | A18 | D1B | C18 | F18 | E18 | 198 | 098 | 398 | 298 | 598 | 498 | 798 | 698 |
| 1 C | 118 | 018 | 318 | 218 | 518 | 418 | 718 | 618 | 998 | 898 | B98 | A98 | D98 | C98 | F98 | E98 |
| 0 D | D58 | C58 | F58 | E58 | 958 | 858 | B58 | A58 | 5D8 | 4D8 | 7D8 | 6D8 | 1D8 | 0D8 | 3D8 | 2D8 |
| 1 D | 558 | 458 | 758 | 658 | 158 | 058 | 358 | 258 | DD8 | CD8 | FD8 | ED8 | 9D8 | 8D8 | BD8 | AD8 |
| 0 E | B38 | A38 | 938 | 838 | F38 | E38 | D38 | C38 | 3B8 | 2B8 | 1B8 | 0B8 | 7B8 | 6B8 | 5B8 | 4B8 |
| 1 E | 338 | 238 | 138 | 038 | 738 | 638 | 538 | 438 | BB8 | AB8 | 9B8 | 8B8 | FB8 | EB8 | DB8 | CB8 |
| 0 F | F78 | E78 | D78 | C78 | B78 | A78 | 978 | 878 | 7F8 | 6F8 | 5F8 | 4F8 | 3F8 | 2F8 | 1F8 | 0F8 |
| 1 F | 778 | 678 | 578 | 478 | 378 | 278 | 178 | 078 | FF8 | EF8 | DF8 | CF8 | BF8 | AF8 | 9F8 | 8F8 |

TABLE 17

| | PARTITION TABLE BCS = f(XYZ) FOR sm = 1 AM2111 | | | | | | | | | | | | | | | |
|---|---|---|---|---|---|---|---|---|---|---|---|---|---|---|---|---|
| ZY/X | 0 | 1 | 2 | 3 | 4 | 5 | 6 | 7 | 8 | 9 | A | B | C | D | E | F |
| 0 0 | 000 | 100 | 200 | 300 | 440 | 540 | 640 | 740 | 880 | 980 | A80 | B80 | CC0 | DC0 | EC0 | FC0 |
| 1 0 | 800 | 900 | A00 | B00 | C40 | D40 | E40 | F40 | 080 | 180 | 280 | 380 | 4C0 | 5C0 | 6C0 | 7C0 |
| 0 1 | 400 | 500 | 600 | 700 | 040 | 140 | 240 | 340 | C80 | D80 | E80 | F80 | 8C0 | 9C0 | AC0 | BC0 |
| 1 1 | C00 | D00 | E00 | F00 | 840 | 940 | A40 | B40 | 480 | 580 | 680 | 780 | 0C0 | 1C0 | 2C0 | 3C0 |
| 0 2 | 220 | 320 | 020 | 120 | 660 | 760 | 460 | 560 | AA0 | BA0 | 8A0 | 9A0 | EE0 | FE0 | CE0 | DE0 |
| 1 2 | A20 | B20 | 820 | 920 | E60 | F60 | C60 | D60 | 2A0 | 3A0 | 0A0 | 1A0 | 6E0 | 7E0 | 4E0 | 5E0 |
| 0 3 | 620 | 720 | 420 | 520 | 260 | 360 | 060 | 160 | EA0 | FA0 | CA0 | DA0 | AE0 | BE0 | 8E0 | 9E0 |
| 1 3 | E20 | F20 | C20 | D20 | A60 | B60 | 860 | 960 | 6A0 | 7A0 | 4A0 | 5A0 | 2E0 | 3E0 | 0E0 | 1E0 |
| 0 4 | 110 | 010 | 310 | 210 | 550 | 450 | 750 | 650 | 990 | 890 | B90 | A90 | DD0 | CD0 | FD0 | ED0 |
| 1 4 | 910 | 810 | B10 | A10 | D50 | C50 | F50 | E50 | 190 | 090 | 390 | 290 | 5D0 | 4D0 | 7D0 | 6D0 |
| 0 5 | 510 | 410 | 710 | 610 | 150 | 050 | 350 | 250 | D90 | C90 | F90 | E90 | 9D0 | 8D0 | BD0 | AD0 |
| 1 5 | D10 | C10 | F10 | E10 | 950 | 850 | B50 | A50 | 590 | 490 | 790 | 690 | 1D0 | 0D0 | 3D0 | 2D0 |
| 0 6 | 330 | 230 | 130 | 030 | 770 | 670 | 570 | 470 | BB0 | AB0 | 9B0 | 8B0 | FF0 | EF0 | DF0 | CF0 |
| 1 6 | B30 | A30 | 930 | 830 | F70 | E70 | D70 | C70 | 3B0 | 2B0 | 1B0 | 0B0 | 7F0 | 6F0 | 5F0 | 4F0 |
| 0 7 | 730 | 630 | 530 | 430 | 370 | 270 | 170 | 070 | FB0 | EB0 | DB0 | CB0 | BF0 | AF0 | 9F0 | 8F0 |
| 1 7 | F30 | E30 | D30 | C30 | B70 | A70 | 970 | 870 | 7B0 | 6B0 | 5B0 | 4B0 | 3F0 | 2F0 | 1F0 | 0F0 |
| 0 8 | 808 | 908 | A08 | B08 | C48 | D48 | E48 | F48 | 088 | 188 | 288 | 388 | 4C8 | 5C8 | 6C8 | 7C8 |
| 1 8 | 008 | 108 | 208 | 308 | 448 | 548 | 648 | 748 | 888 | 988 | A88 | B88 | CC8 | DC8 | EC8 | FC8 |
| 0 9 | C08 | D08 | E08 | F08 | 848 | 948 | A48 | B48 | 488 | 588 | 688 | 788 | 0C8 | 1C8 | 2C8 | 3C8 |
| 1 9 | 408 | 508 | 608 | 708 | 048 | 148 | 248 | 348 | C88 | D88 | E88 | F88 | 8C8 | 9C8 | AC8 | BC8 |
| 0 A | A28 | B28 | 828 | 928 | E68 | F68 | C68 | D68 | 2A8 | 3A8 | 0A8 | 1A8 | 6E8 | 7E8 | 4E8 | 5E8 |
| 1 A | 228 | 328 | 028 | 128 | 668 | 768 | 468 | 568 | AA8 | BA8 | 8A8 | 9A8 | EE8 | FE8 | CE8 | DE8 |
| 0 B | E28 | F28 | C28 | D28 | A68 | B68 | 868 | 968 | 6A8 | 7A8 | 4A8 | 5A8 | 2E8 | 3E8 | 0E8 | 1E8 |
| 1 B | 628 | 728 | 428 | 528 | 268 | 368 | 068 | 168 | EA8 | FA8 | CA8 | DA8 | AE8 | BE8 | 8E8 | 9E8 |
| 0 C | 918 | 818 | B18 | A18 | D58 | C58 | F58 | E58 | 198 | 098 | 398 | 298 | 5D8 | 4D8 | 7D8 | 6D8 |
| 1 C | 118 | 018 | 318 | 218 | 558 | 458 | 758 | 658 | 998 | 898 | B98 | A98 | DD8 | CD8 | FD8 | ED8 |
| 0 D | D18 | C18 | F18 | E18 | 958 | 858 | B58 | A58 | 598 | 498 | 798 | 698 | 1D8 | 0D8 | 3D8 | 2D8 |
| 1 D | 518 | 418 | 718 | 618 | 158 | 058 | 358 | 258 | D98 | C98 | F98 | E98 | 9D8 | 8D8 | BD8 | AD8 |
| 0 E | B38 | A38 | 938 | 838 | F78 | E78 | D78 | C78 | 3B8 | 2B8 | 1B8 | 0B8 | 7F8 | 6F8 | 5F8 | 4F8 |
| 1 E | 338 | 238 | 138 | 038 | 778 | 678 | 578 | 478 | BB8 | AB8 | 9B8 | 8B8 | FF8 | EF8 | DF8 | CF8 |
| 0 F | F38 | E38 | D38 | C38 | B78 | A78 | 978 | 878 | 7B8 | 6B8 | 5B8 | 4B8 | 3F8 | 2F8 | 1F8 | 0F8 |
| 1 F | 738 | 638 | 538 | 438 | 378 | 278 | 178 | 078 | FB8 | EB8 | DB8 | CB8 | BF8 | AF8 | 9F8 | 8F8 |

TABLE 18

| | PARTITION TABLE BCS = f(XYZ) FOR sm = 1 AM1211 | | | | | | | | | | | | | | | |
|---|---|---|---|---|---|---|---|---|---|---|---|---|---|---|---|---|
| ZY/X | 0 | 1 | 2 | 3 | 4 | 5 | 6 | 7 | 8 | 9 | A | B | C | D | E | F |
| 0 0 | 000 | 100 | 220 | 320 | 440 | 540 | 660 | 760 | 880 | 980 | AA0 | BA0 | CC0 | DC0 | EE0 | FE0 |
| 1 0 | 800 | 900 | A20 | B20 | C40 | D40 | E60 | F60 | 080 | 180 | 2A0 | 3A0 | 4C0 | 5C0 | 6E0 | 7E0 |
| 0 1 | 400 | 500 | 620 | 720 | 040 | 140 | 260 | 360 | C80 | D80 | EA0 | FA0 | 8C0 | 9C0 | AE0 | BE0 |
| 1 1 | C00 | D00 | E20 | F20 | 840 | 940 | A60 | B60 | 480 | 580 | 6A0 | 7A0 | 0C0 | 1C0 | 2E0 | 3E0 |
| 0 2 | 200 | 300 | 020 | 120 | 640 | 740 | 460 | 560 | A80 | B80 | 8A0 | 9A0 | EC0 | FC0 | CE0 | DE0 |
| 1 2 | A00 | B00 | 820 | 920 | E40 | F40 | C60 | D60 | 280 | 380 | 0A0 | 1A0 | 6C0 | 7C0 | 4E0 | 5E0 |
| 0 3 | 600 | 700 | 420 | 520 | 240 | 340 | 060 | 160 | E80 | F80 | CA0 | DA0 | AC0 | BC0 | 8E0 | 9E0 |
| 1 3 | E00 | F00 | C20 | D20 | A40 | B40 | 860 | 960 | 680 | 780 | 4A0 | 5A0 | 2C0 | 3C0 | 0E0 | 1E0 |
| 0 4 | 110 | 010 | 330 | 230 | 550 | 450 | 770 | 670 | 990 | 890 | BB0 | AB0 | DD0 | CD0 | FF0 | EF0 |
| 1 4 | 910 | 810 | B30 | A30 | D50 | C50 | F70 | E70 | 190 | 090 | 3B0 | 2B0 | 5D0 | 4D0 | 7F0 | 6F0 |
| 0 5 | 510 | 410 | 730 | 630 | 150 | 050 | 370 | 270 | D90 | C90 | FB0 | EB0 | 9D0 | 8D0 | BF0 | AF0 |
| 1 5 | D10 | C10 | F30 | E30 | 950 | 850 | B70 | A70 | 590 | 490 | 7B0 | 6B0 | 1D0 | 0D0 | 3F0 | 2F0 |
| 0 6 | 310 | 210 | 130 | 030 | 750 | 650 | 570 | 470 | B90 | A90 | 9B0 | 8B0 | FD0 | ED0 | DF0 | CF0 |

TABLE 18-continued

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | PARTITION TABLE BCS = f(XYZ) FOR sm = 1 AM1211 | | | | | | | | | | | | | | | |
| 1 6 | B10 | A10 | 930 | 830 | F50 | E50 | D70 | C70 | 390 | 290 | 1B0 | 0B0 | 7D0 | 6D0 | 5F0 | 4F0 |
| 0 7 | 710 | 610 | 530 | 430 | 350 | 250 | 170 | 070 | F90 | E90 | DB0 | CB0 | BD0 | AD0 | 9F0 | 8F0 |
| 1 7 | F10 | E10 | D30 | C30 | B50 | A50 | 970 | 870 | 790 | 690 | 5B0 | 4B0 | 3D0 | 2D0 | 1F0 | 0F0 |
| 0 8 | 808 | 908 | A28 | B28 | C48 | D48 | E68 | F68 | 088 | 188 | 2A8 | 3A8 | 4C8 | 5C8 | 6E8 | 7E8 |
| 1 8 | 008 | 108 | 228 | 328 | 448 | 548 | 668 | 768 | 888 | 988 | AA8 | BA8 | CC8 | DC8 | EE8 | FE8 |
| 0 9 | C08 | D08 | E28 | F28 | 848 | 948 | A68 | B68 | 488 | 588 | 6A8 | 7A8 | 0C8 | 1C8 | 2E8 | 3E8 |
| 1 9 | 408 | 508 | 628 | 728 | 048 | 148 | 268 | 368 | C88 | D88 | EA8 | FA8 | 8C8 | 9C8 | AE8 | BE8 |
| 0 A | A0B | B08 | 828 | 928 | E48 | F48 | C68 | D68 | 288 | 388 | 0A8 | 1A8 | 6C8 | 7C8 | 4E8 | 5E8 |
| 1 A | 208 | 308 | 028 | 128 | 648 | 748 | 468 | 568 | A88 | B88 | 8A8 | 9A8 | EC8 | FC8 | CE8 | DE8 |
| 0 B | E08 | F08 | C28 | D28 | A48 | B48 | 868 | 968 | 688 | 788 | 4A8 | 5A8 | 2C8 | 3C8 | 0E8 | 1E8 |
| 1 B | 608 | 708 | 428 | 528 | 248 | 348 | 068 | 168 | E88 | F88 | CA8 | DA8 | AC8 | BC8 | 8E8 | 9E8 |
| 0 C | 918 | 818 | B38 | A38 | D58 | C58 | F78 | E78 | 198 | 098 | 3B8 | 2B8 | 5D8 | 4D8 | 7F8 | 6F8 |
| 1 C | 118 | 018 | 338 | 238 | 558 | 458 | 778 | 678 | 998 | 898 | BB8 | AB8 | DD8 | CD8 | FF8 | EF8 |
| 0 D | D18 | C18 | F38 | E38 | 958 | 858 | B78 | A78 | 598 | 498 | 7B8 | 6B8 | 1D8 | 0D8 | 3F8 | 2F8 |
| 1 D | 518 | 418 | 738 | 638 | 158 | 058 | 378 | 278 | D98 | C98 | FB8 | EB8 | 9D8 | 8D8 | BF8 | AF8 |
| 0 E | B18 | A18 | 938 | 838 | F58 | E58 | D78 | C78 | 398 | 298 | 1B8 | 0B8 | 7D8 | 6D8 | 5F8 | 4F8 |
| 1 E | 318 | 218 | 138 | 038 | 758 | 658 | 578 | 478 | B98 | A98 | 9B8 | 8B8 | FD8 | ED8 | DF8 | CF8 |
| 0 F | F18 | E18 | D38 | C38 | B58 | A58 | 978 | 878 | 798 | 698 | 5B8 | 4B8 | 3D8 | 2D8 | 1F8 | 0F8 |
| 1 F | 718 | 618 | 538 | 438 | 358 | 258 | 178 | 078 | F98 | E98 | DB8 | CB8 | BD8 | AD8 | 9F8 | 8F8 |

TABLE 19

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | PARTITION TABLE BCS = f(XYZ) F0R sm = 1 AM0311 | | | | | | | | | | | | | | | |
| 0 0 | 000 | 110 | 220 | 330 | 440 | 550 | 660 | 770 | 880 | 990 | AA0 | BB0 | CC0 | DD0 | EE0 | FF0 |
| 1 0 | 800 | 910 | A20 | B30 | C40 | D50 | E60 | F70 | 080 | 190 | 2A0 | 3B0 | 4C0 | 5D0 | 6E0 | 7F0 |
| 0 1 | 400 | 510 | 620 | 730 | 040 | 150 | 260 | 370 | C80 | D90 | EA0 | FB0 | 8C0 | 9D0 | AE0 | BF0 |
| 1 1 | C00 | D10 | E20 | F30 | 840 | 950 | A60 | B70 | 480 | 590 | 6A0 | 7B0 | 0C0 | 1D0 | 2E0 | 3F0 |
| 0 2 | 200 | 310 | 020 | 130 | 640 | 750 | 460 | 570 | A80 | B90 | 8A0 | 9B0 | EC0 | FD0 | CE0 | DF0 |
| 1 2 | A00 | B10 | 820 | 930 | E40 | F50 | C60 | D70 | 280 | 390 | 0A0 | 1B0 | 6C0 | 7D0 | 4E0 | 5F0 |
| 0 3 | 600 | 710 | 420 | 530 | 240 | 350 | 060 | 170 | E80 | F90 | CAO | DB0 | AC0 | BD0 | 8E0 | 9F0 |
| 1 3 | E00 | F10 | C20 | D30 | A40 | B50 | 860 | 970 | 680 | 790 | 4A0 | 5B0 | 2C0 | 3D0 | 0E0 | 1F0 |
| 0 4 | 100 | 010 | 320 | 230 | 540 | 450 | 760 | 670 | 980 | 890 | BA0 | AB0 | DC0 | CD0 | FE0 | EF0 |
| 1 4 | 900 | 810 | B20 | A30 | D40 | C50 | F60 | E70 | 180 | 090 | 3A0 | 2B0 | 5C0 | 4D0 | 7E0 | 6F0 |
| 0 5 | 500 | 410 | 720 | 630 | 140 | 050 | 360 | 270 | D80 | C90 | FA0 | EB0 | 9C0 | 8D0 | BE0 | AF0 |
| 1 5 | D00 | C10 | F20 | E30 | 940 | 850 | B60 | A70 | 580 | 490 | 7A0 | 6B0 | 1C0 | 0D0 | 3E0 | 2F0 |
| 0 6 | 300 | 210 | 120 | 030 | 740 | 650 | 560 | 470 | B80 | A90 | 9A0 | 8B0 | FC0 | ED0 | DE0 | CF0 |
| 1 6 | B00 | A10 | 920 | 830 | F40 | E50 | D60 | C70 | 380 | 290 | 1A0 | 0B0 | 7C0 | 6D0 | 5E0 | 4F0 |
| 0 7 | 700 | 610 | 520 | 430 | 340 | 250 | 160 | 070 | F80 | E90 | DA0 | CB0 | BC0 | AD0 | 9E0 | 8F0 |
| 1 7 | F00 | E10 | D20 | C30 | B40 | A50 | 960 | 870 | 780 | 690 | 5A0 | 4B0 | 3C0 | 2D0 | 1E0 | 0F0 |
| 0 8 | 808 | 918 | A28 | B38 | C48 | D58 | E68 | F78 | 088 | 198 | 2A8 | 3B8 | 4C8 | 5D8 | 6E8 | 7F8 |
| 1 8 | 008 | 118 | 228 | 338 | 448 | 558 | 668 | 778 | 888 | 998 | AA8 | BB8 | CC8 | DD8 | EE8 | FF8 |
| 0 9 | C08 | D18 | E28 | F38 | 848 | 958 | A68 | B78 | 488 | 598 | 6A8 | 7B8 | 0C8 | 1D8 | 2E8 | 3F8 |
| 1 9 | 408 | 518 | 628 | 738 | 048 | 158 | 268 | 378 | C88 | D98 | EA8 | FB8 | 8C8 | 9D8 | AE8 | BF8 |
| 0 A | A08 | B18 | 828 | 938 | E48 | F58 | C68 | D78 | 288 | 398 | 0A8 | 1B8 | 6C8 | 7D8 | 4E8 | 5F8 |
| 1 A | 208 | 318 | 028 | 138 | 648 | 758 | 468 | 578 | A88 | B98 | 8A8 | 9B8 | EC8 | FD8 | CE8 | DF8 |
| 0 B | E08 | F18 | C28 | D38 | A48 | B58 | 868 | 978 | 688 | 798 | 4A8 | 5B8 | 2C8 | 3D8 | 0E8 | 1F8 |
| 1 B | 608 | 718 | 428 | 538 | 248 | 358 | 068 | 178 | E88 | F98 | CA8 | DB8 | AC8 | BD8 | 8E8 | 9F8 |
| 0 C | 908 | 818 | B28 | A38 | D48 | C58 | F68 | E78 | 188 | 098 | 3A8 | 2B8 | 5C8 | 4D8 | 7E8 | 6F8 |
| 1 C | 108 | 018 | 328 | 238 | 548 | 458 | 768 | 678 | 988 | 898 | BA8 | AB8 | DC8 | CD8 | FE8 | EF8 |
| 0 D | D08 | C18 | F28 | E38 | 948 | 858 | B68 | A78 | 588 | 498 | 7A8 | 6B8 | 1C8 | 0D8 | 3E8 | 2F8 |
| 1 D | 508 | 418 | 728 | 638 | 148 | 058 | 368 | 278 | D88 | C98 | FA8 | EB8 | 9C8 | 8D8 | BE8 | AF8 |
| 0 E | B08 | A18 | 928 | 838 | F48 | E58 | D68 | C78 | 388 | 298 | 1A8 | 0B8 | 7C8 | 6D8 | 5E8 | 4F8 |
| 1 E | 308 | 218 | 128 | 038 | 748 | 658 | 568 | 478 | B88 | A98 | 9A8 | 8B8 | FC8 | EDB | DE8 | CF8 |
| 0 F | F08 | E18 | D28 | C38 | B48 | A58 | 968 | 878 | 788 | 698 | 5A8 | 4B8 | 3C8 | 2D8 | 1E8 | 0F8 |
| 1 F | 708 | 618 | 528 | 438 | 348 | 258 | 168 | O78 | F88 | E98 | DA8 | CB8 | BC8 | AD8 | 9E8 | 8F8 |

TABLE 20

| ZY/X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | PARTITION TABLE BCS = f(XYZ) F0R sm = 2 AM4002 | | | | | | | | | | | | | | | |
| 0 0 | 000 | 100 | 200 | 300 | 400 | 500 | 600 | 700 | 800 | 900 | A00 | B00 | C00 | D00 | E00 | F00 |
| 1 0 | 808 | 908 | A08 | B08 | C08 | D08 | E08 | F08 | 008 | 108 | 208 | 308 | 408 | 508 | 608 | 708 |
| 2 0 | 404 | 504 | 604 | 704 | 004 | 104 | 204 | 304 | C04 | D04 | E04 | F04 | 804 | 904 | A04 | B04 |
| 3 0 | C0C | D0C | E0C | F0C | 80C | 90C | A0C | B0C | 40C | 50C | 60C | 70C | 00C | 10C | 20C | 30C |
| 0 1 | 220 | 320 | 020 | 120 | 620 | 720 | 420 | 520 | A20 | B20 | 820 | 920 | E20 | F20 | C20 | D20 |
| 1 1 | A28 | B28 | 828 | 928 | E28 | F28 | C28 | D28 | 228 | 328 | 028 | 128 | 628 | 728 | 428 | 528 |
| 2 1 | 624 | 724 | 424 | 524 | 224 | 324 | 024 | 124 | E24 | F24 | C24 | D24 | A24 | B24 | 824 | 924 |
| 3 1 | E2C | F2C | C2C | D2C | A2C | B2C | 82C | 92C | 62C | 72C | 42C | 52C | 22C | 32C | 02C | 12C |
| 0 2 | 110 | 010 | 310 | 210 | 510 | 410 | 710 | 610 | 910 | 810 | B10 | A10 | D10 | C10 | F10 | E10 |
| 1 2 | 918 | 818 | B18 | A18 | D18 | C18 | F18 | E18 | 118 | 018 | 318 | 218 | 518 | 418 | 718 | 618 |
| 2 2 | 514 | 414 | 714 | 614 | 114 | 014 | 314 | 214 | D14 | C14 | F14 | E14 | 914 | 814 | B14 | A14 |
| 3 2 | D1C | C1C | F1C | E1C | 91C | 81C | B1C | A1C | 51C | 41C | 71C | 61C | 11C | 01C | 31C | 21C |
| 0 3 | 330 | 230 | 130 | 030 | 730 | 630 | 530 | 430 | B30 | A30 | 930 | 830 | F30 | E30 | D30 | C30 |
| 1 3 | B38 | A38 | 938 | 838 | F38 | E38 | D38 | C38 | 338 | 238 | 138 | 038 | 738 | 638 | 538 | 438 |
| 2 3 | 734 | 634 | 534 | 434 | 334 | 234 | 134 | 034 | F34 | E34 | D34 | C34 | B34 | A34 | 934 | 834 |

TABLE 20-continued

| | | | | | | | | | | | | | | | | |
|---|---|---|---|---|---|---|---|---|---|---|---|---|---|---|---|---|
| 3 3 | F3C | E3C | D3C | C3C | B3C | A3C | 93C | 83C | 73C | 63C | 53C | 43C | 33C | 23C | 13C | 03C |
| 0 4 | 880 | 980 | A80 | B80 | C80 | D80 | E80 | F80 | 080 | 180 | 280 | 380 | 480 | 580 | 680 | 780 |
| 1 4 | 088 | 188 | 288 | 388 | 488 | 588 | 688 | 788 | 888 | 988 | A88 | B88 | C88 | D88 | E88 | F88 |
| 2 4 | C84 | D84 | E84 | F84 | 884 | 984 | A84 | B84 | 484 | 584 | 684 | 784 | 084 | 184 | 284 | 384 |
| 3 4 | 48C | 58C | 68C | 78C | 08C | 18C | 28C | 38C | C8C | D8C | E8C | F8C | 88C | 98C | A8C | B8C |
| 0 5 | AA0 | BA0 | 8A0 | 9A0 | EA0 | FA0 | CA0 | DA0 | 2A0 | 3A0 | 0A0 | 1A0 | 6A0 | 7A0 | 4A0 | 5A0 |
| 1 5 | 2A8 | 3A8 | 0A8 | 1A8 | 6A8 | 7A8 | 4A8 | 5A8 | AA8 | BA8 | 8A8 | 9A8 | EA8 | FA8 | CA8 | DA8 |
| 2 5 | EA4 | FA4 | CA4 | DA4 | AA4 | BA4 | 8A4 | 9A4 | 6A4 | 7A4 | 4A4 | 5A4 | 2A4 | 3A4 | 0A4 | 1A4 |
| 3 5 | 6AC | 7AC | 4AC | 5AC | 2AC | 3AC | 0AC | 1AC | EAC | FAC | CAC | DAC | AAC | BAC | 8AC | 9AC |
| 0 6 | 990 | 890 | B90 | A90 | D90 | C90 | F90 | E90 | 190 | 090 | 390 | 290 | 590 | 490 | 790 | 690 |
| 1 6 | 198 | 098 | 398 | 298 | 598 | 498 | 798 | 698 | 998 | 898 | B98 | A98 | D98 | C98 | F98 | E98 |
| 2 6 | D94 | C94 | F94 | E94 | 994 | 894 | B94 | A94 | 594 | 494 | 794 | 694 | 194 | 094 | 394 | 294 |
| 3 6 | 59C | 49C | 79C | 69C | 19C | 09C | 39C | 29C | D9C | C9C | F9C | E9C | 99C | 89C | B9C | A9C |
| 0 7 | BB0 | AB0 | 9B0 | 8B0 | FB0 | EB0 | DB0 | CB0 | 3B0 | 2B0 | 1B0 | 0B0 | 7B0 | 6B0 | 5B0 | 4B0 |
| 1 7 | 3B8 | 2B8 | 1B8 | 0B8 | 7B8 | 6B8 | 5B8 | 4B8 | BB8 | AB8 | 9B8 | 8B8 | FB8 | EB8 | DB8 | CB8 |
| 2 7 | FB4 | EB4 | DB4 | CB4 | BB4 | AB4 | 9B4 | 8B4 | 7B4 | 6B4 | 5B4 | 4B4 | 3B4 | 2B4 | 1B4 | 0B4 |
| 3 7 | 7BC | 6BC | 5BC | 4BC | 3BC | 2BC | 1BC | 0BC | FBC | EBC | DBC | CBC | BBC | ABC | 9BC | 8BC |
| 0 8 | 440 | 540 | 640 | 740 | 040 | 140 | 240 | 340 | C40 | D40 | E40 | F40 | 840 | 940 | A40 | B40 |
| 1 8 | C48 | D48 | E48 | F48 | 848 | 948 | A48 | B48 | 448 | 548 | 648 | 748 | 048 | 148 | 248 | 348 |
| 2 8 | 044 | 144 | 244 | 344 | 444 | 544 | 644 | 744 | 844 | 944 | A44 | B44 | C44 | D44 | E44 | F44 |
| 3 8 | 84C | 94C | A4C | B4C | C4C | D4C | E4C | F4C | 04C | 14C | 24C | 34C | 44C | 54C | 64C | 74C |
| 0 9 | 660 | 760 | 460 | 560 | 260 | 360 | 060 | 160 | E60 | F60 | C60 | D60 | A60 | B60 | 860 | 960 |
| 1 9 | E68 | F68 | C68 | D68 | A68 | B68 | 868 | 968 | 668 | 768 | 468 | 568 | 268 | 368 | 068 | 168 |
| 2 9 | 264 | 364 | 064 | 164 | 664 | 764 | 464 | 564 | A64 | B64 | 864 | 964 | E64 | F64 | C64 | D64 |
| 3 9 | A6C | B6C | 86C | 96C | E6C | F6C | C6C | D6C | 26C | 36C | 06C | 16C | 66C | 76C | 46C | 56C |
| 0 A | 550 | 450 | 750 | 650 | 150 | 050 | 350 | 250 | D50 | C50 | F50 | E50 | 950 | 850 | B50 | A50 |
| 1 A | D58 | C58 | F58 | E58 | 958 | 858 | B58 | A58 | 558 | 458 | 758 | 658 | 158 | 058 | 558 | 258 |
| 2 A | 154 | 054 | 354 | 254 | 554 | 454 | 754 | 654 | 954 | 854 | B54 | A54 | D54 | C54 | F54 | E54 |
| 3 A | 95C | 85C | B5C | A5C | D5C | C5C | F5C | E5C | 15C | 05C | 35C | 25C | 55C | 45C | 75C | 65C |
| 0 B | 770 | 670 | 570 | 470 | 370 | 270 | 170 | 070 | F70 | E70 | D70 | C70 | B70 | A70 | 970 | 870 |
| 1 B | F78 | E78 | D78 | C78 | B78 | A78 | 978 | 878 | 778 | 678 | 578 | 478 | 378 | 278 | 178 | 078 |
| 2 B | 374 | 274 | 174 | 074 | 774 | 674 | 574 | 474 | B74 | A74 | 974 | 874 | F74 | E74 | D74 | C74 |
| 3 B | B7C | A7C | 97C | 87C | F7C | E7C | D7C | C7C | 37C | 27C | 17C | 07C | 77C | 67C | 57C | 47C |
| 0 C | CC0 | DC0 | EC0 | FC0 | 8C0 | 9C0 | AC0 | BC0 | 4C0 | 5C0 | 6C0 | 7C0 | 0C0 | 1C0 | 2C0 | 3C0 |
| 1 C | 4C8 | 5C8 | 6C8 | 7C8 | 0C8 | 1C8 | 2C8 | 3C8 | CC8 | DC8 | EC8 | FC8 | 8C8 | 9C8 | AC8 | BC8 |
| 2 C | 8C4 | 9C4 | AC4 | BC4 | CC4 | DC4 | EC4 | FC4 | 0C4 | 1C4 | 2C4 | 3C4 | 4C4 | 5C4 | 6C4 | 7C4 |
| 3 C | 0CC | 1CC | 2CC | 3CC | 4CC | 5CC | 6CC | 7CC | 8CC | 9CC | ACC | BCC | CCC | DCC | ECC | FCC |
| 0 D | EE0 | FE0 | CE0 | DE0 | AE0 | BE0 | 8E0 | 9E0 | 6E0 | 7E0 | 4E0 | 5E0 | 2E0 | 3E0 | 0E0 | 1E0 |
| 1 D | 6E8 | 7E8 | 4E8 | 5E8 | 2E8 | 3E8 | 0E8 | 1E8 | EE8 | FE8 | CE8 | DE8 | AE8 | BE8 | 8E8 | 9E8 |
| 2 D | AE4 | BE4 | 8E4 | 9E4 | EE4 | FE4 | CE4 | DE4 | 2E4 | 3E4 | 0E4 | 1E4 | 6E4 | 7E4 | 4E4 | 5E4 |
| 3 D | 2EC | 3EC | 0EC | 1EC | 6EC | 7EC | 4EC | 5EC | AEC | BEC | 8EC | 9EC | EEC | FEC | CEC | DEC |
| 0 E | DD0 | CD0 | FD0 | ED0 | 9D0 | 8D0 | BD0 | AD0 | 5D0 | 4D0 | 7D0 | 6D0 | 1D0 | 0D0 | 3D0 | 2D0 |
| 1 E | 5D8 | 4D8 | 7D8 | 6D8 | 1D8 | 0D8 | 3D8 | 2D8 | DD8 | CD8 | FD8 | ED8 | 9D8 | 8D8 | BD8 | AD8 |
| 2 E | 9D4 | 8D4 | BD4 | AD4 | DD4 | CD4 | FD4 | ED4 | 1D4 | 0D4 | 3D4 | 2D4 | 5D4 | 4D4 | 7D4 | 6D4 |
| 3 E | 1DC | 0DC | 3DC | 2DC | 5DC | 4DC | 7DC | 6DC | 9DC | 8DC | BDC | ADC | DDC | CDC | FDC | EDC |
| 0 F | FF0 | EF0 | DF0 | CF0 | BF0 | AF0 | 9F0 | 8F0 | 7F0 | 6F0 | 5F0 | 4F0 | 3F0 | 2F0 | 1F0 | 0F0 |
| 1 F | 7F8 | 6F8 | 5F8 | 4F8 | 3F8 | 2F8 | 1F8 | 0F8 | FF8 | EF8 | DF8 | CF8 | BF8 | AF8 | 9F8 | 8F8 |
| 2 F | BF4 | AF4 | 9F4 | BF4 | FF4 | EF4 | DF4 | CF4 | 3F4 | 2F4 | 1F4 | 0F4 | 7F4 | 6F4 | 5F4 | 4F4 |
| 3 F | 3FC | 2FC | 1FC | 0FC | 7FC | 6FC | 5FC | 4FC | BFC | AFC | 9FC | 8FC | FFC | EFC | DFC | CFC |

TABLE 21

PARTITION TABLE BCS = f(XYZ) FOR sm = 2 AM3012

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | | Sheet 1 | | | | | | | | |
| 0 0 | 000 | 100 | 200 | 300 | 400 | 500 | 600 | 700 | 880 | 980 | A80 | B80 | C80 | D80 | E80 | F80 |
| 1 0 | 800 | 900 | A00 | B00 | C00 | D00 | E00 | F00 | 080 | 180 | 280 | 380 | 480 | 580 | 680 | 780 |
| 2 0 | 404 | 504 | 604 | 704 | 004 | 104 | 204 | 304 | C84 | D84 | E84 | F84 | 884 | 984 | A84 | B84 |
| 3 0 | C04 | D04 | E04 | F04 | 804 | 904 | A04 | B04 | 484 | 584 | 684 | 784 | 084 | 184 | 284 | 384 |
| 0 1 | 220 | 320 | 020 | 120 | 620 | 720 | 420 | 520 | AA0 | BA0 | 8A0 | 9A0 | EA0 | FA0 | CA0 | DA0 |
| 1 1 | A20 | B20 | 820 | 920 | E20 | F20 | C20 | D20 | 2A0 | 3A0 | 0A0 | 1A0 | 6A0 | 7A0 | 4A0 | 5A0 |
| 2 1 | 624 | 724 | 424 | 524 | 224 | 324 | 024 | 124 | EA4 | FA4 | CA4 | DA4 | AA4 | BA4 | 8A4 | 9A4 |
| 3 1 | E24 | F24 | C24 | D24 | A24 | B24 | 824 | 924 | 6A4 | 7A4 | 4A4 | 5A4 | 2A4 | 3A4 | 0A4 | 1A4 |
| 0 2 | 110 | 010 | 310 | 210 | 510 | 410 | 710 | 610 | 990 | 890 | B90 | A90 | D90 | C90 | F90 | E90 |
| 1 2 | 910 | 810 | B10 | A10 | D10 | C10 | F10 | E10 | 190 | 090 | 390 | 290 | 590 | 490 | 790 | 690 |
| 2 2 | 514 | 414 | 714 | 614 | 114 | 014 | 314 | 214 | D94 | C94 | F94 | E94 | 994 | 894 | B94 | A94 |
| 3 2 | D14 | C14 | F14 | E14 | 914 | 814 | B14 | A14 | 594 | 494 | 794 | 694 | 194 | 094 | 394 | 294 |
| 0 3 | 330 | 230 | 130 | 030 | 730 | 630 | 530 | 430 | BB0 | AB0 | 9B0 | 8B0 | FB0 | EB0 | DB0 | CB0 |
| 1 3 | B30 | A30 | 930 | 830 | F30 | E30 | D30 | C30 | 3B0 | 2B0 | 1B0 | 0B0 | 7B0 | 6B0 | 5B0 | 4B0 |
| 2 3 | 734 | 634 | 534 | 434 | 334 | 234 | 134 | 034 | FB4 | EB4 | DB4 | CB4 | BB4 | AB4 | 9B4 | 8B4 |
| 3 3 | F34 | E34 | D34 | C34 | B34 | A34 | 934 | 834 | 7B4 | 6B4 | 5B4 | 4B4 | 3B4 | 2B4 | 1B4 | 0B4 |
| 0 4 | 808 | 908 | A08 | B08 | C08 | D08 | E08 | F08 | 088 | 188 | 288 | 388 | 488 | 588 | 688 | 788 |
| 1 4 | 008 | 108 | 208 | 308 | 408 | 508 | 608 | 708 | 888 | 988 | A88 | B88 | C88 | D88 | E88 | F88 |
| 2 4 | C0C | D0C | E0C | F0C | 80C | 90C | A0C | B0C | 48C | 58C | 68C | 78C | 08C | 18C | 28C | 38C |
| 3 4 | 40C | 50C | 60C | 70C | 00C | 10C | 20C | 30C | C8C | D8C | E8C | F8C | 88C | 98C | A8C | B8C |
| 0 5 | A28 | B28 | 828 | 928 | E28 | F28 | C28 | D28 | 2A8 | 3A8 | 0A8 | 1A8 | 6A8 | 7A8 | 4A8 | 5A8 |
| 1 5 | 228 | 328 | 028 | 128 | 628 | 728 | 428 | 528 | AA8 | BA8 | 8A8 | 9A8 | EA8 | FA8 | CA8 | DA8 |
| 2 5 | E2C | F2C | C2C | D2C | A2C | B2C | 82C | 92C | 6AC | 7AC | 4AC | 5AC | 2AC | 3AC | 0AC | 1AC |
| 3 5 | 62C | 72C | 42C | 52C | 22C | 32C | 02C | 12C | EAC | FAC | CAC | DAC | AAC | BAC | 8AC | 9AC |
| 0 6 | 918 | 818 | B18 | A18 | D18 | C18 | F18 | E18 | 198 | 098 | 398 | 298 | 598 | 498 | 798 | 698 |
| 1 6 | 118 | 018 | 318 | 218 | 518 | 418 | 718 | 618 | 998 | 898 | B98 | A98 | D98 | C98 | F98 | E98 |

TABLE 21-continued

PARTITION TABLE BCS = f(XYZ) FOR sm = 2 AM3012

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 2 6 | D1C | C1C | F1C | E1C | 91C | 81C | B1C | A1C | 59C | 49C | 79C | 69C | 19C | 09C | 39C | 29C |
| 3 6 | 51C | 41C | 71C | 61C | 11C | 01C | 31C | 21C | D9C | C9C | F9C | E9C | 99C | 89C | B9C | A9C |
| 0 7 | B38 | A38 | 938 | 838 | F38 | E38 | D38 | C38 | 3B8 | 2B8 | 1B8 | 0B8 | 7B8 | 6B8 | 5B8 | 4B8 |
| 1 7 | 338 | 238 | 138 | 038 | 738 | 638 | 538 | 438 | BB8 | AB8 | 9B8 | 8B8 | FB8 | EB8 | DB8 | CB8 |
| 2 7 | F3C | E3C | D3C | C3C | B3C | A3C | 93C | 83C | 7BC | 6BC | 5BC | 4BC | 3BC | 2BC | 1BC | 0BC |
| 3 7 | 73C | 63C | 53C | 43C | 33C | 23C | 13C | 03C | FBC | EBC | DBC | CBC | BBC | ABC | 9BC | 8BC |
| | | | | | | | | Sheet 2 | | | | | | | | |
| 0 8 | 440 | 540 | 640 | 740 | 040 | 140 | 240 | 340 | CC0 | DC0 | EC0 | FC0 | 8C0 | 9C0 | AC0 | BC0 |
| 1 8 | C40 | D40 | E40 | F40 | 840 | 940 | A40 | B40 | 4C0 | 5C0 | 6C0 | 7C0 | 0C0 | 1C0 | 2C0 | 3C0 |
| 2 8 | 044 | 144 | 244 | 344 | 444 | 544 | 644 | 744 | 8C4 | 9C4 | AC4 | BC4 | CC4 | DC4 | EC4 | FC4 |
| 3 8 | 844 | 944 | A44 | B44 | C44 | D44 | E44 | F44 | 0C4 | 1C4 | 2C4 | 3C4 | 4C4 | 5C4 | 6C4 | 7C4 |
| 0 9 | 660 | 760 | 460 | 560 | 260 | 360 | 060 | 160 | EE0 | FE0 | CE0 | DE0 | AE0 | BE0 | 8E0 | 9E0 |
| 1 9 | E60 | F60 | C60 | D60 | A60 | B60 | 860 | 960 | 6E0 | 7E0 | 4E0 | 5E0 | 2E0 | 3E0 | 0E0 | 1E0 |
| 2 9 | 264 | 364 | 064 | 164 | 664 | 764 | 464 | 564 | AE4 | BE4 | 8E4 | 9E4 | EE4 | FE4 | CE4 | DE4 |
| 3 9 | A64 | B64 | 864 | 964 | E64 | F64 | C64 | D64 | 2E4 | 3E4 | 0E4 | 1E4 | 6E4 | 7E4 | 4E4 | 5E4 |
| 0 A | 550 | 450 | 750 | 650 | 150 | 050 | 350 | 250 | DD0 | CD0 | FD0 | ED0 | 9D0 | 8D0 | BD0 | AD0 |
| 1 A | D50 | C50 | F50 | E50 | 950 | 850 | B50 | A50 | 5D0 | 4D0 | 7D0 | 6D0 | 1D0 | 0D0 | 3D0 | 2D0 |
| 2 A | 154 | 054 | 354 | 254 | 554 | 454 | 754 | 654 | 9D4 | 8D4 | BD4 | AD4 | DD4 | CD4 | FD4 | ED4 |
| 3 A | 954 | 854 | B54 | A54 | D54 | C54 | F54 | E54 | 1D4 | 0D4 | 3D4 | 2D4 | 5D4 | 4D4 | 7D4 | 6D4 |
| 0 B | 770 | 670 | 570 | 470 | 370 | 270 | 170 | 070 | FF0 | EF0 | DF0 | CF0 | BF0 | AF0 | 9F0 | 8F0 |
| 1 B | F70 | E70 | D70 | C70 | B70 | A70 | 970 | 870 | 7F0 | 6F0 | 5F0 | 4F0 | 3F0 | 2F0 | 1F0 | 0F0 |
| 2 B | 374 | 274 | 174 | 074 | 774 | 674 | 574 | 474 | BF4 | AF4 | 9F4 | 8F4 | FF4 | EF4 | DF4 | CF4 |
| 3 B | B74 | A74 | 974 | 874 | F74 | E74 | D74 | C74 | 3F4 | 2F4 | 1F4 | 0F4 | 7F4 | 6F4 | 5F4 | 4F4 |
| 0 C | C48 | D48 | E48 | F48 | 848 | 948 | A48 | B48 | 4C8 | 5C8 | 6C8 | 7C8 | 0C8 | 1C8 | 2C8 | 3C8 |
| 1 C | 448 | 548 | 648 | 748 | 048 | 148 | 248 | 348 | CC8 | DC8 | EC8 | FC8 | 8C8 | 9C8 | AC8 | BC8 |
| 2 C | 84C | 94C | A4C | B4C | C4C | D4C | E4C | F4C | 0CC | 1CC | 2CC | 3CC | 4CC | 5CC | 6CC | 7CC |
| 3 C | 04C | 14C | 24C | 34C | 44C | 54C | 64C | 74C | 8CC | 9CC | ACC | BCC | CCC | DCC | ECC | FCC |
| 0 D | E68 | F68 | C68 | D68 | A68 | B68 | 868 | 968 | 6E8 | 7E8 | 4E8 | 5E8 | 2E8 | 3E8 | 0E8 | 1E8 |
| 1 D | 668 | 768 | 468 | 568 | 268 | 368 | 068 | 168 | EE8 | FE8 | CE8 | DE8 | AE8 | BE8 | 8E8 | 9E8 |
| 2 D | A6C | B6C | 86C | 96C | E6C | F6C | C6C | D6C | 2EC | 3EC | 0EC | 1EC | 6EC | 7EC | 4EC | 5EC |
| 3 D | 26C | 36C | 06C | 16C | 66C | 76C | 46C | 56C | AEC | BEC | 8EC | 9EC | EEC | FEC | CEC | DEC |
| 0 E | D58 | C58 | F58 | E58 | 958 | 858 | B58 | A58 | 5D8 | 4D8 | 7D8 | 6D8 | 1D8 | 0D8 | 3D8 | 2D8 |
| 1 E | 558 | 458 | 758 | 658 | 158 | 058 | 358 | 258 | DD8 | CD8 | FD8 | ED8 | 9D8 | 8D8 | BD8 | AD8 |
| 2 E | 95C | 85C | B5C | A5C | D5C | C5C | F5C | E5C | 1DC | 0DC | 3DC | 2DC | 5DC | 4DC | 7DC | 6DC |
| 3 E | 15C | 05C | 35C | 25C | 55C | 45C | 75C | 65C | 9DC | 8DC | BDC | ADC | DDC | CDC | FDC | EDC |
| 0 F | F78 | E78 | D78 | C78 | B78 | A78 | 978 | 878 | 7F8 | 6F8 | 5F8 | 4F8 | 3F8 | 2F8 | 1F8 | 0F8 |
| 1 F | 778 | 678 | 578 | 478 | 378 | 278 | 178 | 078 | FF8 | EF8 | DF8 | CF8 | BF8 | AF8 | 9F8 | 8F8 |
| 2 F | B7C | A7C | 97C | 87C | F7C | E7C | D7C | C7C | 3FC | 2FC | 1FC | 0FC | 7FC | 6FC | 5FC | 4FC |
| 3 F | 37C | 27C | 17C | 07C | 77C | 67C | 57C | 47C | BFC | AFC | 9FC | 8FC | FFC | EFC | DFC | CFC |

TABLE 22

PARTITION TABLE BCS = f(XYZ) FOR sm = 2 AM2022

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | | Sheet 1 | | | | | | | | |
| 0 0 | 000 | 100 | 200 | 300 | 440 | 540 | 640 | 740 | 880 | 980 | A80 | B80 | CC0 | DC0 | EC0 | FC0 |
| 1 0 | 800 | 900 | A00 | B00 | C40 | D40 | E40 | F40 | 080 | 180 | 280 | 380 | 4C0 | 5C0 | 6C0 | 7C0 |
| 2 0 | 400 | 500 | 600 | 700 | 040 | 140 | 240 | 340 | C80 | D80 | E80 | F80 | 8C0 | 9C0 | AC0 | BC0 |
| 3 0 | C00 | D00 | E00 | F00 | 840 | 940 | A40 | B40 | 480 | 580 | 680 | 780 | 0C0 | 1C0 | 2C0 | 3C0 |
| 0 1 | 220 | 320 | 020 | 120 | 660 | 760 | 460 | 560 | AA0 | BA0 | 8A0 | 9A0 | EE0 | FE0 | CE0 | DE0 |
| 1 1 | A20 | B20 | 820 | 920 | E60 | F60 | C60 | D60 | 2A0 | 3A0 | 0A0 | 1A0 | 6E0 | 7E0 | 4E0 | 5E0 |
| 2 1 | 620 | 720 | 420 | 520 | 260 | 360 | 060 | 160 | EA0 | FA0 | CA0 | DA0 | AE0 | BE0 | 8E0 | 9E0 |
| 3 1 | E20 | F20 | C20 | D20 | A60 | B60 | 860 | 960 | 6A0 | 7A0 | 4A0 | 5A0 | 2E0 | 3E0 | 0E0 | 1E0 |
| 0 2 | 110 | 010 | 310 | 210 | 550 | 450 | 750 | 650 | 990 | 890 | B90 | A90 | DD0 | CD0 | FD0 | ED0 |
| 1 2 | 910 | 810 | B10 | A10 | D50 | C50 | F50 | E50 | 190 | 090 | 390 | 290 | 5D0 | 4D0 | 7D0 | 6D0 |
| 2 2 | 510 | 410 | 710 | 610 | 150 | 050 | 350 | 250 | D90 | C90 | F90 | E90 | 9D0 | 8D0 | BD0 | AD0 |
| 3 2 | D10 | C10 | F10 | E10 | 950 | 850 | B50 | A50 | 590 | 490 | 790 | 690 | 1D0 | 0D0 | 3D0 | 2D0 |
| 0 3 | 330 | 230 | 130 | 030 | 770 | 670 | 570 | 470 | BB0 | AB0 | 9B0 | 8B0 | FF0 | EF0 | DF0 | CF0 |
| 1 3 | B30 | A30 | 930 | 830 | F70 | E70 | D70 | C70 | 3B0 | 2B0 | 1B0 | 0B0 | 7F0 | 6F0 | 5F0 | 4F0 |
| 2 3 | 730 | 630 | 530 | 430 | 370 | 270 | 170 | 070 | FB0 | EB0 | DB0 | CB0 | BF0 | AF0 | 9F0 | 8F0 |
| 3 3 | F30 | E30 | D30 | C30 | B70 | A70 | 970 | 870 | 7B0 | 6B0 | 5B0 | 4B0 | 3F0 | 2F0 | 1F0 | 0F0 |
| 0 4 | 808 | 908 | A08 | B08 | C48 | D48 | E48 | F48 | 088 | 188 | 288 | 388 | 4C8 | 5C8 | 6C8 | 7C8 |
| 1 4 | 008 | 108 | 208 | 308 | 448 | 548 | 648 | 748 | 888 | 988 | A88 | B88 | CC8 | DC8 | EC8 | FC8 |
| 2 4 | C08 | D08 | E08 | F08 | 848 | 948 | A48 | B48 | 488 | 588 | 688 | 788 | 0C8 | 1C8 | 2C8 | 3C8 |
| 3 4 | 408 | 508 | 608 | 708 | 048 | 148 | 248 | 348 | C88 | D88 | E88 | F88 | 8C8 | 9C8 | AC8 | BC8 |
| 0 5 | A28 | B28 | 828 | 928 | E68 | F68 | C68 | D68 | 2A8 | 3A8 | 0A8 | 1A8 | 6E8 | 7E8 | 4E8 | 5E8 |
| 1 5 | 228 | 328 | 028 | 128 | 668 | 768 | 468 | 568 | AA8 | BA8 | 8A8 | 9A8 | EE8 | FE8 | CE8 | DE8 |
| 2 5 | E28 | F28 | C28 | D28 | A68 | B68 | 868 | 968 | 6A8 | 7A8 | 4A8 | 5A8 | 2E8 | 3E8 | 0E8 | 1E8 |
| 3 5 | 628 | 728 | 428 | 528 | 268 | 368 | 068 | 168 | EA8 | FA8 | CA8 | DA8 | AE8 | BE8 | 8E8 | 9E8 |
| 0 6 | 918 | 818 | B18 | A18 | D58 | C58 | F58 | E58 | 198 | 098 | 398 | 298 | 5D8 | 4D8 | 7D8 | 6D8 |
| 1 6 | 118 | 018 | 318 | 218 | 558 | 458 | 758 | 658 | 998 | 898 | B98 | A98 | DD8 | CD8 | FD8 | ED8 |
| 2 6 | D18 | C18 | F18 | E18 | 958 | 858 | B58 | A58 | 598 | 498 | 798 | 698 | 1D8 | 0D8 | 3D8 | 2D8 |
| 3 6 | 518 | 418 | 718 | 618 | 158 | 058 | 358 | 258 | D98 | C98 | F98 | E98 | 9D8 | 8D8 | BD8 | AD8 |
| 0 7 | B38 | A38 | 938 | 838 | F78 | E78 | D78 | C78 | 3B8 | 2B8 | 1B8 | 0B8 | 7F8 | 6F8 | 5F8 | 4F8 |
| 1 7 | 338 | 238 | 138 | 038 | 778 | 678 | 578 | 478 | BB8 | AB8 | 9B8 | 8B8 | FF8 | EF8 | DF8 | CF8 |
| 2 7 | F38 | E38 | D38 | C38 | B78 | A78 | 978 | 878 | 7B8 | 6B8 | 5B8 | 4B8 | 3F8 | 2F8 | 1F8 | 0F8 |
| 3 7 | 738 | 638 | 538 | 438 | 378 | 278 | 178 | 078 | FB8 | EB8 | DB8 | CB8 | BF8 | AF8 | 9F8 | 8F8 |
| | | | | | | | | Sheet 2 | | | | | | | | |

TABLE 22-continued

PARTITION TABLE BCS = f(XYZ) FOR sm = 2 AM2022

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 8 | 404 | 504 | 604 | 704 | 044 | 144 | 244 | 344 | C84 | D84 | E84 | F84 | 8C4 | 9C4 | AC4 | BC4 |
| 1 8 | C04 | D04 | E04 | F04 | 844 | 944 | A44 | B44 | 484 | 584 | 684 | 784 | 0C4 | 1C4 | 2C4 | 3C4 |
| 2 8 | 004 | 104 | 204 | 304 | 444 | 544 | 644 | 744 | 884 | 984 | A84 | B84 | CC4 | DC4 | EC4 | FC4 |
| 3 8 | 804 | 904 | A04 | B04 | C44 | D44 | E44 | F44 | 084 | 184 | 284 | 384 | 4C4 | 5C4 | 6C4 | 7C4 |
| 0 9 | 624 | 724 | 424 | 524 | 264 | 364 | 064 | 164 | EA4 | FA4 | CA4 | DA4 | AE4 | BE4 | 8E4 | 9E4 |
| 1 9 | E24 | F24 | C24 | D24 | A64 | B64 | 864 | 964 | 6A4 | 7A4 | 4A4 | 5A4 | 2E4 | 3E4 | 0E4 | 1E4 |
| 2 9 | 224 | 324 | 024 | 124 | 664 | 764 | 464 | 564 | AA4 | BA4 | 8A4 | 9A4 | EE4 | FE4 | CE4 | DE4 |
| 3 9 | A24 | B24 | 824 | 924 | E64 | F64 | C64 | D64 | 2A4 | 3A4 | 0A4 | 1A4 | 6E4 | 7E4 | 4E4 | 5E4 |
| 0 A | 514 | 414 | 714 | 614 | 154 | 054 | 354 | 254 | D94 | C94 | F94 | E94 | 9D4 | 8D4 | BD4 | AD4 |
| 1 A | DI4 | C14 | F14 | E14 | 954 | 854 | B54 | A54 | 594 | 494 | 794 | 694 | 1D4 | 0D4 | 3D4 | 2D4 |
| 2 A | 114 | 014 | 314 | 214 | 554 | 454 | 754 | 654 | 994 | 894 | B94 | A94 | DD4 | CD4 | FD4 | ED4 |
| 3 A | 914 | 814 | B14 | A14 | D54 | C54 | F54 | E54 | 194 | 094 | 394 | 294 | 5D4 | 4D4 | 7D4 | 6D4 |
| 0 B | 734 | 634 | 534 | 434 | 374 | 274 | 174 | 074 | FB4 | EB4 | DB4 | CB4 | BF4 | AF4 | 9F4 | 8F4 |
| 1 B | F34 | E34 | D34 | C34 | B74 | A74 | 974 | 874 | 7B4 | 6B4 | 5B4 | 4B4 | 3F4 | 2F4 | 1F4 | 0F4 |
| 2 B | 334 | 234 | 134 | 034 | 774 | 674 | 574 | 474 | BB4 | AB4 | 9B4 | 8B4 | FF4 | EF4 | DF4 | CF4 |
| 3 B | B34 | A34 | 934 | 834 | F74 | E74 | D74 | C74 | 3B4 | 2B4 | 1B4 | 0B4 | 7F4 | 6F4 | 5F4 | 4F4 |
| 0 C | C0C | D0C | E0C | F0C | 84C | 94C | A4C | B4C | 48C | 58C | 68C | 78C | 0CC | 1CC | 2CC | 3CC |
| 1 C | 40C | 50C | 60C | 70C | 04C | 14C | 24C | 34C | C8C | D8C | E8C | F8C | 8CC | 9CC | ACC | BCC |
| 2 C | 80C | 90C | A0c | B0C | C4C | D4C | E4C | F4C | 08C | 18C | 28C | 38C | 4CC | 5CC | 6CC | 7CC |
| 3 C | 00C | 10C | 20C | 30C | 44C | 54C | 64C | 74C | 88C | 98C | A8C | B8C | CCC | DCC | ECC | FCC |
| 0 D | E2C | F2C | C2C | D2C | A6C | B6C | 86C | 96C | 6AC | 7AC | 4AC | 5AC | 2EC | 3EC | 0EC | 1EC |
| 1 D | 62C | 72C | 42C | 52C | 26C | 36C | 06C | 16C | EAC | FAC | CAC | DAC | AEC | BEC | 8EC | 9EC |
| 2 D | A2C | B2C | 82C | 92C | E6C | F6C | C6C | D6C | 2AC | 3AC | 0AC | 1AC | 6EC | 7EC | 4EC | 5EC |
| 3 D | 22C | 32C | 02C | 12C | 66C | 76C | 46C | 56C | AAC | BAC | 8AC | 9AC | EEC | FEC | CEC | DEC |
| 0 E | D1C | C1C | F1C | E1C | 95C | 85C | B5C | A5C | 59C | 49C | 79C | 69C | 1DC | 0DC | 3DC | 2DC |
| 1 E | 51C | 41C | 71C | 61C | 15C | 05C | 35C | 25C | D9C | C9C | F9C | E9C | 9DC | 8DC | BDC | ADC |
| 2 E | 91C | 81C | B1C | A1C | D5C | C5C | F5C | E5C | 19C | 09C | 39C | 29C | 5DC | 4DC | 7DC | 6DC |
| 3 E | 11C | 01C | 31C | 21C | 55C | 45C | 75C | 65C | 99C | 89C | B9C | A9C | DDC | CDC | FDC | EDC |
| 0 F | F3C | E3C | D3C | C3C | B7C | A7C | 97C | 87C | 7BC | 6BC | 5BC | 4BC | 3FC | 2FC | 1FC | 0FC |
| 1 F | 73C | 63C | 53C | 43C | 37C | 27C | 17C | 07C | FBC | EBC | DBC | CBC | BFC | AFC | 9FC | 8FC |
| 2 F | B3C | A3C | 93C | 83C | F7C | E7C | D7C | C7C | 3BC | 2BC | 1BC | 0BC | 7FC | 6FC | 5FC | 4FC |
| 3 F | 33C | 23C | 13C | 03C | 77C | 67C | 57C | 47C | BBC | ABC | 9BC | 8BC | FFC | EFC | DFC | CFC |

TABLE 23

PARTITION TABLE BCS = f(XYZ) FOR sm = 2 AM1122

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | Sheet 1 | | | | | | | | | |
| 0 0 | 000 | 100 | 220 | 320 | 440 | 540 | 660 | 760 | 880 | 980 | AA0 | BA0 | CC0 | DC0 | EE0 | FE0 |
| 1 0 | 800 | 900 | A20 | B20 | C40 | D40 | E60 | F60 | 080 | 180 | 2A0 | 3A0 | 4C0 | 5C0 | 6E0 | 7E0 |
| 2 0 | 400 | 500 | 620 | 720 | 040 | 140 | 260 | 360 | C80 | D80 | EA0 | FA0 | 8C0 | 9C0 | AE0 | BE0 |
| 3 0 | C00 | D00 | E20 | F20 | 840 | 940 | A60 | B60 | 480 | 580 | 6A0 | 7A0 | 0C0 | 1C0 | 2E0 | 3E0 |
| 0 1 | 200 | 300 | 020 | 120 | 640 | 740 | 460 | 560 | A80 | B80 | 8A0 | 9A0 | EC0 | FC0 | CE0 | DE0 |
| 1 1 | A00 | B00 | 820 | 920 | E40 | F40 | C60 | D60 | 280 | 380 | 0A0 | 1A0 | 6C0 | 7C0 | 4E0 | 5E0 |
| 2 1 | 600 | 700 | 420 | 520 | 240 | 340 | 060 | 160 | E80 | F80 | CA0 | DA0 | AC0 | BC0 | 8E0 | 9E0 |
| 3 1 | E00 | F00 | C20 | D20 | A40 | B40 | 860 | 960 | 680 | 780 | 4A0 | 5A0 | 2C0 | 3C0 | 0E0 | 1E0 |
| 0 2 | 110 | 010 | 330 | 230 | 550 | 450 | 770 | 670 | 990 | 890 | BB0 | AB0 | DD0 | CD0 | FF0 | EF0 |
| 1 2 | 910 | 810 | B30 | A30 | D50 | C50 | F70 | E70 | 190 | 090 | 3B0 | 2B0 | 5D0 | 4D0 | 7F0 | 6F0 |
| 2 2 | 510 | 410 | 730 | 630 | 150 | 050 | 370 | 270 | D90 | C90 | FB0 | EB0 | 9D0 | 8D0 | BF0 | AF0 |
| 3 2 | D10 | C10 | F30 | E30 | 950 | 850 | B70 | A70 | 590 | 490 | 7B0 | 6B0 | 1D0 | 0D0 | 3F0 | 2F0 |
| 0 3 | 310 | 210 | 130 | 030 | 750 | 650 | 570 | 470 | B90 | A90 | 9B0 | 8B0 | FD0 | ED0 | DF0 | CF0 |
| 1 3 | B10 | A10 | 930 | 830 | F50 | E50 | D70 | C70 | 390 | 290 | 1B0 | 0B0 | 7D0 | 6D0 | 5F0 | 4F0 |
| 2 3 | 710 | 610 | 530 | 430 | 350 | 250 | 170 | 070 | F90 | E90 | D80 | CB0 | BD0 | AD0 | 9F0 | 8F0 |
| 3 3 | F10 | E10 | D30 | C30 | B50 | A50 | 970 | 870 | 790 | 690 | 5B0 | 4B0 | 3D0 | 2D0 | 1F0 | 0F0 |
| 0 4 | 808 | 908 | A28 | B28 | C48 | D48 | E68 | F68 | 088 | 188 | 2A8 | 3A8 | 4C8 | 5C8 | 6E8 | 7E8 |
| 1 4 | 008 | 108 | 228 | 328 | 448 | 548 | 668 | 768 | 888 | 988 | AA8 | BA8 | CC8 | DC8 | EE8 | FE8 |
| 2 4 | C08 | D08 | E28 | F28 | 848 | 948 | A68 | B68 | 488 | 588 | 6A8 | 7A8 | 0C8 | 1C8 | 2E8 | 3E8 |
| 3 4 | 408 | 508 | 628 | 728 | 048 | 148 | 268 | 368 | C88 | D88 | EA8 | FA8 | 8C8 | 9C8 | AE8 | BE8 |
| 0 5 | A08 | B08 | 828 | 928 | E48 | F48 | C68 | D68 | 288 | 388 | 0A8 | 1A8 | 6C8 | 7C8 | 4E8 | 5E8 |
| 1 5 | 208 | 308 | 028 | 128 | 648 | 748 | 468 | 568 | A88 | B88 | 8A8 | 9A8 | EC8 | FC8 | CE8 | DE8 |
| 2 5 | E08 | F08 | C28 | D28 | A48 | B48 | 868 | 968 | 688 | 788 | 4A8 | 5A8 | 2C8 | 3C8 | 0E8 | 1E8 |
| 3 5 | 608 | 708 | 428 | 528 | 248 | 348 | 068 | 168 | E88 | F88 | CA8 | DA8 | AC8 | BC8 | 8E8 | 9E8 |
| 0 6 | 918 | 818 | B38 | A38 | D58 | C58 | F78 | E78 | 198 | 098 | 3B8 | 2B8 | 5D8 | 4D8 | 7F8 | 6F8 |
| 1 6 | 118 | 018 | 338 | 238 | 558 | 458 | 778 | 678 | 998 | 898 | BB8 | AB8 | DD8 | CD8 | FF8 | EF8 |
| 2 6 | D18 | C18 | F38 | E38 | 958 | 858 | B78 | A78 | 598 | 498 | 7B8 | 6B8 | 1D8 | 0D8 | 3F8 | 2F8 |
| 3 6 | 518 | 418 | 738 | 638 | 158 | 058 | 378 | 278 | D98 | C98 | FB8 | EB8 | 9D8 | 8D8 | BF8 | AF8 |
| 0 7 | B18 | A18 | 938 | 838 | F58 | E58 | D78 | C78 | 398 | 298 | 1B8 | 0B8 | 7D8 | 6D8 | 5F8 | 4F8 |
| 1 7 | 318 | 218 | 138 | 038 | 758 | 658 | 578 | 478 | B98 | A98 | 9B8 | 8B8 | FD8 | ED8 | DF8 | CF8 |
| 2 7 | F18 | E18 | D38 | C38 | B58 | A58 | 978 | 878 | 798 | 698 | 5B8 | 4B8 | 3D8 | 2D8 | 1F8 | 0F8 |
| 3 7 | 718 | 618 | 538 | 438 | 358 | 258 | 178 | 078 | F98 | E98 | DB8 | CB8 | BD8 | AD8 | 9F8 | 8F8 |
| | | | | | | | Sheet 2 | | | | | | | | | |
| 0 8 | 404 | 504 | 624 | 724 | 044 | 144 | 264 | 364 | C84 | D84 | EA4 | FA4 | 8C4 | 9C4 | AE4 | BE4 |
| 1 8 | C04 | D04 | E24 | F24 | 844 | 944 | A64 | B64 | 484 | 584 | 6A4 | 7A4 | 0C4 | 1C4 | 2E4 | 3E4 |
| 2 8 | 004 | 104 | 224 | 324 | 444 | 544 | 664 | 764 | 884 | 984 | AA4 | BA4 | CC4 | DC4 | EE4 | FE4 |
| 3 8 | 804 | 904 | A24 | B24 | C44 | D44 | E64 | F64 | 084 | 184 | 2A4 | 3A4 | 4C4 | 5C4 | 6E4 | 7E4 |
| 0 9 | 604 | 704 | 424 | 524 | 244 | 344 | 064 | 164 | E84 | F84 | CA4 | DA4 | AC4 | BC4 | 8E4 | 9E4 |
| 1 9 | E04 | F04 | C24 | D24 | A44 | B44 | 864 | 964 | 684 | 784 | 4A4 | 5A4 | 2C4 | 3C4 | 0E4 | 1E4 |
| 2 9 | 204 | 304 | 024 | 124 | 644 | 744 | 464 | 564 | A84 | B84 | 8A4 | 9A4 | EC4 | FC4 | CE4 | DE4 |

TABLE 23-continued

PARTITION TABLE BCS = f(XYZ) FOR sm = 2 AM1122

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 3 9 | A04 | B04 | 824 | 924 | E44 | F44 | C64 | D64 | 284 | 384 | 0A4 | 1A4 | 6C4 | 7C4 | 4E4 | 5E4 |
| 0 A | 514 | 414 | 734 | 634 | 154 | 054 | 374 | 274 | D94 | C94 | FB4 | EB4 | 9D4 | 8D4 | BF4 | AF4 |
| 1 A | D14 | C14 | F34 | E34 | 954 | 854 | B74 | A74 | 594 | 494 | 7B4 | 6B4 | 1D4 | 0D4 | 3F4 | 2F4 |
| 2 A | 114 | 014 | 334 | 234 | 554 | 454 | 774 | 674 | 994 | 894 | BB4 | AB4 | DD4 | CD4 | FF4 | EF4 |
| 3 A | 914 | 814 | B34 | A34 | D54 | C54 | F74 | E74 | 194 | 094 | 3B4 | 2B4 | 5D4 | 4D4 | 7F4 | 6F4 |
| 0 B | 714 | 614 | 534 | 434 | 354 | 254 | 174 | 074 | F94 | E94 | DB4 | CB4 | BD4 | AD4 | 9F4 | 8F4 |
| 1 B | F14 | E14 | D34 | C34 | B54 | A54 | 974 | 874 | 794 | 694 | 5B4 | 4B4 | 3D4 | 2D4 | 1F4 | 0F4 |
| 2 B | 314 | 214 | 134 | 034 | 754 | 654 | 574 | 474 | B94 | A94 | 9B4 | 8B4 | FD4 | ED4 | DF4 | CF4 |
| 3 B | B14 | A14 | 934 | 834 | F54 | E54 | D74 | C74 | 394 | 294 | 1B4 | 0B4 | 7D4 | 6D4 | 5F4 | 4F4 |
| 0 C | C0C | D0C | E2C | F2C | 84C | 94C | A6C | B6C | 48C | 58C | 6AC | 7AC | 0CC | 1CC | 2EC | 3EC |
| 1 C | 40C | 50C | 62C | 72C | 04C | 14C | 26C | 36C | C8C | D8C | EAC | FAC | 8CC | 9CC | AEC | BEC |
| 2 C | 80C | 90C | A2C | B2C | C4C | D4C | E6C | F6C | 08C | 18C | 2AC | 3AC | 4CC | 5CC | 6EC | 7EC |
| 3 C | 00C | 10C | 22C | 32C | 44C | 54C | 66C | 76C | 88C | 98C | AAC | BAC | CCC | DCC | EEC | FEC |
| 0 D | E0C | F0C | C2C | D2C | A4C | B4C | 86C | 96C | 68C | 78C | 4AC | 5AC | 2CC | 3CC | 0EC | 1EC |
| 1 D | 60C | 70C | 42C | 52C | 24C | 34C | 06C | 16C | E8C | F8C | CAC | DAC | ACC | BCC | 8EC | 9EC |
| 2 D | A0C | B0C | 82C | 92C | E4C | F4C | C6C | D6C | 28C | 38C | 0AC | 1AC | 6CC | 7CC | 4EC | 5EC |
| 3 D | 20C | 30C | 02C | 12C | 64C | 74C | 46C | 56C | A8C | B8C | 8AC | 9AC | ECC | FCC | CEC | DEC |
| 0 E | D1C | C1C | F3C | E3C | 95C | 85C | B7C | A7C | 59C | 49C | 7BC | 6BC | 1DC | 0DC | 3FC | 2FC |
| 1 E | 51C | 41C | 73C | 63C | 15C | 05C | 37C | 27C | D9C | C9C | FBC | EBC | 9DC | 8DC | BFC | AFC |
| 2 E | 91C | 81C | B3C | A3C | D5C | C5C | F7C | E7C | 19C | 09C | 3BC | 2BC | 5DC | 4DC | 7FC | 6FC |
| 3 E | 11C | 01C | 33C | 23C | 55C | 45C | 77C | 67C | 99C | 89C | BBC | ABC | DDC | CDC | FFC | EFC |
| 0 F | F1C | E1C | D3C | C3C | B5C | A5C | 97C | 87C | 79C | 69C | 5BC | 4BC | 3DC | 2DC | 1FC | 0FC |
| 1 F | 71C | 61C | 53C | 43C | 35C | 25C | 17C | 07C | F9C | E9C | DBC | CBC | BDC | ADC | 9FC | 8FC |
| 2 F | B1C | A1C | 93C | 83C | F5C | E5C | D7C | C7C | 39C | 29C | 1BC | 0BC | 7DC | 6DC | 5FC | 4FC |
| 3 F | 31C | 21C | 13C | 03C | 75C | 65C | 57C | 47C | B9C | A9C | 9BC | 8BC | FDC | EDC | DFC | CFC |

TABLE 24

PARTITION TABLE BCS = f(XYZ) FOR sm = 2 AM0222

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | | Sheet 1 | | | | | | | | |
| 0 0 | 000 | 110 | 220 | 330 | 440 | 550 | 660 | 770 | 880 | 990 | AA0 | BB0 | CC0 | DD0 | EE0 | FF0 |
| 1 0 | 800 | 910 | A20 | B30 | C40 | D50 | E60 | F70 | 080 | 190 | 2A0 | 3B0 | 4C0 | 5D0 | 6E0 | 7F0 |
| 2 0 | 400 | 510 | 620 | 730 | 040 | 150 | 260 | 370 | C80 | D90 | EA0 | FB0 | 8C0 | 9D0 | AE0 | BF0 |
| 3 0 | C00 | D10 | E20 | F30 | 840 | 950 | A60 | B70 | 480 | 590 | 6A0 | 7B0 | 0C0 | 1D0 | 2E0 | 3F0 |
| 0 1 | 200 | 310 | 020 | 130 | 640 | 750 | 460 | 570 | A80 | B90 | 8A0 | 9B0 | EC0 | FD0 | CE0 | DF0 |
| 1 1 | A00 | B10 | 820 | 930 | E40 | F50 | C60 | D70 | 280 | 390 | 0A0 | 1B0 | 6C0 | 7D0 | 4E0 | 5F0 |
| 2 1 | 600 | 710 | 420 | 530 | 240 | 350 | 060 | 170 | E80 | F90 | CA0 | DB0 | AC0 | BD0 | 8E0 | 9F0 |
| 3 1 | E00 | F10 | C20 | D30 | A40 | B50 | 860 | 970 | 680 | 790 | 4A0 | 5B0 | 2C0 | 3D0 | 0E0 | 1F0 |
| 0 2 | 100 | 010 | 320 | 230 | 540 | 450 | 760 | 670 | 980 | 890 | BA0 | AB0 | DC0 | CD0 | FE0 | EF0 |
| 1 2 | 900 | 810 | B20 | A30 | D40 | C50 | F60 | E70 | 180 | 090 | 3A0 | 2B0 | 5C0 | 4D0 | 7E0 | 6F0 |
| 2 2 | 500 | 410 | 720 | 630 | 140 | 050 | 360 | 270 | D80 | C90 | FA0 | EB0 | 9C0 | 8D0 | BE0 | AF0 |
| 3 2 | D00 | C10 | F20 | E30 | 940 | 850 | B60 | A70 | 580 | 490 | 7A0 | 6B0 | 1C0 | 0D0 | 3E0 | 2F0 |
| 0 3 | 300 | 210 | 120 | 030 | 740 | 650 | 560 | 470 | B80 | A90 | 9A0 | 8B0 | FC0 | ED0 | DE0 | CF0 |
| 1 3 | B00 | A10 | 920 | 830 | F40 | E50 | D60 | C70 | 380 | 290 | 1A0 | 0B0 | 7C0 | 6D0 | 5E0 | 4F0 |
| 2 3 | 700 | 610 | 520 | 430 | 340 | 250 | 160 | 070 | F80 | E90 | DA0 | CB0 | BC0 | AD0 | 9E0 | 8F0 |
| 3 3 | F00 | E10 | D20 | C30 | B40 | A50 | 960 | 870 | 780 | 690 | 5A0 | 4B0 | 3C0 | 2D0 | 1E0 | 0F0 |
| 0 4 | 808 | 918 | A28 | B38 | C48 | D58 | E68 | F78 | 088 | 198 | 2A8 | 3B8 | 4C8 | 5D8 | 6E8 | 7F8 |
| 1 4 | 008 | 118 | 228 | 338 | 448 | 558 | 668 | 778 | 888 | 998 | AA8 | BB8 | CC8 | DD8 | EE8 | FF8 |
| 2 4 | C08 | D18 | E28 | F38 | 848 | 958 | A68 | B78 | 488 | 598 | 6A8 | 7B8 | 0C8 | 1D8 | 2E8 | 3F8 |
| 3 4 | 408 | 518 | 628 | 738 | 048 | 158 | 268 | 378 | C88 | D98 | EA8 | FB8 | 8C8 | 9D8 | AE8 | BF8 |
| 0 5 | A08 | B18 | 828 | 938 | E48 | F58 | C68 | D78 | 288 | 398 | 0A8 | 1B8 | 6C8 | 7D8 | 4E8 | 5F8 |
| 1 5 | 208 | 318 | 028 | 138 | 648 | 758 | 468 | 578 | A88 | B98 | 8A8 | 9B8 | EC8 | FD8 | CE8 | DF8 |
| 2 5 | E08 | F18 | C28 | D38 | A48 | B58 | 868 | 978 | 688 | 798 | 4A8 | 5B8 | 2C8 | 3D8 | 0E8 | 1F8 |
| 3 5 | 608 | 718 | 428 | 538 | 248 | 358 | 068 | 178 | E88 | F98 | CA8 | DB8 | AC8 | BD8 | 8E8 | 9F8 |
| 0 6 | 908 | 818 | B28 | A38 | D48 | C58 | F68 | E78 | 188 | 098 | 3A8 | 2B8 | 5C8 | 4D8 | 7E8 | 6F8 |
| 1 6 | 108 | 018 | 328 | 238 | 548 | 458 | 768 | 678 | 988 | 898 | BA8 | AB8 | DC8 | CD8 | FE8 | EF8 |
| 2 6 | D08 | C18 | F28 | E38 | 948 | 858 | B68 | A78 | 588 | 498 | 7A8 | 6B8 | 1C8 | 0D8 | 3E8 | 2F8 |
| 3 6 | 508 | 418 | 728 | 638 | 148 | 058 | 368 | 278 | D88 | C98 | FA8 | EB8 | 9C8 | 8D8 | BE8 | AF8 |
| 0 7 | B08 | A18 | 928 | 838 | F48 | E58 | D68 | C78 | 388 | 298 | 1A8 | 0B8 | 7C8 | 6D8 | 5E8 | 4F8 |
| 1 7 | 308 | 218 | 128 | 038 | 748 | 658 | 568 | 478 | B88 | A98 | 9A8 | 8B8 | FC8 | ED8 | DE8 | CF8 |
| 2 7 | F08 | E18 | D28 | C38 | B48 | A58 | 968 | 878 | 788 | 698 | 5A8 | 4B8 | 3C8 | 2D8 | 1E8 | 0F8 |
| 3 7 | 708 | 618 | 528 | 438 | 348 | 258 | 168 | 078 | F88 | E98 | DA8 | CB8 | BC8 | AD8 | 9E8 | 8F8 |
| | | | | | | | | Sheet 2 | | | | | | | | |
| 0 8 | 404 | 514 | 624 | 734 | 044 | 154 | 264 | 374 | C84 | D94 | EA4 | FB4 | 8C4 | 9D4 | AE4 | BF4 |
| 1 8 | C04 | D14 | E24 | F34 | 844 | 954 | A64 | B74 | 484 | 594 | 6A4 | 7B4 | 0C4 | 1D4 | 2E4 | 3F4 |
| 2 8 | 004 | 114 | 224 | 334 | 444 | 554 | 664 | 774 | 884 | 994 | AA4 | BB4 | CC4 | DD4 | EE4 | FF4 |
| 3 8 | 804 | 914 | A24 | B34 | C44 | D54 | E64 | F74 | 084 | 194 | 2A4 | 3B4 | 4C4 | 5D4 | 6E4 | 7F4 |
| 0 9 | 604 | 714 | 424 | 534 | 244 | 354 | 064 | 174 | E84 | F94 | CA4 | DB4 | AC4 | BD4 | 8E4 | 9F4 |
| 1 9 | E04 | F14 | C24 | D34 | A44 | B54 | 864 | 974 | 684 | 794 | 4A4 | 5B4 | 2C4 | 3D4 | 0E4 | 1F4 |
| 2 9 | 204 | 314 | 024 | 134 | 644 | 754 | 464 | 574 | A84 | B94 | 8A4 | 9B4 | EC4 | FD4 | CE4 | DF4 |
| 3 9 | A04 | B14 | 824 | 934 | E44 | F54 | C64 | D74 | 284 | 394 | 0A4 | 1B4 | 6C4 | 7D4 | 4E4 | 5F4 |
| 0 A | 504 | 414 | 724 | 634 | 144 | 054 | 364 | 274 | D84 | C94 | FA4 | EB4 | 9C4 | 8D4 | BE4 | AF4 |
| 1 A | D04 | C14 | F24 | E34 | 944 | 854 | B64 | A74 | 584 | 494 | 7A4 | 6B4 | 1C4 | 0D4 | 3E4 | 2F4 |
| 2 A | 104 | 014 | 324 | 234 | 544 | 454 | 764 | 674 | 984 | 894 | BA4 | AB4 | DC4 | CD4 | FE4 | EF4 |
| 3 A | 904 | 814 | B24 | A34 | D44 | C54 | F64 | E74 | 184 | 094 | 3A4 | 2B4 | 5C4 | 4D4 | 7E4 | 6F4 |
| 0 B | 704 | 614 | 524 | 434 | 344 | 254 | 164 | 074 | F84 | E94 | DA4 | CB4 | BC4 | AD4 | 9E4 | 8F4 |
| 1 B | F04 | E14 | D24 | C34 | B44 | A54 | 964 | 874 | 784 | 694 | 5A4 | 4B4 | 3C4 | 2D4 | 1E4 | 0F4 |

TABLE 24-continued

PARTITION TABLE BCS = f(XYZ) FOR sm = 2 AM0222

| ZY X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 2 B | 304 | 214 | 124 | 034 | 744 | 654 | 564 | 474 | B84 | A94 | 9A4 | 8B4 | FC4 | ED4 | DE4 | CF4 |
| 3 B | B04 | A14 | 924 | 834 | F44 | E54 | D64 | C74 | 384 | 294 | 1A4 | 0B4 | 7C4 | 6D4 | 5E4 | 4F4 |
| 0 C | C0C | D1C | E2C | F3C | 84C | 95C | A6C | B7C | 48C | 59C | 6AC | 7BC | 0CC | 1DC | 2EC | 3FC |
| 1 C | 40C | 51C | 62C | 73C | 04C | 15C | 26C | 37C | C8C | D9C | EAC | FBC | 8CC | 9DC | AEC | BFC |
| 2 C | 80C | 91C | A2C | B3C | C4C | D5C | E6C | F7C | 08C | 19C | 2AC | 3BC | 4CC | 5DC | 6EC | 7FC |
| 3 C | 00C | 11C | 22C | 33C | 44C | 55C | 66C | 77C | 88C | 99C | AAC | BBC | CCC | DDC | EEC | FFC |
| 0 D | E0C | F1C | C2C | D3C | A4C | B5C | 86C | 97C | 68C | 79C | 4AC | 5BC | 2CC | 3DC | 0EC | 1FC |
| 1 D | 60C | 71C | 42C | 53C | 24C | 35C | 06C | 17C | E8C | F9C | CAC | DBC | ACC | BDC | 8EC | 9FC |
| 2 D | A0C | B1C | 82C | 93C | E4C | F5C | C6C | D7C | 28C | 39C | 0AC | 1BC | 6CC | 7DC | 4EC | 5FC |
| 3 D | 20C | 31C | 02C | 13C | 64C | 75C | 46C | 57C | A8C | B9C | 8AC | 9BC | ECC | FDC | CEC | DFC |
| 0 E | D0C | C1C | F2C | E3C | 94C | 85C | B6C | A7C | 58C | 49C | 7AC | 6BC | 1CC | 0DC | 3EC | 2FC |
| 1 E | 50C | 41C | 72C | 63C | 14C | 05C | 36C | 27C | D8C | C9C | FAC | EBC | 9CC | 8DC | BEC | AFC |
| 2 E | 90C | 81C | B2C | A3C | D4C | C5C | F6C | E7C | 18C | 09C | 3AC | 2BC | 5CC | 4DC | 7EC | 6FC |
| 3 E | 10C | 01C | 32C | 23C | 54C | 45C | 76C | 67C | 98C | 89C | BAC | ABC | DCC | CDC | FEC | EFC |
| 0 F | F0C | E1C | D2C | C3C | B4C | A5C | 96C | 87C | 78C | 69C | 5AC | 4BC | 3CC | 2DC | 1EC | 0FC |
| 1 F | 70C | 61C | 52C | 43C | 34C | 25C | 16C | 07C | F8C | E9C | DAC | CBC | BCC | ADC | 9EC | 8FC |
| 2 F | B0C | A1C | 92C | 83C | F4C | E5C | D6C | C7C | 38C | 29C | 1AC | 0BC | 7CC | 6DC | 5EC | 4FC |
| 3 F | 30C | 21C | 12C | 03C | 74C | 65C | 56C | 47C | B8C | A9C | 9AC | 8BC | FCC | EDC | DEC | CFC |

TABLE 25

PARTITION TABLE BCS = f(XYZ) FOR sm = 3 AM1033

| ZY/X | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 0 | 0 | 000 | 100 | 220 | 320 | 440 | 640 | 660 | 760 | 880 | 980 | AA0 | BA0 | CC0 | DC0 | EE0 | FE0 |
| 1 | 0 | 800 | 300 | A20 | B20 | C40 | D40 | E60 | F60 | 080 | 180 | 2A0 | 3A0 | 4C0 | 5C0 | 6E0 | 7E0 |
| 2 | 0 | 400 | 500 | 620 | 720 | D40 | 140 | 260 | 360 | C80 | D80 | EA0 | FA0 | 8C0 | 9C0 | AE0 | BE0 |
| 3 | 0 | C00 | D00 | E20 | F20 | 840 | 940 | A60 | B60 | 480 | 580 | 6A0 | 7A0 | 0C0 | 1C0 | 2E0 | 3E0 |
| 4 | 0 | 200 | 300 | 020 | 120 | 640 | 740 | 460 | 560 | A80 | B80 | 8A0 | 9A0 | EC0 | FC0 | CE0 | DE0 |
| 5 | 0 | A00 | B00 | 820 | 920 | E40 | F40 | C60 | D60 | 280 | 380 | 0A0 | 1A0 | 6C0 | 7C0 | 4EO | 5E0 |
| 6 | 0 | 600 | 700 | 420 | 520 | 240 | 340 | 060 | 160 | E80 | F80 | CA0 | 0A0 | AC0 | 8C0 | 8E0 | 9E0 |
| 7 | 0 | E00 | F00 | C20 | D20 | A40 | B40 | A60 | 960 | 680 | 780 | 4A0 | 6A0 | 2C0 | 0E0 | 1E0 | |
| 0 | 1 | 110 | 010 | 330 | 230 | 660 | 460 | 770 | 670 | 990 | 890 | 880 | 000 | C00 | FF0 | EF0 | |
| 1 | 1 | 910 | 810 | 830 | A30 | D60 | C60 | F70 | E70 | 190 | 090 | 380 | 280 | 600 | 400 | 7F0 | 6F0 |
| 2 | 1 | 610 | 410 | 730 | 630 | 150 | 060 | 370 | 270 | D90 | F80 | E80 | 9D0 | 8D0 | 8F0 | AF0 | |
| 3 | 1 | D10 | C10 | F30 | E30 | 960 | 850 | B70 | A70 | 690 | 490 | 780 | 680 | 100 | 0D0 | 3F0 | 2F0 |
| 4 | 1 | 310 | 210 | 130 | 030 | 750 | 650 | 570 | 470 | 890 | A90 | 980 | 880 | FD0 | DF0 | CF0 | |
| 5 | 1 | B10 | A10 | 930 | 830 | F60 | E60 | D70 | C70 | 390 | 290 | 180 | 080 | 7D0 | 6D0 | 6F0 | 4F0 |
| 6 | 1 | 710 | 610 | 630 | 430 | 350 | 260 | 170 | 070 | F90 | E90 | D80 | C80 | BD0 | AD0 | 9F0 | 8F0 |
| 7 | 1 | F10 | E10 | D30 | C30 | B50 | A50 | 970 | 870 | 790 | 690 | 680 | 480 | 3D0 | 2D0 | 1F0 | 0F0 |
| 0 | 2 | 808 | 908 | A28 | B28 | C48 | D48 | E68 | F68 | 088 | 188 | 2A8 | 3A8 | 4C8 | 5C8 | 6E8 | 7E8 |
| 1 | 2 | 008 | 108 | 228 | 328 | 448 | 648 | 668 | 768 | 888 | 988 | AA8 | BA8 | CC8 | DC8 | EE8 | FE8 |
| 2 | 2 | C08 | D08 | W28 | F28 | 848 | 948 | A68 | B68 | 488 | 588 | 6A8 | 7A8 | 0C8 | 1C8 | 2E8 | 3E8 |
| 3 | 2 | 408 | 608 | 628 | 728 | 048 | 148 | 268 | 368 | C88 | D88 | EA8 | FA8 | 8C8 | 9C8 | AE8 | BE8 |
| 4 | 2 | AD8 | B08 | 828 | 928 | E48 | F48 | C60 | D68 | 288 | 388 | DA8 | 1A8 | 6C8 | 7C8 | 4E8 | 5E8 |
| 5 | 2 | 208 | 308 | 028 | 128 | 648 | 743 | 468 | 668 | A88 | B88 | 8A8 | 9A8 | EC8 | FC8 | CE8 | DE8 |
| 6 | 2 | EO8 | F08 | C28 | D28 | A48 | B48 | 868 | 968 | 688 | 788 | 4A8 | 5AB | 2C8 | 3C8 | DE6 | 1E8 |
| 7 | 2 | 608 | 708 | 428 | 528 | 243 | 345 | 068 | 168 | E88 | F88 | CA8 | DA8 | AC8 | BC8 | 8E8 | 9E8 |
| 0 | 3 | 918 | 818 | B38 | A38 | D68 | C68 | F78 | E78 | 198 | 098 | 3B8 | 2B8 | 6D8 | 4D8 | 7F8 | 6F8 |
| 1 | 3 | 118 | 018 | 338 | 238 | 668 | 468 | 778 | 678 | 998 | 898 | BB8 | ABA | DD8 | CD8 | FF8 | EF8 |
| 2 | 3 | D18 | C18 | F38 | E38 | 968 | 868 | 878 | A78 | 698 | 498 | 7B8 | 6B8 | 1D8 | 0D8 | 3F8 | 2F8 |
| 3 | 3 | 618 | 418 | 738 | 638 | 168 | 058 | 378 | 278 | D98 | C98 | FB8 | EB8 | 9D8 | 8D8 | BF8 | AF8 |
| 4 | 3 | B18 | A18 | 938 | 838 | F68 | E68 | D78 | C78 | 398 | 298 | 1B8 | 0B8 | 7D8 | 6D8 | 6F8 | 4F8 |
| 5 | 3 | 318 | 218 | 138 | 038 | 768 | 668 | 678 | 478 | B98 | A98 | 9B8 | 8B8 | FD8 | ED8 | DF8 | CF8 |
| 6 | 3 | F18 | E18 | D38 | C38 | B68 | A68 | 978 | 878 | 798 | 698 | 688 | 4B8 | 3D8 | 2D8 | 1F8 | 0F8 |
| 7 | 3 | 718 | 618 | 538 | 438 | 368 | 258 | 178 | 078 | F98 | E98 | DB8 | CB8 | BD8 | AD8 | 9F8 | 8F8 |
| 0 | 4 | 404 | 604 | 624 | 724 | 044 | 144 | 264 | 364 | C84 | D84 | EA4 | FA4 | 8C4 | 9C4 | AE4 | BE4 |
| 1 | 4 | CO4 | D04 | E24 | F24 | 844 | 944 | A64 | B64 | 484 | 684 | 6A4 | 7A4 | 0C4 | 1C4 | 2E4 | 3E4 |
| 2 | 4 | 004 | 104 | 224 | 324 | 444 | 544 | 664 | 764 | 884 | 984 | AA4 | BA4 | CC4 | DC4 | EE4 | FE4 |
| 3 | 4 | 804 | 904 | A24 | B24 | C44 | D44 | E64 | F64 | 064 | 184 | 2A4 | 3A4 | 4C4 | 6C4 | 6E4 | 7E4 |
| 4 | 4 | 604 | 704 | 424 | 624 | 244 | 344 | 064 | 164 | E84 | F84 | CA4 | DA4 | AC4 | BC4 | 8E4 | 9E4 |
| 5 | 4 | E04 | F04 | C24 | D24 | A44 | B44 | 864 | 964 | 684 | 784 | 4A4 | 5A4 | 2C4 | 3C4 | 0E4 | 1E4 |
| 6 | 4 | 204 | 304 | 024 | 124 | 644 | 744 | 464 | 564 | A84 | B84 | 8A4 | 9A4 | EC4 | FC4 | CE4 | DE4 |
| 7 | 4 | A04 | B04 | 824 | 924 | E44 | F44 | C64 | D64 | 284 | 384 | 0A4 | 1A4 | 6C4 | 7C4 | 4E4 | 5E4 |
| 0 | 6 | 614 | 414 | 734 | 634 | 164 | 064 | 374 | 274 | D94 | C94 | F84 | E84 | 9D4 | 8D4 | BF4 | AF4 |
| 1 | 6 | D14 | C14 | F34 | E34 | 964 | 864 | B74 | A74 | 694 | 494 | 7B4 | 6B4 | 1D4 | 0D4 | 3F4 | 2F4 |
| 2 | 5 | 114 | 014 | 334 | 234 | 664 | 454 | 774 | 674 | 994 | 894 | BB4 | AB4 | DD4 | CD4 | FF4 | EF4 |
| 3 | 6 | 914 | 814 | B34 | A34 | D64 | C64 | F74 | E74 | 194 | 094 | 3B4 | 2B4 | 6D4 | 4D4 | 7F4 | 6F4 |
| 4 | 6 | 714 | 614 | 634 | 434 | 364 | 264 | 174 | D74 | F94 | E94 | DB4 | CB4 | BD4 | AD4 | 9F4 | 8F4 |
| 5 | 5 | F14 | E14 | D34 | C34 | B64 | A64 | 974 | 874 | 794 | 694 | 6B4 | 4B4 | 3D4 | 2D4 | 1F4 | 0F4 |
| 6 | 5 | 314 | 214 | 134 | 034 | 764 | 654 | 674 | 474 | B94 | A94 | 9B4 | 8B4 | FD4 | ED4 | DF4 | CF4 |
| 7 | 6 | B14 | A14 | 934 | 834 | F64 | E64 | D74 | C74 | 394 | 294 | 1B4 | 0B4 | 7D4 | 6D4 | 6F4 | 4F4 |
| 0 | 6 | C0C | D0C | E2C | F2C | 84C | 94C | A6C | B6C | 48C | 68C | 6AC | 7AC | DCC | 1CC | 2EC | 3EC |
| 1 | 6 | 40C | 50C | 62C | 72C | 04C | 14C | 26C | 36C | C8C | D8C | EAC | FAC | 8CC | 9CC | AEC | BEC |
| 2 | 6 | 80C | 90C | A2C | B2C | C4C | D4C | E6C | F6C | 08C | 18C | 2AC | 3AC | 4CC | 6CC | 6EC | 7EC |
| 3 | 6 | DDC | 10C | 22C | 32C | 44C | 64C | 66C | 76C | 88C | 98C | AAC | BAC | CCC | DCC | EEC | FEC |
| 4 | 6 | EDC | F0C | C2C | D2C | A4C | B4C | 86C | 96C | 68C | 78C | 4AC | 6AC | 2CC | 3CC | DEC | 1EC |
| 5 | 6 | 60C | 70C | 42C | 52C | 24C | 34C | D6C | 16C | E8C | F8C | CAC | DAC | ACC | BCC | 8EC | 9EC |
| 6 | 6 | A0C | B0C | 82C | 92C | E4C | F4C | C6C | D6C | 28C | 38C | 0AC | 1AC | 6CC | 7CC | 4EC | 6EC |

TABLE 25-continued

PARTITION TABLE BCS = f(XYZ) FOR sm = 3 AM1033

| ZY/X | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 7 | 5 | 20C | 30C | 02C | 12C | 64C | 74C | 46C | 66C | A8C | B8C | 8AC | 9AC | ECC | FCC | CEC | DEC |
| 0 | 7 | D1C | C1C | F3C | E3C | 96C | 86C | B7C | A7C | 69C | 49C | 7BC | 6BC | 1DC | 0DC | 3FC | 2FC |
| 1 | 7 | 61C | 41C | 73C | 63C | 16C | 06C | 37C | 27C | D9C | C9C | FBC | EBC | 9DC | 8DC | 8FC | AFC |
| 2 | 7 | 91C | 81C | 83C | A3C | D5C | C5C | F7C | E7C | 19C | 09C | 3BC | 2BC | 6DC | 4DC | 7FC | 6FC |
| 3 | 7 | 11C | 01C | 33C | 23C | 65C | 45C | 77C | 67C | 99C | 89C | BBC | ABC | DDC | CDC | FFC | EFC |
| 4 | 7 | F1C | E1C | D3C | C3C | B5C | A5C | 97C | 87C | 79C | 69C | 5BC | 4BC | 3DC | 2DC | 1FC | 0FC |
| 6 | 7 | 71C | 61C | 63C | 43C | 65C | 26C | 17C | 07C | F9C | E9C | DBC | CBC | BDC | ADC | 9FC | 8FC |
| 6 | 7 | B1C | A1C | 93C | 83C | F6C | E6C | D7C | C7C | 39C | 29C | 1BC | 0BC | 7DC | 6DC | 6FC | 4FC |
| 7 | 7 | 31C | 21C | 13C | 03C | 75C | 55C | 57C | 47C | 59C | A9C | 99C | 88C | FDC | EDC | DFC | CDC |
| 0 | 8 | 202 | 302 | 022 | 122 | 642 | 742 | 462 | 662 | A82 | B82 | 9A2 | EC2 | FC2 | CE2 | DE2 | |
| 1 | 8 | AD2 | D02 | 822 | E42 | F42 | C62 | D62 | 282 | 382 | 0A2 | 1A2 | 6C2 | 7C2 | 7C2 | 4E2 | 5E2 |
| 2 | 8 | 502 | 702 | 422 | 522 | 242 | 342 | 062 | 162 | E82 | F82 | CA2 | DA2 | AC2 | BC2 | 8E2 | 9E2 |
| 3 | 8 | E02 | F02 | C22 | D22 | A42 | B42 | 862 | 962 | 682 | 782 | 4A2 | 5A2 | 2C2 | 3C2 | DE2 | 1E2 |
| 4 | 8 | 002 | 102 | 222 | 322 | 442 | 542 | 662 | 762 | 882 | 982 | AA2 | BA2 | CC2 | DC2 | EE2 | FE2 |
| 5 | 8 | 002 | 902 | A22 | B22 | C42 | D42 | E62 | F62 | 082 | 182 | 2A2 | 3A2 | 4C2 | 5C2 | 6E2 | 7E2 |
| 6 | 8 | 402 | 502 | 622 | 722 | 042 | 142 | 262 | 362 | C82 | D82 | EA2 | FA2 | 8C2 | 9C2 | AE2 | BE2 |
| 7 | 8 | C02 | D02 | E22 | F22 | 842 | 942 | A62 | B62 | 482 | 682 | 6A2 | 7A2 | 0C2 | 1C2 | 2E2 | 3E2 |
| 0 | 9 | 312 | 212 | 132 | 032 | 762 | 662 | 572 | 472 | 692 | A92 | 9B2 | 8B2 | FD2 | ED2 | DF2 | CF2 |
| 1 | 9 | B12 | A12 | 932 | 832 | F62 | E52 | D72 | C72 | 392 | 292 | 1B2 | 0B2 | 7D2 | 6D2 | 6F2 | 4F2 |
| 2 | 9 | 712 | 612 | 532 | 432 | 362 | 262 | 172 | 072 | F92 | E92 | DB2 | CB2 | BD2 | AD2 | 9F2 | 8F2 |
| 3 | 9 | F12 | E12 | D32 | C32 | B62 | A52 | 972 | 872 | 792 | 682 | 682 | 482 | 3D2 | 2D2 | 1F2 | 0F2 |
| 4 | 9 | 112 | 012 | 332 | 232 | 662 | 462 | 772 | 672 | 982 | 892 | BB2 | AB2 | DD2 | CD2 | FF2 | ED2 |
| 5 | 9 | 912 | 812 | 832 | A32 | D62 | C82 | F72 | E72 | 192 | 092 | 3B2 | 2B2 | 5D2 | 4D2 | 7F2 | 6F2 |
| 6 | 9 | 512 | 412 | 732 | 632 | 162 | 062 | 372 | 272 | D92 | C92 | FB2 | EB2 | 9D2 | 8D2 | BF2 | AF2 |
| 7 | 9 | D12 | C12 | F32 | E32 | 962 | 852 | B72 | A72 | 692 | 492 | 7B2 | 6B2 | 1D2 | DD2 | 3F2 | 2F2 |
| 8 | A | ADA | BDA | 82A | 92A | E4A | F4A | C6A | D6A | 28A | 38A | DAA | 1AA | 6CA | 7CA | 4EA | 6EA |
| 1 | A | 20A | 30A | 02A | 12A | 64A | 74A | 46A | 55A | A8A | B8A | 8AA | 9AA | ECA | FCA | CEA | DEA |
| 2 | A | EDA | FDA | C2A | D2A | A4A | B4A | 86A | 96A | 68A | 78A | 4AA | 5AA | 2CA | 3CA | DEA | 1EA |
| 3 | A | EDA | 7DA | 42A | 62A | 24A | 62A | 34A | D5A | 15A | E8A | F8A | CAA | DAA | ACA | BCA | 9EA |
| 4 | A | 8DA | 9DA | A2A | B2A | C4A | D4A | E6A | F6A | D8A | 18A | 2AA | 3AA | 4CA | 6CA | 6EA | 7EA |
| 5 | A | DDA | 1DA | 22A | 32A | 44A | 54A | 56A | 76A | 88A | 98A | AAA | BAA | CCA | DCA | EEA | FEA |
| 6 | A | 6DA | DOA | E2A | F2A | 84A | 94A | A6A | B6A | 48A | 68A | 6AA | 7AA | 0CA | 1CA | 2EA | 3EA |
| 7 | A | 40A | 50A | 62A | 72A | D4A | 14A | 26A | 36A | C8A | D8A | EAA | FAA | 8CA | 9CA | AEA | BEA |
| D | B | B1A | A1A | 93A | 83A | F64 | E64 | D7A | C7A | 39A | 29A | 1BA | 0BA | 7DA | 6DA | 6FA | 4FA |
| 1 | B | 31A | 21A | 13A | 03A | 76A | 66A | 67A | 47A | 89A | A9A | 9BA | 8BA | FDA | EDA | DFA | CFA |
| 2 | B | F1A | E1A | D3A | C3A | B6A | A6A | 97A | 87A | 79A | 69A | 6BA | 4BA | 3DA | 2DA | 1FA | 0FA |
| 3 | B | 71A | 61A | 63A | 43A | 36A | 25A | 17A | D74 | F9A | E9A | DBA | CBA | BDA | ADA | 9FA | 8FA |
| 4 | B | 91A | 81A | 83A | A3A | D6A | C5A | F7A | E7A | 19A | D94 | 3BA | 2BA | 5DA | 4DA | 7FA | 6FA |
| 6 | B | 11A | 01A | 33A | 23A | 66A | 46A | 77A | 67A | 99A | 89A | BBA | ABA | DDA | CDA | FFA | EFA |
| 6 | B | D1A | C1A | F3A | E3A | 96A | 86A | B7A | A7A | 69A | 49A | 7BA | 6BA | 1DA | 0DA | 3FA | 2FA |
| 7 | B | 61A | 41A | 73A | 63A | 16A | 06A | 37A | 27A | D94 | C94 | FBA | EBA | 9DA | 8DA | 8FA | AFA |
| 8 | C | 606 | 706 | 426 | 526 | 246 | 346 | 066 | 166 | E86 | F86 | CA6 | DA6 | AC6 | BC6 | 8E6 | 9E6 |
| 1 | C | E06 | F06 | C26 | D26 | A46 | B46 | 866 | 966 | 686 | 786 | 4A6 | 5A6 | 2C8 | 3C6 | DE6 | 1E8 |
| 2 | C | 208 | 306 | D26 | 126 | 646 | 748 | 468 | 556 | A86 | D86 | 8A5 | 9A6 | EC6 | FC6 | CE6 | DE6 |
| 3 | C | AD6 | B06 | 826 | 926 | E48 | F46 | C66 | D68 | 286 | 388 | DA6 | 1A6 | 6C6 | 7C8 | 4E6 | 6E6 |
| 4 | C | 406 | 6D6 | 626 | 726 | D46 | 145 | 266 | 355 | C86 | D86 | EA6 | FA6 | 8C8 | 9C8 | AE6 | BE6 |
| 5 | C | C06 | B06 | E26 | F28 | 845 | 946 | A55 | B66 | 486 | 538 | 6A6 | 7A8 | 0C6 | 168 | 2E6 | 3E6 |
| 6 | C | DD6 | 105 | 226 | 326 | 445 | 545 | 555 | 768 | 886 | 996 | AA5 | BA6 | CC6 | DC8 | EE6 | FE6 |
| 7 | C | 806 | 906 | A26 | B26 | C46 | D46 | E68 | F66 | D86 | 186 | 2A6 | 3AE | 4CE | 6C6 | 6E6 | 7E6 |
| 0 | D | 716 | 616 | 636 | 436 | 366 | 266 | 176 | 076 | F96 | E96 | D86 | C86 | BD6 | AD6 | 9F6 | 8F6 |
| 1 | D | F18 | E18 | D36 | C36 | B55 | A56 | 976 | 876 | 796 | 696 | 6B6 | 486 | 3D8 | 2D6 | 1F8 | 0F6 |
| 2 | D | 316 | 216 | 136 | 036 | 766 | 656 | 578 | 478 | B96 | A96 | 9B6 | 8B6 | FD6 | ED6 | DF6 | CF6 |
| 3 | D | B16 | A16 | 936 | 836 | F66 | E66 | D76 | C76 | 396 | 295 | 186 | 0B6 | 7D6 | 6D6 | 6F6 | 4F6 |
| 4 | D | 616 | 416 | 736 | 636 | 166 | 056 | 378 | 276 | D96 | C96 | FB6 | EB6 | 9D6 | 8D6 | BF6 | AF6 |
| 6 | D | D16 | C18 | F36 | E36 | 954 | 866 | B76 | A76 | 696 | 495 | 786 | 6B6 | 1DE | 0D6 | 3F6 | 2F6 |
| 6 | D | 116 | 016 | 336 | 236 | 666 | 455 | 776 | 676 | 996 | 895 | BB6 | AB6 | DD6 | CD6 | FF6 | EF6 |
| 7 | D | 916 | 816 | B36 | A36 | D66 | C66 | F76 | E76 | 196 | 096 | 3B6 | 2B6 | 6D6 | 4D6 | 7F6 | 6F6 |
| 0 | E | E0E | F0E | C2E | D2E | A4E | B4E | 86E | 96E | 68E | 78E | 4AE | 6AE | 2CE | 3CE | DEE | 1EE |
| 1 | E | 60E | 70E | 42E | 52E | 24E | 34E | D6E | 16E | E8E | F8E | CAE | DAE | ACE | BCE | 8EE | 9EE |
| 2 | E | ADE | BDE | 82E | 92E | E4E | F4E | C6E | D6E | 28E | 38E | DAE | 1AE | 5CE | 7CE | 4EE | 5EE |
| 3 | E | 2DE | 3DE | 02E | 12E | 64E | 74E | 46E | 56E | A8E | D8E | 8AE | 9AE | ECE | FCE | CEE | DEE |
| 4 | E | C0E | D0E | E2E | F2E | 84E | 94E | A6E | B6E | 48E | 68E | 6AE | 7AE | DCE | 1CE | 2EE | 3EE |
| 5 | E | 40E | 60E | 62E | 72E | 04E | 14E | 26E | 36E | C8E | D8E | EAE | FAE | 8CE | 9CE | AEE | BEE |
| 6 | E | 80E | 90E | A2E | B2E | C4E | D4E | E6E | F6E | 08E | 18E | 2AE | 3AE | 4CE | 5CE | 6EE | 7EE |
| 7 | E | DDE | 1DE | 22E | 32E | 44E | 54E | 66E | 76E | 88E | 98E | AAE | BAE | CCE | DCE | EEE | FEE |
| 0 | F | F1E | E1E | D3E | C3E | B5E | A6E | 97E | 87E | 79E | 69E | 5BE | 4BE | 3DE | 2DE | 1FE | 0FE |
| 1 | F | 71E | 61E | 63E | 43E | 35E | 26E | 17E | 07E | F9E | E9E | DBE | CBE | 8DE | ADE | 9FE | 8FE |
| 2 | F | B1E | A1E | 93E | 83E | F6E | E6E | D7E | C7E | 39E | 29E | 1BE | 0BE | 7DE | 6DE | 6FE | 4FE |
| 3 | F | 31E | 21E | 13E | D3E | 76E | 66E | 67E | 47E | B9E | A9E | 9BE | 8BE | FDE | EDE | DFE | CFE |
| 4 | F | D1E | C1E | F3E | E3E | 96E | 86E | 87E | A7E | 69E | 49E | 7BE | 68E | 1DE | 0DE | 3FE | 2FE |
| 6 | F | 61E | 41E | 73E | 63E | 16E | 06E | 37E | 27E | D9E | C9E | FBE | EBE | 9DE | 8DE | 8FE | AFE |
| 6 | F | 91E | 81E | B3E | A3E | D6E | C6E | F7E | E7E | 19E | 09E | 3BE | 2BE | 6DE | 4DE | 7FE | 6FE |
| 7 | F | 11E | 01E | 33E | 23E | 66E | 45E | 77E | 67E | 99E | 89E | BBE | ABE | DDE | CDE | FFE | EFE |

TABLE 26

FUNDAMENTAL EQUATIONS AND SETUP EQUATIONS
BASIC DEFINING EQUATIONS
(L = h + v + p)

AMhvp MODES:

```
  Ys = Sp(sm, Rp(Y))
  ZR = Rp(Z)
   B = Ep(X, Ep(Ys, Zr))
  AY = Ys
  Az = Zr
   X = Ep(B, Ep(Ay, Az))
  Ys = Ay
  Zr = Az
   C = Qp(X, h, Ys)
   U = Qp(Qp(Zr, L-p, Ys), h, X)
   S = Qp(Ys, L-p, Zr)
   X = Qp(C, h, U)
  Ys = Rp(Qp(Qp(S, L-p, U), h, C))
  Zr = Qp(Qp(U, L-p, s)
 Ucs = Ep(B, Ep(C, S))
  Ay = Qp(Qp(S, L-p, Ucs), h, C)
  Az = Qp(Ucs, L-p, S)
```

TABLE 26A

PERMUTATION EQUATIONS FOR A SYSTEM WITH THREE BLOCK DIMENSIONS, STATIC TRANSFORM OVER THREE PIXEL DIMENSIONS AND A MIXTURE OF PERMUTATION BIT MAPS (PBMs) AND STANDARD BIT MAPS (SBMs).

PBM TRANSFORMS:

```
Wy = Sp(sm,Rp(Y)) = Qp(Qp(Cz,p',U),h,Cy)
Wz = Rp(Z) = Qp(U,p',Cz)
 B = Ep(X,Ep(Wy,Wz) = Ep(U,Ep(Cy,Cz))
Ay = Wy = Qp(Qp(Cz,p',Ep(B,Ep(Cy,Cz))),h,Cy)
Az = Wz = Qp(Ep(B,Ep(Cy,Cz)),p',Cz)
 U = Qp(Qp(Wz,p',Wy),h,X)
Cy = Qp(X,h,Wy)
Cz = Qp(Wy,p',Wz) p'= L - p
 X = Qp(Cy,h,U)
```

SBM TRANSFORMS:

```
 B = U  = Qp(Wz,p',X)
Ay = Cy = Qp(X,p',Wz)
Az = Cz = Qp(Wy,p',Wz)
```

TABLE 27

Definition of Shuffle Linear Permutation Network $S_p$, A Wire LPN

Definition:

$S_p(s,X_i) = X_{(i+s) \bmod L} = X_{i'}$

Where: i = index bit number value

TABLE 27-continued

Definition of Shuffle Linear Permutation Network $S_p$, A Wire LPN i' = (i + s) mod L
s = shuffle phase shift
L = number of index bits i Examples:

If s = 1 and L = 4

| i | i' | $X_i$ | $X_{i'}$ |
|---|---|---|---|
| 0 | 3 | $X_0$ | $X_3$ |
| 1 | 0 | $X_1$ | $X_0$ |
| 2 | 1 | $X_2$ | $X_1$ |
| 3 | 2 | $X_3$ | $X_2$ |

If s = 2 and L = 4

| i | i' | $X_i$ | $X_{i'}$ |
|---|---|---|---|
| 0 | 2 | $X_0$ | $X_2$ |
| 1 | 3 | $X_1$ | $X_3$ |
| 2 | 0 | $X_2$ | $X_0$ |
| 3 | 1 | $X_3$ | $X_1$ |

If s = 3 and L = 4

| i | i' | $X_i$ | $X_{i'}$ |
|---|---|---|---|
| 0 | 1 | $X_0$ | $X_1$ |
| 1 | 2 | $X_1$ | $X_2$ |
| 2 | 3 | $X_2$ | $X_3$ |
| 3 | 0 | $X_3$ | $X_0$ |

Reversal Proofs:

$S_p(-s,S_p(s,X_i)) = X_i$
$S_p(O,X_i) = X_i$
$S_p(L,X_i) = X_i$

TABLE 28

ADDRESSING EQUATIONS

AY1B = C1 HLT[1 + 1]' + HLT[1 + 1] S1 ^ ((plt[l-1]c1 B1))
AZ1B = S1 ^ (PLT[L-1]'C1 ^ B1)

MEMORY BANK ADDRESS CONNECTIONS:

| | |
|---|---|
| AY00 = 00,20,40,60,80,A0,C0,E0 | AZ00 = 00,20,40,60,80,A0,C0,E0 |
| AY01 = 10,30,50,70,90,B0,D0,F0 | AZ01 = 10,30,50,70,90,B0,D0,F0 |
| AY10 = 01,11,41,51,81,91,C1,D1 | AZ10 = 01,11,41,51,81,91,C1,D1 |
| AY11 = 21,31,61,71,A1,B1,E1,F1 | AZ11 = 21,31,61,71,A1,B1,E1,F1 |
| AY20 = 02,12,22,32,82,92,A2,B2 | AZ20 = 02,12,22,32,82,92,A2,B2 |
| AY21 = 42,52,62,72,C2,D2,E2,F2 | AZ21 = 42,52,62,72,C2,D2,E2,F2 |
| AY30 = 03,13,23,33,43,53,63,73 | AZ30 = 03,13,23,33,43,53,63,73 |
| AY31 = 83,93,A3,B3,C3,D3,E3,F3 | AZ31 = 83,93,A3,B3,C3,D3,E3,F3 |

H = h
HLT = "h less than"
P = p
PLT = "p less than"
\+ = "OR"
^ = "XOR"
space = "AND"
' = "NOT"

TABLE 29

VALID ADDRESS MODES FOR GIVEN STATIC SM MODE:

| MODE sm = | | 0 | 1 | 2 | 3 | 4 |
|---|---|---|---|---|---|---|
| MO | AM400 | Y | Y | Y | Y | Y |
| M1 | AM310 | Y | | | | Y |
| M2 | AM220 | Y | | | | Y |
| M3 | AM130 | Y | | | | Y |
| M4 | AM040 | Y | Y | Y | Y | Y |
| M5 | AM301 | Y | Y | Y | Y | Y |
| M6 | AM211 | | Y | | | |
| M7 | AM121 | | Y | | | |
| M8 | AM031 | | Y | | | |
| M9 | AM202 | Y | Y | Y | Y | Y |
| MA | AM112 | | | Y | | |
| MB | AM022 | | | Y | | |
| MC | AM103 | Y | Y | Y | Y | Y |
| MD | AM013 | | | | Y | |
| ME | AM004 | Y | Y | Y | Y | Y |

Y = valid address mode under contiguity requirement

TABLE 30

| SM | MODE | | | S3 | S2 | S1 | S0 | C3 | C2 | C1 | C0 | U3 | U2 | U1 | U0 |
|---|---|---|---|---|---|---|---|---|---|---|---|---|---|---|---|
| 0 | M0 | AM4000 | | Z0 | Z1 | Z2 | Z3 | Y0 | Y1 | Y2 | Y3 | X5 | X4 | X3 | X2 |
| 0 | M1 | AM3100 | | Z0 | Z1 | Z2 | Z3 | X5 | Y1 | Y2 | Y3 | Y0 | X4 | X3 | X2 |
| 0 | M2 | AM2200 | | Z0 | Z1 | Z2 | Z3 | X5 | X4 | Y2 | Y3 | Y0 | Y1 | X3 | X2 |
| 0 | M3 | AM1300 | | Z0 | Z1 | Z2 | Z3 | X5 | X4 | X3 | Y3 | Y0 | Y1 | Y2 | X2 |
| 0 | M4 | AM0400 | | Z0 | Z1 | Z2 | Z3 | X5 | X4 | X3 | X2 | Y0 | Y1 | Y2 | Y3 |
| 0 | M5 | AM3010 | | Y0 | Z1 | Z2 | Z3 | X5 | Y1 | Y2 | Y3 | Z0 | X4 | X3 | X2 |
| 0 | M6 | AM2110 | ? | Y0 | Z1 | Z2 | Z3 | X5 | X4 | Y2 | Y3 | Z0 | Y1 | X3 | X2 |
| 0 | M7 | AM1210 | ? | Y0 | Z1 | Z2 | Z3 | X5 | X4 | X3 | Y3 | Z0 | Y1 | Y2 | X2 |
| 0 | M8 | AM0310 | ? | Y0 | Z1 | Z2 | Z3 | X5 | X4 | X3 | X2 | Z0 | Y1 | Y2 | Y3 |
| 0 | M9 | AM2020 | | Y0 | Y1 | Z2 | Z3 | X5 | X4 | Y2 | Y3 | Z0 | Z1 | X3 | X2 |
| 0 | MA | AM1120 | ? | Y0 | Y1 | Z2 | Z3 | X5 | X4 | X3 | Y3 | Z0 | Z1 | Y2 | X2 |
| 0 | MB | AM0220 | ? | Y0 | Y1 | Z2 | Z3 | X5 | X4 | X3 | X2 | Z0 | Z1 | Y2 | Y3 |
| 0 | MC | AM1030 | | Y0 | Y1 | Y2 | Z3 | X5 | X4 | X3 | Y3 | Z0 | Z1 | Z2 | X2 |
| 0 | MD | AM0130 | ? | Y0 | Y1 | Y2 | Z3 | X5 | X4 | X3 | X2 | Z0 | Z1 | Z2 | Y3 |
| 0 | ME | AM0040 | | Y0 | Y1 | Y2 | Y3 | X5 | X4 | X3 | X2 | Z0 | Z1 | Z2 | Z3 |
| 0 | W0 | AM4W00 | | Z0 | Z1 | Z2 | Z3 | Y0 | Y1 | Y2 | Y3 | X5 | X4 | X3 | X2 |

? = Does not conform with contiguity requirement

TABLE 31

Static Mode sm = 0
EXTERNAL ADDRESS EQUATIONS for p <= sm:

AY00 = CO
AY01 = CO ^ HLT1
AY10 = C1
AY11 = C1 ^ HLT2
AY20 = C2
AY21 = C2 ^ HLT3
AY30 = C3
AY31 = C3 ^ HLT4

H = h
HLT =0 "h less than"
^ = XOR

TABLE 32

| SM | MODE | | | S3 | S2 | S1 | S0 | C3 | C2 | C1 | C0 | U3 | U2 | U1 | U0 |
|---|---|---|---|---|---|---|---|---|---|---|---|---|---|---|---|
| 1 | M0 | AM4001 | | Z0 | Z1 | Z2 | Z3 | Y3 | Y0 | Y2 | C0 | X5 | X4 | X3 | X2 |
| 1 | M1 | AM3101 | ? | Z0 | Z1 | Z2 | Z3 | X5 | Y0 | Y1 | Y2 | Y3 | X4 | X3 | X2 |
| 1 | M2 | AM2201 | ? | Z0 | Z1 | Z2 | Z3 | X5 | X4 | Y1 | Y2 | Y3 | Y0 | X3 | X2 |
| 1 | M3 | AM1301 | ? | Z0 | Z1 | Z2 | Z3 | X5 | X4 | X3 | Y2 | Y3 | Y0 | Y1 | X2 |
| 1 | M4 | AM0401 | | Z0 | Z1 | Z2 | Z3 | X5 | X4 | X3 | X2 | Y3 | Y0 | Y1 | Y2 |
| 1 | M5 | AM3011 | | Y3 | Z1 | Z2 | Z3 | X5 | Y0 | Y1 | Y2 | Z0 | X4 | X3 | X2 |
| 1 | M6 | AM2111 | | Y3 | Z1 | Z2 | Z3 | X5 | X4 | Y1 | Y2 | Z0 | Y0 | X3 | X2 |
| 1 | M7 | AM1211 | | Y3 | Z1 | Z2 | Z3 | X5 | X4 | X3 | Y2 | Z0 | Y0 | Y1 | Y2 |
| 1 | M8 | AM0311 | | Y3 | Z1 | Z2 | Z3 | X5 | X4 | X3 | X2 | Z0 | Y0 | Y1 | Y2 |
| 1 | M9 | AM2021 | | Y3 | Y0 | Z2 | Z3 | X5 | X4 | Y1 | Y2 | Z0 | Z1 | X3 | X2 |
| 1 | MA | AM1121 | ? | Y3 | Y0 | Z2 | Z3 | X5 | X4 | X3 | Y2 | Z0 | Z1 | Y1 | X2 |
| 1 | MB | AM0221 | ? | Y3 | Y0 | Z2 | Z3 | X5 | X4 | X3 | X2 | Z0 | Z1 | Y1 | Y2 |
| 1 | MC | AM1031 | | Y3 | Y0 | Y1 | Z3 | X5 | X4 | X3 | Y2 | Z0 | Z1 | Z2 | X2 |
| 1 | MD | AM0131 | ? | Y3 | Y0 | Y1 | Z3 | X5 | X4 | X3 | X2 | Z0 | Z1 | Z2 | Y2 |
| 1 | ME | AM0041 | | Y3 | Y0 | Y1 | Y2 | X5 | X4 | X3 | X2 | Z0 | Z1 | Z2 | Z3 |
| 1 | W1 | AM3W11 | | Y3 | Z1 | Z2 | Z3 | X5 | Y0 | Y1 | Y2 | Z0 | X4 | X3 | X2 |

? = Does not conform with contiguity requirement

TABLE 33

Static Mode sm = 1

TABLE 33-continued

EXTERNAL ADDRESS EQUATIONS for p <= sm:

AY00 = C0
AY01 = C0 ^ HLT1
AY10 = C1
AY11 = C1 ^ HLT2
AY20 = C2
AY21 = C2 ^ HLT3
AY30 = HLT4' C3 + HLT4 S3 ^ (PLT1 C3)
AY31 = HLT4' C3 + HLT4 S3 ^ (PLT1 C3')
AZ30 = S3 ^ (PLT1' C3)
AZ31 = S3 ^ (PLT1' C3')

H = h
P = p
+ = "OR"
^ = "XOR"
' = "NOT"
space = "AND"
HLT = "h less than"
PLT = "p less than"

TABLE 34

| SM | MODE | | | S3 | S2 | S1 | S0 | C3 | C2 | C1 | C0 | U3 | U2 | U1 | U0 |
|---|---|---|---|---|---|---|---|---|---|---|---|---|---|---|---|
| 2 | M0 | AM4002 | | Z0 | Z1 | Z2 | Z3 | Y2 | Y3 | Y0 | Y1 | X5 | X4 | X3 | X2 |
| 2 | M1 | AM3102 | ? | Z0 | Z1 | Z2 | Z3 | X5 | Y3 | Y0 | Y1 | Y2 | X4 | X3 | X2 |
| 2 | M2 | AM2202 | ? | Z0 | Z1 | Z2 | Z3 | X5 | X4 | Y0 | Y1 | Y2 | Y3 | X3 | X2 |
| 2 | M3 | AM1302 | ? | Z0 | Z1 | Z2 | Z3 | X5 | X4 | X3 | Y1 | Y2 | Y3 | Y0 | X2 |
| 2 | M4 | AM0402 | | Z0 | Z1 | Z2 | Z3 | X5 | X4 | X3 | X2 | Y2 | Y3 | Y0 | Y1 |
| 2 | M5 | AM3012 | | Y2 | Z1 | Z2 | Z3 | X5 | Y3 | Y0 | Y1 | Z0 | X4 | X3 | X2 |
| 2 | M6 | AM2112 | ? | Y2 | Z1 | Z2 | Z3 | X5 | X4 | Y0 | Y1 | Z0 | Y3 | X3 | X2 |
| 2 | M7 | AM1212 | ? | Y2 | Z1 | Z2 | Z3 | X5 | X4 | X3 | Y1 | Z0 | Y3 | Y0 | X2 |
| 2 | M8 | AM0312 | ? | Y2 | Z1 | Z2 | Z3 | X5 | X4 | X3 | X2 | Z0 | Y3 | Y0 | Y1 |
| 2 | M9 | AM2022 | | Y2 | Y3 | Z2 | Z3 | X5 | X4 | Y0 | Y1 | Z0 | Z1 | X3 | X2 |
| 2 | MA | AM1122 | | Y2 | Y3 | Z2 | Z3 | X5 | X4 | X3 | Y1 | Z0 | Z1 | Y0 | X2 |
| 2 | MB | AM0222 | | Y2 | Y3 | Z2 | Z3 | X5 | X4 | X3 | X2 | Z0 | Z1 | Y0 | Y1 |
| 2 | MC | AM1032 | | Y2 | Y3 | Y0 | Z3 | X5 | X4 | X3 | Y1 | Z0 | Z1 | Z2 | X2 |
| 2 | MD | AM0132 | ? | Y2 | Y3 | Y0 | Z3 | X5 | X4 | X3 | X2 | Z0 | Z1 | Z2 | Y1 |

TABLE 34-continued

| SM | MODE | | S3 | S2 | S1 | S0 | C3 | C2 | C1 | C0 | U3 | U2 | U1 | U0 |
|---|---|---|---|---|---|---|---|---|---|---|---|---|---|---|
| 2 | ME | AM0042 | Y2 | Y3 | Y0 | Y1 | X5 | X4 | X3 | X2 | Z0 | Z1 | Z2 | Z3 |
| 2 | W2 | AM2W22 | Y2 | Y3 | Z2 | Z3 | X5 | X4 | Y0 | Y1 | Z0 | Z1 | X3 | X2 |

? = Does not conform with contiguity requirement

TABLE 35

Static Mode sm = 2

EXTERNAL ADDRESS EQUATIONS for p <= sm:

AY00 = C0
AY01 = C0 ^ HLT1
AY10 = C1
AY11 = C1 ^ HLT2
AY20 = HLT3' C2 + HLT3 S2 ^ (PLT2 C2)
AY21 = HLT3' C2 + HLT3 S2 ^ (PLT2 C2')
AY30 = HLT4' C3 + HLT4 S3 ^ (PLT1 C3)
AY31 = HLT4' C3 + HLT4 S3 ^ (PLT1 C3')
AZ20 = S2 ^ (PLT2' C2)
AZ21 = S2 ^ (PLT2' C2')
AZ30 = S3 ^ (PLT1' C3)
AZ31 = S3 ^ (PLT1' C3')

H = h
P = p
+ = "OR"
^ = "XOR"
' = "NOT"
space = "AND"
HLT = "h less than"
PLT = "p less than"

TABLE 37

Static Mode = sm = 3

EXTERNAL ADDRESS EQUATIONS for p <= sm:

AY00 = C0
AY01 = C0 ^ HLT1
AY10 = HLT2' C1 + HLT2 S1 ^ (PLT3 C1)
AY11 = HLT2' C1 + HLT2 S1 ^ (PLT3 C1')
AY20 = HLT3' C2 + HLT3 S2 ^ (PLT2 C2)
AY21 = HLT3' C2 + HLT3 S2 ^ (PLT2 C2')
AY30 = HLT4' C3 + HLT4 S3 ^ (PLT1 C3)
AY31 = HLT4' C3 + HLT4 S3 ^ (PLT1 C3')
AZ10 = S1 ^ (PLT3' C1)
AZ11 = S1 ^ (PLT3' C1')
AZ20 = S2 ^ (PLT2' C2)
AZ21 = S2 ^ (PLT2' C2')
AZ30 = S3 ^ (PLT1' C3)
AZ31 = S3 ^ (PLT1' C3')

H = h
P = p
+ = "OR"
^ = "XOR"
' = "NOT"
space = "AND"
HLT = "h less than"
PLT = "p less than"

TABLE 36

| SM | MODE | | | S3 | S2 | S1 | S0 | C3 | C2 | C1 | C0 | U3 | U2 | U1 | U0 |
|---|---|---|---|---|---|---|---|---|---|---|---|---|---|---|---|
| 3 | M0 | AM4003 | | Z0 | Z1 | Z2 | Z3 | Y1 | Y2 | Y3 | Y0 | X5 | X4 | X3 | X2 |
| 3 | M1 | AM3103 | ? | Z0 | Z1 | Z2 | Z3 | X5 | Y2 | Y3 | Y0 | Y1 | X4 | X3 | X2 |
| 3 | M2 | AM2203 | ? | Z0 | Z1 | Z2 | Z3 | X5 | X4 | Y3 | Y0 | Y1 | Y2 | X3 | X2 |
| 3 | M3 | AM1303 | ? | Z0 | Z1 | Z2 | Z3 | X5 | X4 | X3 | Y0 | Y1 | Y2 | Y3 | X2 |
| 3 | M4 | AM0403 | | Z0 | Z1 | Z2 | Z3 | X5 | X4 | X3 | X2 | Y1 | Y2 | Y3 | Y0 |
| 3 | M5 | AM3013 | | Y1 | Z1 | Z2 | Z3 | X5 | Y2 | Y3 | Y0 | Z0 | X4 | X3 | X2 |
| 3 | M6 | AM2113 | ? | Y1 | Z1 | Z2 | Z3 | X5 | X4 | Y3 | Y0 | Z0 | Y2 | X3 | X2 |
| 3 | M7 | AM1213 | ? | Y1 | Z1 | Z2 | Z3 | X5 | X4 | X3 | Y0 | Z0 | Y2 | Y3 | X2 |
| 3 | M8 | AM0313 | ? | Y1 | Z1 | Z2 | Z3 | X5 | X4 | X3 | X2 | Z0 | Y2 | Y3 | Y0 |
| 3 | M9 | AM2023 | | Y1 | Y2 | Z2 | Z3 | X5 | X4 | Y3 | Y0 | Z0 | Z1 | X3 | X2 |
| 3 | MA | AM1123 | ? | Y1 | Y2 | Z2 | Z3 | X5 | X4 | X3 | Y0 | Z0 | Z1 | Y3 | X2 |
| 3 | MB | AM0223 | ? | Y1 | Y2 | Z2 | Z3 | X5 | X4 | X3 | X2 | Z0 | Z1 | Y3 | Y0 |
| 3 | MC | AM1033 | | Y1 | Y2 | Y3 | Z3 | X5 | X4 | X3 | Y0 | Z0 | Z1 | Z2 | X2 |
| 3 | MD | AM0133 | | Y1 | Y2 | Y3 | Z3 | X5 | X4 | X3 | X2 | Z0 | Z1 | Z2 | Y0 |
| 3 | ME | AM0043 | | Y1 | Y2 | Y3 | Y0 | X5 | X4 | X3 | X2 | Z0 | Z1 | Z2 | Z3 |
| 3 | W3 | AM1W33 | | Y1 | Y2 | Y3 | Z3 | X5 | X4 | X3 | Y0 | Z0 | Z1 | Z2 | X2 |

? = Does not conform with contiguity requirement

TABLE 38

| SM | MODE | | | S3 | S2 | S1 | S0 | C3 | C2 | C1 | C0 | U3 | U2 | U1 | U0 |
|---|---|---|---|---|---|---|---|---|---|---|---|---|---|---|---|
| 4 | M0 | AM4004 | | Z0 | Z1 | Z2 | Z3 | Y0 | Y1 | Y2 | Y3 | X5 | X4 | X3 | X2 |
| 4 | M1 | AM3104 | | Z0 | Z1 | Z2 | Z3 | X5 | Y1 | Y2 | Y3 | Y0 | X4 | X3 | X2 |
| 4 | M2 | AM2204 | | Z0 | Z1 | Z2 | Z3 | X5 | X4 | Y2 | Y3 | Y0 | Y1 | X3 | X2 |
| 4 | M3 | AM1304 | | Z0 | Z1 | Z2 | Z3 | X5 | X4 | X3 | Y3 | Y0 | Y1 | Y2 | X2 |
| 4 | M4 | AM0404 | | Z0 | Z1 | Z2 | Z3 | X5 | X4 | X3 | X2 | Y0 | Y1 | Y2 | Y3 |
| 4 | M5 | AM3014 | | Y0 | Z1 | Z2 | Z3 | X5 | Y1 | Y2 | Y3 | Z0 | X4 | X3 | X2 |
| 4 | M6 | AM2114 | ? | Y0 | Z1 | Z2 | Z3 | X5 | X4 | Y2 | Y3 | Z0 | Y1 | X3 | X2 |
| 4 | M7 | AM1214 | ? | Y0 | Z1 | Z2 | Z3 | X5 | X4 | X3 | Y3 | Z0 | Y1 | Y2 | X2 |
| 4 | M8 | AM0314 | ? | Y0 | Z1 | Z2 | Z3 | X5 | X4 | X3 | X2 | Z0 | Y1 | Y2 | Y3 |
| 4 | M9 | AM2024 | | Y0 | Y1 | Z2 | Z3 | X5 | X4 | Y2 | Y3 | Z0 | Z1 | X3 | X2 |
| 4 | MA | AM1124 | ? | Y0 | Y1 | Z2 | Z3 | X5 | X4 | X3 | Y3 | Z0 | Z1 | Y2 | X2 |
| 4 | MB | AM0224 | ? | Y0 | Y1 | Z2 | Z3 | X5 | X4 | X3 | X2 | Z0 | Z1 | Y2 | Y3 |
| 4 | MC | AM1034 | | Y0 | Y1 | Y2 | Z3 | X5 | X4 | X3 | Y3 | Z0 | Z1 | Z2 | X2 |
| 4 | MD | AM0134 | ? | Y0 | Y1 | Y2 | Z3 | X5 | X4 | X3 | X2 | Z0 | Z1 | Z2 | Y3 |
| 4 | ME | AM0044 | | Y0 | Y1 | Y2 | Y3 | X5 | X4 | X3 | X2 | Z0 | Z1 | Z2 | Z3 |
| 4 | W4 | AM0W44 | | Y0 | Y1 | Y2 | Y3 | X5 | X4 | X3 | X2 | Z0 | Z1 | Z2 | Z3 |

? = Does not conform with contiguity requirement

TABLE 39

| Static mode sm = 4 |
|---|
| EXTERNAL ADDRESS EQUATIONS for p <= sm: |
| AY00 = HLT1' C0 + HLT1 S0 ^ (PLT4 C0) |
| AY01 = HLT1' C0 + HLT1 S0 ^ (PLT4 C0') |
| AY10 = HLT2' C1 + HLT2 S1 ^ (PLT3 C1) |
| AY11 = HLT2' C1 + HLT2 S1 ^ (PLT3 C1') |
| AY20 = HLT3' C2 + HLT3 S2 ^ (PLT2 C2) |
| AY21 = HLT3' C2 + HLT3 S2 ^ (PLT2 C2') |
| AY30 = HLT4' C3 + HLT4 S3 ^ (PLT1 C3) |
| AY31 = HLT4' C3 + HLT4 S3 ^ (PLT1 C3') |
| AZ00 = S0 ^ (PLT4' C0) |
| AZ01 = S0 ^ (PLT4' C0') |
| AZ10 = S1 ^ (PLT3' C1) |
| AZ11 = S1 ^ (PLT3' C1') |
| AZ20 = S2 ^ (PLT2' C2) |
| AZ21 = S2 ^ (PLT2' C2') |
| AZ30 = S3 ^ (PLT1' C3) |
| AZ31 = S3 ^ (PLT1' C3') |

H = h
P = p
+ = "OR"
^ = "XOR"
' = "NOT"
space = "AND"
HLT = "h less than"
PLT = "p less than"

TABLE 40

| AGEN PINOUT SIGNAL DESCRIPTIONS | |
|---|---|
| ADE | Address/data enable: enables AGEN address or data to the AD lines. |
| AD31:0 | Bidirectional address/data bus. Mostly used for addresses. Used also to load control words into DGEN. And received display list words. |
| IRQ | Instruction request in put. Causes AGEN to read instructions from the AD bus for execution. Also allows polled status request from buscode. |
| ICODE3:0 | Instruction code associated with IRQ. Indicates the type of instruction to be processed, or causes AGEN to execute a status or refresh sequence. |
| IRDY | Instruction ready. Indicates when AGEN is available to receive and execute an Icode. Also distinguishes status buscode from bus control buscode. |
| MR | Master reset. Initialize the control state. |
| WAIT | Delays AGEN use of the bus to accommodate external bus usage and slow memories. |
| BUSTRODE | Initiates bus transfers as defined by the buscode. Used to strobe external bus control logic. |
| BUSCODE2:0 | Complete definition of the type of memory cycle being executed. Used by the external address circuit and the bus arbiters. |
| DOP2:0 | Function or operation code for the DGEN. Runs usually at 10 MHZ. |
| OPSTROBE | Nominal 10 MHZ signal generated by AGEN to lod dops into DGEN and otherwise keep the piplines in sync. |
| ICLK | Primary 40 MHZ clock input used to generate all other timing and drive the internal sequencers. Used directly for vector draw processor. |
| BFLD3:0 | Break field of the DGEN instructions. |
| PFLD3:0 | Pixel field of the DGEN instructions. |

TABLE 41

| DGEN PINOUT SIGNAL DESCRIPTIONS | |
|---|---|
| D31:0 | Primary bidirectional interface to the frame buffer image memory. DGEN also receives setup words from AGEN on this bus. |
| DE | Data bus output enable. |
| DSTROBE | Sequences the loading of DGEN registers from D bus. |
| VID7:0 | Video output from the fifo and shift registers independent of the ICLK. |

TABLE 41-continued

| DGEN PINOUT SIGNAL DESCRIPTIONS | |
|---|---|
| VSTROBE | 40 MHZ strobe for the video shift register output with special design to allow skew with the 40 MHZ AGEN and 40 MHZ DGEN ICLK. The skew is handled by phasing VID7'0 output relative to VSTROBE and ICLK. |
| MR | Master reset input. Causes a hard reset of control. |
| DOP3:0 | Multistate function operation code generated by AGEN to rapidly change the addressing modes and control the sequence for host data I/0. Register loading. BIT-BLT and vector draw operations. |
| OPSTRODE | 10 MHZ max rate strobe for the DOP instruction input. |
| PFLD3:0 | Nibble (4-bit) pixel bus for vector draw. |
| BFLD3:0 | "Break field" used primarily for defining vector break sequence. During BIT-BLT is used to control edge masking. |
| ICLK | 40 MHZ maximum rate instruction clock. |
| BLANK | Disable video shift action during retrace. |

TABLE 42

| The CA0[3:0] and CA1[3:0] fields of the AGEN output address: |
|---|
| CA00 = C0 |
| = X2 & HLE0 ! YZ0 & HLE0' |
| = X2 & HLE0 ! (SM & Y2 ! SM' & Y3) & HLE0' |
| CA01 = C1 |
| = X3 & HLE1 ! YZ1 & HLE1' |
| = X3 & HLE1 ! (SM & Y1 ! SM' & Y2) & HLE1' |
| CA02 = C2 |
| = X4 & HLE2 ! YZ2 & HLE2' |
| = X4 & HLE2 ! (SM & Y0 ! SM' & Y1) & HLE2' |
| CA03 = C3 |
| = X5 & HLE3 ! YZ3 & HLE3' |
| = X5 & HLE3 ! (SM & Z0 ! SM' & Y0) & HLE3' |
| CA10 = C0 ^ HLE0 |
| = X2' & HLE0 ! YZ0 & HLE0' |
| = X2' & HLE0 ! (SM & Y2 ! SM' & Y3) & HLE0' |
| CA11 = C1 ^ HLE1 |
| = X3' & HLE1 ! YZ1 & HLE1' |
| = X3' & HLE1 ! (SM & Y1 ! SM' & Y2) & HLE1' |
| CA02 = C2 ^ HLE2 |
| = X4' & HLE2 ! YZ2 & HLE2' |
| = X4' & HLE2 ! (SM & Y0 ! SM' & Y1) & HLE2' |
| CA13 = C3 ^ HLE3 |
| = X5' & HLE3 ! YZ3 & HLE3' |

TABLE 42-continued

| The CA0[3:0] and CA1[3:0] fields of the AGEN output address: |
|---|
| = X5' & HLE3 ! (SM & Z0 ! SM' & Y0) & HLE3' |

H = h
SM = sm
& = "AND"
! = "OR"
^ = "XOR"
' = "NOT"
HLE = h less than or equal to
SM' = L − sm
CA = A

We claim:

1. A frame buffer address circuit for raster graphics machines having a frame buffer memory comprising a bit map for storing graphics image data at frame buffer memory addresses correlated with pixel positions of a raster display surface, said frame buffer address circuit comprising:

linear permutation network (LPN) means for transformation and linear permutation of the graphics image data frame buffer memory addresses to form a linear permutation bit map in the frame buffer memory addressable by the frame buffer address circuit in at least two different addressing mode cell configurations, at least one of said addressing mode cell configurations corresponding to a two-dimensional cell.

2. The frame buffer address circuit of claim 1 wherein the linear permutation network means comprises at least one logical LPN.

3. A frame buffer address circuit for raster graphics machines having a frame buffer memory comprising a bit map for storing graphics image data at graphics image data addresses in the frame buffer memory correlated with pixel positions of a raster display surface, said bit map being addressable by the frame buffer address circuit in an addressing cell corresponding to a cell on the raster display surface in a memory access cycle, said frame buffer address circuit comprising:

logical linear permutation network means for transformation and linear permutation of the graphics image data addresses in the frame buffer memory to form a linear permutation bit map addressable by the frame buffer address circuit in at least three different addressing mode cell configurations, at least one of said addressing mode cell configurations corresponding to a two-dimensional cell on the raster display or view surface.

4. The frame buffer address circuit of claim 3 wherein the addressing mode cell configuations comprise a horizontally oriented two dimensional cell, a vertically oriented two dimensional cell, and a horizontal word mode cell.

5. A raster graphics machine comprising:

a frame buffer memory with frame buffer memory banks and frame buffer memory bank addresses, a data generator circuit for accessing graphics image data in the frame buffer memory bank addresses and for updating the graphics image data in the frame buffer memory bank addresses for raster operations and for refresh of a raster display surface with the graphics image data in the frame buffer memory, said data generator circuit having at least one logical linear permutation network means for transformation and linear permutation of graphics image data retrieved from the frame buffer memory bank addresses for normalizing the order of the data for raster operations and for refresh.

6. The data generator of claim 5 wherein the logical linear permutation network means comprises exchange linear permutation network means, $E_p$.

7. The data generator circuit of claim 5 wherein the logical linear permutation network means of the data generator circuit comprises exchange linear permutation network means, $E_p$, in combination with reversal wire linear permutation network means, $R_p$.

8. A data generator circuit for raster graphics machines having a frame buffer memory for updataing the frame buffer memory with vector drawing and raster operations and for refresh and display of a raster display surface with the graphics image data contents of the frame buffer memory, said data generator circuit comprising first logical linear permuation network means for transformation and linear permutation of graphics image data accessed from the frame buffer memory for normalizing graphics image data accessed from the frame buffer memory for raster operations and for refresh, and second logical linear permutation network means for transformation and linear permutation of the normalized graphics image data processed according to raster operations in the data generator circuit for return to said frame buffer memory.

9. The frame buffer address circuit of claim 8 wherein the first and second logical linear permutation network means of the data generator circuit comprise an exchange linear permutation network $E_p$.

10. A frame buffer address circuit for raster graphics machines having a frame buffer memory comprising a plurality of separately addressable memory banks B with memory bank address locations A, said address circuit addressing each memory bank of the frame buffer memory in a memory access cycle, said frame buffer memory comprising a bit map for storing graphics image data at memory bank address locations correlated with pixel positions of a raster display surface, said frame buffer address circuit having an input to receive graphics image data addresses organized in a user X, Y coordinate system corresponding to the pixel positions on the raster display surface, said frame buffer address circuit comprising:

linear permutation network (LPN) means for transformation and linear permutation of the graphics image data addresses in the user X, Y coordinate system to addresses in a B, A coordinate system of designated memory banks B and memory bank address locations A of the frame buffer, said B, A coordinate system comprising a linear permutation of the user X, Y coordinate system, said B, A coordinate system comprising a linear permutation bit map addressable by the frame buffer address circuit in at least two different addressing mode cell configurations, at least one of said addressing mode cell configuations corresponding to a two-dimensional cell in the user X, Y coordinate system.

11. The frame buffer address circuit of claim 10 wherein the linear permuation network means comprises at least one logical LPN.

12. The frame buffer address circuit of claim 11 wherein the designated memory bank B in the B, A coordinate system is a function of both X and Y in the X, Y coordinate system having a functional relationship of the form:

$$B=f_1\,(X,f_2(Y))$$

where the functions $f_1$ and $f_2$ are LPN,s and at least one of the functions $f_1$ and $f_2$ comprises a logical LPN.

13. The frame buffer address circuit of claim 12 wherein fl comprise a logical LPN and wherein f2 comprises a wire LPN.

14. The frame buffer address circuit of claim 12 wherein B is a function of X and Y as follows:

$$B=E_p(X,R_p(Y))$$

where $E_p$ is the exchange LPN and $R_p$ is the reversal LPN.

15. The frame buffer address circuit of claim 12 wherein the memory bank address locations A are a function of Y in the X, Y coordinate system having a functional relationship of the form:

$$A=f_3(Y)$$

where $f_3$ is a function comprising a wire LPN.

16. The frame buffer address circuit of claim 15 wherein $f_3$ comprises a reversal wire LPN, $R_p$.

17. The frame buffer address circuit of claim 12 wherein B is a function of X and Y as follows:

$$B=E_p\,(X,E_pR_p(Y))$$

where $E_p$ is the exchange LPN and $R_p$ is the reversal LPN.

18. The frame buffer address circuit of claim 11 wherein the logical linear permutation network comprises self-symmetric reversible Boolean logic gates.

19. The frame buffer address circuit of claim 11 wherein the logical linear permuation network comprises a cyclic LPN, $C_p$.

20. The frame buffer address circuit of claim 12 wherein the bit depth dimension coordinate Z is substituted for the vertical coordinate Y.

21. The frame buffer address circuit of claim 10 wherein the addressing mode cell configurations comprise at least one horizontally oriented two dimensional cell, at least one vertically oriented two dimensional cell, and at least one horizontal word mode cell.

22. The frame buffer address circuit of claim 10 wherein the address circuit is constructed and arrange for addressing each memory bank in a memory access cycle and accessing and assembling an addressing mode cell of graphics image data from the memory banks in a memory access cycle, all of the addressing mode cells of the different addressing modes cell confiqurations being the same bit size and comprising at least one bit from each of the memory banks.

23. The frame buffer address circuit means of claim 10 wherein the frame buffer address circuit is constructed and arranged to organize the linear permutation bit map of the frame buffer memory into a plurality of blocks of equal numbers of memory bank address locations corresponding to blocks of equal number of pixels of the raster display or view surface, said address circuit further organizing the blocks into a plurality of different sets of an equal number of cells with equal numbers of memory bank address locations in each cell, one set of cells corresponding to each addressing mode cell configuration, each set of cells corresponding to nonoverlapping cells of equal numbers of pixels on the raster display surface, each cell comprising an equal number of units of graphics image data from the frame buffer memory bank address locations, one unit of graphics image data from each memory bank.

24. The frame buffer address circuit of claim 23 wherein the horizontal dimension of each block is equal to the longest horizontal dimension of any of the cells of the different addressing mode cell configurations, wherein the vertical dimension of the block is equal to the longest vertical dimension of any of the cells of the different addressing mode cell configurations, said block size comprising the smallest X,Y coordinate system area containing a set of equal numbers of cells of each of the different addressing mode cell configurations and in which each set of cells of the different addressing mode cell configurations forms a boundary subset of the block.

25. The frame buffer address circuit of claim 24 wherein the cells of the different addressing mode cell configurations comprise a cell size of 64 bits, wherein the addressing mode cell configurations comprise a 64×1 bit horizontal word cell, a 16×4 bit horizontally oriented rectangular cell, and a 4×16 bit vertically oriented rectangular cell, and wherein the block size comprises 64×16 bits.

26. The frame buffer address circuit of claim 25 wherein the addressing mode cell configurations further comprise an 8×8 bit square cell.

27. The frame buffer address circuit of claim 26 wherein the addressing mode cell configurations further comprise a 32×2 bit cell.

28. The frame buffer address circuit of claim 25 wherein the unit of graphics image data from each memory bank accessed each memory cycle comprises a quad of four bits.

29. A frame buffer address circuit for raster graphics machines having a frame buffer memory comprising a plurality of separately addressable memory banks B with memory bank address locations Ay, Az organized into a plurality of bit planes, said address circuit accessing each memory bank of the frame buffer memory in a memory access cycle, said frame buffer memory comprising a bit map for storing graphics image data at memory bank address locations correlated with pixel positions of a raster display surface, each plane of the frame buffer memory comprising memory bank address locations for storing one bit per pixel of the raster display or view surface in each plane, said frame buffer address circuit comprising input circuitry to receive graphics image data addresses organized in a user X,Y, Z coordinate system of horizontal rows in the X coordinate direction and vertical columns in the Y coordinate direction corresponding to the pixel positions on the raster display or view surface, said user X, Y, Z coordinate system further comprising a bit depth dimension Z corresponding to the planes of the frame buffer memory, said frame buffer address circuit comprising:

linear permutation network (LPN) means for transformation and linear permutation f the graphics image data addresses in the user X, Y, Z coordinate system to addresses in a B, $A_y$, $A_z$ coordinate system of designated memory banks B and memory bank address locations $A_y$, $A_z$ of the frame buffer, said B, $A_y$, $A_z$ coordinate system comprising a linear permutaiton of the user X,YY, Z coordinate system, said B, $A_y$, $A_z$ coordinate system comprising a linear permutation bit map addressable by the frame buffer address circuit in at least two different addressing mode cell configurations, at least one of said addressing mode cell configurations corresponding to a three-dimensional cell in the user X, Y, Z coordinate system.

30. The frame buffer address circuit of claim 29 wherein the linear permuation network means comprises at least two logical LPN'S.

31. The frame buffer address circuit of claim 30 wherein the designated memory bank B in the B, $A_y$, $A_z$ coordinate system is a function of X, Y, and Z in the X, Y, Z coordinate system having a functional relationship of the form:

$$b=f_1(X,f_2(Y,Z)$$

where $f_1$ and $f_2$ are functions comprising logical linear permutation networks.

32. The frame buffer address circuit of claim 31 wherein $f_1$ and $f_2$ each comprise an exchange linear permuation network $E_p$.

33. The frame buffer address circuit of claim 32 wherein $f_2$ comprises an exchange LPN, $E_p$, and a reversal LPN, $R_p$.

34. The frame buffer address circuit of claim 31 wherein B is a function of X,Y, and Z as follows:

$$B=E_p(X,E_pR_p(Y,Z))$$

where $E_p$ is the exchange LPN and $R_p$ is the reversal LPN.

35. The frame buffer address circuit of claim 34 wherein B is a function of X,Y and Z as follows:

$$B=E_p(X,E_p(Y_s,Z_r))$$

where $$Z_r=R_p(Z)$$

and $$Y_s=S_p(sm,R_p(Y))$$

where $S_p$ is the shuffle wire LPN, $R_p$ is the reversal wire LPN, and wherein sm is the addressing static mode.

36. The frame buffer address circuit of claim 35 where the memory bank address location coordinates $A_y$ are a function of Y in the X,Y,Z coordinate system having the functional relationship of the form:

$$A_y=Y_s.$$

37. The frame buffer address circuit of claim 36 where the frame buffer memory bank address coordinates $A_z$ are a function of Z in the X,ZY,Z coordinate system having a functional relationship of the form:

$$A_z=Z_r.$$

38. The frame buffer address circuit of claim 31 wherein the memory bank address locations coordinates $A_y$ in the B,$A_y$,$A_z$ coordinate system are a function of Y in the X,Y,Z coordinate system having a functional relationship of the form:

$$A_y=f_3(Y)$$

39. The frame buffer address circuit of claim 38, wherein the wire permutation network of $f_3$ comprises a reversal wire LPN, $R_p$.

40. The frame buffer address circuit of claim 29 wherein the address circuit is constructed and arranged for addressing each memory bank in a memory access cycle and accessing and assembling an addressing mode cell of graphics image data from the plurality of memory banks in a memory access cycle, all of the addressing mode cells of the different addressing mode cell configurations being the same bit size and comprising at least one bit from each of the memory banks.

41. The frame buffer address circuit of claim 29 wherein the frame buffer address circuit is constructed and arranged to organize the linear permuation bit map of the frame buffer memory into a plurality of blocks of equal numbers of memory bank address locations corresponding to blocks of equal number of pixels of the raster display or view surface, said address circuit further organizing the blocks into a plurality of different sets of an equal number of cells with equal numbers of memory bank address locations in each cell, one set of cells corresponding to each addressing mode cell configuration, each set of cells corresponding to nonoverlapping cells of equal numbers of pixels on the raster display or view surface, each cell comprising an equal number of units of graphics image data from the frame buffer memory bank address locations, one unit of graphics image data from each memory bank.

42. The frame buffer address circuit of claim 41 wherein the horizontal dimension of each block is equal to the longest horizontal dimension of any of the cells of the different addressing mode cell configurations, wherein the vertical dimension of the block is equal to the longest vertical dimension of any of the cells of the different addressing mode cell configurations, and wherein the depth dimension of each block is equal to the selected number of planes Z of organization of the frame buffer memory bank address locations and therefore the depth dimension of cell with greatest bit depth dimension, said block size comprising the smallest X, Y, Z coordinate system volume containing a set of equal numbers of cells of each of the different addressing mode cell configurations and in which each set of cells of the different addressing mode cell configurations forms a boundary subset of the block.

43. The frame buffer address circuit of claim 42 wherein the cell size of each of the different addressing mode cell configurations is 64 bits, wherein the addressing mode cell configurations comprise a horizontal word mode cell with X,Y,Z dimensions of 64×1×1 bits, a first horizontally oriented rectangular cell having X,Y,Z dimensions of 32×2×1 bits, a second horizontally oriented rectangular cell having X,Y,Z dimensions of 16×4×1 bits, a square cell having X,Y,Z dimensions of 8×8×1 bits and a vertically oriented rectangular cell having X,Y,Z dimensions of 4×16×1 bits.

44. The frame buffer address circuit of claim 43 wherein the addressing mode cell configurations further comprise a second horizontal word cell having X,Y,Z dimensions of 32×1×2 bits, a third horizontal word cell having X,Y,Z dimensions of 16×1×4 bits, a fourth horizontal word cell having X,Y,Z dimensions of 8×1×8 bits, and a fifth horizontal word cell having X,Y,Z dimensions of 4×1×16 bits.

45. The frame buffer address circuit of claim 43 wherein the block size in bits is 1024 bits with X,Y,Z dimensions comprising 64×16×1 bits.

46. The frame buffer address circuit of claim 42 wherein the bit size of the addressing mode cells comprises 64 bits, wherein the addressing mode cell configurations comprise a horizontal word cell having X,Y,Z dimensions of 32×1 by 2 bits, a first horizontally oriented rectangular cell having X,Y,Z dimensions of 16×2×2 bits, a second horizontally oriented rectangular cell having X,Y,Z dimensions of 8×4×2 bits, and a vertically oriented rectangular cell having X,Y,Z dimensions of 4×8×2 bits.

47. The frame buffer address circuit of claim 43 wherein the bit size of the addressing mode cells comprises 64 bits, wherein the addressing mode cell configurations comprise a horizontal word cell having X,Y,Z dimensions of 16×1×4 bits, a horizontally oriented rectangular cell having X, Y, Z dimensions of 8×2×4 bits, and a square cell having X, Y, Z dimensions of 4×4×4 bits.

48. The frame buffer address circuit of claim 42 wherein the bit size of the addressing mode cells comprises 64 bits, wherein the addressing mode cell configurations comprise a horizontal word cell having X, Y, Z dimensions of 8×1×8 bits, and a horizontally oriented rectangular cell having X,Y,Z dimensions of 4×2×8 bits.

49. The frame buffer address circuit of claim 42 wherein the linear permutation network means comprises a first linear permutation function network for transformation and linear permutation of the graphics image data addresses in the user X, Y, Z coordinate system to addresses in an abstract C, U, S coordinate system of three-dimensional block sections S of equal bit size and configuration corresponding to three-dimensional block sections of the X, Y, Z coordinate system, cell subdivisions C of the block sections corresponding to the addressing mode cells and corresponding nonoverlapping cells of equal numbers of pixels on the raster display or view surface, and graphics image data units, U, each cell comprising an equal number of said units, said C, U, S coordinate system comprising a first linear permutation bit map, said first linear permutation function network comprising a functional relationship of the form:

$$C,U,S=f(X,Y,Z)$$

where f includes the pairwise logical switch linear permutation network $Q_p$;

and wherein the linear permutation network means further comprises a second linear permutation function network for transformation and linear permutation of the graphics image data addresses in the abstract C, U, S coordinate system to memory bank addresses in a B, $A_y$, $A_z$ coordinate system of designated memory banks B and memory bank address locations $A_y$ of the frame buffer memory said B, AY, $A_z$ coordinate system comprising a linear permutation of the abstract C, U, S coordinate system and wherein the functional relationship of the second transformation and linear permutation is of the form:

$$B,A_y,A_z=g(C,U,S)$$

where g comprises the pairwise logical switch linear permutation netwrok $Q_p$ and the logical exchange LPN $E_p$.

50. The frame buffer address circuit of claim 49 wherein the first and second linear permutation function networks further comprise wire LPNs.

51. A data generator means coupled to the frame buffer address circuit and frame buffer memory of a raster graphics machine for updating the frame buffer with vector drawing and raster operations, and for refresh of a raster display surface with the graphics image data contents of the frame buffer memory, said data generator circuit comprising:

first linear permutation network means comprising at least one logical linear permuation network (LPN) for transformation and linear permutation of graphics image data accessed from the frame buffer memory in the frame buffer memory coordinate system for normalizing the order of graphics image data accessed from the frame buffer memory for raster operations and refresh, and second linear permutation network means comprising at least one logical linear permutation network (LPN) for transformation and linear permutation of the normalized graphics image data processed in raster operations in the data generator circuit to a permuted coordinate system for return to the frame buffer memory.

52. The data generator circuit of claim 51 wherein the first and second linear permutation network means of the data generator circuit comprise exchange linear permutation networks $E_p$.

53. The data generator circuit of claim 52 wherein the first and second linear permutation network means of the data generator circuit means further comprise wire linear permutation networks including the reversal wire linear permutation netwrok $R_p$.

54. A data generator circuit coupled to the address generator circuit and frame buffer memory of a raster graphics machine for accessing graphics image data in frame buffer memory bank address locations for updating the frame buffer memory bank address locations with vector drawing and raster operations and for refresh of a raster display surface with the contents of the frame buffer memory, said data generator circuit comprising:

pre-permute logical linear permutation network means for transformation and linear permutation of graphics image source data retrieved from the frame buffer memory bank address locations in the coordinate system of the frame buffer memory for normalizing the order of the data for establishing a common coordinate system of source data and destination data during raster operations; and post-permute logical linear permutation network means for transformation and linear permutation of graphics image data processed by raster operations to a permuted coordinate system for return of processed graphics image data to the frame buffer memory in a permute coordinate system.

55. The data generator circuit of claim 54 wherein the pre-permute logical linear permutation network means and the post-permute logical linear permuation network means of the data geneator circuit further comprise wire linear permutation networks.

56. The data generator circuit of claim 54 wherein the pre-permute and post-permute logical linear permuation network means of the data generator circuit comprise exchange linear permuation networks $E_p$.

57. The data generator circuit of claim 56 wherein the pre-permute and post-permute logical linear permutation network means of the data generator circuit further comprise reversal wire linear permutation networks $R_p$.

58. The data generator circuit of claim 54 wherein the logical linear permutation network means comprise the cyclic linear permutation network Cp.

59. A method for graphics image data generation for updating frame buffer memory bank address locations A in the memory banks B of a frame buffer memory in a raster graphics machine and for refresh of a raster display surface having pixel positions correlated with the frame buffer memory bank address locations comprising:

organizing the frame buffer memory bank address locations into a permuted bit map by receiving graphics image data addresses in the user X, Y coordinate system and transforming and permutting the addresses from the user X, Y coordinate system through logical linear permutation network means to a permuted B, A coordinate system of designated memory banks B and memory bank address locations A;

retrieving graphics image data from the frame buffer memory bank address locations in the permuted B, A coordinate system for processing in raster operations;

pre-permuting and normalizing the order of graphics image data retrieved from the permuted B, A coordinate system to the normalized user X, Y coordinate system through pre-permute linear permutation network means for matching source data with destination data during raster operations;

post-permuting graphics image data remaining in the normalized user, X, Y coordinate system after processing in raster operations to the permuted B, A cordinate system through post-permute linear permutation network means;

and returning the graphics image data in the permuted B, A coordinate system to the frame buffer memory bank address locations for completing raster operations in the permuted bit map.

60. The method of claim 59 comprising the steps of pre-permuting and normalizing graphics image source data retrieved from the frame buffer memory bank address locations in the permuted B, A coordinate system to the normalized user X,Y coordinate system;

pre-permuting and normalizing graphics image destination data retrieved from the frame buffer memory bank address locations in the permuted B, A coordinate system to the normalized user, X, Y coordinate system;

aligning the normalized graphics image source data and destination data by alignment rotation of the source data;

merging the normalized and aligned source data and destination data in a logical operation in the user X, Y coordinate system;

post-permuting the merged and processed source data and destination data by transformation and permutation from the user X, Y coordinate system to the permuted B,A coordinate system for return to the permuted bit map of the frame buffer memory bank address locations.

61. A method for graphics image data generation for updating frame buffer memory bank address locations $A_y$, $A_z$ organized into a plurality of planes in the memory banks B of a frame buffer memory in a raster graphics machine and for refresh of a raster display surface having pixel positions correlated with frame buffer memory bank address location comprising:

organizing the frame buffer memory bank address locations into a permuted bit map by receiving graphics image data addresses in the user X, Y, Z coordinate system corresponding to rows and columns X, Y of pixels on a raster display or view surface and multiple plane bit depth Z corresponding to the number of bits defining each pixel, and transforming and permuting the addresses from the user X, Y, Z coordinate system through logical linear permutation network means to a permute B, $A_y$, $A_z$ coordinate system of designated memory banks B and memory bank address locations $A_y$, $A_z$;

retrieving graphics image data from the frame buffer memory bank address locations in the permute B,$A_y$,$A_z$ coordinate system for processing in raster operations;

pre-permuting and normalizing the order of retrieved graphic image data from the permuted B, $A_y$, $A_z$ coordinate system to the normalized user X, Y, Z coordinate system for processing graphics image data in graphics perations;

post-permuting processed graphics image data from the normalized user X, Y, Z coordinate system to the permuted B, $A_y$, $A_z$ coordinate system through post-permute linear permutation networks;

and returning the graphics image data in the $B,A_yA_z$ coordinate system to the frame buffer memory bank address locations in the permuted bit map.

62. a method for addressing a raster graphics machine frame buffer memory comprising a bit map for storing graphics image data at frame buffer memory addresses correlated with pixel positions of a raster display surface, said frame buffer addresing method comprising:

transforming and linear permuting in linear permutation network means the graphics image data frame buffer memory addresses and forming a linear permutation bit map in the frame buffer memory addressable by the frame buffer address circuit in at least two different addressing mode cell configurations, at least one of said addressing mode cell configurations corresponding to a two-dimensional cell.

63. The frame buffer addressing method of claim 62 wherein transforming and linear permuting step comprises transforming and permuting in at least one logical linear permutation network (LPN);

and addressing the frame buffer memory linear permutation bit map in at least three different addressing mode cell configurations, at least two of said addressing mode cell configurations comprising two-dimensional cells.

64. A method for generating graphics image data in raster graphics machines having a frame buffer memory by accessing graphics image data in frame buffer memory bank addresses and updating the frame buffer memory bank addresses for vector drawing, raster operations, and refresh of a raster display surface with the contents of the frame buffer memory, said method comprising:

accessing graphics image data from the frame buffer memory bank addresses and permutting the data in pre-permute logical linear permutation network means for transformation and linear permutation for normalizing the order of the data and establishing a common coordinate system for processing graphics image data during raster operations and refresh; and transforming and linear permuting the graphics image data processed raster operations in post-permute logical linear permutation network means for return of processed graphics image data to the frame buffer memory.

65. The method of claim 64 wherein the pre-mute and post-permute logical linear permutation networks of the data generator circuit comprise exchange linear permutation networks $E_p$.

* * * * *

US004882683B1

REEXAMINATION CERTIFICATE (2720th)

United States Patent [19]

[11] B1 4,882,683

Rupp et al.

[45] Certificate Issued Nov. 7, 1995

[54] CELLULAR ADDRESSING PERMUTATION BIT MAP RASTER GRAPHICS ARCHITECTURE

[75] Inventors: Charles R. Rupp, Bolton; William R. Stronge, Tewksbury, both of Mass.

[73] Assignee: Fairchild Semiconductor Corporation, Cupertino, Calif.

Reexamination Request:
No. 90/002,723, May 14, 1992

Reexamination Certificate for:

| | |
|---|---|
| Patent No.: | **4,882,683** |
| Issued: | **Nov. 21, 1989** |
| Appl. No.: | **26,041** |
| Filed: | **Mar. 16, 1987** |

[51] Int. Cl.$^6$ .......... G06F 12/00

[52] U.S. Cl. .......... 395/165; 345/193

[58] Field of Search .......... 395/122, 164–166, 395/400, 425; 340/701, 703, 723, 724, 727, 279, 750, 798–800; 345/193, 189, 190, 200, 187, 185, 112, 116

[56] References Cited

U.S. PATENT DOCUMENTS

| | | | |
|---|---|---|---|
| 3,812,467 | 5/1974 | Batcher | 395/800 |
| 3,938,102 | 2/1976 | Morrin et al. | 395/164 |
| 3,995,253 | 1/1976 | Morrin, II et al. | 395/164 |
| 3,996,559 | 12/1976 | Morrin et al. | 395/100 |
| 4,090,174 | 5/1978 | Van Voorhis | 395/164 |

FOREIGN PATENT DOCUMENTS

| | | |
|---|---|---|
| 0163209 | 4/1985 | European Pat. Off. . |
| 0141521 | 5/1985 | European Pat. Off. . |
| 0201174 | 12/1986 | European Pat. Off. . |
| 2149157 | 5/1985 | United Kingdom . |

OTHER PUBLICATIONS

IEEE Transactions on Computers, vol. C–35, No. 7, Jul. 1986, p. 669–674.

Electronics, vol. 60, No. 15, 23rd Jul. 1987, pp. 57–59.

*Primary Examiner*—Mark R. Powell

[57] ABSTRACT

A new permutation bit map architecture is described for flexible cellular addressing, image creation, and frame buffer control in raster graphics machines. A new frame buffer address generator and address circuitry accesses frame buffer memory locations with different word and cell configuration addressing modes to increase performance and efficiency. A new graphics image data generator creates, modifies, and updates graphics image-data in the frame buffer memory locations accessed by the multiple addresing mode word and cell configurations of the address generator and address circuitry. The graphics image data generator provides vector drawing, polygon filling, "Bit Blt's" or bit block transfers, alignment and masking of graphics image data, and refresh display of a raster view surface. Vector drawing is achieved with greatly increased performance because of the multiple cellular addressing modes of the addressing circuitry. A new and unusual permitted bit map organization of graphics image data is established in the frame buffer memory locations by the new flexible addressing architecture. The frame buffer address circuitry incorporates linear permutation networks that permute the user X,Y, Z coordinate addresses. The data generator circuit also incorporates linear permutation networks for normalizing, aligning and merging data retrieved from the frame buffer memory in raster operations. Parallel processing of accessed data is achieved using a frame buffer comprised of multiple memory banks. The system is also implemented in three dimensions. A new three-dimensional permuted bit map organization accommodates a variable number of multiple planes in the third dimension or bit depth dimension for varying the number of bits defining each pixel.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 59–61 is confirmed.

Claims 6, 7, 19, 32, 52, 56, 58 and 65 are cancelled.

Claims 1–5, 8–13, 18, 21–23, 29–31, 33, 37, 41, 49, 51, 53, 54, 57, and 62–64 are determined to be patentable as amended.

Claims 14–17, 20, 24–28, 34–36, 38–40, 42–48, 50, 55 and 59–61 dependent on an amended claim, are determined to be patentable.

1. A frame buffer address circuit for faster graphics machines having a frame buffer memory comprising a bit map for storing graphics image data at frame buffer memory addresses correlated with pixel positions of a faster display surface, said frame buffer address circuit comprising:

*logical* linear permutation network (LPN) [means] *comprising an exchange linear permutation network, $E_p$* for transformation and linear permutation of the graphics image data frame buffer memory addresses to form a linear permutation bit map in the frame buffer memory addressable by the frame buffer address circuit [in at least two] *by greater than 3* different addressing mode configurations, [at least one] *a plurality* of said addressing mode cell configurations corresponding to [a] two-dimensional cells.

2. The frame buffer address circuit of claim 1 wherein the *logical* linear permutation network means comprises at least one [logical] *exchange* LPN *$E_p$ constructed from self-symmetric Boolean logic XOR or XNOR gates.*

3. A frame buffer address circuit for raster graphics machines having a frame buffer memory comprising a bit map for storing graphics image data at graphics image data addresses in the fame buffer memory correlated with pixel positions of a raster display surface, said bit map being addressable by the frame buffer address circuit in an addressing cell corresponding to a cell on the raster display surface in a memory access cycle, said frame buffer address circuit comprising:

logical linear permutation network [means] *(LPN) comprising an exchange LPN, $E_p$* for transformation and linear permutation of the graphics image data addresses in the frame buffer memory to form a linear permutation bit map addressable by the frame buffer address circuit in [at least] *greater than* three different addressing mode cell configurations at least [one] *three* of said addressing mode cell configurations corresponding to [a] two-dimensional *cells* on the raster [or view] *display* surface.

4. The frame buffer address circuit of claim 3 wherein the addressing mode cell configurations comprise a horizontally oriented two dimensional cell, a vertically oriented two dimensional cell, *a substantially square two dimensional cell,* and a horizontal word mode cell.

5. A raster graphics machine comprising:

a frame buffer memory with frame buffer memory banks and frame buffer memory bank addresses, a data generator circuit for accessing graphics image data in the frame buffer memory bank addresses and for updating the graphics image data in the frame buffer memory bank addresses for raster operations and for refresh of a raster display surface with the graphics image data in the frame buffer memory, said data generator circuit having at least one logical linear permutation network means *comprising an exchange linear permutation network $E_p$ in a combination with a wire reversal LPN, $R_p$* for transformation and linear permutation of graphics image data retrieved from the frame buffer memory bank addresses for normalizing the order of the data for raster operations and for refresh.

8. A data generator circuit for raster graphics machines having a frame buffer memory for updating the frame buffer with vector drawing and raster operations and for refresh and display of a raster display surface with the graphics image data contents of the frame buffer memory, said data generator circuit means comprising:

first logical linear permutation network means *comprising an exchange linear permutation network $E_p$* for transformation and linear permutation of graphics image data accessed from the frame buffer memory for normalizing graphics image data accessed from the frame buffer for raster operations and for refresh*;* and [:]

second logical linear permutation network means *comprising an exchange linear permutation network $E_p$* for transformation and linear permutation of the normalized graphics image data processed according to raster operations in the data generator circuit for return to said frame buffer memory.

9. The [frame buffer address circuit] *data generator circuit* of claim 8 wherein the first and second logical linear permutation network means of the data generator circuit *each* comprise [an] *said* exchange linear permutation network $E_p$ *in combination with a wire reversal LPN, $R_p$*.

10. A frame buffer address circuit for raster graphics machines having a frame buffer memory comprising a plurality of separately addressable memory banks B with memory bank address locations A, said address circuit addressing each memory bank of the frame buffer memory in a memory access cycle, said frame buffer memory comprising a bit map for storing graphics image data at memory bank address locations correlated with pixel positions of a raster display surface, said frame buffer address circuit being operatively arranged to receive graphics image data addresses organized in a user X, Y coordinate system corresponding to the pixel positions on the raster display surface, said frame buffer address circuit comprising:

*logical* linear permutation network (LPN) [means] *comprising an exchange linear permutation network $E_p$* for transformation and linear permutation of the graphics image data addresses in the user X,Y coordinate system to address in a B,A coordinate system of designated memory banks B and memory bank address locations A of the frame buffer, said B,A coordinate system comprising a linear permutation of the user X,Y coordinate system, said B,A coordinate system comprising a linear permutation bit map addressable by the frame buffer address circuit in [at least two greater] *than three* different addressing mode cell configurations, [at least one] *a plurality* of said addressing mode cell configurations corresponding to [a] two-dimensional cells in the user X,Y coordinate system.

11. The frame buffer address circuit of claim 10 wherein the *logical* linear permutation network means comprises at least one [logical] *exchange* LPN $E_p$ *constructed from self-symmetric Boolean logic gates.*

12. The frame buffer address circuit of claim [11] *10* wherein the designated memory bank B in the B,A coordinate system is a function of both X and Y in the X,Y coordinate system having a functional relationship of the form:

$$B=f_1(X, f_2(Y))$$

where the functions $f_1$ and $f_2$ are LPN's and at least one of the functions $f_1$ and $f_2$ comprises [a logical] *said exchange* LPN, $E_p$.

13. The frame buffer address circuit of claim 12 wherein [f1] $f_1$ [comprise] *comprises* said [a logical] *exchange* LPN $E_p$ and wherein [F2] $f_2$ comprises a wire LPN.

18. The frame buffer address circuit of claim 11 wherein the [logical] *exchange* linear permutation network [means] $E_p$ comprises self-symmetric reversible Boolean logic XOR or XNOR gates.

21. The frame buffer address circuit of claim 10 wherein the addressing mode cell configuration comprise at least one horizontally oriented two dimensional cell, at least one vertically oriented two dimensional cell *at least one substantially square two dimensional cell,* and at least one horizontal word mode cell.

22. The frame buffer address circuit of claim 10 wherein the address circuit is constructed [and arrange] for addressing each memory bank in a memory access cycle and accessing and assembling an addressing mode cell of graphics image data from the memory banks in a memory access cycle, all of the addressing mode cells of the different addressing modes cell configurations being the same bit size and comprising at least one bit from each of the memory banks.

23. The frame buffer address circuit [means] of claim 10 wherein the frame buffer address circuit is constructed [and arranged] to organize the linear permutation bit map of the frame buffer memory into a plurality of blocks of equal numbers of memory bank address locations corresponding to blocks of equal number of pixels of the raster display [or view] surface, said address circuit further organizing the blocks into a plurality of different sets of an equal number of cells with equal numbers of memory bank address locations in each cell, one set of cells corresponding to each addressing mode cell configuration, each set of cells corresponding to nonoverlapping cells of equal numbers of pixels on the raster display or view surface, each cell comprising an equal number of units of graphics image data from the frame buffer memory bank address locations, one unit of graphics image data from each memory bank.

29. A frame buffer address circuit for raster graphics machines having a frame buffer memory comprising a plurality of separately addressable memory banks B with memory bank address locations $A_Y$, $A_Z$ organized into a plurality of bit planes, said address circuit accessing each memory bank of the frame buffer memory in a memory access cycle, said frame buffer memory comprising a bit map for storing graphics image data at memory bank address locations correlated with pixel positions of a raster display surface, each plane of the frame buffer memory comprising memory bank address locations for storing one bit per pixel of the raster display [or view] surface in each plane, said frame buffer address circuit being operatively arranged to receive graphics image data addresses organized in a user X,Y,Z coordinate system of horizontal rows in the X coordinate direction and vertical columns in the Y coordinate direction corresponding to the pixel positions on the raster display [or view] surface, said user X,Y,Z coordinate system further comprising a bit depth dimension Z corresponding to the planes of the frame buffer memory, said frame buffer address circuit comprising:

*logical* linear permutation network (LPN) [means] *comprising at least two exchange LPN's* $E_p$ for transformation and linear permutation *of* the graphics image data addresses in the user X,Y,Z coordinate system to address in a $B,A_YA_Z$ coordinate system of designated memory banks B and memory bank address locations $A_Y$, $A_Z$ of the frame buffer, said $B,A_Y,A_Z$ coordinate system comprising a linear permutation of the user X,Y,Z coordinate system, said $B,A_Y$, $A_Z$ coordinate system comprising a linear permutation bit map addressable by the frame buffer address circuit [in at least two] *by greater than three* different addressing mode cell configurations, [at least one] *a plurality* of said addressing mode cell configurations corresponding to [a] three-dimensional [ ] cells in the user X,Y,Z coordinate system.

30. The frame buffer address circuit of claim 29 wherein the *logical* linear permutation network means comprises at least two [logical] *exchange* LPN's $E_p$ *constructed with self-symmetric Boolean logic gates.*

31. The frame buffer address circuit of claim [30] *29* wherein the designated memory bank B in the $B,A_Y,A_Z$ coordinate system is a function of X,Y, and Z in the X,Y,Z coordinate system having a functional relationship of the form:

$$B=f_1(X,f_2(Y,Z)$$

where $f_1$ and $f_2$ are functions comprising [logical] *exchange* linear permutation networks $E_p$.

33. The frame buffer address circuit of claim [32] *31* wherein $f_2$ comprises an exchange LPN, $E_p$, and a reversal LPN, $R_p$.

37. The frame buffer address circuit of claim 36 where the frame buffer memory bank address coordinates $A_Z$ are a function of Z in the X, [Z]Y,Z coordinate system having a functional relationship of the form:

$$A_Y=Z_r.$$

41. The frame buffer address circuit of claim 29 wherein the frame buffer address circuit is constructed [and arranged] to organize the linear permutation bit map of the frame buffer memory into a plurality of blocks of equal numbers of memory bank address locations corresponding to blocks of equal number of pixels of the raster display [or view] surface, said address circuit further organizing the blocks into a plurality of different sets of an equal number of cells with equal numbers of memory bank address locations in each cell, one set of cells corresponding to each addressing mode cell configuration, each set of cells corresponding to nonoverlapping cells of equal numbers of pixels on the raster display [or view] surface, each cell comprising an equal number of units of graphics image data from the frame buffer memory bank address locations, one unit of graphics image data from each memory bank.

49. The frame buffer address circuit of claim 42 wherein the linear permutation network means comprises a first linear permutation function network for transformation and linear permutation of the graphics image data addresses in the user X,Y,Z coordinate system to addresses in an abstract C,U,S coordinate system of three-dimensional block sections S of equal bit size and configuration corresponding to three-dimensional block sections of the X,Y,Z coordinate system, cell subdivisions C of the block sections corresponding to the addressing mode cells and corresponding nonoverlapping cells of equal numbers of pixels on the raster display or view surface, and graphics image data units U, each cell comprising an equal number of said units, said C,U,S coordinate system comprising a first linear permutation bit map, said first linear permutation function network comprising a functional relationship of the form:

$$C,U,S=f(X,Y,Z)$$

where f includes the pairwise logical linear permutation network $Q_p$;

and wherein the linear permutation network means further comprises a second linear permutation function network for transformation and linear permutation of the graphics image data addresses in the abstract C,U,S coordinate system to memory bank addresses in a $B,A_Y,A_Z$ coordinate system of designated memory banks B and memory bank address locations $A_Y$ of the frame buffer memory said B, [AY] *$A_Y$*, $A_Z$ coordinate system comprising a linear permutation of the abstract C,U,S coordinate system and wherein the functional relationship of the second transformation and linear permutation is of the form:

$$B,A_Y,A_{Z=g}\ (C,U,S)$$

where g comprises the pairwise logical linear permutation network $Q_p$ and the logical exchange LPN $E_p$.

51. A data generator [means] *circuit* coupled to [the] *a* frame buffer address circuit and frame buffer memory of a raster graphics machine for updating the frame buffer *memory* with vector drawing and raster operations, and for refresh of a raster display surface with [the] graphics image data contents of the frame buffer memory, said data generator circuit comprising:

first *logical* linear permutation network means comprising at least one [logical] *exchange* linear permutation network (LPN) *$E_p$* for transformation and linear permutation of graphics image data accessed from the frame buffer memory in *a coordinate system of* the frame buffer memory [coordinate system] for normalizing the order of graphics image data accessed from the frame buffer memory for raster operations and refresh, and second *logical* linear permutation network means comprising at least one [logical] *exchange* linear permutation network (LPN) *$E_p$* for transformation and linear permutation of the normalized graphics image data processed in raster operations in the data generator circuit to a permuted coordinate system for return to the frame buffer memory.

53. The data generator circuit of claim [52] *51* wherein the first and second *logical* linear permutation network means of the data generator circuit [means] further comprise wire linear permutation networks including the reversal wire linear permutation network $R_p$.

54. A data generator circuit operatively coupled to the address generator circuit and frame buffer memory of a raster graphics machine for accessing graphics image data in the frame buffer memory bank address locations for updating the frame buffer memory bank address locations with vector drawing and raster operations and for refresh of a raster display surface with the contents of the frame buffer memory, said data generator circuit comprising:

pre-permute logical linear permutation network means for transformation and linear permutation of graphics image source data retrieved from the frame buffer memory bank address locations in the coordinate system of the frame buffer memory for normalizing the order of the data for establishing a common coordinate system of source data and destination data during raster operations; and post-permute logical linear permutation network means for transformation and linear permutation of graphics image data processed by raster operations to a permuted coordinate system for return of processed graphics image data to the frame buffer memory in a permute*d* coordinate system*;*

*said pre-permute and post-permute linear permutation network means of the data generator circuit comprising exchange linear permutation networks $E_p$.*

57. The data generator circuit of claim [56] *55* wherein the pre-permute and post-permute logical linear permutation network means of the data generator circuit further comprise reversal wire linear permutation networks $R_p$.

62. A method for addressing a raster graphics machine frame buffer memory comprising a bit map for storing graphics image data at frame buffer memory addresses correlated with pixel positions of a raster display surface, said frame buffer addressing method comprising:

transforming and linear permuting in logical linear permutation network means *including an exchange LPN $E_p$* the graphics image data frame buffer memory addresses and forming a linear permutation bit map in the frame buffer memory addressable by [the] *a* frame buffer address circuit in [at least two] *greater than three* different addressing mode cell configurations, at least [one] *three* of said addressing mode cell configurations corresponding to [a] two-dimensional *cells.*

63. The frame buffer addressing method of claim 62 wherein transforming and linear permuting step comprises transforming and permuting in at least one [logical] *exchange* linear permutation network (LPN) *$E_p$ constructed from self-symmetric Boolean logic gates*;

and addressing the frame buffer memory linear permutation bit map in [at least] *greater than* three different addressing mode cell configuration, at least [two] *three* of said addressing mode cell configurations comprising two-dimensional cells *having the configurations of a horizontally oriented rectangular two dimensional cell, a vertically oriented rectangular two dimensional cell, and a substantially square two dimensional cell.*

64. A method for generating graphics image data in raster graphics machine having a frame buffer memory by accessing graphics image data in frame buffer memory bank addresses and updating the frame buffer memory bank addresses for vector drawings, raster operations, and refresh of a raster display surface with the contents of the frame buffer memory, said method comprising:

accessing graphics image data from the frame buffer memory bank addresses and permuting the data in pre-permute logical *exchange* linear permutation network means for transformation and linear permutation for normalizing the order of the data and establishing a common coordinate system for processing graphics image data during raster operations and refresh; and transforming and linear permuting the graphics image data processed raster operations in post-permute logical *exchange* linear permutation network means for return of processed graphics image data to the frame buffer memory.

* * * * *